US010318941B2

(12) United States Patent
Chawla et al.

(10) Patent No.: US 10,318,941 B2
(45) Date of Patent: *Jun. 11, 2019

(54) PAYMENT PLATFORM INTERFACE WIDGET GENERATION APPARATUSES, METHODS AND SYSTEMS

(71) Applicant: VISA INTERNATIONAL SERVICE ASSOCIATION, San Francisco, CA (US)

(72) Inventors: Pawan Chawla, San Ramon, CA (US); Manav Gupta, Mountain View, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/966,098

(22) Filed: Aug. 13, 2013

(65) Prior Publication Data

US 2014/0052617 A1 Feb. 20, 2014

Related U.S. Application Data

(63) Continuation-in-part of application No. 13/872,005, filed on Apr. 26, 2013, now Pat. No. 9,953,378, and (Continued)

(51) Int. Cl.
G06Q 20/12 (2012.01)
G06Q 10/10 (2012.01)
G06Q 20/10 (2012.01)

(52) U.S. Cl.
CPC ............ *G06Q 20/12* (2013.01); *G06Q 10/10* (2013.01); *G06Q 20/102* (2013.01)

(58) Field of Classification Search
USPC ......................................... 705/39
See application file for complete search history.

(56) References Cited

U.S. PATENT DOCUMENTS 789,106 A 5/1905 Seymour
5,237,164 A 8/1993 Takada
(Continued)

FOREIGN PATENT DOCUMENTS

EP 0855659 A1 7/1998
JP 2008545210 A 12/2008
(Continued)

OTHER PUBLICATIONS

Han, Hui and Trimi, Silvana; "Social Commerce Design: A Framework and Application", May 27, 2017, Journal of Theoretical and Applied Electronic Commerce Research, vol. 12, Issue 3; www.jtaer.com (Year: 2017).*

(Continued)

*Primary Examiner* — Bruce I Ebersman
*Assistant Examiner* — David P Sharvin
(74) *Attorney, Agent, or Firm* — Loeb & Loeb, LLP

(57) ABSTRACT

The PAYMENT PLATFORM INTERFACE WIDGET GENERATION APPARATUSES, METHODS AND SYSTEMS ("API-Tool") transforms developer credentials, codes and parameter inputs via the API-Tool component into buy widgets, payment acceptance and purchase transaction outputs. In one embodiment, the API-Tool may facilitate obtaining a plurality of authentication parameters and widget customization parameters. The API-Tool may authenticate a user using a parameter derived from the plurality of authentication parameters and may dynamically generate a purchase widget for the authenticated user using the plurality of widget customization parameters.

15 Claims, 73 Drawing Sheets

Related U.S. Application Data a continuation-in-part of application No. PCT/US2012/069557, filed on Dec. 13, 2012, and a continuation-in-part of application No. 13/714,090, filed on Dec. 13, 2012, now Pat. No. 10,096,022.

(60) Provisional application No. 61/682,645, filed on Aug. 13, 2012, provisional application No. 61/639,843, filed on Apr. 27, 2012, provisional application No. 61/639,837, filed on Apr. 27, 2012, provisional application No. 61/570,230, filed on Dec. 13, 2011.

(56) References Cited

U.S. PATENT DOCUMENTS

| | | |
|---|---|---|
| 5,311,594 A | 5/1994 | Penzias |
| 5,446,890 A | 8/1995 | Renslo |
| 5,459,656 A | 10/1995 | Fields |
| 5,510,777 A | 4/1996 | Pilc |
| 5,521,362 A | 5/1996 | Powers |
| 5,530,438 A | 6/1996 | Bickham |
| 5,536,045 A | 7/1996 | Adams |
| 5,588,105 A | 12/1996 | Foster |
| 5,615,110 A | 3/1997 | Wong |
| 5,615,264 A | 3/1997 | Kazmierczak |
| 5,649,118 A | 7/1997 | Carlisle |
| 5,815,657 A | 9/1998 | Williams |
| 5,850,446 A | 12/1998 | Berger |
| 5,878,337 A | 3/1999 | Joao |
| 5,903,830 A | 5/1999 | Joao |
| 5,943,624 A | 8/1999 | Fox |
| 5,963,924 A | 10/1999 | Williams |
| 6,061,660 A | 5/2000 | Eggleston |
| 6,064,990 A | 5/2000 | Goldsmith |
| 6,092,053 A | 7/2000 | Boesch |
| 6,202,052 B1 | 3/2001 | Miller |
| 6,202,933 B1 | 3/2001 | Poore |
| 6,263,447 B1 | 7/2001 | French |
| 6,267,292 B1 | 7/2001 | Walker |
| 6,304,886 B1 | 10/2001 | Bernardo |
| 6,330,593 B1 | 12/2001 | Roberts |
| 6,336,099 B1 | 1/2002 | Barnett |
| 6,374,250 B2 | 4/2002 | Ajtai |
| 6,473,500 B1 | 10/2002 | Risafi |
| 6,529,725 B1 | 3/2003 | Joao |
| 6,535,855 B1 | 3/2003 | Cahill |
| 6,601,761 B1 | 8/2003 | Katis |
| 6,643,652 B2 | 11/2003 | Helgeson |
| 6,735,572 B2 | 5/2004 | Landesmann |
| 6,799,165 B1 | 9/2004 | Boesjes |
| 6,842,741 B1 | 1/2005 | Fujimura |
| 6,853,386 B1 | 2/2005 | Keim |
| 6,853,982 B2 | 2/2005 | Smith |
| 6,857,073 B2 | 2/2005 | French |
| 6,873,974 B1 | 3/2005 | Schutzer |
| 6,898,598 B2 | 5/2005 | Himmel |
| 6,915,279 B2 | 7/2005 | Hogan |
| 6,934,528 B2 | 8/2005 | Loureiro |
| 6,963,859 B2 | 11/2005 | Stefik |
| 6,999,943 B1 | 2/2006 | Johnson |
| 7,015,912 B2 | 3/2006 | Marais |
| 7,024,383 B1 | 4/2006 | Mancini |
| 7,028,052 B2 | 4/2006 | Chapman |
| 7,047,041 B2 | 5/2006 | Vanska |
| 7,051,002 B2 | 5/2006 | Keresman, III |
| 7,089,208 B1 | 8/2006 | Levchin |
| 7,096,003 B2 | 8/2006 | Joao |
| 7,111,789 B2 | 9/2006 | Rajasekaran |
| 7,155,411 B1 | 12/2006 | Blinn |
| 7,165,041 B1 | 1/2007 | Guheen |
| 7,167,844 B1 * | 1/2007 | Leong .................. G06Q 30/04 705/37 |
| 7,177,848 B2 | 2/2007 | Hogan |
| 7,194,437 B1 | 3/2007 | Britto |
| 7,206,847 B1 | 4/2007 | Alberth |
| 7,212,979 B1 | 5/2007 | Matz |
| RE39,736 E | 7/2007 | Morrill |
| 7,268,667 B2 | 9/2007 | Beenau |
| 7,268,668 B2 | 9/2007 | Beenau |
| 7,290,704 B1 | 11/2007 | Ball |
| 7,318,049 B2 | 1/2008 | Iannacci |
| 7,337,119 B1 | 2/2008 | Geschwender |
| 7,337,144 B1 | 2/2008 | Blinn |
| 7,343,149 B2 | 3/2008 | Benco |
| 7,343,351 B1 | 3/2008 | Bishop |
| 7,349,885 B2 | 3/2008 | Gangi |
| 7,356,505 B2 | 4/2008 | March |
| 7,357,310 B2 | 4/2008 | Calabrese |
| 7,359,880 B2 | 4/2008 | Abel |
| 7,373,669 B2 | 5/2008 | Eisen |
| 7,379,899 B1 | 5/2008 | Junger |
| 7,392,222 B1 | 6/2008 | Hamilton |
| 7,395,242 B2 | 7/2008 | Blinn |
| 7,398,250 B2 | 7/2008 | Blinn |
| 7,413,113 B1 | 8/2008 | Zhu |
| 7,450,966 B2 | 11/2008 | Vanska |
| 7,477,780 B2 | 1/2009 | Boncyk |
| 7,499,889 B2 | 3/2009 | Golan |
| 7,500,607 B2 | 3/2009 | Williams |
| 7,533,064 B1 | 5/2009 | Boesch |
| 7,536,360 B2 | 5/2009 | Stolfo |
| 7,571,139 B1 | 8/2009 | Giordano |
| 7,571,140 B2 | 8/2009 | Weichert |
| 7,593,858 B2 | 9/2009 | Matz |
| 7,603,311 B1 | 10/2009 | Yadav-ranjan |
| 7,630,937 B1 | 12/2009 | Mo |
| 7,634,295 B2 | 12/2009 | Hayaashi |
| 7,644,037 B1 | 1/2010 | Ostrovsky |
| 7,644,859 B1 | 1/2010 | Zhu |
| 7,645,194 B2 | 1/2010 | Van Luchene |
| 7,660,749 B2 | 2/2010 | Koski |
| 7,676,434 B2 | 3/2010 | Evans |
| 7,685,067 B1 | 3/2010 | Britto |
| 7,698,221 B2 | 4/2010 | Blinn |
| 7,707,113 B1 | 4/2010 | Dimartino |
| 7,708,194 B2 | 5/2010 | Vawter |
| 7,708,198 B2 | 5/2010 | Gangi |
| 7,712,658 B2 | 5/2010 | Gangi |
| 7,716,141 B2 | 5/2010 | Stewart |
| 7,734,630 B2 | 6/2010 | Kato |
| 7,739,194 B2 | 6/2010 | Blinn |
| 7,742,984 B2 | 6/2010 | Mohsenzadeh |
| 7,756,752 B2 | 7/2010 | Duvall |
| 7,765,166 B2 | 7/2010 | Beringer |
| 7,774,076 B2 | 8/2010 | Skowronek |
| 7,779,360 B1 | 8/2010 | Jones |
| 7,783,569 B2 | 8/2010 | Abel |
| 7,784,684 B2 | 8/2010 | Labrou |
| 7,801,829 B2 | 9/2010 | Gray |
| 7,802,719 B2 | 9/2010 | Johnson |
| 7,810,720 B2 | 10/2010 | Lovett |
| 7,819,307 B2 | 10/2010 | Lyons |
| 7,828,206 B2 | 11/2010 | Hessburg |
| 7,828,992 B2 | 11/2010 | Kilickiran |
| 7,837,125 B2 | 11/2010 | Biskupski |
| 7,844,530 B2 | 11/2010 | Ziade |
| 7,849,014 B2 | 12/2010 | Erikson |
| 7,870,027 B1 | 1/2011 | Tannenbaum |
| 7,877,299 B2 | 1/2011 | Bui |
| 7,878,400 B2 | 2/2011 | Harris |
| 7,890,370 B2 | 2/2011 | Whitsitt |
| 7,890,393 B2 | 2/2011 | Talbert |
| 7,895,119 B2 | 2/2011 | Praisner |
| 7,899,744 B2 | 3/2011 | Bishop |
| 7,904,360 B2 | 3/2011 | Evans |
| 7,908,227 B2 | 3/2011 | Zizzimopoulos |
| 7,926,714 B1 | 4/2011 | Zhu |
| 7,933,779 B2 | 4/2011 | Rooks |
| 7,942,337 B2 | 5/2011 | Jain |
| 7,962,418 B1 | 6/2011 | Wei |
| 7,967,196 B1 | 6/2011 | Bierbaum |
| 7,971,782 B1 | 7/2011 | Shams |
| 7,996,259 B1 | 8/2011 | Distefano, III |
| 8,016,192 B2 | 9/2011 | Messerges |

(56) References Cited

U.S. PATENT DOCUMENTS

| | | |
|---|---|---|
| 8,020,763 B1 | 9/2011 | Kowalchyk |
| 8,024,260 B1 | 9/2011 | Hogl |
| 8,028,041 B2 | 9/2011 | Olliphant |
| 8,032,438 B1 | 10/2011 | Barton |
| 8,041,338 B2 | 10/2011 | Chen |
| 8,050,997 B1 | 11/2011 | Nosek |
| 8,060,413 B2 | 11/2011 | Castell |
| 8,074,876 B2 | 12/2011 | Foss |
| 8,086,535 B2 | 12/2011 | Zweig |
| 8,090,618 B1 | 1/2012 | Chu |
| 8,108,261 B2 | 1/2012 | Carlier |
| 8,127,982 B1 | 3/2012 | Casey |
| 8,140,418 B1 | 3/2012 | Casey |
| 8,145,188 B2 | 3/2012 | Park |
| 8,145,561 B1 | 3/2012 | Zhu |
| 8,145,566 B1 | 3/2012 | Ahuja |
| 8,145,569 B2 | 3/2012 | Gong |
| 8,145,898 B2 | 3/2012 | Kamalakantha |
| 8,150,767 B2 | 4/2012 | Wankmueller |
| 8,150,772 B2 | 4/2012 | Mardikar |
| 8,151,328 B1 | 4/2012 | Lundy |
| 8,151,330 B2 | 4/2012 | Vishik |
| 8,151,336 B2 | 4/2012 | Savoor |
| 8,155,999 B2 | 4/2012 | De Boer |
| 8,156,000 B1 | 4/2012 | Thompson |
| 8,156,026 B2 | 4/2012 | Junger |
| 8,156,042 B2 | 4/2012 | Winkleman, III |
| 8,156,549 B2 | 4/2012 | Rice |
| 8,157,178 B2 | 4/2012 | Dewan |
| 8,157,181 B2 | 4/2012 | Bates |
| 8,160,935 B2 | 4/2012 | Bui |
| 8,160,959 B2 | 4/2012 | Rackley, III |
| 8,165,961 B1 | 4/2012 | Dimartino |
| 8,166,068 B2 | 4/2012 | Stevens |
| RE43,351 E | 5/2012 | Jordan |
| 8,170,921 B2 | 5/2012 | Stocker |
| 8,175,235 B2 | 5/2012 | Mumford |
| 8,175,965 B2 | 5/2012 | Moore |
| 8,175,967 B2 | 5/2012 | OLeary |
| 8,175,968 B2 | 5/2012 | OLeary |
| 8,175,975 B2 | 5/2012 | Cai |
| 8,175,979 B2 | 5/2012 | Baentsch |
| 8,176,416 B1 | 5/2012 | Williams |
| 8,179,563 B2 | 5/2012 | King |
| 8,180,289 B1 | 5/2012 | Glickman |
| 8,180,705 B2 | 5/2012 | Kowalchyk |
| 8,185,439 B2 | 5/2012 | Webb |
| 8,190,513 B2 | 5/2012 | Felger |
| 8,191,775 B2 | 6/2012 | Hildred |
| 8,195,233 B2 | 6/2012 | Morikuni |
| 8,195,544 B2 | 6/2012 | Horsfall |
| 8,195,547 B2 | 6/2012 | Aaltonen |
| 8,195,565 B2 | 6/2012 | Bishop |
| 8,195,576 B1 | 6/2012 | Grigg |
| 8,196,131 B1 | 6/2012 | Von Behren |
| 8,200,582 B1 | 6/2012 | Zhu |
| 8,204,774 B2 | 6/2012 | Chwast |
| 8,204,829 B2 | 6/2012 | Alvarez |
| 8,209,217 B1 | 6/2012 | Griffith |
| 8,209,245 B2 | 6/2012 | Dennes |
| 8,209,744 B2 | 6/2012 | Zhu |
| 8,214,288 B2 | 7/2012 | Olliphant |
| 8,214,289 B2 | 7/2012 | Scipioni |
| 8,214,291 B2 | 7/2012 | Pelegero |
| 8,214,292 B2 | 7/2012 | Duggal |
| 8,214,293 B2 | 7/2012 | Powell |
| 8,214,886 B2 | 7/2012 | Foley |
| 8,215,546 B2 | 7/2012 | Lin |
| 8,219,411 B2 | 7/2012 | Matz |
| 8,219,474 B2 | 7/2012 | Sutton |
| 8,219,490 B2 | 7/2012 | Hammad |
| 8,220,047 B1 | 7/2012 | Soghoian |
| 8,224,702 B2 | 7/2012 | Mangerink |
| 8,224,754 B2 | 7/2012 | Pastusiak |
| 8,224,773 B2 | 7/2012 | Spiegel |
| 8,225,997 B1 | 7/2012 | Bierbaum |
| 8,227,936 B1 | 7/2012 | Folk |
| 8,229,354 B2 | 7/2012 | Sklovsky |
| 8,229,808 B1 | 7/2012 | Heit |
| 8,229,844 B2 | 7/2012 | Felger |
| 8,229,851 B2 | 7/2012 | Doran |
| 8,229,854 B2 | 7/2012 | Stephen |
| 8,233,841 B2 | 7/2012 | Griffin |
| 8,234,183 B2 | 7/2012 | Smith |
| 8,239,276 B2 | 8/2012 | Lin |
| 8,244,580 B2 | 8/2012 | Mankoff |
| 8,249,965 B2 | 8/2012 | Tumminaro |
| 8,255,278 B1 | 8/2012 | Young |
| 8,255,323 B1 | 8/2012 | Casey |
| 8,255,324 B2 | 8/2012 | Bercy |
| 8,275,704 B2 | 9/2012 | Bishop |
| 8,280,777 B2 | 10/2012 | Mengerink |
| 8,281,998 B2 | 10/2012 | Tang |
| 8,282,002 B2 | 10/2012 | Shams |
| 8,285,640 B2 | 10/2012 | Scipioni |
| 8,285,820 B2 | 10/2012 | Olliphant |
| 8,285,832 B2 | 10/2012 | Schwab |
| 8,286,875 B2 | 10/2012 | Tang |
| 8,290,433 B2 | 10/2012 | Fisher |
| 8,290,819 B2 | 10/2012 | Bawcutt |
| 8,290,829 B1 | 10/2012 | Katz |
| 8,295,898 B2 | 10/2012 | Ashfield |
| 8,296,187 B2 | 10/2012 | Light |
| 8,296,204 B2 | 10/2012 | Templeton |
| 8,296,228 B1 | 10/2012 | Kloor |
| 8,296,231 B2 | 10/2012 | Britto |
| 8,301,500 B2 | 10/2012 | Pharris |
| 8,301,510 B2 | 10/2012 | Boesch |
| 8,301,556 B2 | 10/2012 | Hogl |
| 8,311,520 B2 | 11/2012 | Choi |
| 8,312,096 B2 | 11/2012 | Cohen |
| 8,321,267 B2 | 11/2012 | Hoerenz |
| 8,321,294 B2 | 11/2012 | Carlier |
| 8,321,315 B2 | 11/2012 | Abel |
| 8,321,338 B2 | 11/2012 | Baumgart |
| 8,321,343 B2 | 11/2012 | Ramavarjula |
| 8,326,756 B2 | 12/2012 | Egendorf |
| 8,326,769 B1 | 12/2012 | Weisman |
| 8,326,770 B1 | 12/2012 | Weisman |
| 8,327,450 B2 | 12/2012 | Clement |
| 8,332,272 B2 | 12/2012 | Fisher |
| 8,332,275 B2 | 12/2012 | Poon |
| 8,332,323 B2 | 12/2012 | Stals |
| 8,335,720 B2 | 12/2012 | Juang |
| 8,335,726 B1 | 12/2012 | Ling |
| 8,335,822 B2 | 12/2012 | Ahmed |
| 8,335,921 B2 | 12/2012 | Von Behren |
| 8,335,932 B2 | 12/2012 | Von Behren |
| 8,340,666 B2 | 12/2012 | Ramer |
| 8,341,029 B1 | 12/2012 | Ramalingam |
| 8,346,643 B2 | 1/2013 | Boyer |
| 8,346,659 B1 | 1/2013 | Mohsenzadeh |
| 8,346,663 B2 | 1/2013 | Kawan |
| 8,352,323 B2 | 1/2013 | Fisher |
| 8,352,362 B2 | 1/2013 | Mohsenzadeh |
| 8,352,499 B2 | 1/2013 | Bharat |
| 8,352,749 B2 | 1/2013 | Von Behren |
| 8,355,987 B2 | 1/2013 | Hirson |
| 8,359,070 B1 | 1/2013 | Zhu |
| 8,364,587 B2 | 1/2013 | Nuzum |
| 8,364,590 B1 | 1/2013 | Casey |
| 8,370,264 B1 | 2/2013 | Wei |
| 8,380,177 B2 | 2/2013 | Laracey |
| 8,401,904 B1 | 3/2013 | Simakov |
| 8,412,586 B1 | 4/2013 | Foulser |
| 8,412,630 B2 | 4/2013 | Ross |
| 8,417,633 B1 | 4/2013 | Chmara |
| 8,423,462 B1 | 4/2013 | Amacker |
| 8,429,013 B2 | 4/2013 | Symons |
| 8,504,559 B1 | 8/2013 | Elman |
| 8,606,649 B2 | 12/2013 | Keener, Jr. |
| 8,639,685 B2 | 1/2014 | Huang |
| 8,788,935 B1 | 7/2014 | Hirsch |
| 9,355,393 B2 | 5/2016 | Purves |

(56) References Cited

U.S. PATENT DOCUMENTS

| | | |
|---|---|---|
| 9,430,579 B2 | 8/2016 | Hsu |
| 9,471,332 B2 | 10/2016 | Li |
| 9,582,598 B2 | 2/2017 | Kalgi |
| 9,622,142 B2 | 4/2017 | Burton |
| 9,710,807 B2 | 7/2017 | Theurer |
| 9,760,871 B1 | 9/2017 | Pourfallah |
| 9,940,610 B1 | 4/2018 | Davison |
| 2001/0037297 A1 | 3/2001 | McNair |
| 2001/0044774 A1 | 11/2001 | Sasazawa |
| 2001/0056359 A1 | 12/2001 | Abreu |
| 2002/0016765 A1 | 2/2002 | Sacks |
| 2002/0019777 A1 | 2/2002 | Schwab |
| 2002/0040325 A1 | 4/2002 | Takae |
| 2002/0077976 A1 | 6/2002 | Meyer |
| 2002/0082919 A1 | 6/2002 | Laundau |
| 2002/0107755 A1 | 8/2002 | Steed |
| 2002/0112014 A1 | 8/2002 | Bennett |
| 2002/0116271 A1 | 8/2002 | Mankoff |
| 2002/0120859 A1 | 8/2002 | Lipkin |
| 2002/0143614 A1 | 10/2002 | MacLean |
| 2003/0014307 A1 | 1/2003 | Heng |
| 2003/0014331 A1 | 1/2003 | Simons |
| 2003/0020748 A1 | 1/2003 | Charpentier |
| 2003/0026404 A1 | 2/2003 | Joyce |
| 2003/0028481 A1 | 2/2003 | Flitcroft |
| 2003/0061170 A1 | 3/2003 | Uzo |
| 2003/0061482 A1 | 3/2003 | Emmerichs |
| 2003/0080185 A1 | 5/2003 | Werther |
| 2003/0097318 A1 | 5/2003 | Yu |
| 2003/0101134 A1 | 5/2003 | Liu |
| 2003/0135734 A1 | 7/2003 | Fagan |
| 2003/0135842 A1 | 7/2003 | Frey |
| 2003/0158811 A1 | 8/2003 | Sanders |
| 2003/0174823 A1 | 9/2003 | Justice |
| 2003/0177361 A1 | 9/2003 | Wheeler |
| 2003/0191711 A1 | 10/2003 | Jamison |
| 2003/0200142 A1 | 10/2003 | Hicks |
| 2003/0200184 A1 | 10/2003 | Dominguez |
| 2003/0212642 A1 | 11/2003 | Weller |
| 2003/0233286 A1 | 12/2003 | Hahn-Carlson |
| 2004/0054625 A1 | 3/2004 | Kellogg |
| 2004/0059659 A1 | 3/2004 | Safaei |
| 2004/0078332 A1 | 4/2004 | Ferguson |
| 2004/0103037 A1 | 5/2004 | Wetmore |
| 2004/0117358 A1 | 6/2004 | von Kaenel |
| 2004/0128197 A1 | 7/2004 | Bam |
| 2004/0138999 A1 | 7/2004 | Friedman |
| 2004/0148255 A1 | 7/2004 | Beck |
| 2004/0215963 A1 | 10/2004 | Kaplan |
| 2004/0230536 A1 | 11/2004 | Fung |
| 2004/0236646 A1 | 11/2004 | Wu |
| 2004/0254836 A1 | 12/2004 | Emoke Barabas |
| 2004/0254891 A1 | 12/2004 | Blinn |
| 2004/0267608 A1 | 12/2004 | Mansfield |
| 2005/0010483 A1 | 1/2005 | Ling |
| 2005/0015338 A1 | 1/2005 | Lee |
| 2005/0037735 A1 | 2/2005 | Courts |
| 2005/0065819 A1 | 3/2005 | Pamela |
| 2005/0080747 A1 | 4/2005 | Anderson |
| 2005/0080821 A1 | 4/2005 | Breil |
| 2005/0097320 A1 | 5/2005 | Golan |
| 2005/0137969 A1 | 6/2005 | Shah |
| 2005/0171894 A1 | 8/2005 | Traynor |
| 2005/0177464 A1 | 8/2005 | Komem |
| 2005/0192893 A1 | 9/2005 | Keeling |
| 2005/0192895 A1 | 9/2005 | Rogers |
| 2005/0220326 A1 | 10/2005 | Sim |
| 2005/0234817 A1 | 10/2005 | VanFleet |
| 2005/0246278 A1 | 11/2005 | Gerber |
| 2005/0253840 A1 | 11/2005 | Kwon |
| 2005/0254714 A1 | 11/2005 | Anne |
| 2005/0261967 A1 | 11/2005 | Barry |
| 2006/0004713 A1 | 1/2006 | Korte |
| 2006/0005207 A1 | 1/2006 | Louch |
| 2006/0015399 A1 | 1/2006 | Alberth |
| 2006/0041618 A1 | 2/2006 | Chang |
| 2006/0053056 A1 | 3/2006 | Alspach-goss |
| 2006/0053077 A1 | 3/2006 | Mourad |
| 2006/0085328 A1 | 4/2006 | Cohen |
| 2006/0085477 A1 | 4/2006 | Phillips |
| 2006/0089962 A1 | 4/2006 | Tsukazaki |
| 2006/0124729 A1 | 6/2006 | Martin |
| 2006/0129427 A1 | 6/2006 | Wennberg |
| 2006/0163349 A1 | 7/2006 | Neugebauer |
| 2006/0178986 A1 | 8/2006 | Giordano |
| 2006/0190347 A1 | 8/2006 | Cuervo |
| 2006/0212722 A1 | 9/2006 | Ginter |
| 2006/0218153 A1 | 9/2006 | Voon |
| 2006/0226216 A1 | 10/2006 | Keithley |
| 2006/0268007 A1 | 11/2006 | Gopalakrishnan |
| 2006/0277143 A1 | 12/2006 | Almonte |
| 2006/0293947 A1 | 12/2006 | Nicholson |
| 2007/0011025 A1 | 1/2007 | Cracchiolo |
| 2007/0038515 A1 | 2/2007 | Postrel |
| 2007/0038516 A1 | 2/2007 | Apple |
| 2007/0055571 A1 | 3/2007 | Fox |
| 2007/0060315 A1 | 3/2007 | Park |
| 2007/0061250 A1 | 3/2007 | Kuo |
| 2007/0087820 A1 | 4/2007 | Van |
| 2007/0087822 A1 | 4/2007 | Van Luchene |
| 2007/0094066 A1 | 4/2007 | Kumar |
| 2007/0100691 A1 | 5/2007 | Patterson |
| 2007/0100728 A1 | 5/2007 | Rotman |
| 2007/0101276 A1 | 5/2007 | Yuen |
| 2007/0106607 A1 | 5/2007 | Seib |
| 2007/0113289 A1 | 5/2007 | Blumenau |
| 2007/0143204 A1 | 6/2007 | Claus |
| 2007/0150413 A1 | 6/2007 | Morgenstern |
| 2007/0180119 A1 | 8/2007 | Khivesara |
| 2007/0189579 A1 | 8/2007 | Crookham |
| 2007/0208662 A1 | 9/2007 | Jeronimus |
| 2007/0214078 A1 | 9/2007 | Coppinger |
| 2007/0214250 A1 | 9/2007 | Ahmed |
| 2007/0226152 A1 | 9/2007 | Jones |
| 2007/0233590 A1 | 10/2007 | Hardison |
| 2007/0239502 A1 | 10/2007 | Babu |
| 2007/0239552 A1 | 10/2007 | Sundaresan |
| 2007/0255653 A1 | 11/2007 | Tumminaro |
| 2007/0267479 A1 | 11/2007 | Nix |
| 2007/0276765 A1 | 11/2007 | Hazel |
| 2007/0299976 A1 | 12/2007 | Zafar |
| 2008/0004116 A1 | 1/2008 | Van |
| 2008/0004952 A1 | 1/2008 | Koli |
| 2008/0010096 A1 | 1/2008 | Patterson |
| 2008/0021829 A1 | 1/2008 | Kranzley |
| 2008/0034309 A1 | 2/2008 | Louch |
| 2008/0077489 A1 | 3/2008 | Gilley |
| 2008/0086365 A1 | 4/2008 | Zollino |
| 2008/0091553 A1 | 4/2008 | Koski |
| 2008/0091616 A1 | 4/2008 | Helwin |
| 2008/0097856 A1 | 4/2008 | Blagg |
| 2008/0097871 A1 | 4/2008 | Williams |
| 2008/0104496 A1* | 5/2008 | Williams ............. G06Q 10/107 |
| | | 715/209 |
| 2008/0114737 A1 | 5/2008 | Neely |
| 2008/0120194 A1 | 5/2008 | Juras |
| 2008/0126145 A1 | 5/2008 | Racklet, III |
| 2008/0133351 A1 | 6/2008 | White |
| 2008/0140568 A1 | 6/2008 | Henry |
| 2008/0147480 A1 | 6/2008 | Sarma |
| 2008/0147883 A1 | 6/2008 | Philyaw |
| 2008/0148283 A1* | 6/2008 | Allen ..................... G06F 8/38 |
| | | 719/316 |
| 2008/0154915 A1 | 6/2008 | Flake |
| 2008/0162361 A1 | 7/2008 | Sklovsky |
| 2008/0167965 A1 | 7/2008 | Von |
| 2008/0172274 A1 | 7/2008 | Hurowitz |
| 2008/0172331 A1 | 7/2008 | Graves |
| 2008/0177574 A1 | 7/2008 | Marcos |
| 2008/0177672 A1 | 7/2008 | Brunner |
| 2008/0181463 A1 | 7/2008 | Error |
| 2008/0195510 A1 | 8/2008 | Olliphant |
| 2008/0195664 A1 | 8/2008 | Maharajh |
| 2008/0208704 A1 | 8/2008 | Wang |

(56) References Cited

U.S. PATENT DOCUMENTS

| | | |
|---|---|---|
| 2008/0208712 A1 | 8/2008 | Yerkes |
| 2008/0222170 A1 | 9/2008 | Farnham |
| 2008/0223918 A1 | 9/2008 | Williams |
| 2008/0235123 A1 | 9/2008 | Olliphant |
| 2008/0244509 A1 | 10/2008 | Buchs |
| 2008/0263460 A1 | 10/2008 | Altberg |
| 2008/0270300 A1 | 10/2008 | Jones |
| 2008/0272188 A1 | 11/2008 | Keithley |
| 2008/0319905 A1 | 12/2008 | Carlson |
| 2009/0006181 A1 | 1/2009 | Ghosh |
| 2009/0024452 A1 | 1/2009 | Martinez |
| 2009/0024527 A1 | 1/2009 | Sellen |
| 2009/0031228 A1 | 1/2009 | Buchs |
| 2009/0037255 A1 | 2/2009 | Chiu |
| 2009/0048934 A1 | 2/2009 | Haddad |
| 2009/0055757 A1 | 2/2009 | Chaney |
| 2009/0061884 A1 | 3/2009 | Rajan |
| 2009/0063261 A1 | 3/2009 | Scribner |
| 2009/0064056 A1 | 3/2009 | Anderson |
| 2009/0076934 A1 | 3/2009 | Shahbazi |
| 2009/0076953 A1 | 3/2009 | Saville |
| 2009/0076966 A1 | 3/2009 | Bishop |
| 2009/0089176 A1 | 4/2009 | Mccabe |
| 2009/0089193 A1 | 4/2009 | Paintin |
| 2009/0096812 A1 | 4/2009 | Boixel |
| 2009/0099925 A1 | 4/2009 | Mehta |
| 2009/0099961 A1* | 4/2009 | Ogilvy ............... G06Q 20/10 705/39 |
| 2009/0104888 A1 | 4/2009 | Cox |
| 2009/0106151 A1 | 4/2009 | Nelsen |
| 2009/0119176 A1 | 5/2009 | Johnson |
| 2009/0119211 A1 | 5/2009 | Johnson |
| 2009/0132347 A1 | 5/2009 | Anderson |
| 2009/0132395 A1 | 5/2009 | Lam |
| 2009/0132403 A1 | 5/2009 | Titus |
| 2009/0132435 A1 | 5/2009 | Titus |
| 2009/0138525 A1 | 5/2009 | Mattox |
| 2009/0144104 A1 | 6/2009 | Johnson |
| 2009/0150388 A1 | 6/2009 | Roseman |
| 2009/0164315 A1 | 6/2009 | Rothman |
| 2009/0164344 A1 | 6/2009 | Shiftan |
| 2009/0171760 A1 | 7/2009 | Aarnlo |
| 2009/0171778 A1 | 7/2009 | Powell |
| 2009/0182664 A1 | 7/2009 | Trombley |
| 2009/0182762 A1 | 7/2009 | Chang |
| 2009/0182837 A1 | 7/2009 | Roberts |
| 2009/0210300 A1 | 8/2009 | Cansler |
| 2009/0222302 A1 | 9/2009 | Higgins |
| 2009/0222347 A1 | 9/2009 | Whitten |
| 2009/0222511 A1 | 9/2009 | Hays |
| 2009/0233579 A1 | 9/2009 | Castell |
| 2009/0234751 A1 | 9/2009 | Chan |
| 2009/0241159 A1 | 9/2009 | Campagna |
| 2009/0248996 A1 | 10/2009 | Mandyam |
| 2009/0254471 A1 | 10/2009 | Seidel |
| 2009/0254479 A1 | 10/2009 | Pharris |
| 2009/0254535 A1 | 10/2009 | Eickelmann |
| 2009/0265274 A1 | 10/2009 | Hahn-Carlson |
| 2009/0271265 A1 | 10/2009 | Lay |
| 2009/0271283 A1 | 10/2009 | Fosnacht |
| 2009/0288012 A1 | 11/2009 | Hertel |
| 2009/0307135 A1 | 12/2009 | Gupta |
| 2009/0313132 A1 | 12/2009 | McKenna |
| 2009/0327040 A1 | 12/2009 | McInerny |
| 2009/0327045 A1 | 12/2009 | Olives |
| 2009/0327088 A1 | 12/2009 | Puthupparambil |
| 2010/0004989 A1 | 1/2010 | Bonalle |
| 2010/0005025 A1 | 1/2010 | Kumar |
| 2010/0009663 A1 | 1/2010 | Chang |
| 2010/0010964 A1 | 1/2010 | Skowronek |
| 2010/0017501 A1 | 1/2010 | Yen |
| 2010/0023386 A1 | 1/2010 | Avisar |
| 2010/0023455 A1 | 1/2010 | Dispensa |
| 2010/0036741 A1 | 2/2010 | Cleven |
| 2010/0036775 A1 | 2/2010 | Edens |
| 2010/0042456 A1 | 2/2010 | Stinchcombe |
| 2010/0042537 A1 | 2/2010 | Smith |
| 2010/0042540 A1 | 2/2010 | Graves |
| 2010/0049879 A1 | 2/2010 | Leavitt |
| 2010/0063873 A1 | 3/2010 | McGucken |
| 2010/0063903 A1 | 3/2010 | Whipple |
| 2010/0076873 A1 | 3/2010 | Taylor |
| 2010/0076987 A1 | 3/2010 | Schreiner |
| 2010/0078471 A1 | 4/2010 | Lin |
| 2010/0078472 A1 | 4/2010 | Lin |
| 2010/0082444 A1 | 4/2010 | Lin |
| 2010/0082445 A1 | 4/2010 | Hodge |
| 2010/0082447 A1 | 4/2010 | Lin |
| 2010/0082455 A1 | 4/2010 | Rosenblatt |
| 2010/0082480 A1 | 4/2010 | Korosec |
| 2010/0082481 A1 | 4/2010 | Lin |
| 2010/0082485 A1 | 4/2010 | Lin |
| 2010/0082490 A1 | 4/2010 | Rosenblatt |
| 2010/0082491 A1 | 4/2010 | Rosenblatt |
| 2010/0088188 A1 | 4/2010 | Kumar |
| 2010/0094730 A1 | 4/2010 | Koski |
| 2010/0100480 A1 | 4/2010 | Altman |
| 2010/0121707 A1 | 5/2010 | Goeldi |
| 2010/0125492 A1 | 5/2010 | Lin |
| 2010/0125495 A1 | 5/2010 | Smith |
| 2010/0125803 A1 | 5/2010 | Johnson |
| 2010/0130853 A1 | 5/2010 | Chandonnet |
| 2010/0131347 A1 | 5/2010 | Sarptipi |
| 2010/0131415 A1 | 5/2010 | Sartipi |
| 2010/0131569 A1 | 5/2010 | Lawyer |
| 2010/0131589 A1 | 5/2010 | Lawyer |
| 2010/0155470 A1 | 6/2010 | Woronec |
| 2010/0161433 A1 | 6/2010 | White |
| 2010/0174599 A1 | 7/2010 | Rosenblatt |
| 2010/0185505 A1 | 7/2010 | Sprogoe |
| 2010/0185531 A1 | 7/2010 | Van |
| 2010/0191578 A1 | 7/2010 | Tran |
| 2010/0191622 A1 | 7/2010 | Reiss |
| 2010/0191770 A1 | 7/2010 | Cho |
| 2010/0198626 A1 | 8/2010 | Cho |
| 2010/0211445 A1 | 8/2010 | Bodington |
| 2010/0211452 A1 | 8/2010 | D'Angelo et al. |
| 2010/0211499 A1 | 8/2010 | Zanzot |
| 2010/0211863 A1 | 8/2010 | Jones |
| 2010/0216542 A1 | 8/2010 | Van Luchene |
| 2010/0217682 A1 | 8/2010 | Chan |
| 2010/0218128 A1 | 8/2010 | Bonat |
| 2010/0223119 A1 | 9/2010 | Klish |
| 2010/0227675 A1 | 9/2010 | Luxton |
| 2010/0241499 A1 | 9/2010 | Crispo |
| 2010/0241507 A1 | 9/2010 | Quinn |
| 2010/0250351 A1 | 9/2010 | Gillenson |
| 2010/0268648 A1 | 10/2010 | Wiesman |
| 2010/0276484 A1 | 11/2010 | Banerjee |
| 2010/0303230 A1 | 12/2010 | Taveau |
| 2010/0305848 A1 | 12/2010 | Stallman |
| 2010/0306075 A1 | 12/2010 | Drance |
| 2010/0306113 A1 | 12/2010 | Grey |
| 2010/0312645 A1 | 12/2010 | Niekadlik |
| 2010/0312676 A1 | 12/2010 | Muthukumaran |
| 2010/0332262 A1 | 12/2010 | Horvitz |
| 2010/0332283 A1 | 12/2010 | Ng |
| 2011/0020129 A1 | 1/2011 | Petri Larrea |
| 2011/0022482 A1 | 1/2011 | Florek |
| 2011/0035594 A1 | 2/2011 | Fox |
| 2011/0047075 A1 | 2/2011 | Fourez |
| 2011/0059784 A1 | 3/2011 | Lutnick |
| 2011/0060663 A1 | 3/2011 | McPhie |
| 2011/0071843 A1 | 3/2011 | Gilvar |
| 2011/0078082 A1 | 3/2011 | Gupta |
| 2011/0082789 A1 | 4/2011 | Boyd |
| 2011/0085667 A1 | 4/2011 | Berrios |
| 2011/0087534 A1 | 4/2011 | Strebinger |
| 2011/0099057 A1 | 4/2011 | Tenyer |
| 2011/0105183 A1 | 5/2011 | Hsiao |
| 2011/0106698 A1 | 5/2011 | Issacson |
| 2011/0137742 A1 | 6/2011 | Parikh |
| 2011/0161882 A1 | 6/2011 | Dasgupta |
| 2011/0178896 A1 | 7/2011 | Nakajima |

(56) References Cited

U.S. PATENT DOCUMENTS

| | | |
|---|---|---|
| 2011/0184827 A1 | 7/2011 | Hubert |
| 2011/0191210 A1 | 8/2011 | Blackhurst |
| 2011/0196724 A1 | 8/2011 | Fenton |
| 2011/0201299 A1 | 8/2011 | Kamdar |
| 2011/0202406 A1 | 8/2011 | Suomela |
| 2011/0208629 A1 | 8/2011 | Benefieid |
| 2011/0209049 A1 | 8/2011 | Ghosh |
| 2011/0212762 A1 | 9/2011 | Ocko |
| 2011/0215146 A1 | 9/2011 | Shams |
| 2011/0218846 A1 | 9/2011 | Fieldman |
| 2011/0218849 A1 | 9/2011 | Rutigliano |
| 2011/0218870 A1 | 9/2011 | Shams |
| 2011/0246290 A1 | 10/2011 | Howard |
| 2011/0258031 A1 | 10/2011 | Valin |
| 2011/0258123 A1 | 10/2011 | Dawkins |
| 2011/0276507 A1 | 11/2011 | OMalley |
| 2011/0296508 A1 | 12/2011 | Os |
| 2011/0320250 A1 | 12/2011 | Gemmell |
| 2011/0320344 A1 | 12/2011 | Faith |
| 2012/0005030 A1 | 1/2012 | Valin |
| 2012/0011063 A1 | 1/2012 | Killian |
| 2012/0020973 A1 | 1/2012 | Crowe |
| 2012/0022943 A1 | 1/2012 | Howard |
| 2012/0022981 A1 | 1/2012 | Morgenstern |
| 2012/0023026 A1 | 1/2012 | Chen |
| 2012/0030101 A1 | 2/2012 | Boyd |
| 2012/0036071 A1 | 2/2012 | Fulton |
| 2012/0054049 A1 | 3/2012 | Hayes |
| 2012/0078735 A1 | 3/2012 | Bauer |
| 2012/0084135 A1 | 4/2012 | Nissan |
| 2012/0084204 A1 | 4/2012 | Castell |
| 2012/0089446 A1 | 4/2012 | Gupta |
| 2012/0095895 A1 | 4/2012 | Aston |
| 2012/0101881 A1 | 4/2012 | Taylor |
| 2012/0116966 A1 | 5/2012 | Tan |
| 2012/0118950 A1 | 5/2012 | Belk |
| 2012/0123838 A1 | 5/2012 | Sparks |
| 2012/0130853 A1 | 5/2012 | Petri |
| 2012/0136780 A1 | 5/2012 | El-Awady |
| 2012/0150598 A1 | 6/2012 | Griggs |
| 2012/0158580 A1 | 6/2012 | Eram |
| 2012/0158584 A1 | 6/2012 | Behren |
| 2012/0166333 A1 | 6/2012 | von Behren |
| 2012/0173431 A1 | 7/2012 | Ritchie |
| 2012/0190386 A1 | 7/2012 | Anderson |
| 2012/0197756 A1 | 8/2012 | Stacker |
| 2012/0209677 A1 | 8/2012 | Mehta |
| 2012/0215640 A1 | 8/2012 | Ramer |
| 2012/0215650 A1 | 8/2012 | Oba |
| 2012/0215701 A1* | 8/2012 | Mehta ............ G06Q 20/12 705/75 |
| 2012/0221421 A1 | 8/2012 | Hammad |
| 2012/0221502 A1 | 8/2012 | Jerram |
| 2012/0231844 A1 | 9/2012 | Coppinger |
| 2012/0259763 A1 | 10/2012 | Pessin |
| 2012/0304273 A1 | 11/2012 | Bailey |
| 2012/0310826 A1 | 12/2012 | Chatterjee |
| 2012/0323664 A1 | 12/2012 | Klems |
| 2013/0030922 A1 | 1/2013 | Shalabi |
| 2013/0041811 A1 | 2/2013 | Vazquez |
| 2013/0090750 A1 | 4/2013 | Herrman |
| 2013/0095910 A1 | 4/2013 | Chu |
| 2013/0151417 A1 | 6/2013 | Gupta |
| 2013/0185135 A1 | 7/2013 | Mason |
| 2013/0246943 A1 | 9/2013 | Goodman |
| 2013/0268763 A1 | 10/2013 | Sweet |
| 2013/0290203 A1 | 10/2013 | Purves |
| 2013/0304637 A1 | 11/2013 | McCabe |
| 2013/0346302 A1 | 12/2013 | Purves |
| 2014/0052617 A1 | 2/2014 | Chawla |
| 2014/0172472 A1 | 6/2014 | Florimond |
| 2014/0207662 A1 | 7/2014 | Isaacson |
| 2014/0282371 A1 | 9/2014 | Hirsch |
| 2014/0351048 A1 | 11/2014 | Fordyce |
| 2015/0221316 A1 | 8/2015 | Mufti |
| 2015/0262168 A1 | 9/2015 | Armstrong |
| 2015/0347989 A1 | 12/2015 | Kumar |
| 2016/0117780 A1 | 4/2016 | Semlani |
| 2016/0232515 A1 | 8/2016 | Jhas |
| 2016/0328693 A1 | 11/2016 | Mao |
| 2017/0185989 A1 | 6/2017 | Bozovich, Jr. |
| 2017/0193475 A1 | 7/2017 | Mercille |
| 2017/0193490 A1 | 7/2017 | Mercille |
| 2017/0221062 A1 | 8/2017 | Katz |
| 2017/0228711 A1 | 8/2017 | Chawla |
| 2017/0278085 A1 | 9/2017 | Anderson |
| 2018/0096321 A1 | 4/2018 | Haldenby |

FOREIGN PATENT DOCUMENTS

| | | |
|---|---|---|
| KR | 100432430 B1 | 5/2004 |
| KR | 20060117177 A | 11/2006 |
| KR | 20070104087 A | 10/2007 |
| WO | 0165502 A2 | 9/2001 |
| WO | 03023674 A1 | 3/2003 |
| WO | 2010148737 A1 | 12/2010 |

OTHER PUBLICATIONS

Business Wire, "New York State Department of Labor Selects JPMorgan Chase to Provide New Banking Services for Unemployment Insurance Benefits; JPMorgan Chase Electronic Services to Help Speed Benefit Payments", Business Wire, New York, Aug. 4, 2006, 2 p.

Gopalan, NP & Selvan, B Siva. TCP/IP Illustrated. Prentice-Hall. 2008. pp. 101-102, 175-176 and 235. 7 pages.

Shadrach, D.C. "A Weighted Metric Based Adaptive Algorithm for Web Server Load Balancing." 2009 Third International Symposium on Intelligent Information Technology Application, http://ieeexplore.ieee.org/xpl/articleDetails.jsp?arnumber=5369384, pp. 449-452.

International Search Report and Written Opinion for PCT/US09/54921 dated Oct. 21, 2009. (2 pages).

International Search Report and Written Opinion for PCT/US2010/048344 dated Nov. 15, 2010. (9 pages).

International Search Report and Written Opinion for PCT/US2010/041860 dated Feb. 1, 2011. (9 pages).

Jones, Peter, "SAP Business Information Warehouse Reporting: Building Better BI with SAP BI 7.0," Jan. 18, 2008, McGraw-Hill Osborne Media, Sections 3.1, 13.1, 15.2.

International Search Report for PCT/US11/49393 dated Dec. 5, 2011. (2 pages).

International Search Report and Written Opinion for PCT/US11/57179 dated Jan. 5, 2012. (7 pages).

International Search Report and Written Opinion for PCT/US11/57173 dated Mar. 15, 2012. (11 pages).

International Search Report and Written Opinion for PCT/US2012/026205, dated May 29, 2012. 8 pages.

International Search Report for PCT/US11/65305 dated Apr. 16, 2012. 2 pages.

International Search Report for PCT/US12/23856 dated Jun. 6, 2012. 3 pages.

International Search Report for PCT/US12/24772 dated Jul. 24, 2012. 3 pages.

International Search Report for PCT/US12/25530 dated Aug. 7, 2012. 4 pages.

International Search Report PCT/US12/27620 dated Aug. 10, 2012. 3 pages.

International Search Report and Written Opinion for PCT/US12/41437 dated Aug. 24, 2012. (11 pages).

International Search Report and Written Opinion for PCT/US12/37597 dated Sep. 21, 2012 (11 pages).

International Search Report for PCT/US12/39638 dated Sep. 24, 2012. 4 pages.

International Search Report for PCT/US12/45875 dated Nov. 16, 2012. 4 pages.

International Search Report for PCT/US12/47092 dated Nov. 26, 2012. 11 pages.

(56) References Cited

OTHER PUBLICATIONS

International Search Report for PCT/US12/57577 dated Nov. 29, 2012. 2 pages.
International Search Report for PCT/US12/57528 dated Dec. 17, 2012. 8 pages.
International Search Report and Written Opinion for PCT/US12/66898 dated Feb. 11, 2013. 14 pages.
International Search Report for PCT/US12/56759 dated Feb. 25, 2013. 12 pages.
International Search Report and Written Opinion for PCT/US2013/020411 dated May 21, 2013. 18 pages.
International Search Report and Written Opinion for PCT/US2013/024538, dated May 31, 2013. 15 pages.
Wikipedia, modified Aug. 26, 2010, "Social Graph"; http://web.archive.Org/web/20100914055833/http://en.wikipedia.org/wiki/Social_Graph, Accessed Aug. 29, 2013. 3 pages.
International Search Report and Written Opinion forPCT/US2013/031084, dated Jun. 4, 2013. 9 pages.
International Search Report and Written Opinion for PCT/US2010/033229 dated Dec. 29, 2010, 8 pages.
Written Opinion for PCT/US12/27620 dated Aug. 10, 2012. 5 pages.
David Breitkopf, "ACS to Take Over Mich. WC Distribution Program", American Banker, New York, NY: Jul. 20, 2006, vol. 171. Issue 138, p. 6.
International Search Report and Written Opinion for PCT/US2010/033861 dated Dec. 9, 2010 (7 pages).
International Search Report and Written Opinion for PCT/US2010/033547 dated Dec. 14, 2010 (3 pages).
International Search Report and Written Opinion for PCT/US2010/045445 dated Feb. 24, 2011 (3 pages).
International Search Report and Written Opinion for PCT/US2010/045500 dated Mar. 29, 2011 (3 pages).
International Search Report and Written Opinion for PCT/US2011/024941 dated Apr. 19, 2011 (6 pages).
International Search Report and Written Opinion for PCT/US2010/046833 dated Apr. 26, 2011 (8 pages).
PCT International Preliminary Report on Patentability dated Mar. 6, 2012 corresponding to application PCT/US2010/046833. 6 pages.
International Search Report and Written Opinion for PCT/US2011/26734 dated Apr. 29, 2011 (7 pages).
International Search Report and Written Opinion for PCT/US2011/29790 dated May 19, 2011 (6 pages).
International Search Report and Written Opinion for PCT/US2011/035268 dated Aug. 5, 2011 (3 pages).
International Search Report and Written Opinion for PCT/US2011/032093 dated Aug. 24, 2011 (11 pages).
International Search Report and Writtten Opinion for PCT/US2011/039178 dated Sep. 16, 2011 (7 pages).
International Search Report and Written Opinion issued in connection with PCT/US11/42062 dated Sep. 29, 2011 (8 pages).
International Search Report and Written Opinion for PCT/US11/57180 dated Mar. 15, 2012 (11 pages).
International Search Report for PCT/US12/21000 dated May 15, 2012. 2 pages.
International Search Report and Written Opinion for PCT/US2012/027043 dated Jul. 13, 2012. 15 pages.
International Search Report and Written Opinion for PCT/US12/55636 dated Nov. 30, 2012. 2 pages.
International Search Report and Written Opinion for PCT/US2012/045601 dated Feb. 1, 2013. 11 pages.
International Search Report and Written Opinion for PCT/US2012/069557 dated Feb. 22, 2013. 8 pages.
International Search Report and Written Opinion for PCT/US12/65738 dated Apr. 19, 2013. 9 pages.
International Preliminary Report on Patentability for PCT/US2010/033229 dated Dec. 29, 2010. (8 pages).
Office Action dated May 8, 2018 for U.S. Appl. No. 13/278,166 (pp. 1-17).
Notice ofAllowanace dated May 18, 2018 for U.S. Appl. No. 13/714,090 (pp. 1-7).
Notice of Allowability dated May 31, 2018 for U.S. Appl. No. 13/714,090 (pp. 1-2).
Office Action dated Jun. 20, 2018 for U.S. Appl. No. 14/037,131 (pp. 1-20).
Office Action dated Aug. 24, 2018 for U.S. Appl. No. 13/278,173 (pp. 1-19).
Office Action dated Sep. 17, 2018 for U.S. Appl. No. 13/278,166 (pp. 1-15).
Office Action dated Mar. 28, 2018 for U.S. Appl. No. 13/278,173 (pp. 1-22).
Office Action dated Apr. 3, 2018 for U.S. Appl. No. 14/230,327 (pp. 1-35).

\* cited by examiner

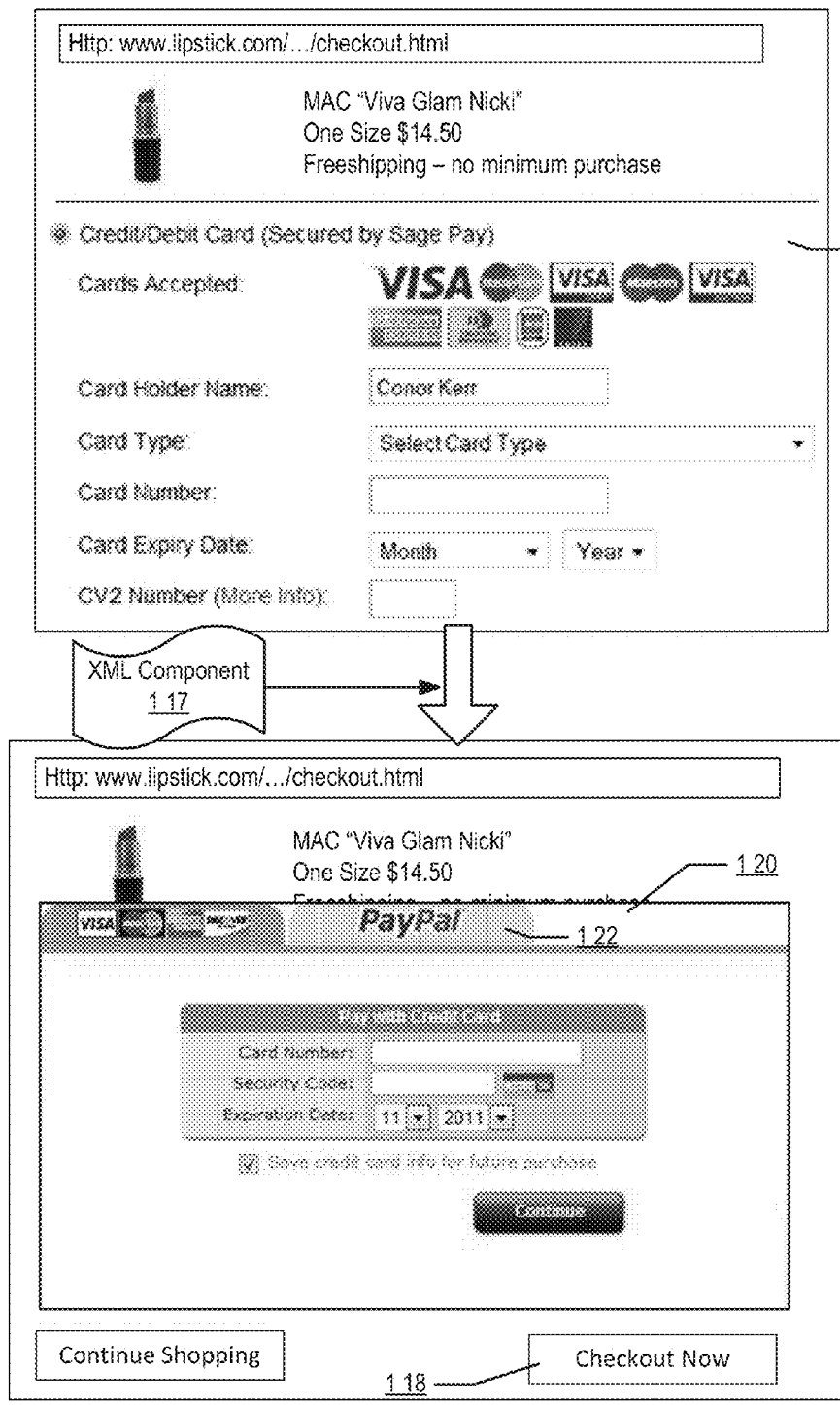
FIG. 1B  API-Tool Example: Adding PayPal Checkout

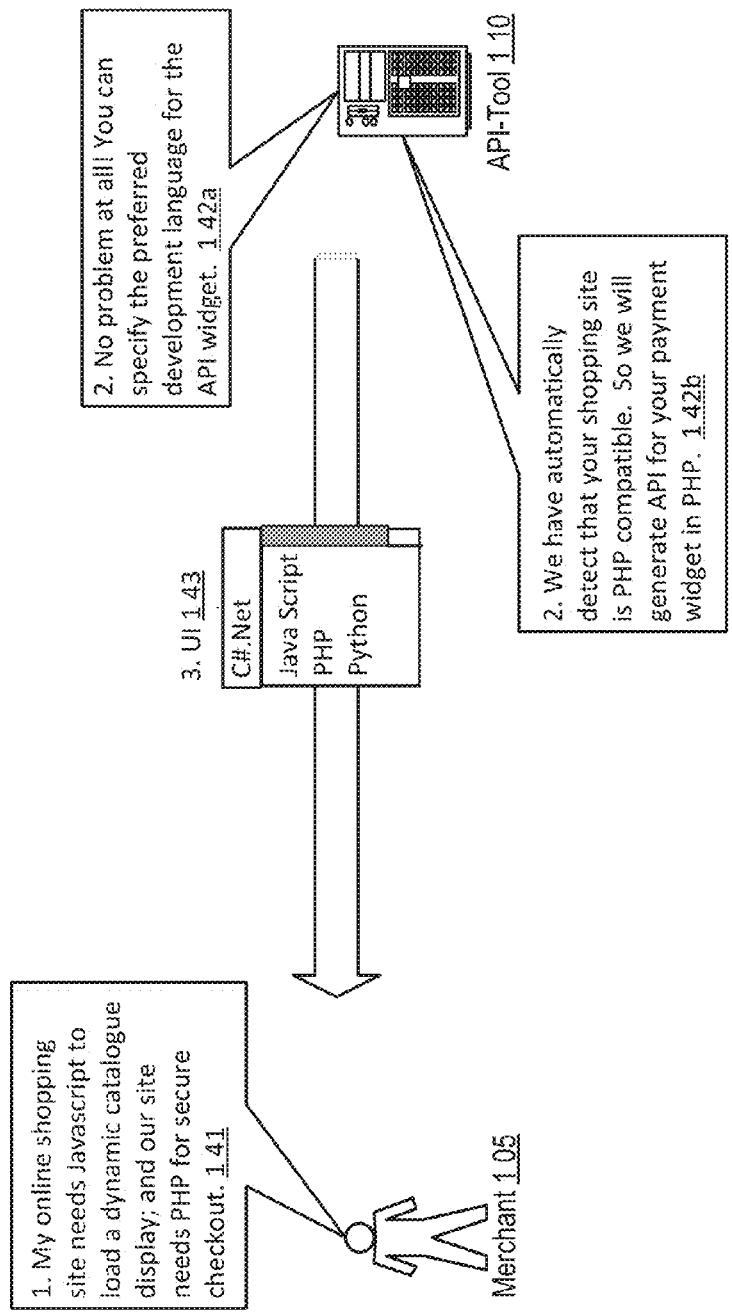
FIG. 1D   API-Tool Example Multi-Programming Language Support

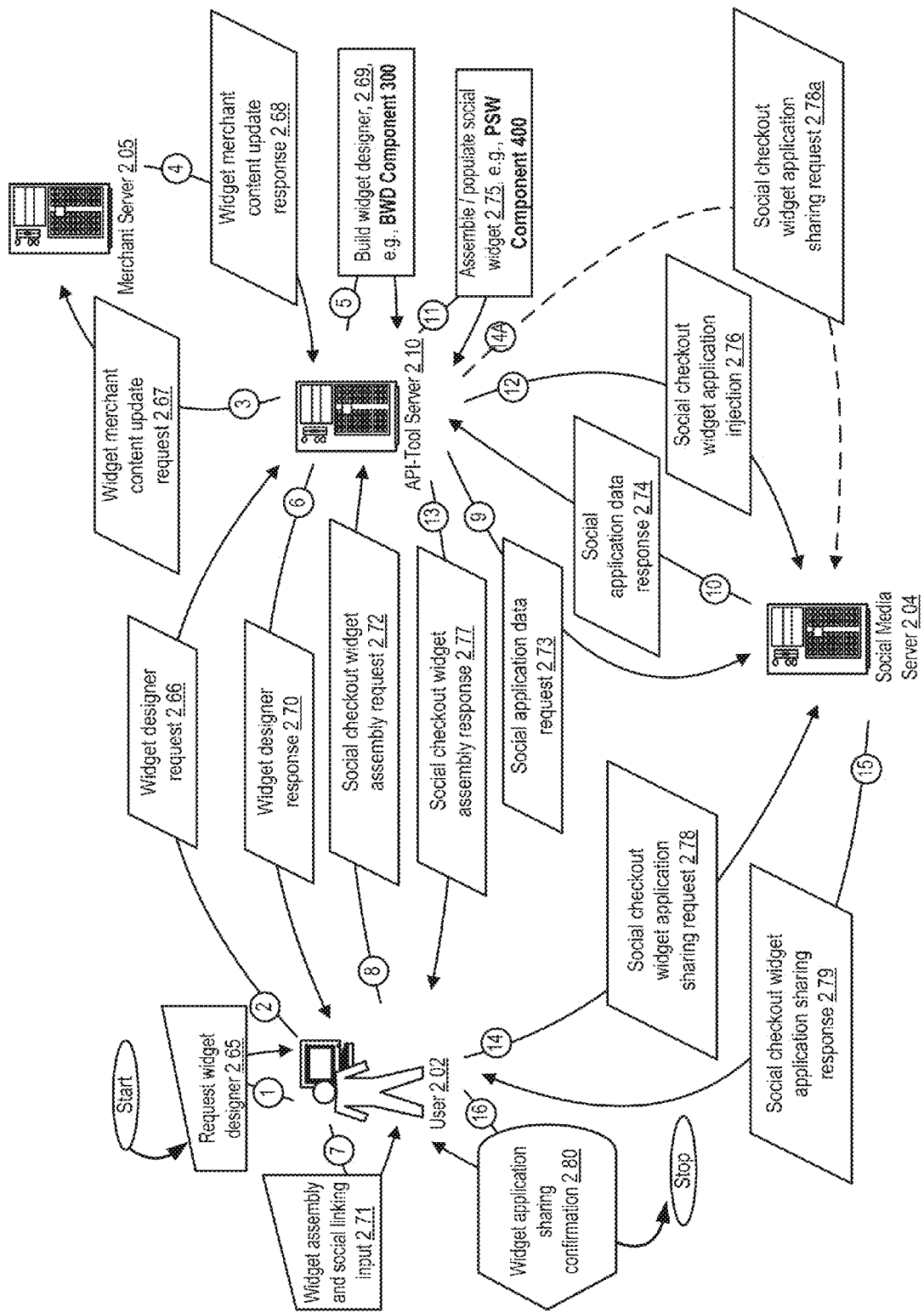
Figure 2C  Example Data Flow: Social Wallet Widget Integration

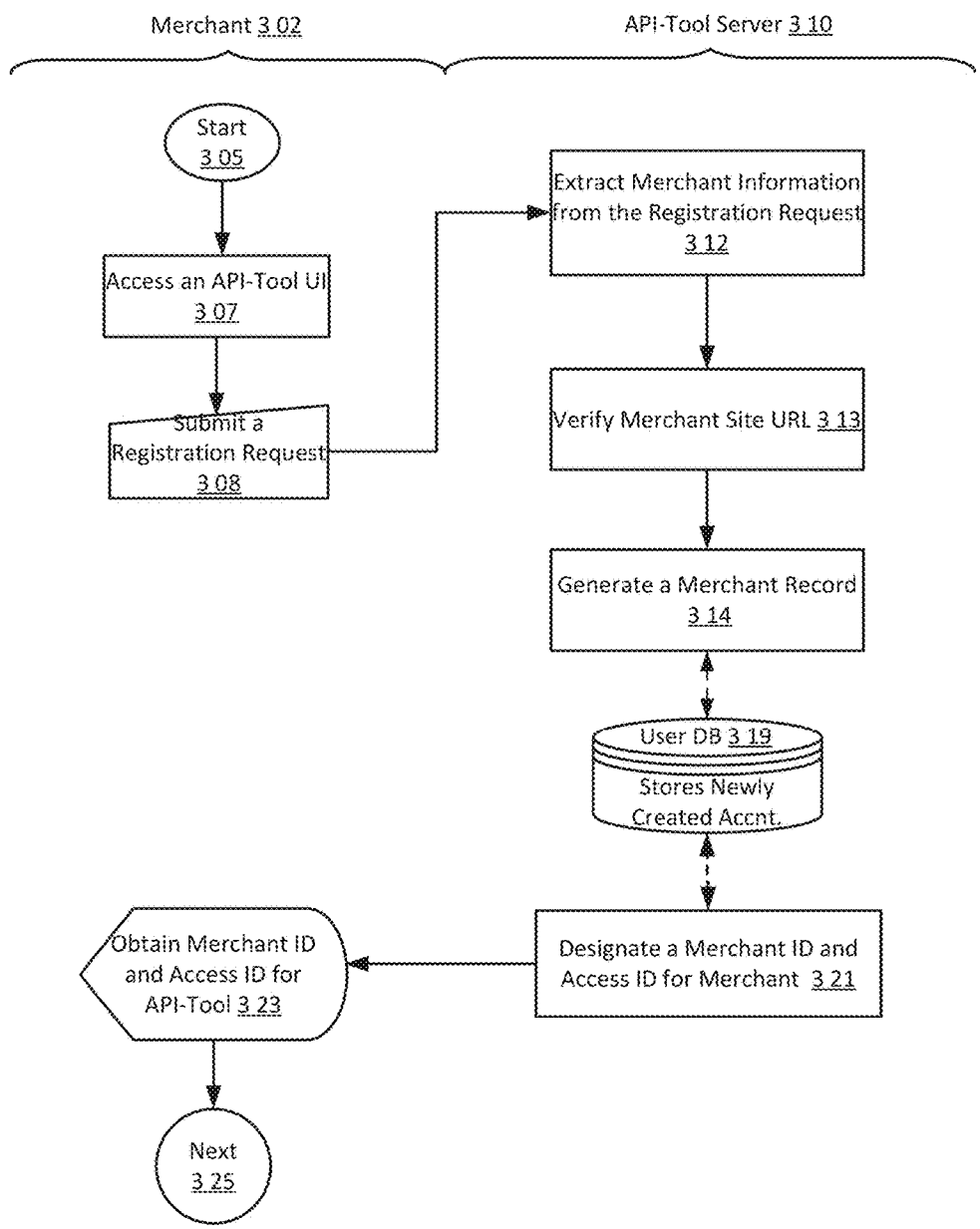
FIG. 3A  Example API-Tool Embodiment: Logic Flow

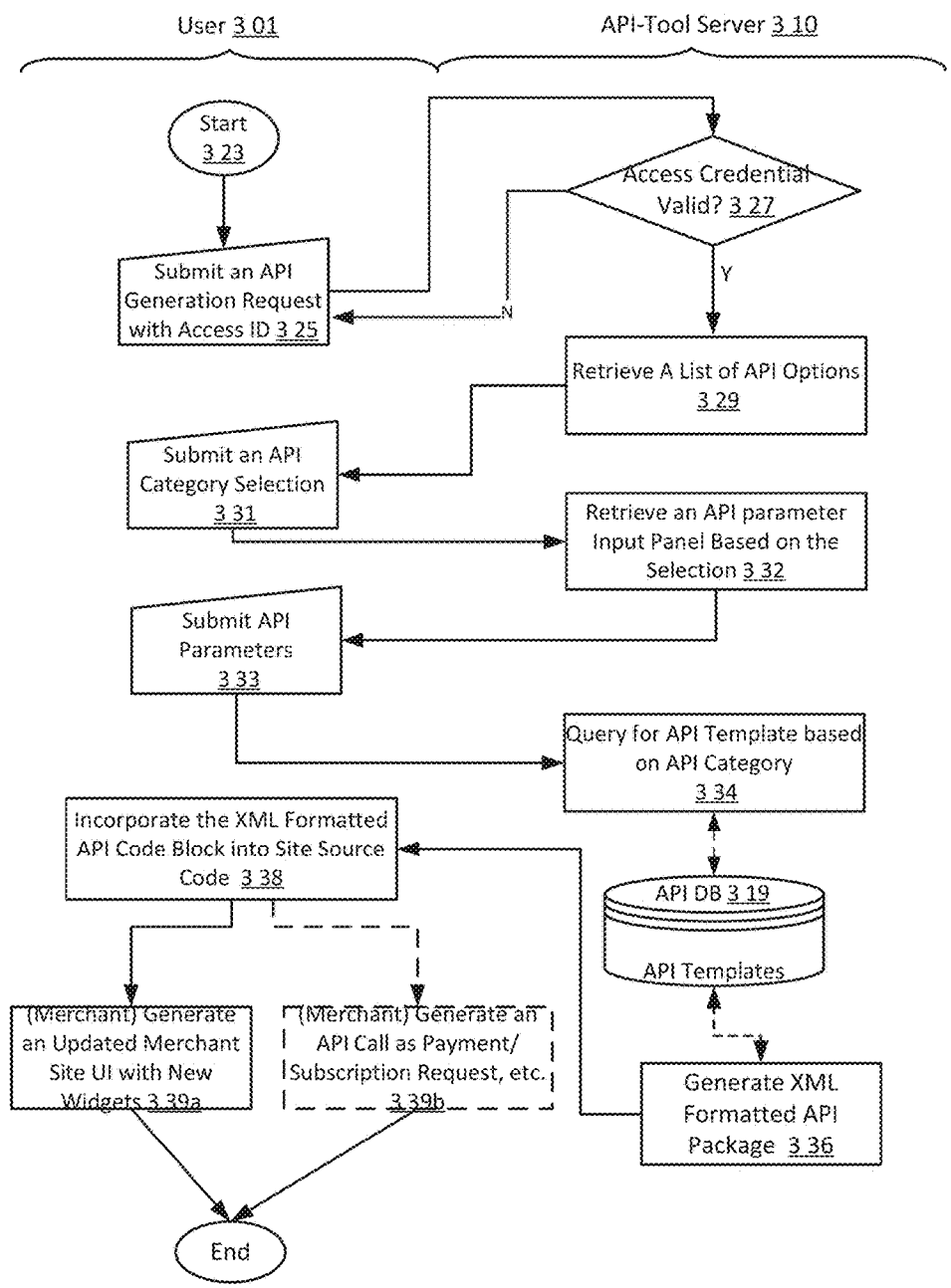
FIG. 3B  Example API-Tool Embodiment: Logic Flow

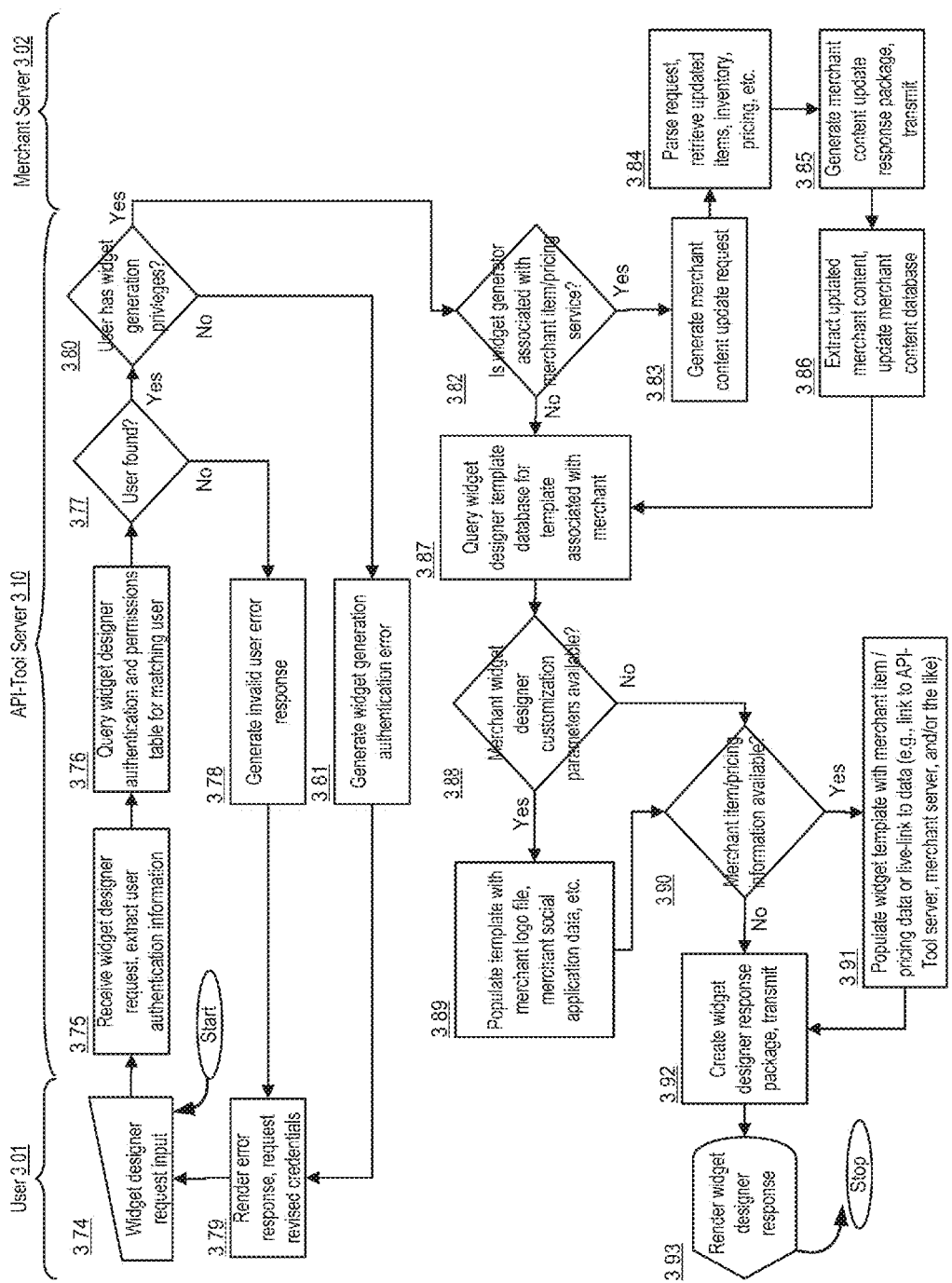
Figure 3E  Example Logic Flow: Widget Designer Building, e.g., BWD Component 300

Example Logic Flow: Social Widget Assembly and Population, e.g., PSW Component 400

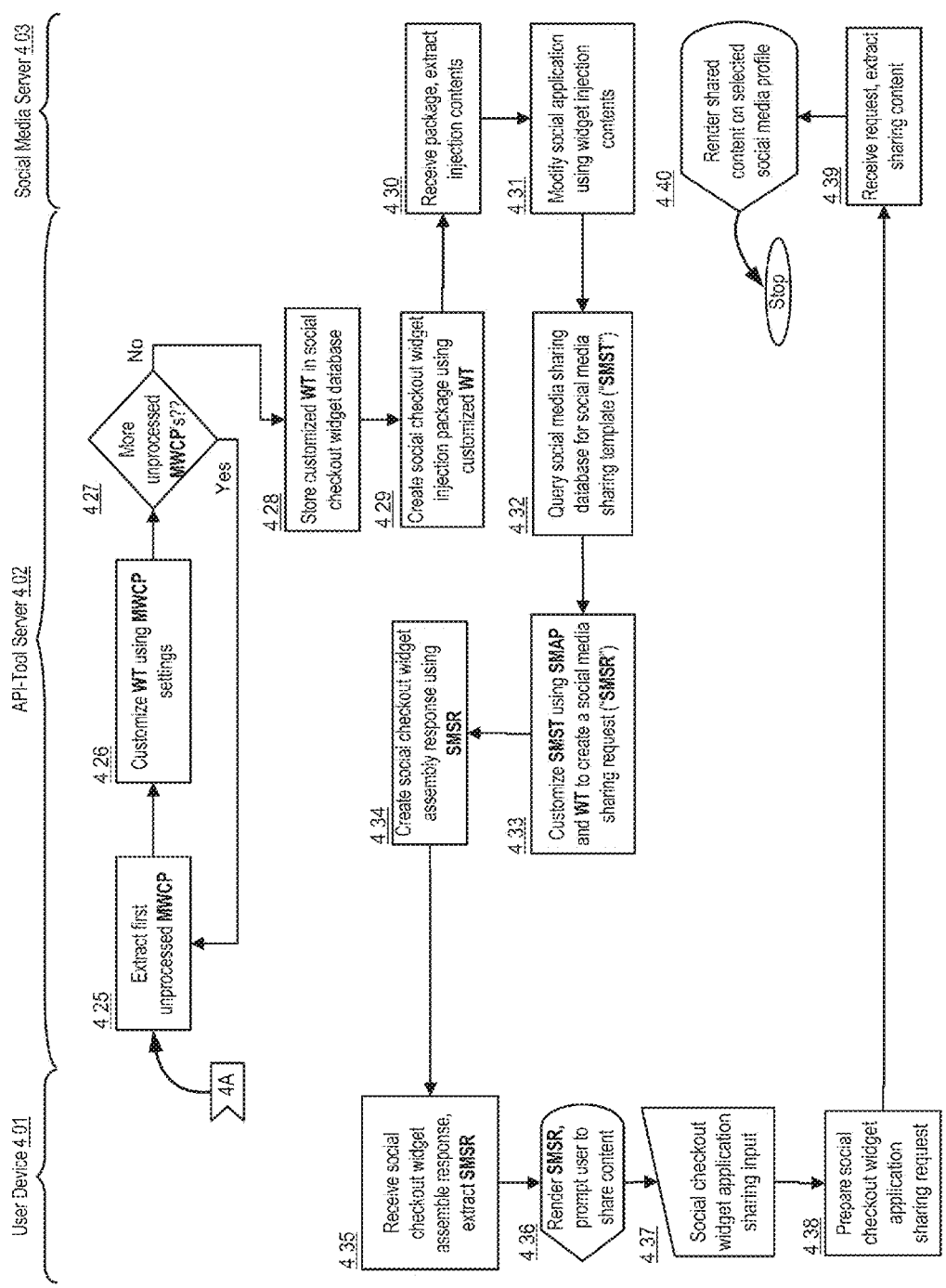
Figure 4B — Example Logic Flow: Social Widget Assembly and Population, e.g., PSW Component 400

Example Virtual Item Purchase UI

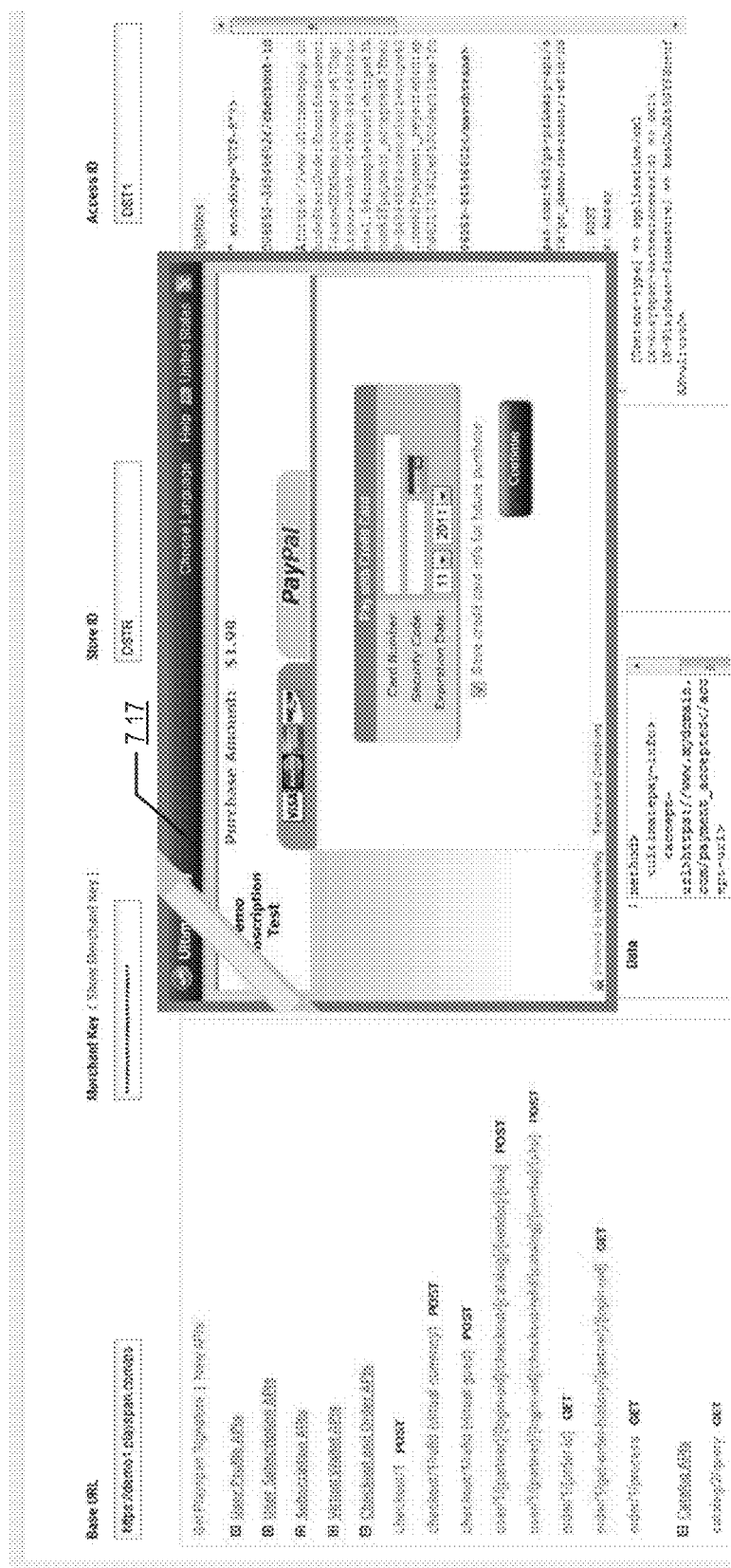
FIG. 7D  Example Virtual Item Purchase UI

Example Get Available Subscription UI

Example Cancel User Subscription UI

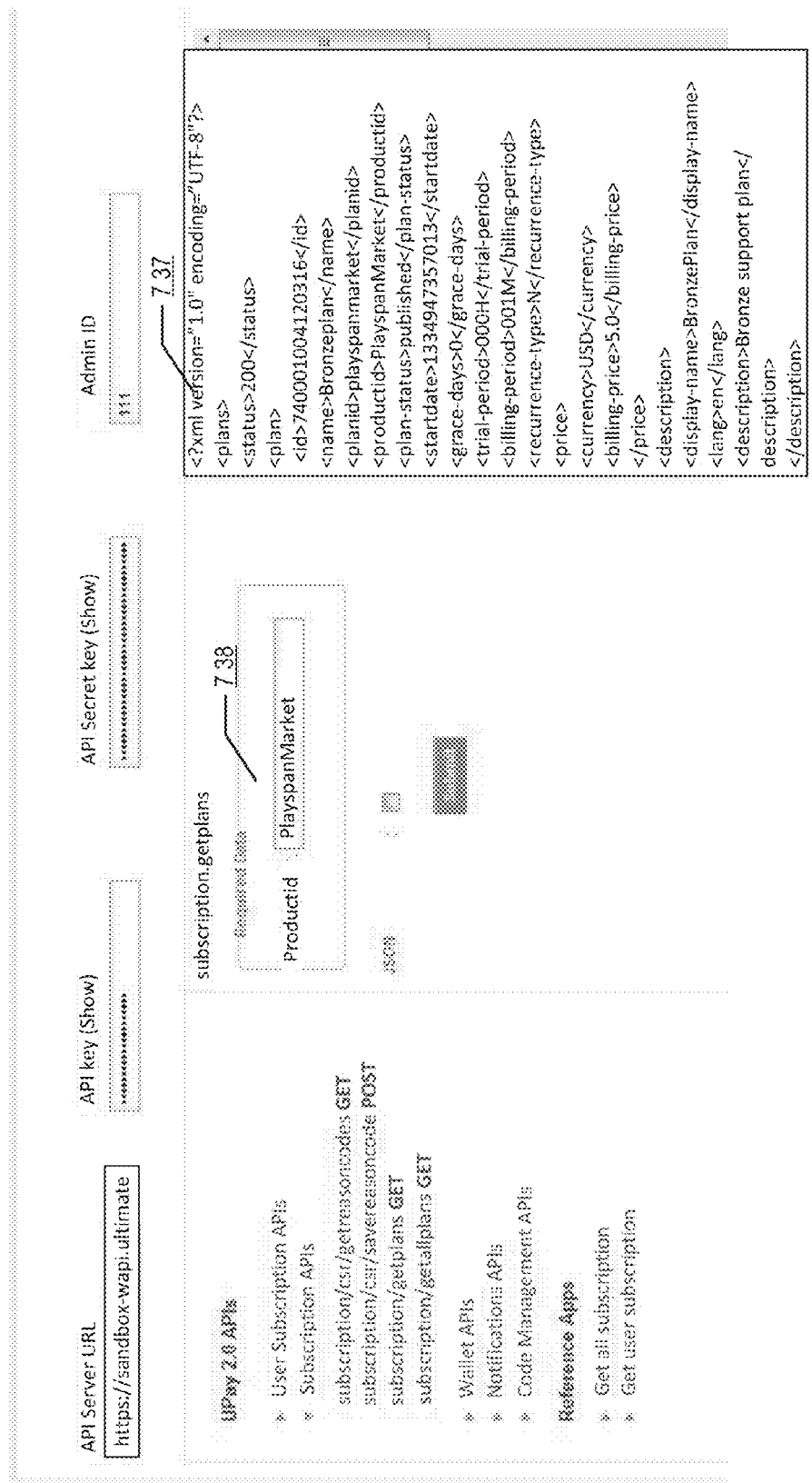
FIG. 7P  Exemplary UI: Subscription API Call

Social Media Widget Integration 7.41

Choose a product to feature in your widget 7.42

Item details: 7.44
- Item: Widget X  Inventory: 47
- SKU: 543878  Default price: $19.99
- Amount (e.g., $19.99)
- Currency (e.g., USD)
- Product ID (e.g., 543878)
- Collect shipping?
- Upload item image [Browse for image...] 7.44a

Non-items:
- Cash donation amount 7.44b

Social application integration target: 7.45
- Target social network (e.g., Facebook) ▶

Social application connection method: 7.46
- 7.46a ○ Direct social media application integration?
  - Application ID
  - Developer credential
  - Developer API Key
- 7.46b ○ Use v.me social media app to host store
- 7.46c ○ Allow v.me to create a social media application on my behalf 7.43 ↓ ↑

Last updated product db: 3 hours
Update source: Merchant web site scrape 7.43a [Add this item]  7.43b [Add this item and select another item]

Social Media Application – Integration Configuration 7.47
- Page to integrate widget in... (e.g., Browse Pg.) 7.47a
- Page element name to insert widget into... (e.g., DIV W) 7.47b
- Preferred widget location... (e.g., "upper right corner", etc.) 7.47c

Social Media Application Launch Widget 7.48

Launch the Jcrew App and view this item!

[Customize Launch Widget] 7.48a

Promotion: 7.49
- ☐ Promote this integrated application store on my social media page?
  - ☐ Post to my social media stream
  - ☐ Email my social media contact list [Choose list...] ▶
- [Customize Social Media Post] 7.49a

Figure 7Q Example User Interface: Overloaded Social Checkout Widget Creation and Integration

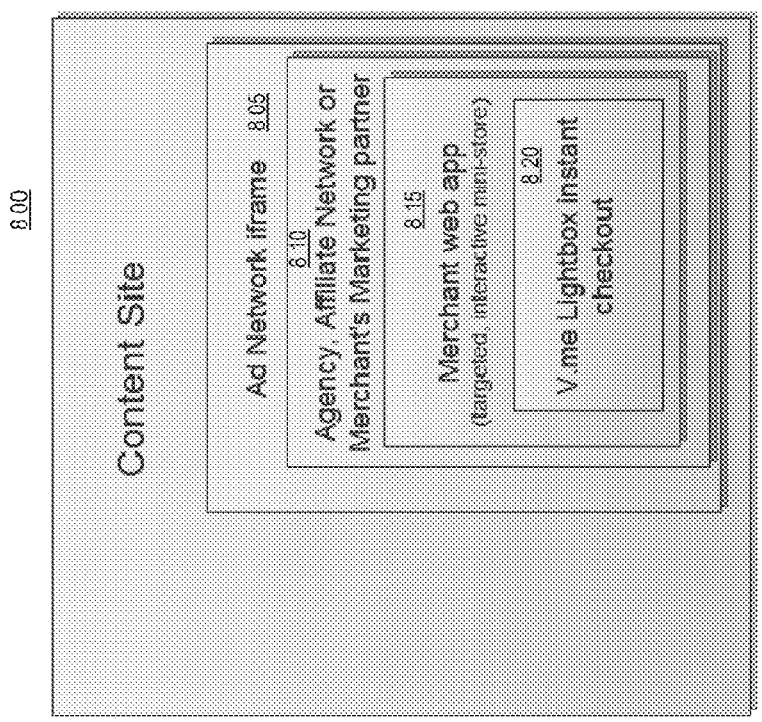
Figure 8A — Example Wallet Integration Opportunities in a Content Site

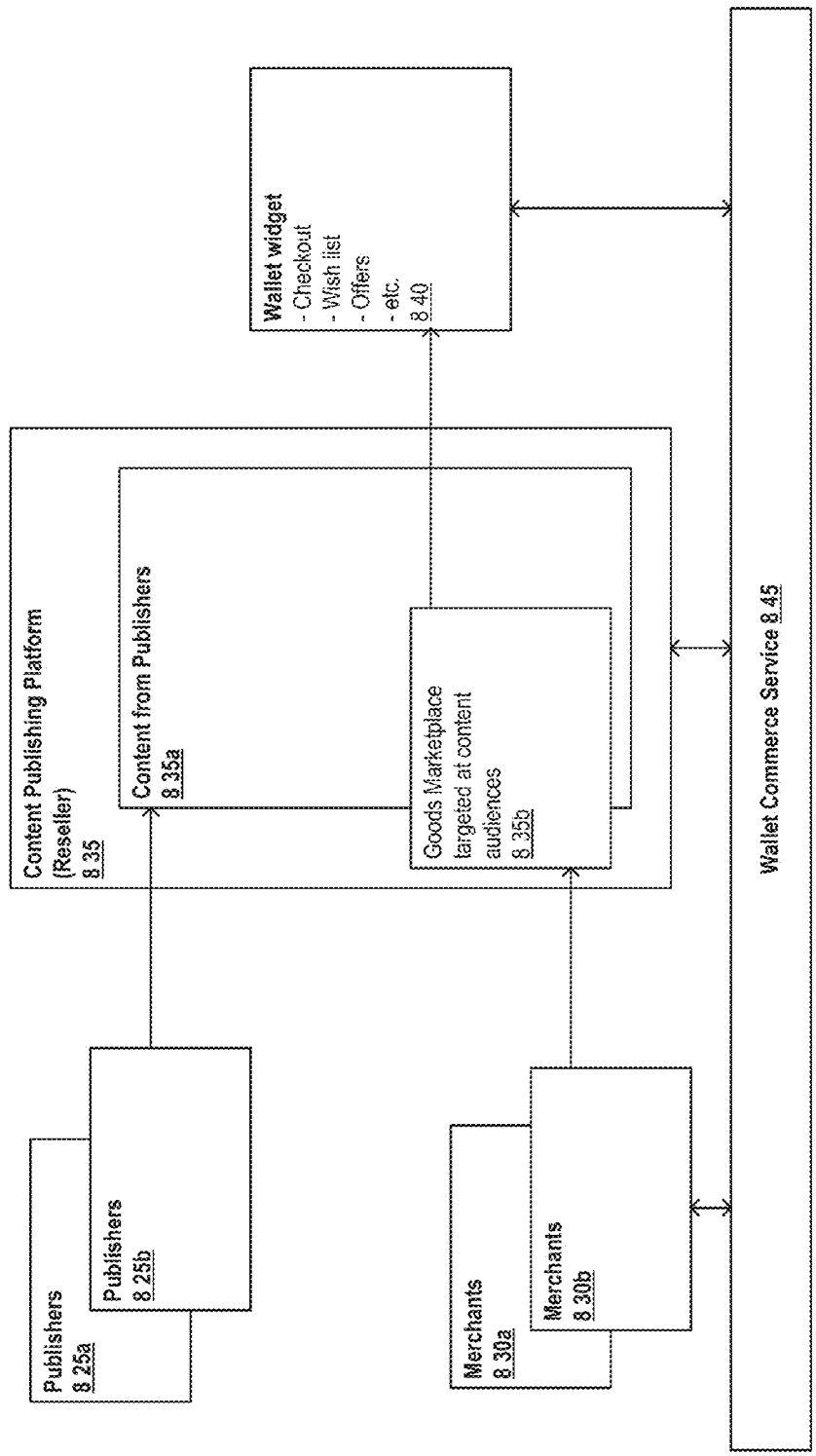

Example Social Media Integration

Example Social Media Checkout

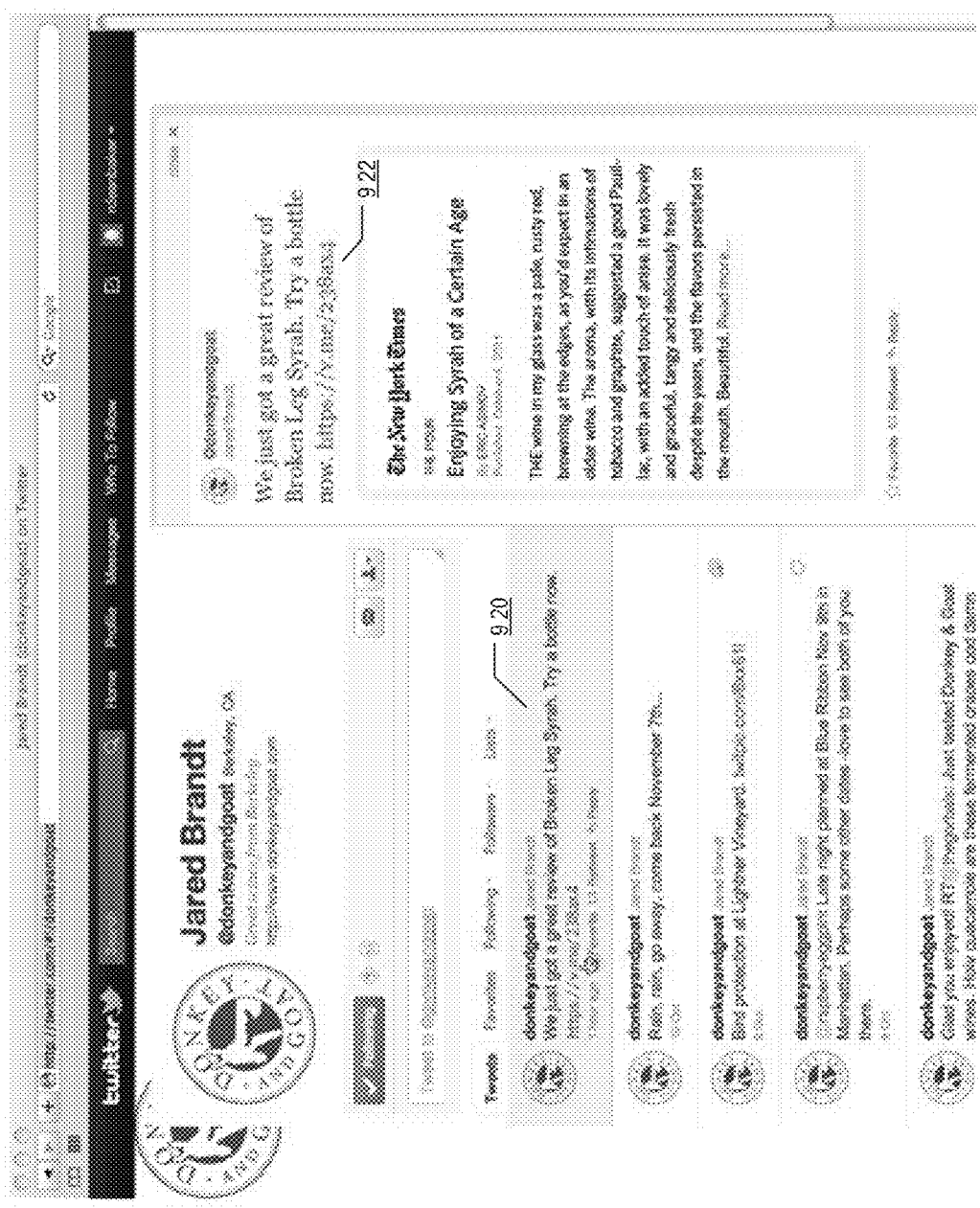
Figure 9D    Example Social Media Integration

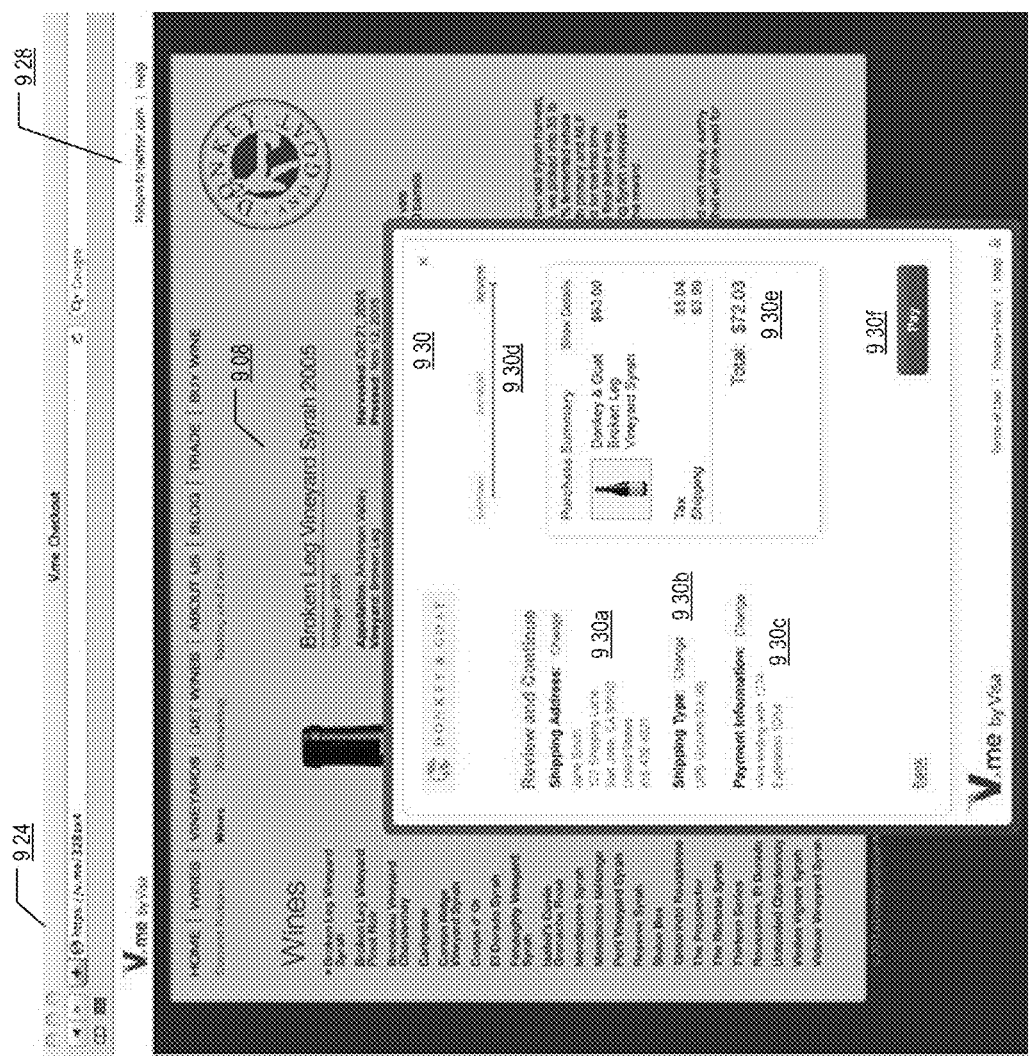
Figure 9E — Example Social Media Checkout

Example Web / Mobile Integration

Example Mobile Checkout

Figure 12B — Example Catalog Checkout

Figure 13A  Example Web Integration

Example Web Checkout

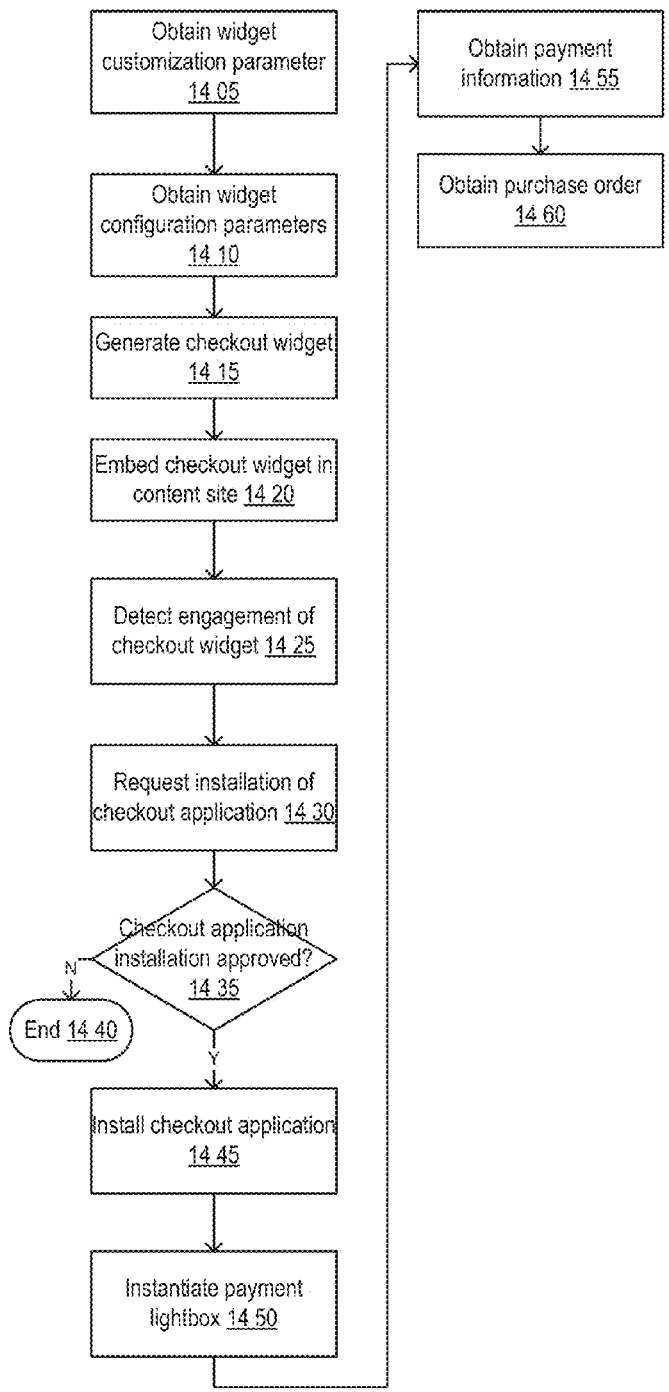
Figure 14　　Example Widget Integration and Checkout (WIC) Component 1400

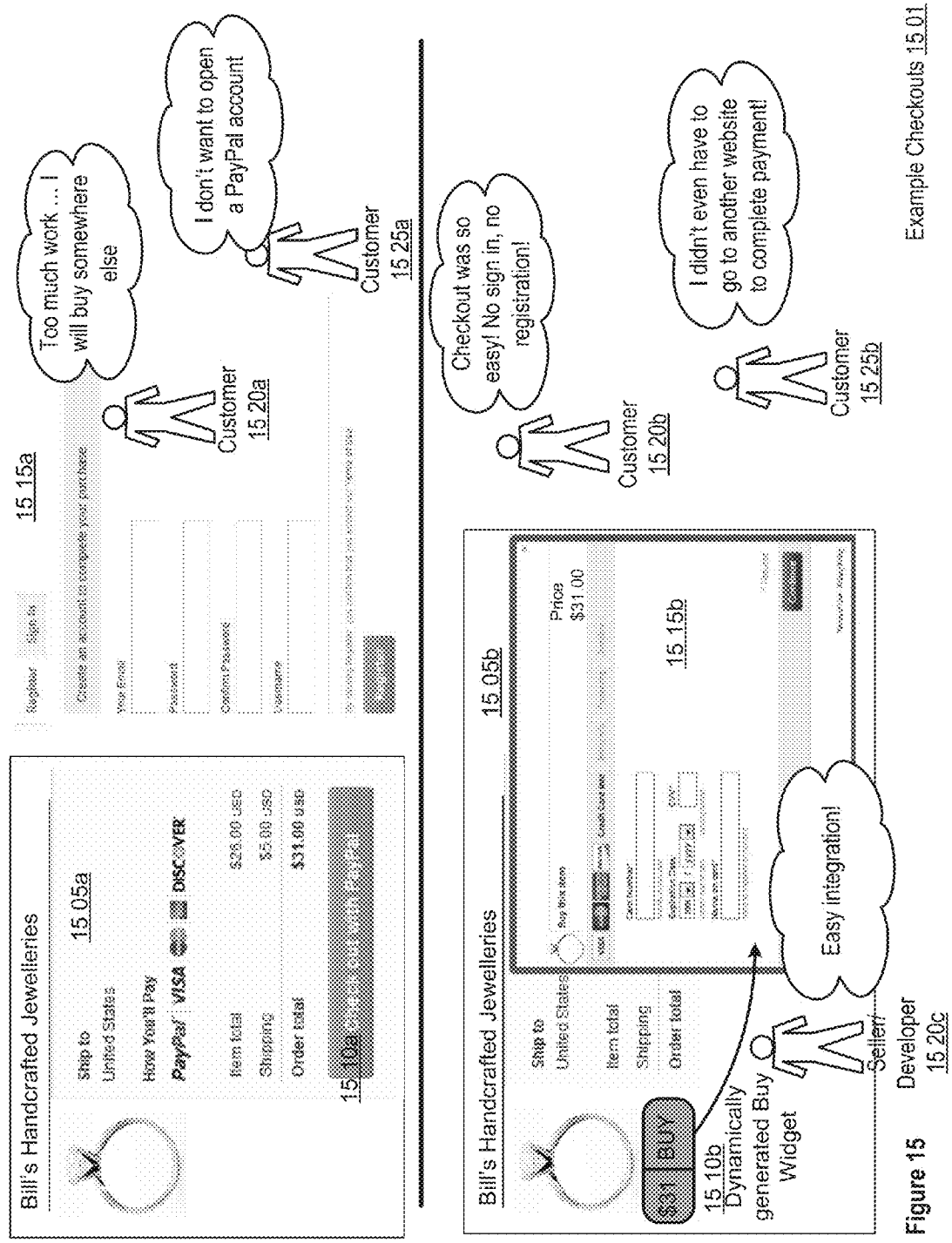
Figure 15 — Example Checkouts 15.01

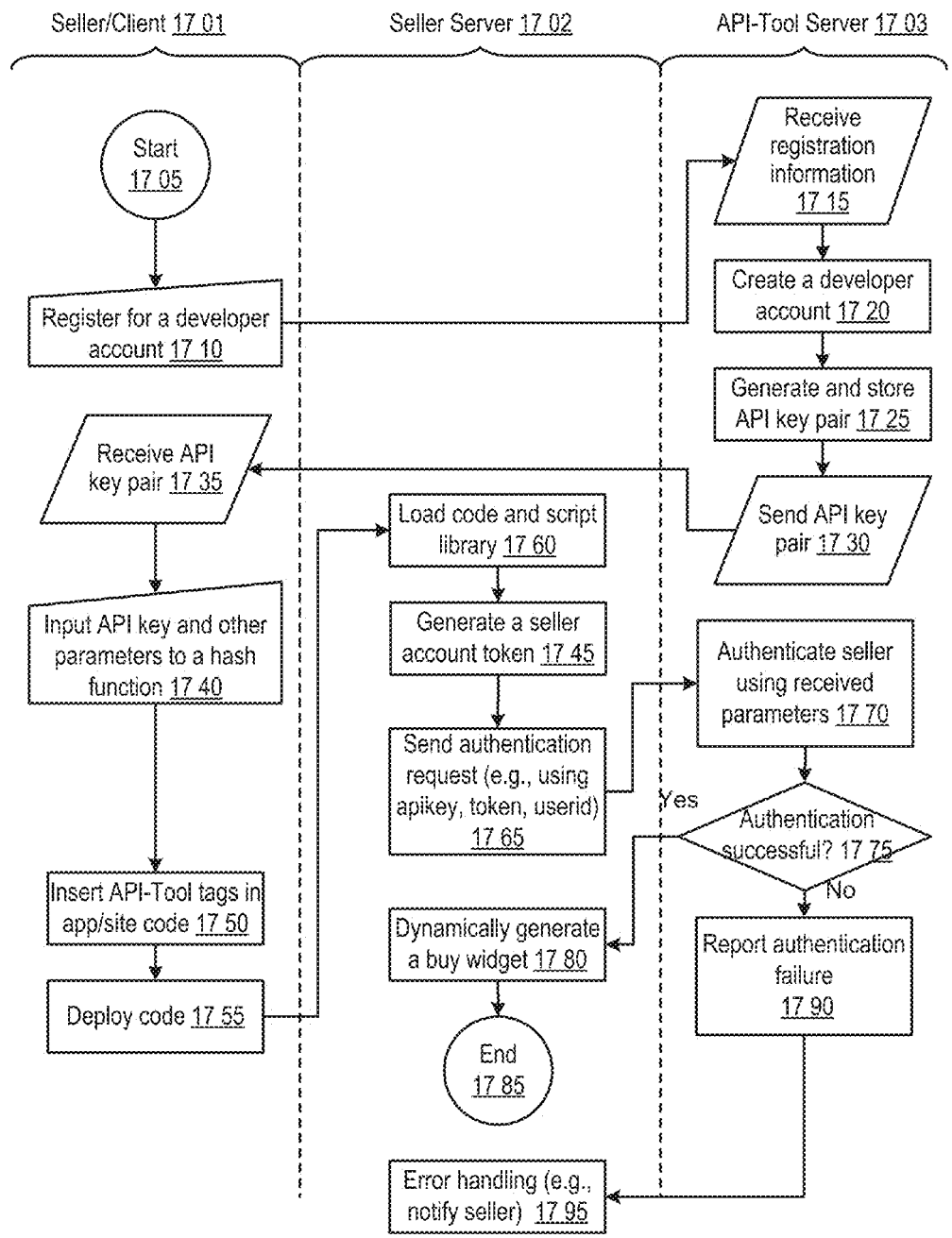
Figure 17      Example Logic Flow: Widget Generation (WG) Component 17 01

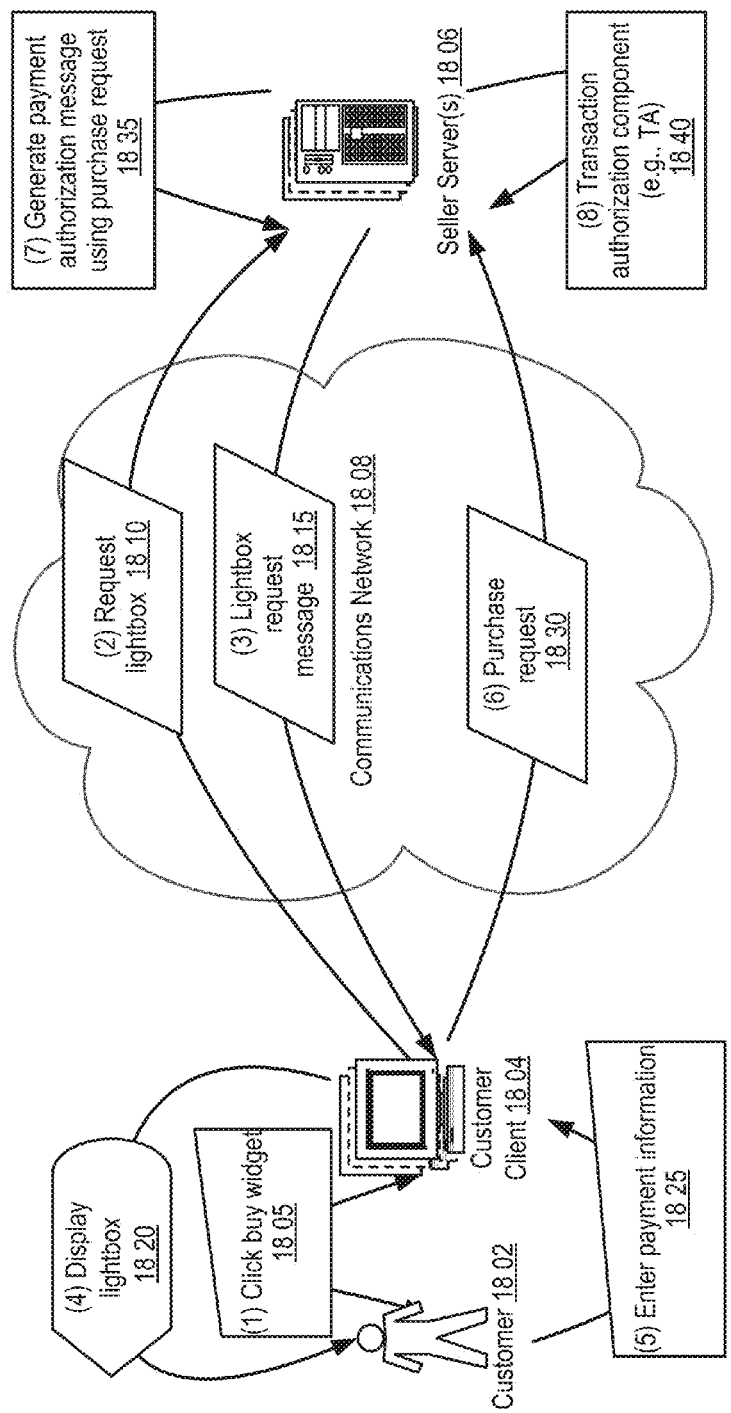
Figure 18  Example Data Flow: Dynamically Generated Widget Based Purchase 18 01

Example Logic Flow: Buy Widget Based Purchase (WBP) Component 19.01

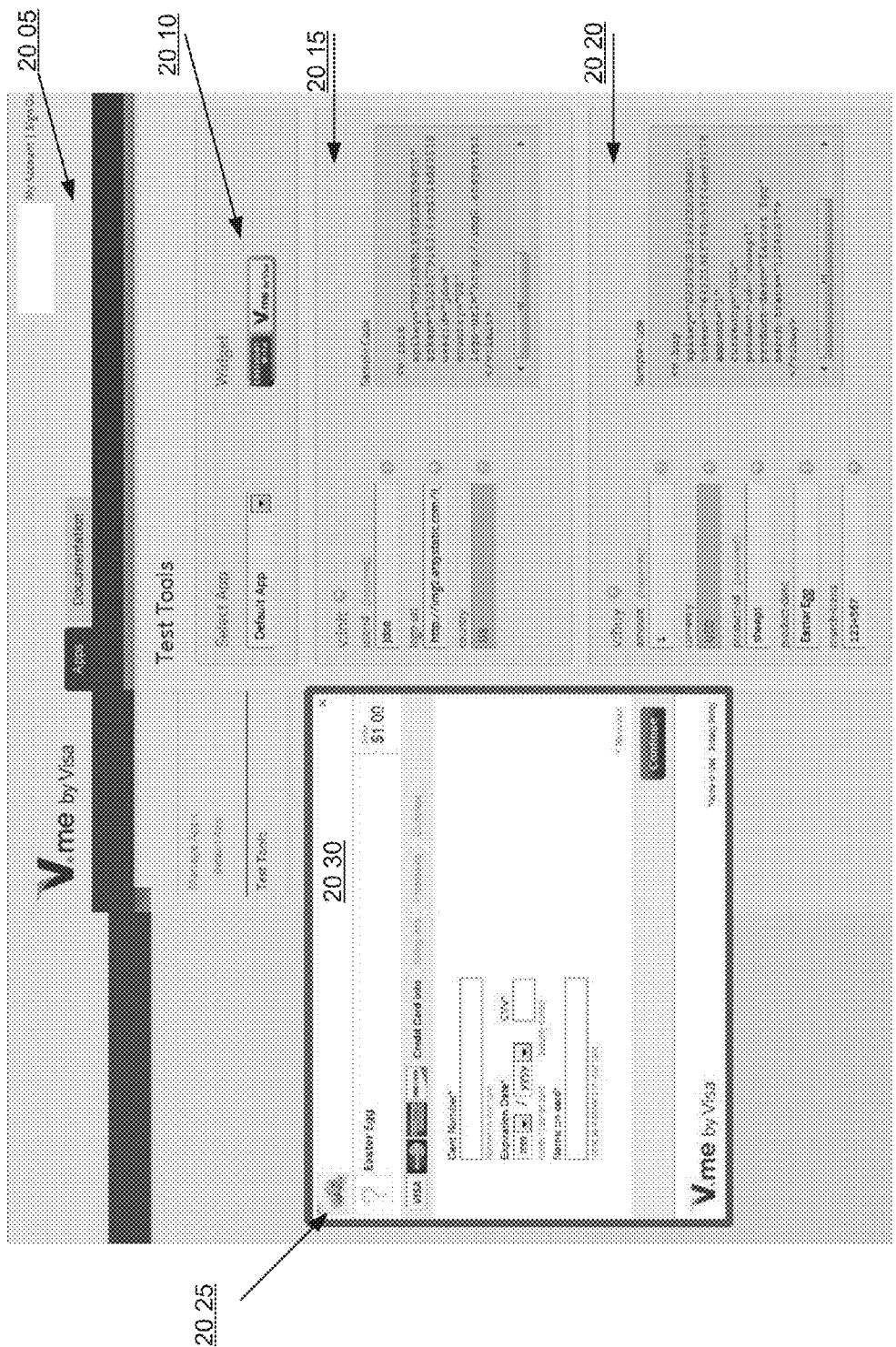
Figure 20A  Example API-Tool Test Tool 20.01

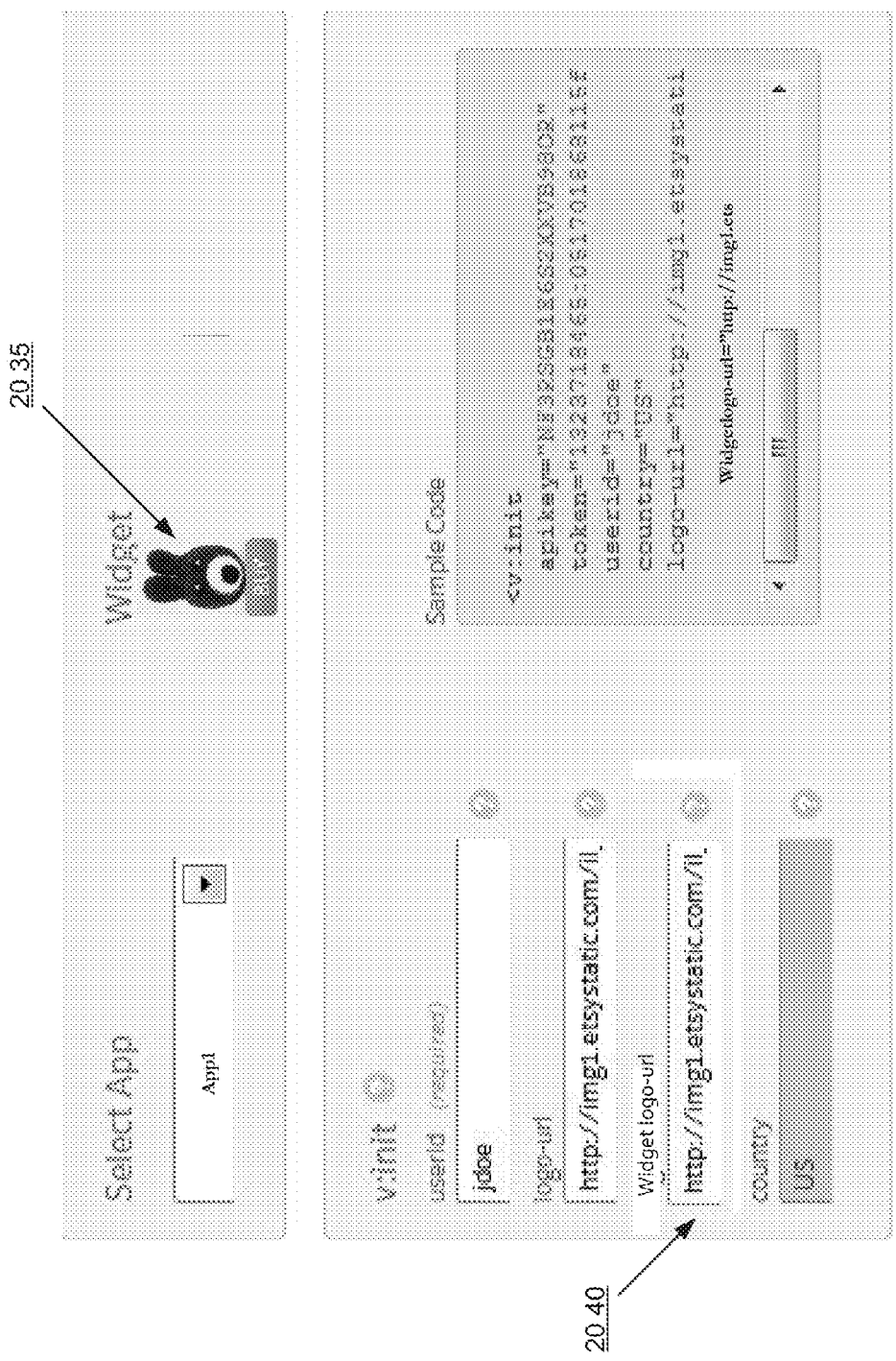
Figure 20B  Example Widget Customization via Test Tool

Figure 21A  Example User Interface: Widget Code Generator with Integrated Testing

Bulk Generate Widgets

Upload New Data File:
Choose File No file chosen 21 18

Current Data File: myproducts.xls 21 19

Match file fields:

| Field 21 20 | | Default Override Value |
|---|---|---|
| Amount | columnA (amount) ▼ | 21 21 |
| Currency | columnC (currency) ▼ | |
| Product ID | columnE (prod_id) ▼ | |
| Merchant-Trans | Default Override ▼ | 21 22 |
| Collect-shipping? | Default Override ▼ | 21 23 |
| Process? | Default Override ▼ | null |
| | | true ▼ |
| | | validate ▼ 21 24 |

Bulk Generate Widgets 21 25

Save Widget for Later    Bulk Generate Widgets 21 17

Example User Interface: Bulk Widget Generation

Figure 21C

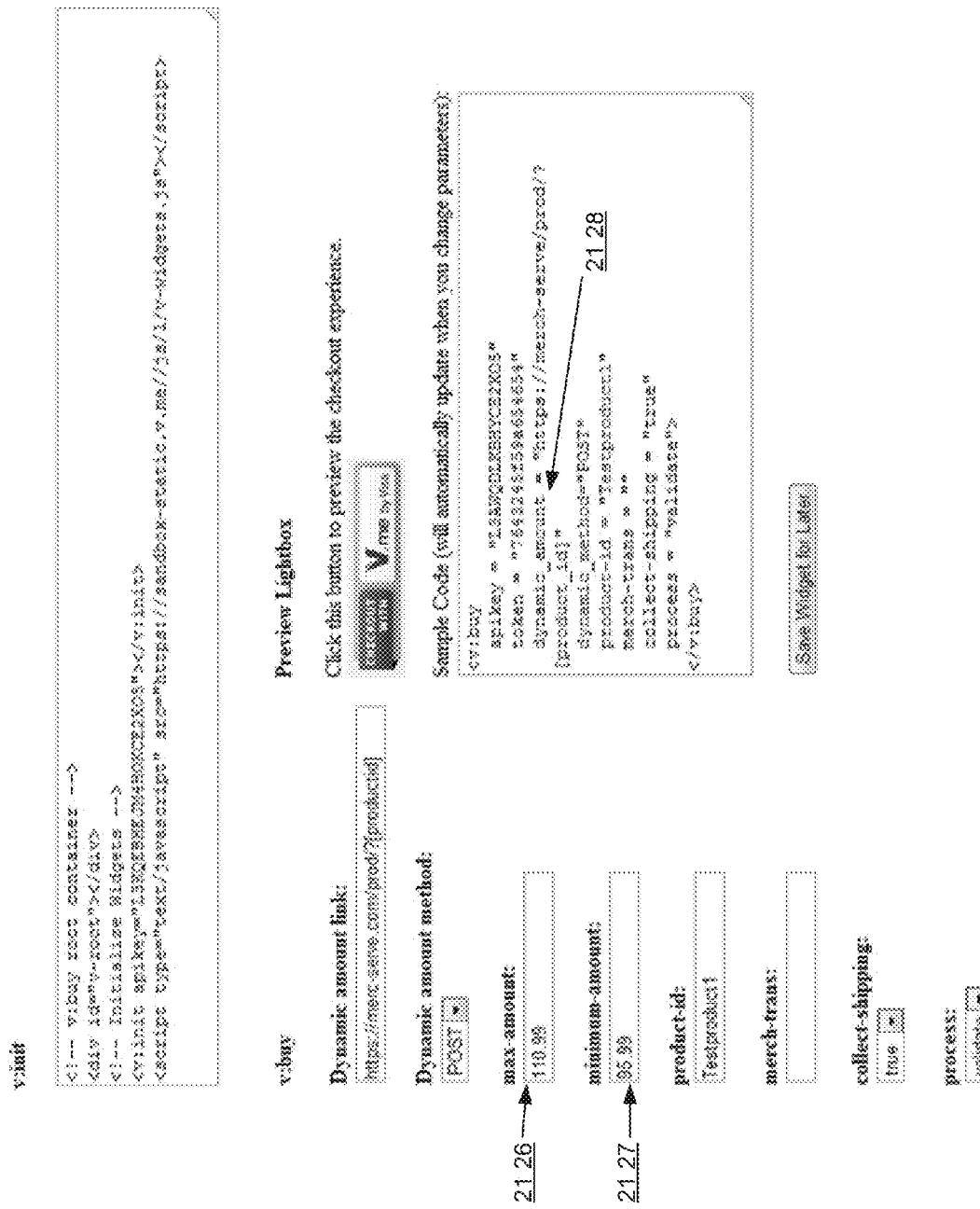
Figure 21D  Example User Interface: Widget Code Generator with Dynamic Content Retrieval

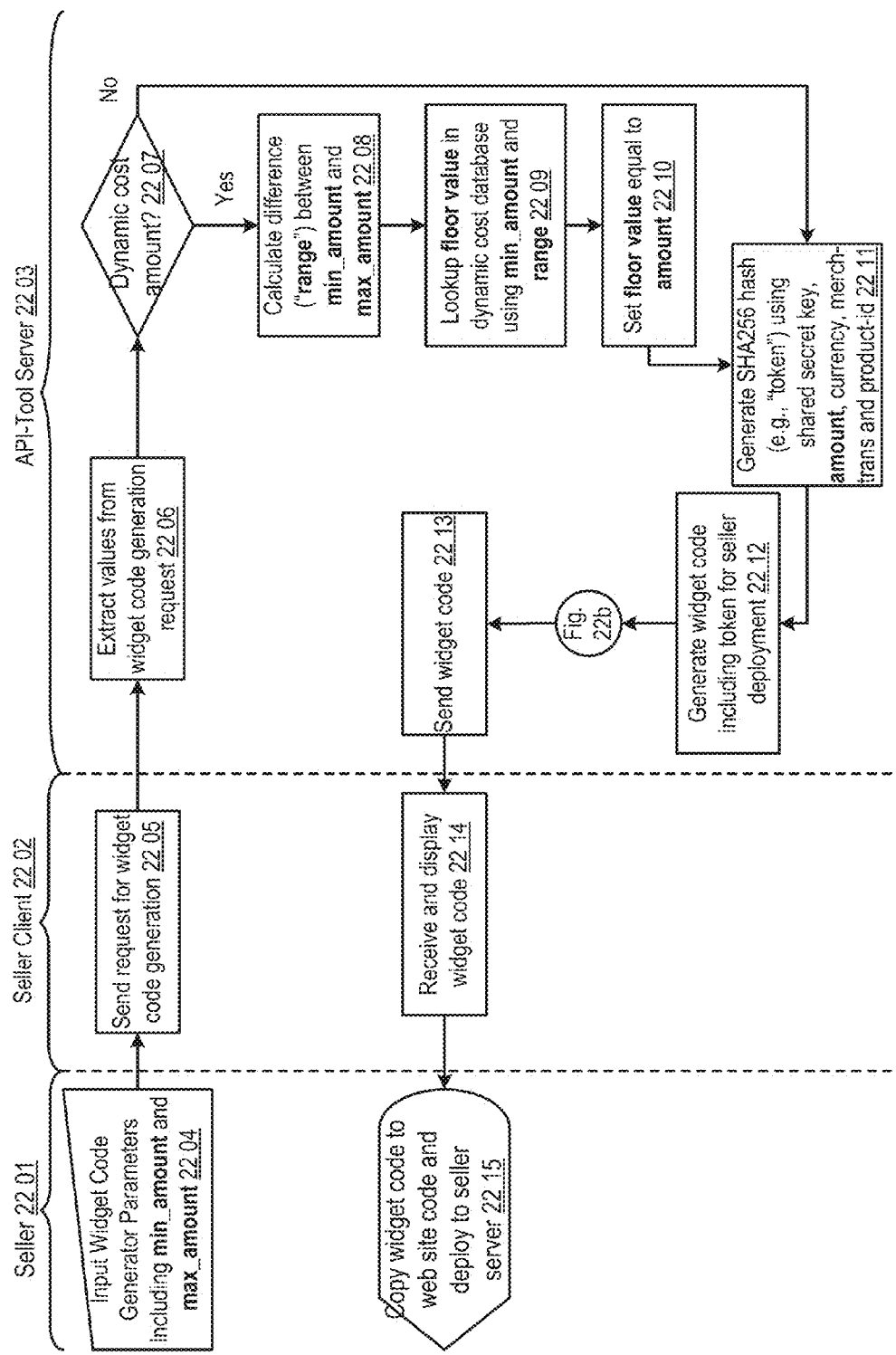
Figure 22A  Example Logic Flow: Widget Code Generator with Dynamic Content Retrieval (e.g., "DCR" Component 2200)

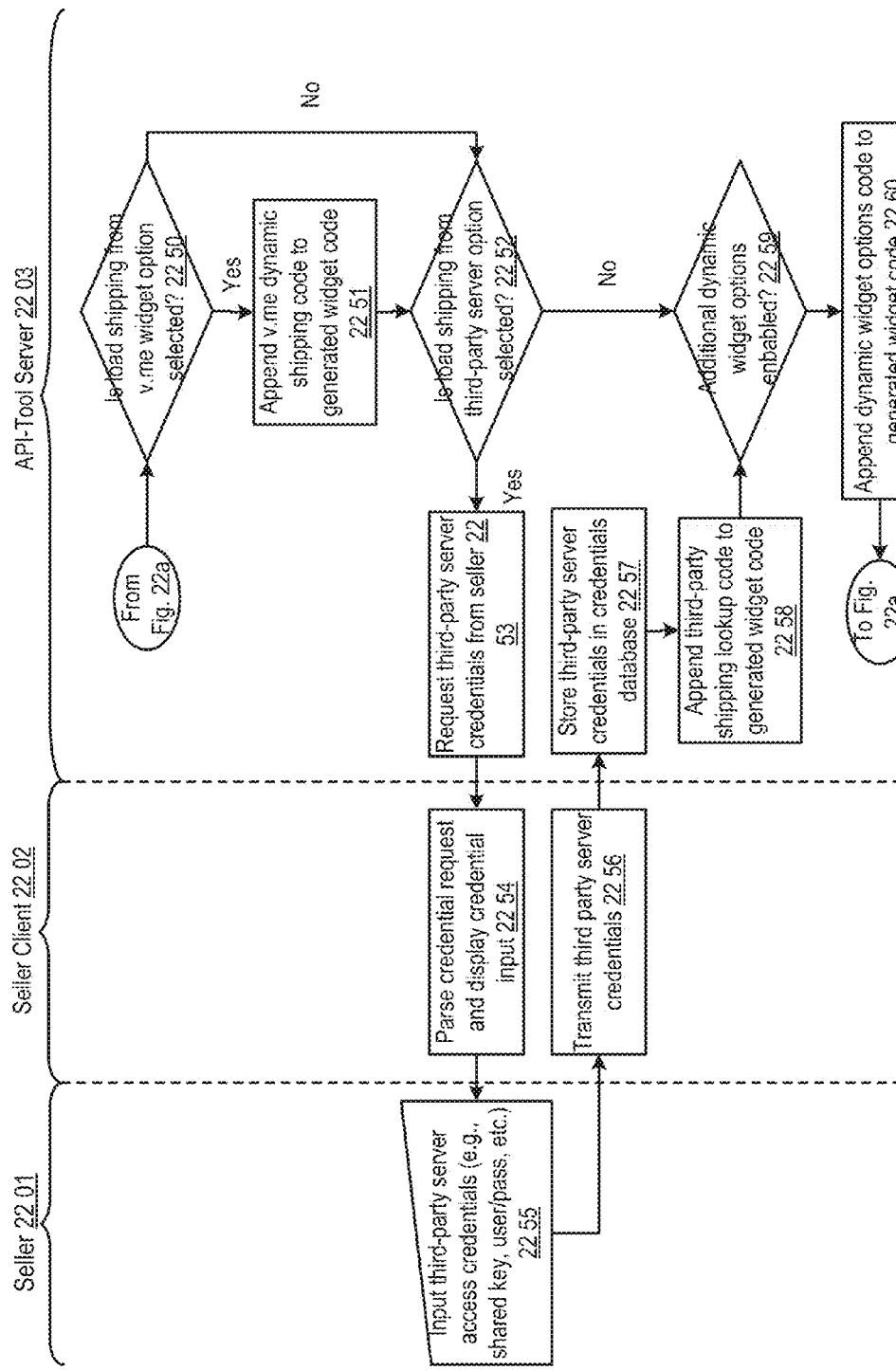
Figure 22B  Example Logic Flow: Widget Code Generator with Dynamic Content Retrieval (e.g., "DCR" Component 2200)

US 10,318,941 B2

PAYMENT PLATFORM INTERFACE WIDGET GENERATION APPARATUSES, METHODS AND SYSTEMS

PRIORITY CLAIM

This application is a non-provisional of and claims priority under 35 U.S.C. § 119 to: U.S. provisional application Ser. No. 61/682,645, filed Aug. 13, 2012, entitled "Payment Platform Interface Widget Generation Apparatuses, Methods And Systems,".

This application is a continuation-in-part of, and claims priority under 35 U.S.C. § 120 to: U.S. non-provisional patent application Ser. No. 13/872,005, filed Apr. 26, 2013, entitled "Social Checkout Widget Generation and Integration Apparatuses, Methods and Systems,", which in turn is a non-provisional of and claims priority under 35 U.S.C. § 119 to: U.S. provisional application Ser. No. 61/639,837 filed Apr. 27, 2012, entitled "Checkout Widget Integration Apparatuses, Methods and Systems,", and U.S. provisional patent application Ser. No. 61/639,843 filed Apr. 27, 2012, entitled "Dynamic Widget Generator Apparatuses, Methods and Systems,".

This application is a continuation-in-part of, and claims priority under 35 U.S.C. § 120 to U.S. non-provisional patent application Ser. No. 13/714,090 filed Dec. 13, 2012, entitled "Dynamic Widget Generator Apparatuses, Methods and Systems,", which in turn claims priority to U.S. provisional application Ser. No. 61/570,230, filed Dec. 13, 2011, and U.S. provisional patent application Ser. No. 61/639,843 filed Apr. 27, 2012, both entitled "Dynamic Widget Generator Apparatuses, Methods and Systems," and U.S. provisional application Ser. No. 61/639,837 filed Apr. 27, 2012, entitled "Checkout Widget Integration Apparatuses, Methods and Systems,".

This application claims priority under 35 U.S.C. § 365, 371 to PCT application no. PCT/US2012/069557 filed Dec. 13, 2012, entitled "Dynamic Widget Generator Apparatuses, Methods and Systems,", which in turn claims priority to U.S. provisional application Ser. No. 61/570,230, filed Dec. 13, 2011, and U.S. provisional patent application Ser. No. 61/639,843 filed Apr. 27, 2012, both entitled "Dynamic Widget Generator Apparatuses, Methods and Systems," and U.S. provisional application Ser. No. 61/639,837 filed Apr. 27, 2012, entitled "Checkout Widget Integration Apparatuses, Methods and Systems,".

The entire contents of the aforementioned application(s) are all expressly incorporated by reference herein.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address payment widget creation, configuration and management, electronic payment application programming interface, and more particularly, include PAYMENT PLATFORM INTERFACE WIDGET GENERATION APPARATUSES, METHODS AND SYSTEMS.

BACKGROUND

Online shopping with a merchant via electronic payment has been widely adopted by a variety of merchants. For example, a merchant may host a website that lists its products so that a consumer may browse the website to shop interested items. The consumer can select an interested item and enter his shipping information and billing information on a checkout page from the merchant website. The consumer entered billing information will be submitted to a payment network for verification. Once it is verified, the payment network will transmit a payment completion confirmation to the merchant website so that the merchant website will generate a confirmation page to the consumer showing a summary of the transaction.

BRIEF DESCRIPTION OF THE DRAWINGS

The accompanying appendices and/or drawings illustrate various non-limiting, example, innovative aspects in accordance with the present descriptions:

FIGS. 1A-1B provide diagrams illustrating an example scenario of API-Tool users obtaining API widgets via the API-Tool within embodiments of the API-Tool;

FIG. 1D provides an exemplary diagram illustrating aspects of multiple programming environment compatibility within embodiments of the API-Tool;

FIG. 2C shows a data flow illustrating an example social wallet widget integration, in some embodiments of the API-Tool;

FIGS. 3A-3B provide exemplary logic flow diagrams illustrating merchant registration and API generation via an API-Tool interface within embodiments of the API-Tool;

FIG. 3E shows a logic flow illustrating an example widget designer building component, e.g., a BWD Component 300, in some embodiments of the API-Tool;

FIGS. 4A-B show a logic flow illustrating an example social widget assembly and population component, e.g., a PSW Component 400, in some embodiments of the API-Tool;

FIG. 8A shows a block diagram illustrating example digital marketing value chain, in some embodiments of the API-Tool;

FIG. 8B shows a block diagram illustrating example e-commerce and content integration with wallet, in some embodiments of the API-Tool;

FIG. 9D shows a screenshot diagram illustrating example integration of checkout widget in social media (e.g., TWITTER), in some embodiments of the API-Tool;

FIG. 9E shows a screenshot diagram illustrating example widget checkout in social media (e.g., TWITTER), in some embodiments of the API-Tool;

FIG. 12B shows user interfaces illustrating example widget checkout in a digital catalog, in some embodiments of the API-Tool;

FIG. 13A shows a screenshot diagram illustrating example integration of checkout widget in a content site, in some embodiments of the API-Tool;

FIG. 14 shows a logic flow diagram illustrating example widget integration and checkout, in some embodiments of the API-Tool;

FIG. 15 shows a block diagram illustrating example checkouts, in some embodiments of the API-Tool;

FIG. 17 shows a logic flow diagram illustrating dynamic widget generation component, in some embodiments of the API-Tool;

FIG. 18 shows a data flow diagram illustrating dynamically generated widget purchase, in some embodiments of the API-Tool;

FIGS. 20A-C show screen shots illustrating example widget customization using test tools, in some embodiments of the API-Tool;

FIGS. 21A-D show user interfaces illustrating example widget code generator with integrated testing, in some embodiments of the API-Tool;

FIG. 22A-B shows a logic flow diagram illustrating a widget code generator with dynamic content retrieval component, in some embodiments of the API-Tool.

Figure 1A:
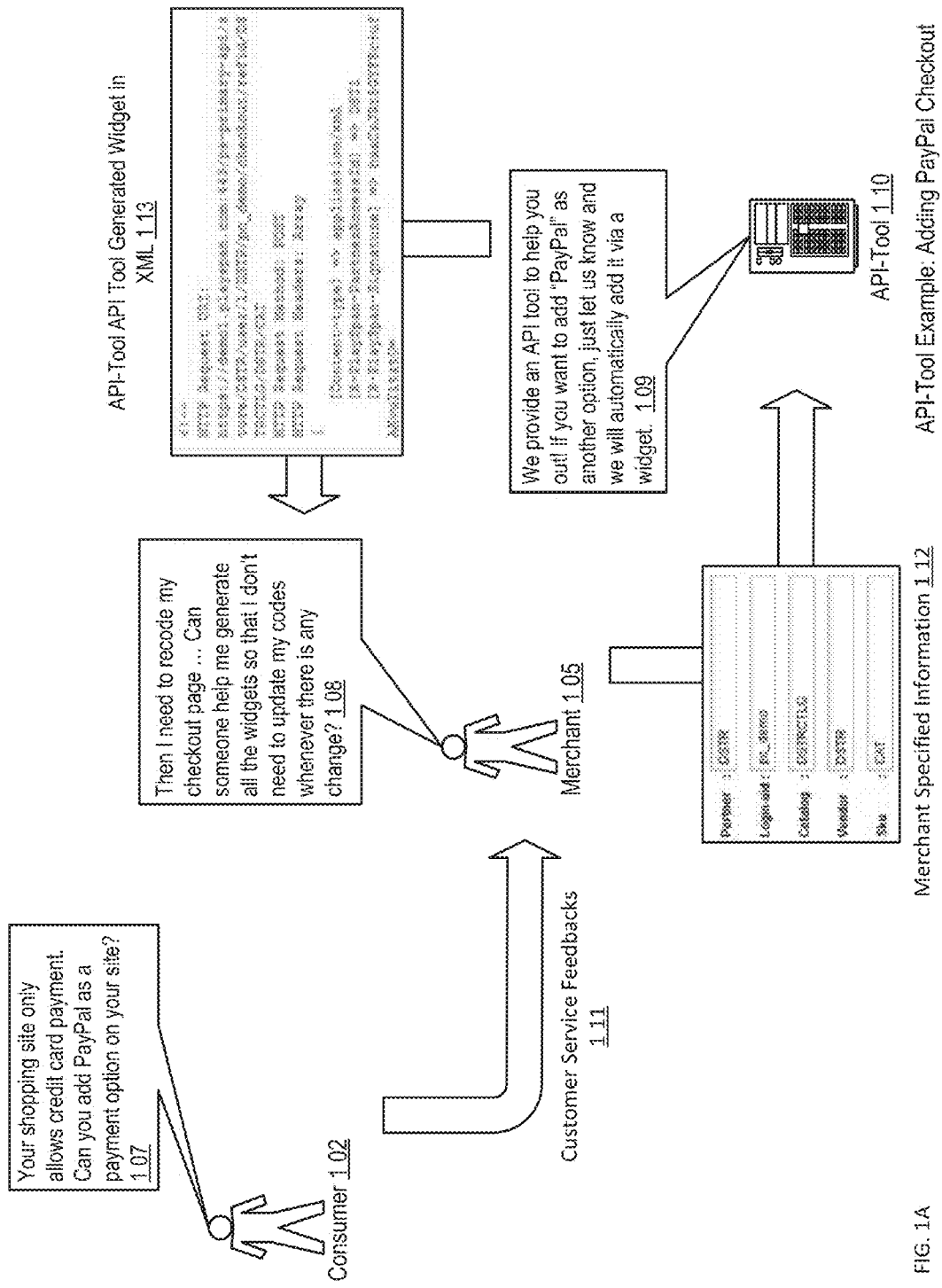

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

API-Tool

The PAYMENT PLATFORM INTERFACE WIDGET GENERATION APPARATUSES, METHODS AND SYSTEMS APPARATUSES, METHODS AND SYSTEMS (hereinafter "API-Tool") provides a application programming interface (API) client tool for a merchant to facilitate payment service at a merchant end without the merchant recreating API code. In one implementation, the API-Tool may allow a merchant site to call various APIs, such as but not limited to commerce (e.g., electronic payment, etc.) and subscription (e.g., transaction feeds, etc.) APIs from third party payment platform (e.g., PlaySpan®, etc.). In one implementation, the API-Tool may provide visual details of the API request, URL, response data, response speed, and/or the like.

For example, in one implementation, a merchant website may desire to design payment components for their online shopping checkout page so that the merchant may provide a widget (e.g., a pop-up box, a checkout light box, etc.) to a consumer to enter their billing information, such as but not limited to a credit card number, a debit card number, a PayPal account, and/or the like, and obtain user entered information for forwarding to a payment network. In one implementation, API-Tool may provide an API development platform, via which the merchant may select a desired API category, e.g., a user profile API, a user subscription API, checkout APIs, and/or the like. The API-Tool may then generate a block of code, e.g., in the form of eXtensible Markup Language (XML), etc., and the merchant may include the generated block of XML code into its web page so that a payment widget is incorporated. For example, a pop-up payment light box may be triggered when a consumer selects "proceed to pay." from the merchant website.

Within implementations, the API-Tool platform may generate user interface widget that is applicable to different merchants, and/or merchant site agnostic. For example, two or more different merchant sites may request a checkout widget at the API-Tool platform widget generation platform (e.g., see FIGS. 7A-Q), and the API-Tool may receive requested parameters from the merchant sites and provide a widget package to the different merchant sites in a non-exclusive manner.

In another implementation, the API-Tool platform facilitates parties such as sellers and/or merchants to add payment acceptance to their applications or websites with a simple integration. In some embodiments, a social payment integration is facilitated that may allow the creation and/or customization of social network applications by API-Tool components. In one embodiment, the API-Tool platform allows sellers (or developers working for sellers) to customize payment acceptance using dynamically generated buy buttons or widgets that capture payments from customers.

Various aspects of the API-Tool facilitates a multi-channel and multi-party merchandising and checkout from content publishing platforms. Examples of publishing platforms include online publishing systems, web and mobile publishing platforms, and/or the like that can support one or more data sources and user interfaces. In one embodiment, the API-Tool provides content publishers an avenue for monetizing content by offering merchandising and commerce marketplaces to their audiences. In another embodiment, the API-Tool supports content publishing platforms by providing a checkout solution that enables management of multiple content publishers and participating merchants. In a further embodiment, the API-Tool supports merchants by providing them a new distribution channel for their storefronts closer to potential customers within the applications or websites where those audiences spend their time online. The API-Tool may further support merchants by driving customers to their own websites or mobile applications by enabling merchants to embed or inject their storefront within destination applications or sites that their potential customers already use. In yet another embodiment, the API-Tool may provide digital wallet providers new channels for acquiring consumer enrollments, reselling, merchant acceptance and driving new sources of volume.

In some embodiments, aspects of the API-Tool provides merchants with a consolidated payment processing integration for all of their transactions and facilitate third parties such as acquirers, processors, payment service vendors, and/or the like to integrate to the transaction processing application programming interface (API) such as V.me transaction processing API to provide reporting and analytics, including federated and/or integrated access to a merchant control panel (e.g., V.me merchant control panel). For example, depending on business and/or technology model, merchants and/or their provider of shopping cart/hosted order page solutions may integrate to a payment widget or checkout widget (e.g., V.me payment widget) using one or more integration methods. In some implementations, follow-on transactions, which may include authorization, capture, reversal, refund, and/or the like, may be sent through the merchant's existing payment processing connection, thereby eliminating the need to support two separate payment APIs and ensure a consolidated view of their transactions.

In some embodiments, aspects of the API-Tool provides merchants facilities to distribute checkout facilities anywhere and everywhere on the web beyond their primary website, thereby facilitating "instant checkout." For example, merchants, using the facilities of the API-Tool, can add instant checkout to their FACEBOOK landing page, advertising banners, search results, web and mobile applications, and/or the like. The instant checkout, in some implementations, allows merchants to widgetize and distribute all or part of their e-commerce website to reach potential customers. Furthermore, the instant checkout may facilitate merchants to transform all of their digital and marketing channels into sales channels by providing low friction or instant on-the-spot checkout.

In some embodiments, aspects of the API-Tool facilitates publishers, content site owners, destination site owners, mobile/web application developers, and/or the like to better monetize their traffic and increase their value proposition to their publishers and sponsors. In one implementation, the facilities of the API-Tool allow acquisition of distribution and developer partners and merchant by establishing a new channel where the merchants may run a program (e.g., V.me program) within an online, mobile or social campaign without disrupting their primary ecommerce website.

In various embodiments, the API-Tool may be platform agnostic and may fit in well with mobile, tablet and various other device commerce.

Integration of an electronic payment platform, a desktop application, a plug-in to existing applications, a stand alone mobile application, a web based application, a smart prepaid card, and/or the like in capturing payment transaction related objects such as purchase labels, payment cards, barcode, receipts, and/or the like reduces the number of network transactions and messages that fulfill a transaction payment initiation and procurement of payment information (e.g., a user and/or a merchant does not need to write lines of code in order to bridge with an electronic platform payment module, and/or the like). In this way, with the reduction of network communications, the number of transactions that may be processed per day is increased, i.e., processing efficiency is improved.

It should be noted that although a web-based user interface (UI) is depicted (e.g., see FIGS. 7A-Q), a digital/electronic wallet, a smart/prepaid card linked to a user's various payment accounts, and/or other payment platforms are contemplated embodiments as well; as such, subset and superset features and data sets of each or a combination of the aforementioned payment platforms (e.g., see FIGS. 11A-11B, 12A-12C, etc.) may be accessed, modified, provided, stored, etc. via cloud/server services and a number of varying client devices throughout the instant specification. Similarly, although mobile wallet user interface elements are depicted, alternative and/or complementary user interfaces are also contemplated including: desktop applications, plug-ins to existing applications, stand alone mobile applications, web based applications (e.g., applications with web objects/frames, HTML 5 applications/wrappers, web pages, etc.), and other interfaces are contemplated. It should be further noted that the API-Tool payment processing component may be integrated with an digital/electronic wallet (e.g., a Visa V-Wallet, etc.), comprise a separate stand alone component instantiated on a user device, comprise a server/cloud accessed component, be loaded on a smart/prepaid card that can be substantiated at a PoS terminal, an ATM, a kiosk, etc., which may be accessed through a physical card proxy, and/or the like.

Payment Platform Interface Widget Generation
Apparatuses, Methods and Systems (API-Tool)

FIGS. 1A-1B provide block diagrams illustrating an example scenario of API-Tool generating a checkout lightbox with PayPal payment option within embodiments of the API-Tool. As shown in FIG. 1A, a consumer 102 may shop at a merchant website and provide consumer service feedbacks in, indicating that a PayPal payment option may be desired at the merchant shopping site 107. In one implementation, the merchant 105 may ask its website developers to update its checkout page of the merchant site, e.g., to incorporate a PayPal payment option. In another implementation, the merchant 105 may submit a request to the API-Tool platform 110 to obtain automatic generated API widgets without additional programming work 108. For example, the merchant 105 may access a API-Tool platform user interface, e.g., a web-based application, etc., and submit requested information 112 such as user ID, merchant catalog information, vendor information, SKU information, and/or the like. The API-Tool 110 may automatically generate a block of code in response 113, wherein the code may be XML formatted for the merchant to incorporate into its checkout page source code and generate a widget 109.

In one implementation, the API-Tool platform may be hosted or affiliated with a third party payment service vendor, e.g., PlaySpan, etc. In one implementation, the third party payment service vendor may obtain and process payment transaction request obtained via the API-Tool generated widget.

As shown in FIG. 1B, before incorporating an API-Tool generated widget, the merchant shopping site may comprise a checkout page 115 including various credit/debit card payment options. Upon incorporating API-Tool generated XML component 117, the merchant site may prompt a lightbox checkout component 120 upon a consumer triggering the "checkout now" 118 button. In one implementation, the checkout lightbox 120 may be generated by the XML component 117, which includes an option for PayPal checkout 122.

Figure 1C:
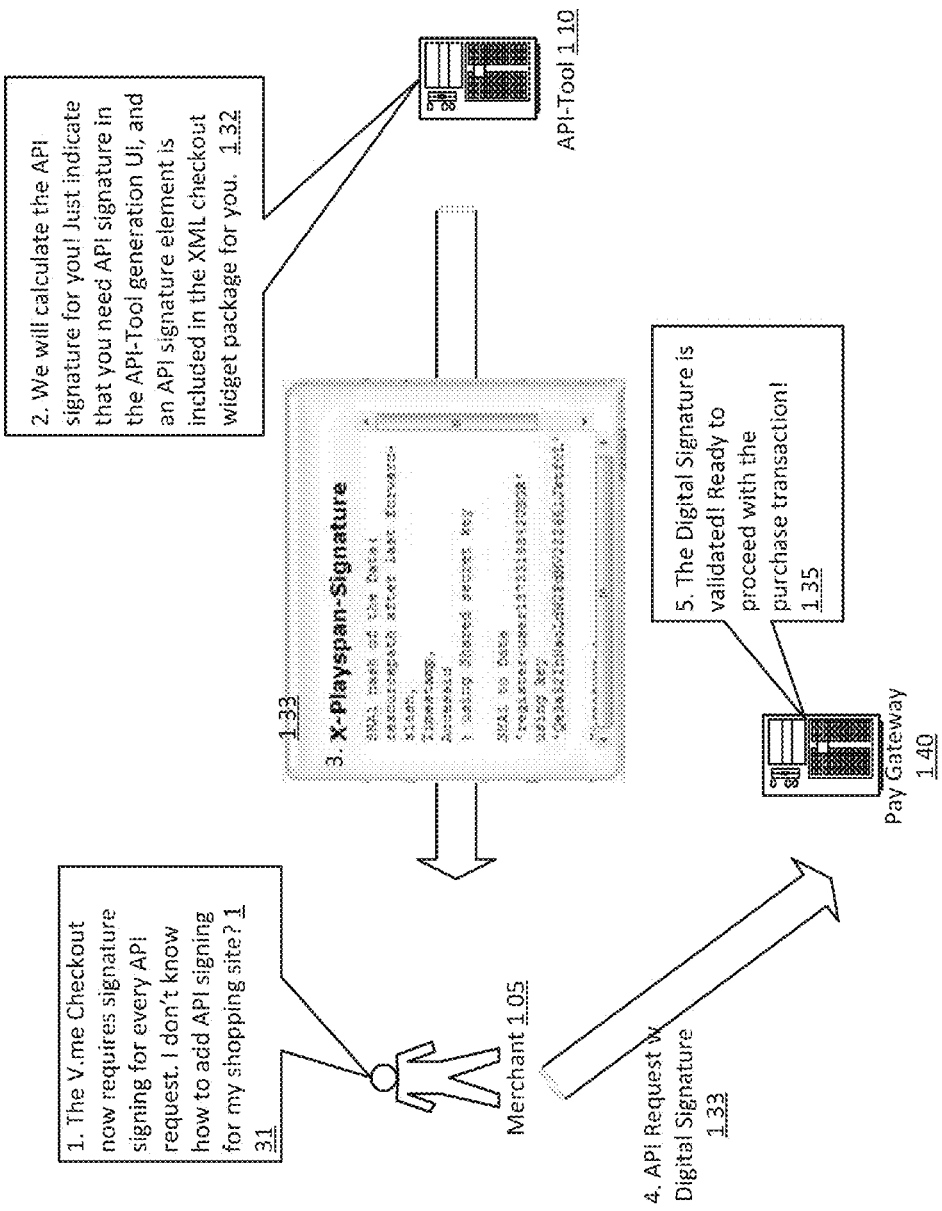
FIG. 1C provides an exemplary diagram illustrating aspects of providing API digital signature widget within embodiments of the API-Tool.

FIG. 1C provides an exemplary diagram illustrating aspects of generating an API widget including digital signature generation for an API request within embodiments of the API-Tool. In one implementation, a merchant site 105 who desires to invoke an API request via a checkout box (e.g., PlaySpan, Visa V.me, etc.) for checkout payment processing, may be required by the pay gateway 140 to digitally sign any API request (e.g., an payment authorization request, etc.). For example, the merchant site may need to employ a procedure to add a timestamp, and calculate a signature (e.g., a hash, etc.) based on the API request and a secret key (e.g., obtained from the pay gateway 140, etc.). Such signature, e.g., the hash value, may need to be calculated for every API request generated at the merchant site. In one implementation, the merchant site may need to develop and/or modify its source codes of the website to generate a digital signature 131, which may incur additional burden for the merchant 105. For example, the development language or environment of the merchant may not have a module for computing the required SHA1 hash; or, the merchant may not have the resources to have a programmer to develop new codes to make the changes immediately.

Within embodiments, the API-Tool no may generate a digital signature signing element to the API widget XML package (e.g., see 113 in FIG. 1A, etc.). For example, a user (e.g., the developer, the merchant, etc.) may submit a request to add a signing component into the API widget via an API widget generation UI (e.g., see 133 in FIG. 1C) so that the API-Tool may include an API signature element into the XML widget package (e.g., a checkout widget, etc.) 132. For example, the AIP signature element 133 may calculate a digital signature on behalf of the merchant, which may be realized by incorporating the signature enabled API widget into the merchant site; and such replacement may be configured in minutes.

Upon incorporating the API widget package with a signature element, the merchant site may digitally sign every API request (e.g., a payment authorization request, etc.) that the API widget generates 134, and send such digitally signed API request to the pay gateway 140. The pay gateway 140 may in turn validate the digital signature from the API request and determine whether the signature is valid so as to proceed to process a purchase transaction 135. For example, the pay gateway 140 may calculate a signature based on a public key and compare the calculated signature versus the obtained signature via the API request to determine whether the two signatures match. If a match is determined, the API request is validated. Otherwise, the pay gateway 140 may send a rejection response to the merchant site 105 to decline the API request, e.g., decline the payment authorization request.

FIG. 1D provides an example diagram illustrating aspects of multi-programming language support within embodiments of the API-Tool. In one implementation, different merchant websites may need different development environment 141, e.g., Javascript, PHP, Python, .Net Framework, etc. The API-Tool 110 may provide the API XML package compatible with a merchant preferred language environment, e.g., the pull parser to read an XML data message, such as but not limited to StAX in the Java programming language, XMLReader in PHP, ElementTree.iterparse in Python, System.Xml.XmlReader in the .NET Framework, and the DOM traversal API, and/or the like, 142a. In one implementation, the API-Tool 110 may provide a drop down list 143 via the API-Tool UI for the merchant/developer to select a preferred development language. In another implementation, the API-Tool no may automatically determine the source language of the destination merchant site (e.g., based on the merchant URL, etc.), and develop the API XML package readable by the determined source language 142b.

Figure 1E:
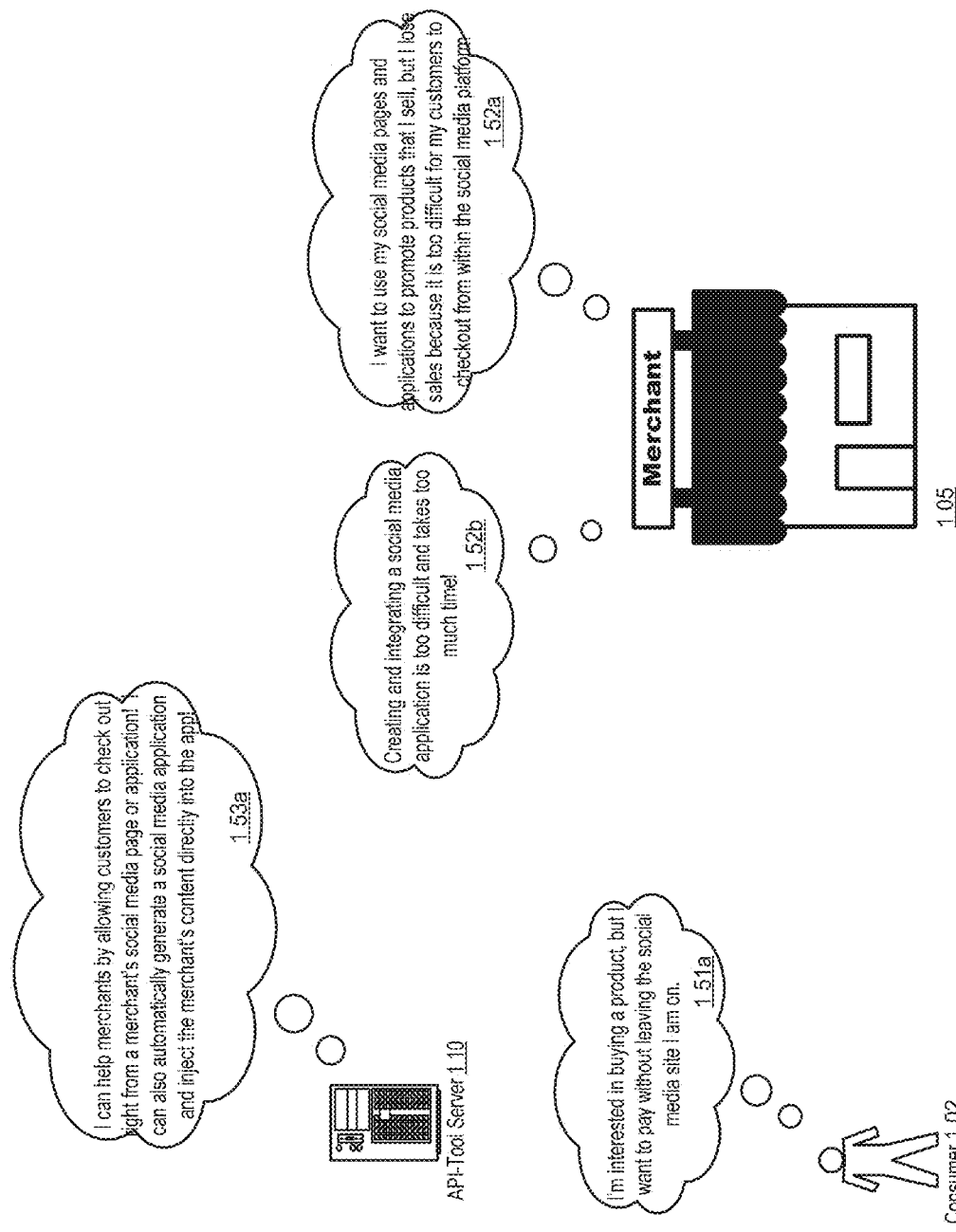
FIG. 1E shows a block diagram illustrating an example social wallet integration, in some embodiments of the API-Tool.

FIG. 1E shows a block diagram illustrating an example social wallet integration, in some embodiments of the API-Tool. In one embodiment, a consumer may be interested in buying a product without leaving a social media site that they are currently on, e.g., 151a. In one embodiment, a merchant 105 may desire to use their social media pages and applications to promote products that they sell but find that customers are lost because of the difficulty in facilitating checkout from a social media platform, e.g., 152a. In still other embodiments, a API-Tool server 110 may provide a capability to merchants, consumers and/or the like that allows consumers to checkout directly from a social media page or application. In one embodiment, the API-Tool may enable a merchant to create a social media application and inject merchant selected content into the application, e.g., 153a.

Figure 2A:
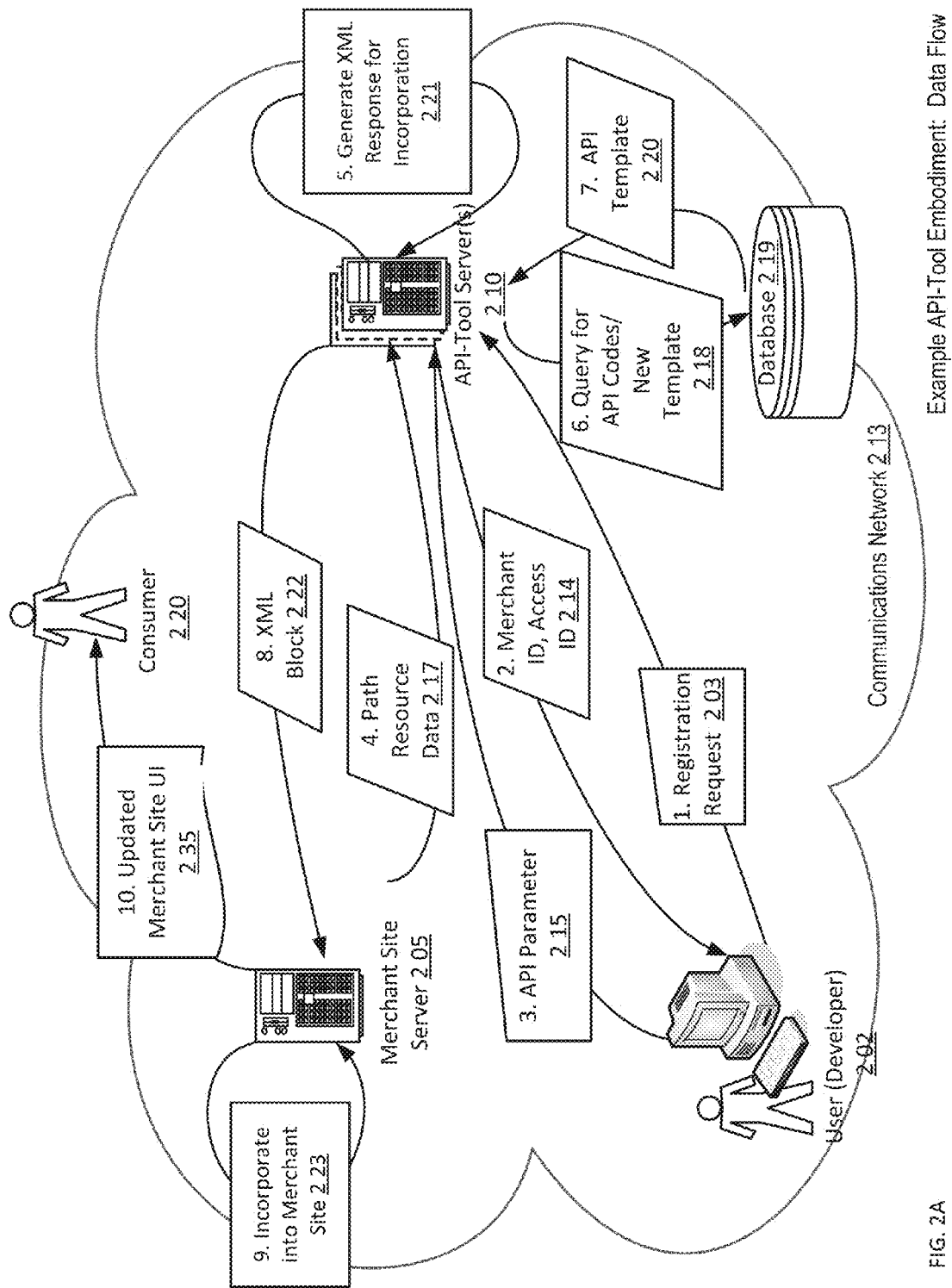
FIGS. 2A-2B provide data flow diagrams illustrating exemplary data flows between the API-Tool and its affiliated entities within embodiments of the API-Tool.

FIG. 2A provides a data flow diagram illustrating exemplary data flows between the API-Tool and its affiliated entities within embodiments of the API-Tool. In FIG. 2, a user (e.g., a developer) 202, merchant(s) site server 205, an API-Tool server 210, a API-Tool database 219, a consumer 220 and/or the like are shown to interact via a communication network 213. The user 202, who may be a web developer of the merchant 205, may operate a wide variety of different user devices, including communications devices and technologies within embodiments of API-Tool operation. For example, in one embodiment, the user devices may include, but are not limited to, computer terminals, work stations, cellular telephony handsets, smart phones, PDAs, and/or the like. In one embodiment, the API-Tool server 210 may be equipped at a terminal computer of the user 202. For example, the API-Tool component may be instantiated on a user device to conduct API-Tool analysis. In another embodiment, the API-Tool server 210 may be a remote server which is accessed by the user 202 via a communication network 213, such as, but not limited to local area network (LAN), in-house intranet, the Internet, and/or the like.

Within implementations, the user 202 and/or the merchant site server 205 may send a registration request 203 to the API-Tool server for registration with API-Tool, which may include merchant information. For example, in one implementation, the user 202 and/or the merchant site server 205 may generate a registration request message 203 to the API-Tool server as a HTTP(S) POST message including XML-formatted data. An example registration message 203 in the HTTP(S) POST message including XML-formatted data, is provided below:

```
POST /registration_request.php HTTP/1.1
Host: www.API-Tool.com
Content-Type: Application/XML
Content-Length: 667
        <?XML version = "1.0" encoding = "UTF-8"?>
        <registration_request>
        <Merchant_key> XXXXXXX </Merchant_key>
        <session_id> 3423eefsddw43 </session_id>
        <merchant_url> www.lipstick.com </merchant_url>
        <merchant_name> lipstick online shopping </merchant_name>
        <merchant_catalog>
                <product_1>
                        <sku> 9090909 </sku>
                        <product_name> MAC Passion
                        </product_name>
                        <brand> MAC </brand>
                        <description> Dark Red </description>
                        <price> 14.95 </price>
                        ...
                </product_1>
                <product_2> ... </product_2>
                ...
        </merchant_catalog>
        ...
</registration_request>
```

In one implementation, the API-Tool server 210 may provide a merchant ID and an access ID 214 to the user 202, e.g., via an registration email account, text message, and/or the like.

Upon registration, the user 202 may specify API parameter 215 to the API-Tool server 210. For example, the API type 215 may include merchant specified API type, path resource data, and/or the like. In one implementation, the submission of API parameters 215 may comprise an iterative process. For example, as shown in FIG. 197A, the user may first select an API type by clicking on a listed API category (e.g., 705a-l in FIG. 7A). For example, an exemplary HTTP(S) POST message including XML-formatted data indicating the API category selection, is provided below:

```
POST /API-selection.php HTTP/1.1
Host: www.API-Tool.com
Content-Type: Application/XML
Content-Length: 667
        <?XML version = "1.0" encoding = "UTF-8"?>
        <API-selection>
        <Merchant_key> XXXXXXX </Merchant_key>
        <merchant_id> xxxxxx </merchant_id>
        <access_id> myaccess </access_id>
        <base_url> www.API-Tool.com </base_url>
        <merchant_url> www.lipstick.com </merchant_url>
        <merchant_name> lipstick online shopping </merchant_name>
        <API_Category>
                checkout and order
        </API_category>
        <API_subcategory>
                catalog/vendor/sku
        </API_subcategory>
        ...
</API-selection>
```

Figure 7A:
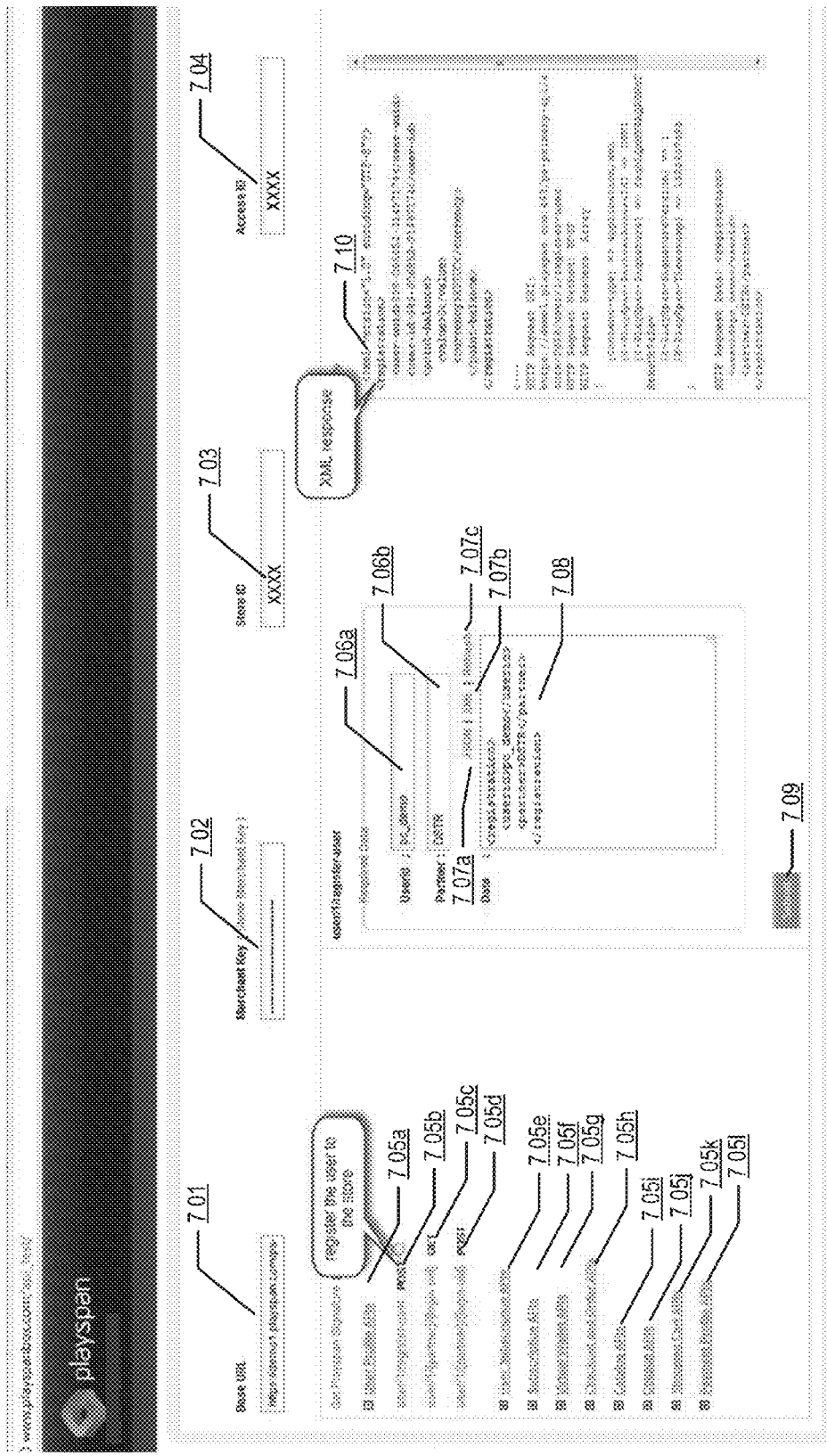
FIGS. 7A-7P provide exemplary user interface diagrams illustrating API-Tool API tools within embodiments of the API-Tool.

Upon receiving an indication of the selected API category, the API-Tool may retrieve a corresponding data input panel (e.g., see 706a-b in FIG. 7A) for API parameters collection from the user 202. In another implementation, as shown in FIGS. 7A-7P, a user 202 may enter field information via an API-Tool UI, which may be translated into an XML formatted message including path resource data 217. For example, an example API message including path resource data 217 in the HTTP(S) POST message including XML-formatted data, is provided below:

```
POST /checkout.php HTTP/1.1
Host: www.API-Tool.com
Content-Type: Application/XML
Content-Length: 667
<?XML version = "1.0" encoding = "UTF-8"?>
<checkout>
        <Merchant_key> XXXXXXX </Merchant_key>
        <merchant_id> xxxxxx </merchant_id>
        <access_id> myaccess </access_id>
        <base_url> www.API-Tool.com </base_url>
        <merchant_url> www.lipstick.com </merchant_url>
        <merchant_name> lipstick online shopping </merchant_name>
        <user_id> pc_demo </user_id>
        <partner> DSTR </partner>
        ...
        <method>
                <ultimatepay-info>
                        <accept-url> www.mydomain.com/
payment_accepted </accept-url>
                        <reject-url> www.mydomain.com/
payment_rejected </reject-url>
                        <display> lightbox </display>
                        ...
                </ultimatepay-info>
                <custom-data>
                        <payment_option>
                                <option_1> Visa </option_1>
                                <option_2> Mastercard </option_2>
                                <option_3> Merchant Store points
</option_3>
                                <option_4> PayPal </option_4>
                                ...
        </method>
</checkout>
```

In one implementation, the API-Tool server 210 may generate an XML formatted response for incorporation to create the requested widget 221. The API-Tool server 210 may query for API code 218 at a database 219. For example, the API-Tool server may issue PHP/SQL commands to query an API template database table. An example query command, substantially in the form of PHP/SQL commands, is provided below:

```
<?PHP
header('Content-Type: text/plain');
mysql_connect("254.93.179.112",$DBserver,$password); // access
database server
mysql_select_db("API-Tool_DB.SQL"); // select database table to
search
//create query
$query = "SELECT checkout refid vendor FROM API_Tamplate Table
WHERE checkout_display = "lightbox";
$result = mysql_query($query); // perform the search query
mysql_close("API-Tool_DB.SQL"); // close database access
?>
```

In other embodiments, the user 202 may generate a new API category (e.g., see FIG. 4N) by indicating API parameters. The API-Tool server may store the generated API template in the database 219. For example, the API-Tool server may issue PHP/SQL commands to store the data to a database table (such as FIG. 23, API template 2319p). An example API template store command 218, substantially in the form of PHP/SQL commands, is provided below:

```
<?PHP
header('Content-Type: text/plain');
mysql_connect("254.92.185.103",$DBserver,$password); // access
database server
mysql_select("API-Tool_DB.SQL"); // select database to append
mysql_query("INSERT INTO API_tempalteTable (API_id, API_name,
API_category, API_subcategory, ...)
VALUES ($new223, $checkout, $checkout_paypal, ...)"); // add data
to table in database
mysql_close("API-Tool_DB.SQL"); // close connection to database
?>
```

In one implementation, the API-Tool server may obtain an API template and provide the API XML block 222 to the merchant site server 205, and/or a user via a user interface. For example, in one implementation, the XML block 222 may be displayed at a user interface, e.g., see 410 at FIG. 4A. In another example, the API-Tool server may generate a HTTP(S) POST message including XML-formatted data for the requested widgets, which is provided below:

```
<?xml version="1.0" encoding = "UTF=8"?>
<checkout>
        <checkout_id> 999-093423rwrw4 </checkout_id>
        <upay_url>
<![CDATA[https://www/ultimatepay.com/app/api/live/?method
fdsfsfsdrstrtstreserrrfsrtsretgriojioyu498ncvr9y8st ...]]>
</upay_url>
        <merchantrans> 99999999999 </merchantrans>
...
</checkout>
<!==
HTTP Request URI:
https://www.playspan.com:443/ps-primary-
api/store/DSTR/user/checkout/refid/...
HTTP Request Method: POST
HTTP Request Headers: Array
{
        [Content-type]=>application/xml
        [X-playspan_Partner_access_ui]=> DST1
        [X-playspan_Partner_signature]=>
rwrcw8rf589fw98589gh54hf09h
        ...
```

In one implementation, the XML-formatted code block 222 may comprise a widget generation source code, which the merchant site server 201 may incorporate into the merchant site 223 to generate an updated merchant site UI 235 to the consumer, e.g., see 120 in FIG. 1B.

In another implementation, the XML-formatted code block 222 may comprise a HTTP POST message (as shown above) for the merchant to generate an API call, e.g., a checkout payment request, a subscription request, and/or the like, to a payment platform (e.g., the PlaySpan platform, etc.).

Figure 2B:
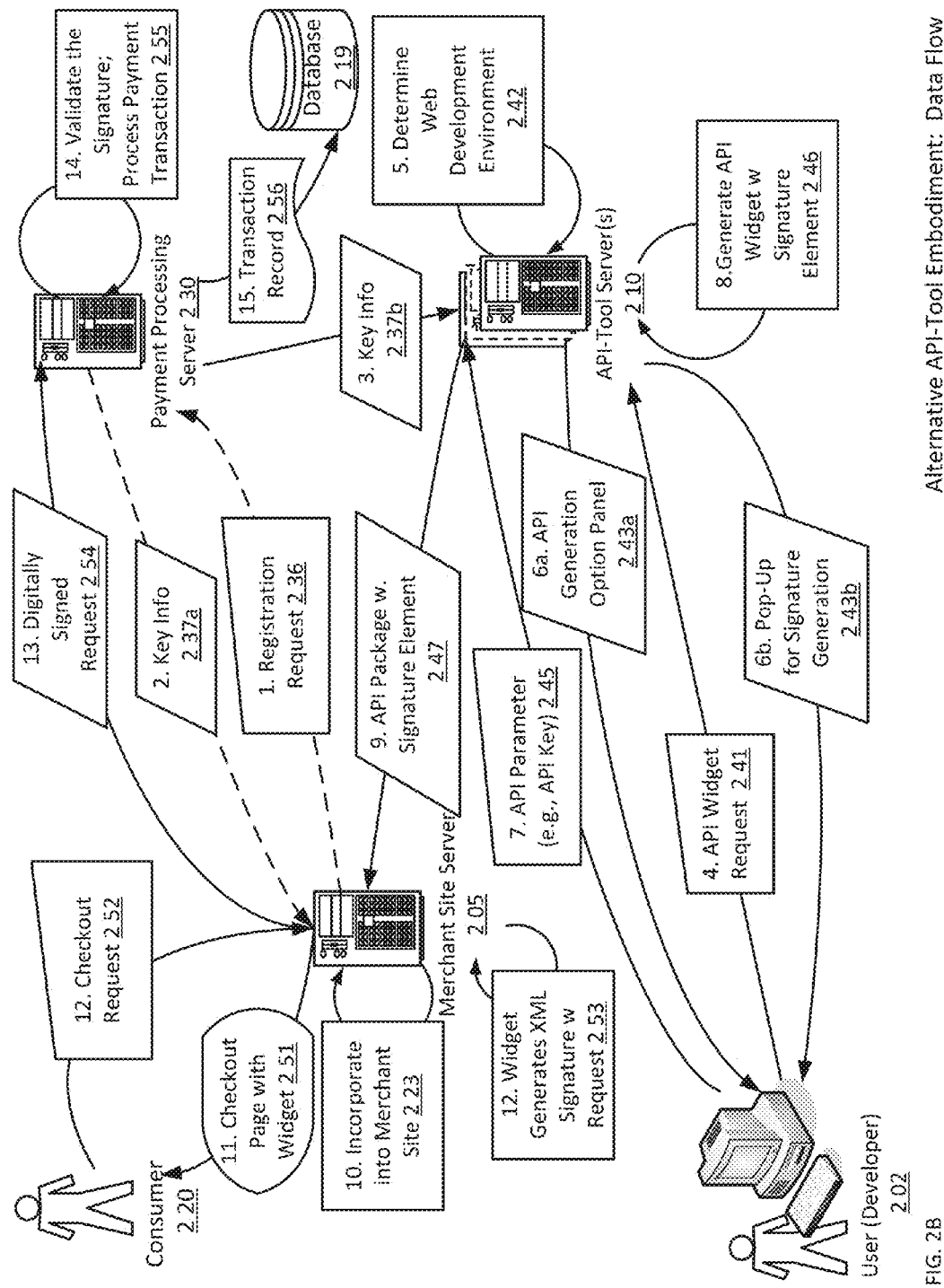

FIG. 2B provides an exemplary data flow diagram illustrating aspects of API widget signature element generation within alternative embodiments of the API-Tool. Within implementations, the merchant site server 205 may optionally submit a registration request 236 to a payment processing server 230 (e.g., PlaySpan, Visa V.me, etc.), e.g., the registration request 236 may take a similar form to 203 in FIG. 2A. In one implementation, the payment processing server 230 may optionally provide key information 237a to the merchant site server, and/or provide key information 237b to the API-Tool server 210. An example HTTPS message of the key information 237a-b substantially in the form of XML may take a form similar to the following:

```
POST /key_info.php HTTP/1.1
Host: www.playspan.com
Content-Type: Application/XML
Content-Length: 667
<?XML version = "1.0" encoding = "UTF-8"?>
<key_info>
        <time> 09-09-2013 12:34 </time>
        <session_id> 3423eefsddw43 </session_id>
        <key_type> public, shared secret </key_type>
/*the key type may be any of a public and a shared secret key*/
        <key> TPL2B3247CDS34DSA3 </key>
        ...
</key_info>
```

In one implementation, the user (developer) 202 may initiate an API widget request 241, e.g., by accessing the API-Tool widget generation site and selecting an API category (e.g., see the API parameters 215 in FIG. 2A, etc.). For example, the API-Tool may generate API widgets for user subscription (e.g., obtaining pricing and/or market information from a third party service provider, etc.), offer redemption, billing, buy/checkout, balance inquiries, and/or the like. The API-Tool server 210 may determine the web development environment 242 for the merchant site, and provide an API generation option panel 243a to the user via a user interface (e.g., see FIGS. 4A and 5B, etc.).

Figure 8C:
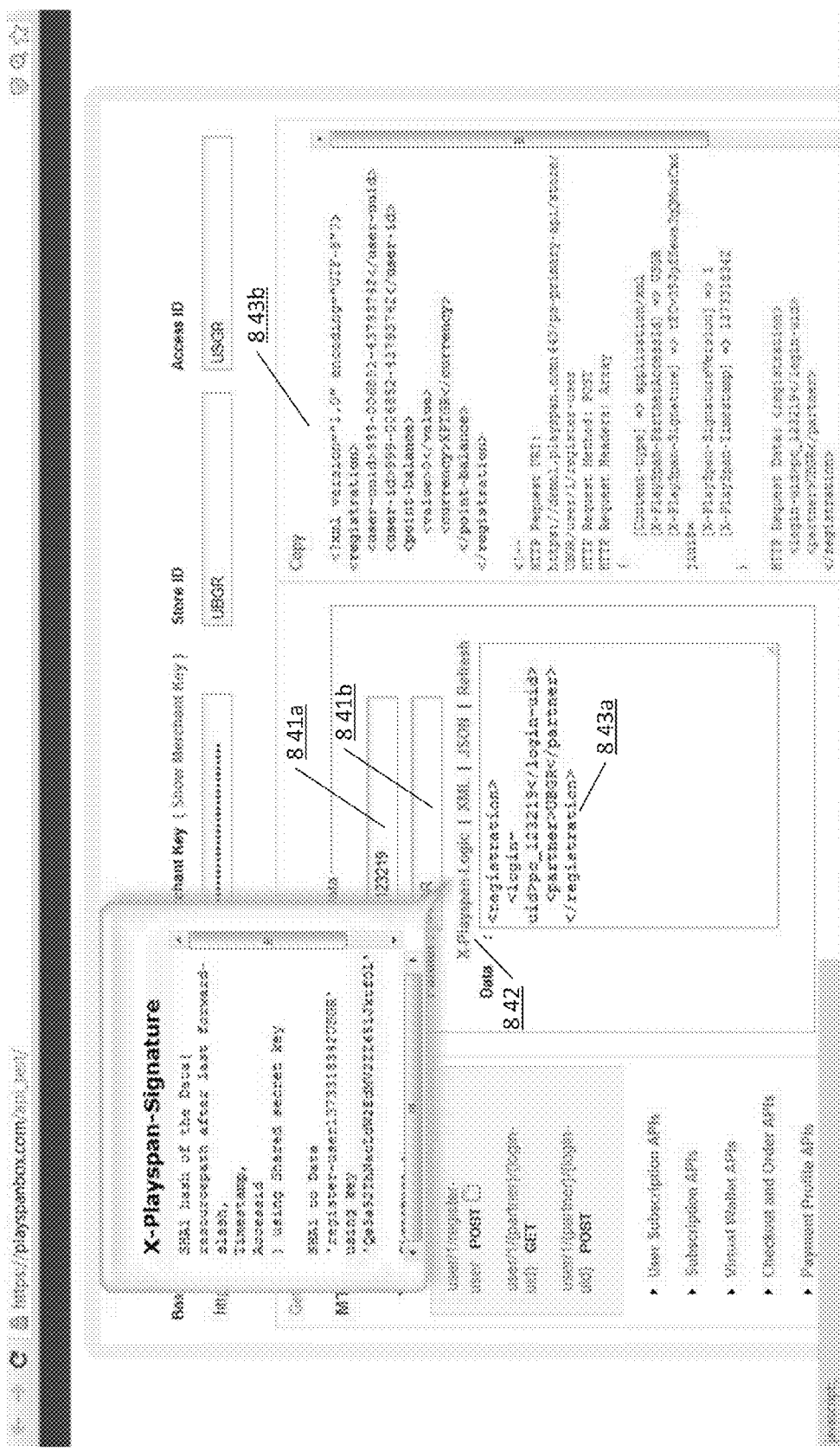
FIGS. 8C-8F provide example user interface diagrams illustrating aspects of API signature widget generation and/or mobile wallet API within embodiments of the API-Tool.

In a further implementation, the API-Tool server 210 may optionally provide a pop-up window for signature generation 243b to the user if the API-Tool determines that the API widget needs a signature, e.g., see 842 in FIG. 8C.

In one implementation, an example HTTPS message of an API generation option panel 243a substantially in the form of XML may take a form similar to the following:

```
POST /API_page.php HTTP/1.1
Host: www.API-Tool.com
Content-Type: Application/XML
Content-Length: 667
<?XML version = "1.0" encoding = "UTF-8"?>
<API_page>
        <Merchant_key> XXXXXXX </Merchant_key>
        <merchant_id> xxxxxx </merchant_id>
        <access_id> myaccess </access_id>
        <base_url> www.API-Tool.com </base_url>
        <API_type>
                <position> left panel </position>
                <type_list>
                        <item_1> user profile </item_1>
                        <item_2> user subscription </item_2>
                        <item_3> virtual wallet API </item_3>
                        <item_4> checkout and other API </item_4>
                        <item_5> catalog API </item_5>
                        <item_6> coupon API </item_6>
                        <item_7> shopping cart API </item_7>
                        <item_8> payment profile </item_8>
                        ...
                </type_list>
        ...
        </API_type>
        <Input>
                <position> mid panel </position>
                <field_1> default </field_1>
                <field_2> blank </field_2>
                ...
        </Input>
        <output>
                <position> right panel </position>
                ...
                <content> blank </content>
                ...
        </output>
        ...
</API_page>
```

In one implementation, upon the user 202 submit API parameters (e.g., selection of the API category) 245, which may take a similar form to 215 in FIG. 2A, the API-Tool server 210 may generate an API widget with a signature element 246, and provide the API package with the signature element 247 to the merchant site server. In one implementation, an example PlaySpan signature element 247 substantially in the form of XML may take a form similar to the following (e.g., see 842 in FIG. 8C):

```
...
SHA1 hash of the Data( resourcepath after last forward-slash,
Timestamp, Accessid ) using Shared secret key
SHA1 to Data 'pc_1231375696479USGR'
using key
'Qe3a52IhNaoLdW2EdMV2ZZ651Jktf0L'
Signature :
yHNLUtNyV3c2D+3H5UEjA2V1XiY=
...
```

In another implementation, an exemplary API XML package 247 with a signature element for user registration may take a form similar to the following:

```
<?xml version="1.0" encoding ="UTF-8"?>
<registration>
        <user-uuid> 999-006852-43793742 </user-uuid>
        <user-id>999-006852-43793742 </user-id>
        <point-balance>
                <value> 0 </value>
                <currency> XPTGR </currency>
        </point-balance>
</registration>
<!-
HTTP Request URI:
https://demo1.playspan.com:443/ps-primary-api/store/...
UBGR/user/1/register-user
HTTP Request Method: POST
HTTP Request Headers: Array
(
        [Content-type] => application/xml
        [X-PlaySpan-PartnerAccessId] => USGR
        [X-PlaySpan-Signature] => tECv35JgfSewsJqQMuzCxdjiui8=
        [X-PlaySpan-SignatureVersion] => 1
        [X-PlaySpan-Timestamp] => 1373318342
)
HTTP Request Data: <registration>
<login-uid> pc_123219 </login-uid>
<partner> UBGR </partner>
</registration>
...
```

In another implementation, an exemplary API XML package 247 for retrieving, modifying and storing a user profile with PlaySpan may take a form similar to the following:

```
<?xml version="1.0" encoding="UTF-8"?>
<userinfo>
    <notify-promo-emails>false</notify-promo-emails>
    <status>ACTIVE</status>
    <user-uuid>999-006852-36355713</user-uuid>
    <user-id>999-006852-36355713</user-id>
</userinfo>
<!--
HTTP Request URI:
https://demo1.playspan.com:443/ps-primary-
api/store/UBGR/user/1/UBGR/pc_123
HTTP Request Method: GET
HTTP Request Headers: Array
(
        [Content-type] => application/xml
        [X-PlaySpan-PartnerAccessId] => USGR
        [X-PlaySpan-Signature] => 6hmRl3LCBQQ6SpZZJqhv9HThTCo=
        [X-PlaySpan-SignatureVersion] => 1
        [X-PlaySpan-Timestamp] => 1375698125
)
HTTP Request Data:
HTTP Response Status: OK - 200
HTTP Response Headers: Array
(
        [Date] => Mon, 05 Aug 2013 10:22:20 GMT
        [Content-type] => application/xml
        [Connection] => close
        [Transfer-encoding] => chunked
)
Response Time: 0.228 seconds
-->
```

In another implementation, an exemplary API XML package 247 for user subscription for market information with PlaySpan may take a form similar to the following:

```
<?xml version="1.0" encoding="UTF-8"?>
<plans>
    <status>200</status>
    <plan>
        <id>7400010004120316</id>
        <name>BronzePlan</name>
        <planid>BronzePlan</planid>
        <productid>PlayspanMarket</productid>
        <plan-status>PUBLISHED</plan-status>
        <startdate>1334947357013</startdate>
        <grace-days>0</grace-days>
        <trial-period>000H</trial-period>
        <billing-period>001M</billing-period>
        <recurrence-type>N</recurrence-type>
        <price>
            <currency>USD</currency>
            <billing-price>5.0</billing-price>
        </price>
        <description>
            <display-name>BronzePlan</display-name>
            <lang>en</lang>
            <description>Bronze support plan</description>
        </description>
        <plan-tag>Bronze Plan</plan-tag>
    </plan>
    <plan>
        <id>7400010004120317</id>
        <name>SilverPlan</name>
        <planid>SilverPlan</planid>
        <productid>PlayspanMarket</productid>
        <plan-status>PUBLISHED</plan-status>
        <startdate>1334947516540</startdate>
        <grace-days>0</grace-days>
        <trial-period>000H</trial-period>
        <billing-period>001M</billing-period>
        <recurrence-type>N</recurrence-type>
        <price>
            <currency>USD</currency>
            <billing-price>10.0</billing-price>
        </price>
        <description>
            <display-name>SilverPlan</display-name>
            <lang>en</lang>
            <description>Silver Plan</description>
        </description>
        <plan-tag>Silver Tag</plan-tag>
    </plan>
</plans>
<!--
StringToSign:
adminid=15&apikey=0BYAHI0L1AVXA5N5QSSQ&productid=
PlayspanMarket&timestamp=1375700932
HTTP Request URI: https://sandbox-
wapi.ultimatepay.com/subscription/getallplans?adminid=15&apikey=0
BYAHI0L1AVXA5N5QSSQ&productid=
PlayspanMarket&timestamp=1375700932&token=
x:1375700932:aa8ac2f93ea390230176e6baa5831134
```

```
HTTP Request Method: GET
HTTP Content-type: application/xml
HTTP Response Status: 200
HTTP Response Time: 0.492221
-->
...
```

In one implementation, the merchant site server 205 may incorporate the received API package into the merchant site 223.

In one implementation, when a consumer 220 submits a checkout request to the merchant site 205, e.g., the consumer clicks to access a checkout page, etc. The merchant site server 205 may present a checkout page with the generated widget 251 such as a checkout sandbox, etc., e.g., see 120 in FIG. 1B. In one implementation, the original checkout request 252 (e.g., unsigned) submitted by the consumer may take a form similar to the following:

```
POST /checkoutrequest.php HTTP/1.1
Host: 000.00.00.0
Content-Type: Application/XML
Content-Length: 667
<?xml version="1.0" encoding="UTF-8"?>
<checkoutrequest>
<timestamp> 09-09-2013 14:22 </timestamp>
<merchant_id> 00234 </merchant_id>
<item>
    <Item number="130046593231">
    <Description>Video Game</Description>
    <Price>10.29</Price>
</Item>
<Buyer id="8492340">
    <Name>John Smith</Name>
    <Address>
        <Street>One Network Drive</Street>
        <Town>Burlington</Town>
        <State>MA</State>
        <Country>United States</Country>
        <PostalCode>01803</PostalCode>
    </Address>
</Buyer>
...
</checkoutrequest>
```

The merchant site may then 205 generate a digitally signed API checkout request 254 via the incorporated widget to a payment processing server 230 (e.g., PlaySpan, Visa V.me, etc.). For example, a digitally signed checkout request 254 substantially in the form of XML may take a form similar to the following:

```
POST /signed_checkoutrequest.php HTTP/1.1
Host: www.merchant.com
Content-Type: Application/XML
Content-Length: 667
<?xml version="1.0" encoding="UTF-8"?>
<signed_checkoutrequest>
<timestamp> 09-09-2013 14:23 </timestamp>
<merchant_id> 00234 </merchant_id>
<item>
    <Item number="130046593231">
    <Description>Video Game</Description>
    <Price>10.29</Price>
</Item>
<Buyer id="8492340">
    <Name>John Smith</Name>
    <Address>
        <Street>One Network Drive</Street>
        <Town>Burlington</Town>
        <State>MA</State>
        <Country>United States</Country>
        <PostalCode>01803</PostalCode>
    </Address>
</Buyer>
<Signature xmlns="http://www.w3.org/2000/09/xmldsig#">
    <SignedInfo>
        <CanonicalizationMethod
          Algorithm="http://www.w3.org/TR/2001/REC-xml-c14n-20010315"/>
        <SignatureMethod
          Algorithm="http://www.w3.org/2000/09/xmldsig#rsa-sha1"/>
        <Reference URI="">
            <Transforms>
                <Transform
                  Algorithm="http://www.w3.org/2000/09/xmldsig#enveloped-signature"/>
            </Transforms>
            <DigestMethod
Algorithm="http://www.w3.org/2000/09/xmldsig#sha1"/>
            <DigestValue>tVicGh6V+8cHbVYFIU91o5+L3OQ=</DigestValue>
        </Reference>
    </SignedInfo>
    <SignatureValue>
        dJDHiGQMaKN8iPuWApAL57eVnxz2BQtyujwfPSgE7HyKoxYtoRB97ocxZ
        8ZU440wHtE39ZwRGIjvwor3WfURxnIgnI1CChMXXwoGpHH//Zc0z4ejaz
        DuCNEq4Mm4OUVTiEVuwcWAOMkfDHaM82awYQiOGcwMbZe38UX0oPJ2DOE=
    </SignatureValue>
    <KeyInfo>
        <X509Data>
```

```
      <X509SubjectName>
        CN=My Name,O=Test Certificates Inc.,C=US
      </X509SubjectName>
      <X509Certificate>
        MIIB9zCCAWCgAwIBAgIERZwdkzANBgkqhkiG9w0BAQUFADBAMQswCQYD
        VQQGEwJVUzEfMB0GA1UEChMWVGVzdCBDZXJ0aWZpY2F0ZXMgSW5jLjEQ
        MA4GA1UEAxMHTXkgTmFtZTAeFw0wNzAxMDMyMTE4MTFaFw0zMTA4MjUy
        ...
      </X509Certificate>
    </X509Data>
  </KeyInfo>
</Signature>
</signed_checkoutrequest>
```

In one implementation, the payment processing server 230 may validate the signature and process the payment transaction 255, which may in turn generate a transaction record 256 to store in the database 219.

Within various implementations, the consumer may submit an API request for various functions at 252, e.g., to subscribe to a third party service provider (e.g., obtaining pricing and/or market information from a third party service provider, etc.), to redeem an offer, to retrieve an online bill with a biller, to view a catalog from a merchant, to buy/checkout with a shopping cart, to access a virtual wallet account for balance inquiries, and/or the like. In similar manners as described at 254, the merchant site may generate a corresponding API request via the incorporated API component, and digitally sign the API request if such signature is necessary, and send the digitally signed request 254 to the corresponding service provider, e.g., Playspan, Visa V.me, etc.

FIG. 2C shows a data flow illustrating an example social wallet widget integration, in some embodiments of the API-Tool. In one embodiment, user 202 may use a client to request a widget designer interface, e.g., 265, configured with capabilities to allow the user to customize a widget, generate a social media application, inject an existing social media application with content, provide widget checkout capabilities from within a social media site or within a social media application, share the user's injected content or social media application on the user's social media feed for viewing by other users who "follow" the user, and/or the like. In one embodiment, the client may generate a widget designer request 266. A widget designer request may be a request to render an interface that allows social media and/or widget customization. An example widget designer request 266, substantially in the form of an HTTP(S) POST message including XML-formatted data, is provided below:

```
POST /widget_designer_request.php HTTP/1.1
Host: www.API-Toolserver.com
Content-Type: Application/XML
Content-Length: 667
<?XML version = "1.0" encoding = "UTF-8"?>
<widget_designer_request>
    <timestamp>2020-12-12 15:22:43</timestamp>
    <auth>
      <user_id>7654353</user_id>
      <password>secretpass</password>
      <device_id type="Mac">E76565</device_id>
      <user_info>
        <name>John Consumer</name>
        <email>john.consumer@foo.com</email>
        <phone>645-123-4567</phone>
      </user_info>
      <key>
        TRDTRBKJHujJHG&^%BKJBJHVTYEXERJHG
        VXDHJVRTDERJUHYLOPOOIUCFGWFDGFTRTD
        )TRDREWQTFRGCDYUG{UYTFTYDFGRERSEW%
      </key>
    </auth>
    <designer val="do_render />
    <merchant_to_query method="web_site_scrape">
      <merchant_id val="5454" />
      <url val="http://www.merchant.com/" />
      <scrape_template id="87564" />
      <item_div val="item" />
      <item_price_div val="sell_price" />
    </merchant_to_query>
    <social_media_credentials>
      <social_media type="facebook" post="auto">
        <user val="myfbusername" />
        <pass val="myfbpass" />
      </social_media>
      <social_media type="twitter">
        <user val="mytwitterusername" />
        <pass val="mytwitterpass" />
      </social_media>
      <social_media>
        ...
      </social_media>
    </social_media_credentials>
</widget_designer_request>
```

In one embodiment, the API-Tool server 210 may require updated content from the merchant before rendering a widget designer response. For example, the API-Tool may have pricing or item information that is stale and requires refreshing. In one embodiment, the API-Tool server may call a merchant provided Application Programming Interface (e.g., a RESTful service, via SOAP, and/or the like) in order to update item information, pricing information, current inventory information, item descriptions, item prices, and/or the like, e.g., 267. In one embodiment, the merchant server 205 may retrieve current pricing information in response to the update request, such as by querying an item and/or pricing database or invoking a pricing procedure stored in memory, and provide the updated information to the API-Tool server, e.g., a widget merchant content update response 268. An example widget merchant content update response 268, substantially in the form of an HTTP(S) POST message including XML-formatted data, is provided below:

```
POST /widget_merchant_content_update_response.php HTTP/1.1
Host: www.API-Toolserver.com
Content-Type: Application/XML
Content-Length: 667
<?XML version = "1.0" encoding = "UTF-8"?>
<widget_merchant_content_update_response>
  <timestamp>2020-12-12 15:24:43</timestamp>
```

```
                                -continued
<auth>
    <user_id>7654353</user_id>
    <password>secretpass</password>
    <device_id type="Mac">E76565</device_id>
    <key>
        TRDTRBKJHujJHG&^%BKJBJHVTYEXERJHG
        VXDHJVRTDERJUHYLOPOOIUCFGWFDGFTRTD
        )TRDREWQTFRGCDYUG{UYTFTYDFGRERSEW%
    </key>
</auth>
<store value="online">
    <item sku="8768675" type="physical">
        <inventory quantity="53" packing="1" />
        <current_price value="9.54" />
        <description>An item description</description>
        <shipping_lag_time value="2-days" />
        <backordered value="false" />
    </item>
    <item>
        ...
    </item>
</store>
<store value="physical_store">
    ...
</store>
</widget_merchant_content_update_response>
```

In another embodiment, the API-Tool server may semi-autonomously obtain the merchant pricing information without a dedicated merchant item/pricing API interface. In so doing, the API-Tool may for example query a publically available merchant web page (e.g., merchant ecommerce pages) and extract information such as items available, item inventory levels, pricing, description, user reviews, and/or the like. For example, the API-Tool server may employ a web scraping capability, such as by using Webharvest, Scrappy, and/or the like. Example Scrappy program code suitable for retrieving information from a merchant's web site, substantially in the form of Python executable commands is:

```
#!/usr/bin/env python
from scrapy.spider import BaseSpider
from scrapy.http import Request
from scrapy.http import FormRequest
from scrapy.selector import HtmlXPathSelector
from scrapy import log
class MerchantSpider(Spider):
    name = "merch_spider"
    allowed_domains = ["www.merchant.com"]
    start_urls = [
        "http://www.merchant.com/store/start"
    ]
    def parse(self, response):
        pass
```

In one embodiment, the API-Tool server may build and/or render the widget designer. For example, the API-Tool may utilize a widget template and substitute values such as merchant item values retrieved above into the template. Further detail with regard to building the widget designer may be found with respect to FIG. 3, e.g., a BWD Component 300.

Upon building or rendering the widget designer, the API-Tool server may return the designer to the user device so that the user may interact with the designer and customize widgets and/or applications, e.g., a widget designer response 210. A widget designer response may contain renderable commands substantially in the form of HTML statements, client-executable commands (such as, for example, PHP interpreter commands), or compiled code suitable for execution on a client device (such as Java bytecode capable of rendering a widget designer).

In response to the widget designer response, the user's client device may render a widget designer interface, such as that described with respect to FIG. 7. The user may thereafter use the interface in order to customize a widget assembly request and/or a social media linking request, e.g., a widget assembly and social linking input 271. In response to the user's input, the client device may transmit a message to the API-Tool server requesting that the API-Tool create a checkout widget, integrate a checkout widget into a user social application, create a new social application on behalf of the user, share information on the user's social media feed, and/or the like, e.g., a social checkout widget assembly request 272. An example social checkout widget assembly request 212, substantially in the form of an HTTP(S) POST message including XML-formatted data, is provided below:

```
POST /social_checkout_widget_assembly_request.php HTTP/1.1
Host: www.API-Toolserver.com
Content-Type: Application/XML
Content-Length: 667
<?XML version = "1.0" encoding = "UTF-8"?>
<social_checkout_widget_assembly_request>
    <timestamp>2020-12-12 15:26:43</timestamp>
    <auth>
        <user_id>7654353</user_id>
        <password>secretpass</password>
        <device_id type="Mac">E76565</device_id>
        <user_info>
            <name>John Consumer</name>
            <email>john.consumer@foo.com</email>
            <phone>645-123-4567</phone>
        </user_info>
        <key>
            TRDTRBKJHujJHG&^%BKJBJHVTYEXERJHG
            VXDHJVRTDERJUHYLOPOOIUCFGWFDGFTRTD
            )TRDREWQTFRGCDYUG{UYTFTYDFGRERSEW%
        </key>
    </auth>
    <widget>
        <widget_type val="inline_html" />
        <widget_target val="social_media_application_integration" />
        <widget_template id="8767" />
        <widget_integration val="facebook_application">
            <social_page_to_integrate_widget
                value="item_display_page"
                populate_template="default_display"
                template_params="item_id:E87753">
            <insert_widget page_location_type="div"
                        Page_location="widget_insert_div" />
            <social_application_access_credentials>
                <social_user_id val="667998867" />
                <master_account user="my@email.com" pass="secretpass2">
                <social_application method="key">
                    <key>
                        TRDTRSERDEFTRED
                        CFGRTD6565434YFGT
                        KBYTJE3r434WRRDTF
                    </key>
                </social_application>
            </social_application_access_credentials>
        </widget_integration>
        <widget_integration>
            ...
        </widget_integration>
        <items_to_feature>
            <item>
                <merchant id="5454" />
                <item id="E87753" />
                <selling_price val="19.99" />
                <feature_on_widget type="photo">
                    <item_photo id="55" crop="25,65" />
                </feature_on_widget>
            </item>
```

```
    <item>
      ...
    </item>
  </items_to_feature>
 </widget>
 <widget>
  ...
 </widget>
</social_checkout_widget_assembly_request>
```

In another embodiment, an example social checkout widget assembly request 272, substantially in the form of an HTTP(S) POST message including XML-formatted data, is provided below:

```
POST /social_checkout_widget_assembly_request.php HTTP/1.1
Host: www.API-Toolserver.com
Content-Type: Application/XML
Content-Length: 667
<?XML version = "1.0" encoding = "UTF-8"?>
<social_checkout_widget_assembly_request>
  <timestamp>2020-12-12 15:26:43</timestamp>
  <auth>
    <user_id>7654353</user_id>
    <password>secretpass</password>
    <device_id type="Mac">E76565</device_id>
    <user_info>
      <name>John Consumer</name>
      <email>john.consumer@foo.com</email>
      <phone>645-123-4567</phone>
    </user_info>
    <key>
      TRDTRBKJHujJHG&^%BKJBJHVTYEXERJHG
      VXDHJVRTDERJUHYLOPOOIUCFGWFDGFTRTD
      )TRDREWQTFRGCDYUG{UYTFTYDFGRERSEW%
    </key>
  </auth>
  <widget>
    <widget_type val="inline_html" />
    <widget_target val="social_media_application_integration" />
    <widget_template id="8767" />
    <widget_integration val="twitter_application">
      <create_application val="true" />
      <sub_application_of val="null" />
      <application_creation_template val="twitter_app4" />
      <developer_api>
        <api_key>T7657568TRDRD</api_key>
        <app_creation_key>876434567</app_creation_key>
      </developer_api>
    </widget_integration>
    <widget_integration>
      ...
    </widget_integration>
    </widget_integration>
    <items_to_feature>
      <item>
        <merchant id="5454" />
        <item id="E87753" />
        <selling_price val="19.99" />
        <feature_on_widget type="photo">
          <item_photo id="55" crop="25,65" />
        </feature_on_widget>
      </items_to_feature>
      </item>
      <item>
        ...
      </item>
    </widget>
  <widget>
    ...
  </widget>
</social_checkout_widget_assembly_request>
```

In one embodiment, if the API-Tool server determines that the social checkout widget request contains a request to create or inject content into a user's social media application, the API-Tool may execute a request to a social media server 204 in order to obtain information about the user's current social media applications, e.g., a social application data request 273. In other embodiments, the API-Tool may host a user's social media application locally in which case a local social media application database may be queried. An example social application data request 273, substantially in the form of an HTTP(S) POST message including XML-formatted data, is provided below:

```
POST /social_application_data_request.php HTTP/1.1
Host: www.socialmediaserver.com
Content-Type: Application/XML
Content-Length: 667
<?XML version = "1.0" encoding = "UTF-8"?>
<social_application_data_request>
  <timestamp>2020-12-12 15:28:43</timestamp>
  <auth type="server_to_server">
    <key>
      TRDTRBKJHujJHG&^%BKJBJHVTYEXERJHG
      VXDHJVRTDERJUHYLOPOOIUCFGWFDGFTRTD
      )TRDREWQTFRGCDYUG{UYTFTYDFGRERSEW%
    </key>
  </auth>
  <request type="third_party" />
  <return type="all_active_user_social_applications" />
  <social_application_access_credentials>
    <social_user_id val="667998867" />
    <master_account user="my@email.com" pass="secretpass2">
    <social_application method="key">
      <key>
        TRDTRSERDEFTRED
        CFGRTD6565434YFGT
        KBYTJE3r434WRRDTF
      </key>
    </social_application>
  </social_application_access_credentials>
</social_application_data_request>
```

In one embodiment, social media server 204 may receive the social application data request and query a social application database for applications associated with the social application data request parameters. In other embodiments, the social media server may respond with a package containing a template for creating new social media applications on the platform. For example, the social media server may provide a WSDL file containing the available function calls available to the API-Tool server (e.g., to be used via a web services call and/or the like) in order to create a social media application. In one embodiment, the API-Tool server may provide a template itself that contains the application parameters is seeks to map (for example, a checkout container with integrated checkout, a product display page, and/or the like) and the social media server may respond with a mapping of the application parameters to function calls available from the social media server. In so doing, the API-Tool server may interface with previously unknown social media servers while minimizing the amount of input required from a API-Tool administrator. An example social application data response 274, substantially in the form of an HTTP(S) POST message including XML-formatted data, is provided below:

```
POST /social_application_data_response.php HTTP/1.1
Host: www.API-Toolserver.com
Content-Type: Application/XML
Content-Length: 667
<?XML version = "1.0" encoding = "UTF-8"?>
<social_application_data_response>
  <timestamp>2020-12-12 15:28:43</timestamp>
  <auth type="server_to_server">
    <key>
      TRDTRBKJHujJHG&^%BKJBJHVTYEXERJHG
```

-continued

```
        VXDHJVRTDERJUHYLOPOOIUCFGWFDGFTRTD
        )TRDREWQTFRGCDYUG{UYTFTYDFGRERSEW%
      </key>
    </auth>
    <applications_registered_for>
      <social_user_id val="667998867" />
    </applications_registered_for>
    <applications>
      <app id="765765">
        <date_created value="2020-01-01" />
        <automatically_created val="false" />
        <created_by val="account_owner" />
        <app_profile>
          <app_capabilities_and_restrictions>
            <restriction type="age_restriction" value="13+" />
            <restriction type="purchase_limits" value="<$100USD" />
            <capability type="revenue_split_on_purchases">
              <split entity="social_network" value="5%" />
              <split entity="pay_network" value="5%" />
              <split entity="merchant" value="90%" />
            </capability>
          </app_capabilities_and_restrictions>

<title val="App Home Page" />
            <is_template_based val="false" />
            <content>
                This is the home page of our merchant
                social media application!
            </content>

<title val="App Home Page" />
            <is_template_based val="true" />
            <template id="65445" />
            <widget_insertion_capable value="true" />
            <widget_insertion_point value="widget_div" />

...

</app_profile>
      </app>
      <app>
        ...
      </app>
    </applications>
</social_application_data_response>
```

In one embodiment, the API-Tool server may receive the social application data response and create a social application, inject a widget (e.g., a checkout widget, an item widget, and/or the like) into an existing social application, prepare a hosted social application (e.g., an application that is hosted on the API-Tool or a third-party server), share a social application on a user's social media feed, and/or the like. Further detail with respect to the assembly and population of a socially enabled widget and/or social application may be found with respect to FIG. 4, e.g., a PSW Component 400.

In one embodiment, the API-Tool server may inject a social checkout capability into a social application, e.g., a social checkout widget application injection 276. An example social checkout widget application injection 216, substantially in the form of an HTTP(S) POST message including XML-formatted data, is provided below:

```
POST /social_checkout_widget_application_injection.php HTTP/1.1
Host: www.socialmediaserver.com
Content-Type: Application/XML
Content-Length: 667
<?XML version = "1.0" encoding = "UTF-8"?>
<social_checkout_widget_application_injection>
    <timestamp>2020-12-12 15:26:43</timestamp>
    <auth type="server_to_server">
```

-continued

```
      <key>
        TRDTRBKJHujJHG&^%BKJBJHVTYEXERJHG
        VXDHJVRTDERJUHYLOPOOIUCFGWFDGFTRTD
        )TRDREWQTFRGCDYUG{UYTFTYDFGRERSEW%
      </key>
    </auth>
    <application_injection>
      <application>
        <api_key>T7657568TRDRD</api_key>
        <app_creation_key>876434567</app_creation_key>
        <application_pages>

<!-- application pages can be injected -->
            This is the application view content. The view
            may contain executable code.

<page_element
                preferred_location="top_left_above_browser_fold"
                content_to_inject="widget_injection:widget_div">
              <div id="widget_div" />
            </page_element>
            <page_element preferred_location="default">
                Page #2 content...
            </page_element>

...

</application_pages>
        <widget_injection page="2" location="div:widget_div">
          <!-- v:buy root container -->
          <div id="v-root"></div>
          <!-- Initialize Widgets -->
          <v:init apikey="L3KQEBHEJM4HOKCE2XO5"></v:init>
          <!-- Site content and v:buy buttons (see below) -->
          <script type="text/javascript"
                  src="https://sandbox-static.
                  v.me//js/1/v-widgets.js"></script>
          <v:buy
              apikey = "L3AWQDLKBHYCE2XO5"
              token = "4a752d0bb67f241a2a567"
              custom_widget_skin = "FDSRE"
              amount = "99.95"
              currency = "USD"
              product-id = "Testproduct1"
              merch-trans = "MERCHORDER1234"
              collect-shipping = "true"
              process = "validate">
          </v:buy>
        </widget_injection>
      </application>
</social_checkout_widget_application_injection>
```

In one embodiment, the API-Tool may then confirm the creation of the social media application, transmit a checkout widget to the user, transmit an interface that allows the user to share details about their widget or application on their social media feed, and/or the like, e.g., a social checkout widget assembly response 277. In one embodiment, the API-Tool server will facilitate the rendering of an interface on the user's device that enables the user to seamlessly post the update to the social media feed. An example social checkout widget assembly response 277, substantially in the form of an HTTP(S) POST message including XML-formatted data, is provided below:

```
POST /social_checkout_widget_assembly_response.php HTTP/1.1
Host: www.userdevice.com
Content-Type: Application/XML
Content-Length: 667
<?XML version = "1.0" encoding = "UTF-8"?>
<social_checkout_widget_assembly_response>
    <timestamp>2020-12-12 15:26:43</timestamp>
```

```
<auth type="server_to_user_device">
  <key>
    TRDTRBKJHujJHG&^%BKJBJHVTYEXERJHG
    VXDHJVRTDERJUHYLOPOOIUCFGWFDGFTRTD
    )TRDREWQTFRGCDYUG{UYTFTYDFGRERSEW%
  </key>
</auth>
<response>
  <application_successfully_created val="true" />
  <application_details>
    <application_id val="8765764" />
    <application_title val="Merchant Social App" />
    <application_access_credentials>
      <auth type="cert">
        YTFTRDREDRE
        SR$ESERSEW
        IULKYHGUKTFRD
      </auth>
    </application_access_credentials>
  </application_details>
  <share_request>
    <social_target val="facebook" />
    <share_url val="https://facebook.com/share/api" />
    <content_to_share>
      <text>
        I just added an item to my Facebook store!
        Click here to view it now
      </text>
      <image type="application_preview">
        <source val="www.API-Tool.com/img/HJFGTR" />
      </image>
    </content_to_share>
  </share_request>
</social_checkout_widget_assembly_response>
```

In one embodiment, the user may then indicate that they wish to share the provided content on their social media site feed, e.g., a social checkout widget application sharing request 278. In some embodiments, the user may share information about the social application, the widget integrated into a social application, and/or the like. In other embodiments, the widget may be shared directly on the user's social media feed, allowing viewers to see the widget's content and, in some examples, checkout using the widget controls. An example social checkout widget application sharing request 278, substantially in the form of an HTTP(S) POST message including XML-formatted data, is provided below:

```
POST /social_checkout_widget_app_sharing_request.php HTTP/1.1
Host: www.socialmediaserver.com
Content-Type: Application/XML
Content-Length: 667
<?XML version = "1.0" encoding = "UTF-8"?>
<social_checkout_widget_app_sharing_request>
  <timestamp>2020-12-12 15:26:43</timestamp>
  <auth type="user_device_to_server">
    <key>
      TRDTRBKJHujJHG&^%BKJBJHVTYEXERJHG
      VXDHJVRTDERJUHYLOPOOIUCFGWFDGFTRTD
      )TRDREWQTFRGCDYUG{UYTFTYDFGRERSEW%
    </key>
  </auth>
  <api type="share_on_my_wall_api">
  <api key="E8767643456" />
  <user_id val="7657654" />
  <post>
    <text>
      I just added an item to my Facebook store!
      Click here to view it now
    </text>
    <image type="application_preview">
      <source val="www.API-Tool.com/img/HJFGTR" />
    </image>
```
```
  </post>
</social_checkout_widget_app_sharing_request>
```

In one embodiment, the social media server 204 may confirm that the social media sharing request has been process (e.g., the content has been shared on the user's social media feed), e.g., a social checkout widget application sharing response 279 and the user device may render a confirmation noting the successful sharing event, e.g., a widget application sharing confirmation 280. In other embodiments, the API-Tool server may itself transmit the content to be posted on the user's social media feed such as by using stored or provided user social media access credentials and/or the like, e.g., 288*a*.

FIGS. 3A-3B provide exemplary logic flow diagrams illustrating merchant registration and API generation via an API-Tool interface within embodiments of the API-Tool. Within embodiments, a merchant may start 305 by accessing an API-Tool UI 307. For example, the API-Tool UI may be hosted or affiliated with a third party service provider, such as, but not limited to PlaySpan, e.g., the PlaySpan platform may provide API-Tool generation tools for merchants who wish to integrate with PlaySpan payment platform.

In one implementation, the merchant may submit a registration request 308 (e.g., see 203 in FIG. 2) to the API-Tool server 310, wherein the registration request 308 may comprise a merchant key, a merchant name, a merchant URL, a merchant contact number, and/or the like. The API-Tool server 310 may then extract merchant information from the registration request 312, and verify merchant site URL 313. In one implementation, the API-Tool server 310 may generate a merchant record for storage at a User database 319, which stores newly created API-Tool accounts.

In one implementation, the API-Tool server 310 may designate a merchant ID and an access ID for a merchant 321. Upon obtaining the designated merchant ID and access ID from the API-Tool 323, the merchant 302 completes the registration.

Continuing on with FIG. 3B, a user 301 (e.g., a web developer at the merchant, etc.) may submit an API generation request with access ID 325, e.g., a request to generate a checkout lightbox including PayPal option (e.g., see 108 in FIG. 1A). The API-Tool server 310 may verify whether the merchant entered access ID and merchant ID, and/or other access credentials are valid 327. If valid, the API-Tool server may proceed to retrieve a list of API options 329, such as but not limited to user profile API, user subscription API, virtual wallet API, checkout API, and/or the like (e.g., see 405*a-l* in FIG. 4A).

Figure 4A:
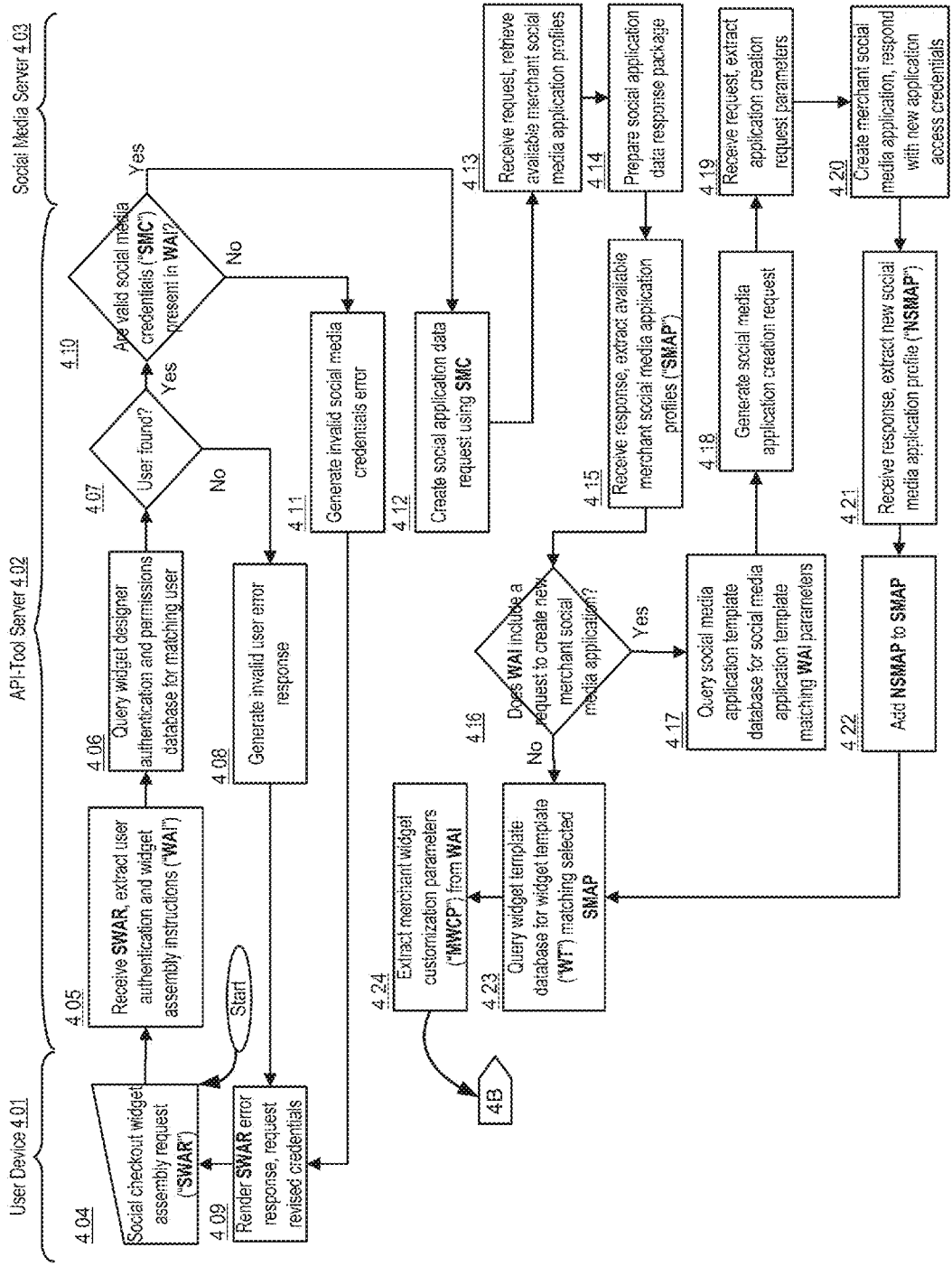

In one implementation, the user may select an API category 331, based on which the API-Tool server 310 may retrieve an API parameter input panel based on the selection 332 (e.g., see 406*a-b* in FIG. 4A, etc.). In one implementation, the user may then submit requested API parameters 333, such as but not limited to a user id, a partner name, and/or the like. In one implementation, the API-Tool server 310 may query for API template from an API database 319 based on the category 334. For example, when the user selects a "checkout and order API," the API-Tool server 310 may retrieve templates for checkout and order widgets.

In one implementation, the API-Tool server 310 may generate an XML formatted API package 336 and provide to the user, e.g., see 410 in FIG. 4A. In one implementation, a developer at the merchant site may copy and paste the XML formatted code from the API-Tool UI into the merchant site source code 338 to generate updated merchant site UI with a new widget 339a.

In alternative implementations, the API-Tool server 310 may send the generated XML formatted API package 333 to a merchant site server, which may automatically incorporate it to update the site page, e.g., see 222/223 in FIG. 2.

In an alternative implementation, the generated XML formatted API call (e.g., 336) may comprise an API call, e.g., for the merchant to request for payment, subscription, profile update, ad/or the like, 339b, so that the merchant may utilize the generated API call to request for such services without a merchant developer hand-coding an API request. For example, in one implementation, the merchant may receive the XML formatted API call and send it to a payment platform (e.g., a PlaySpan platform, etc.) to initiate a payment request, and/or the like.

Figure 3C:
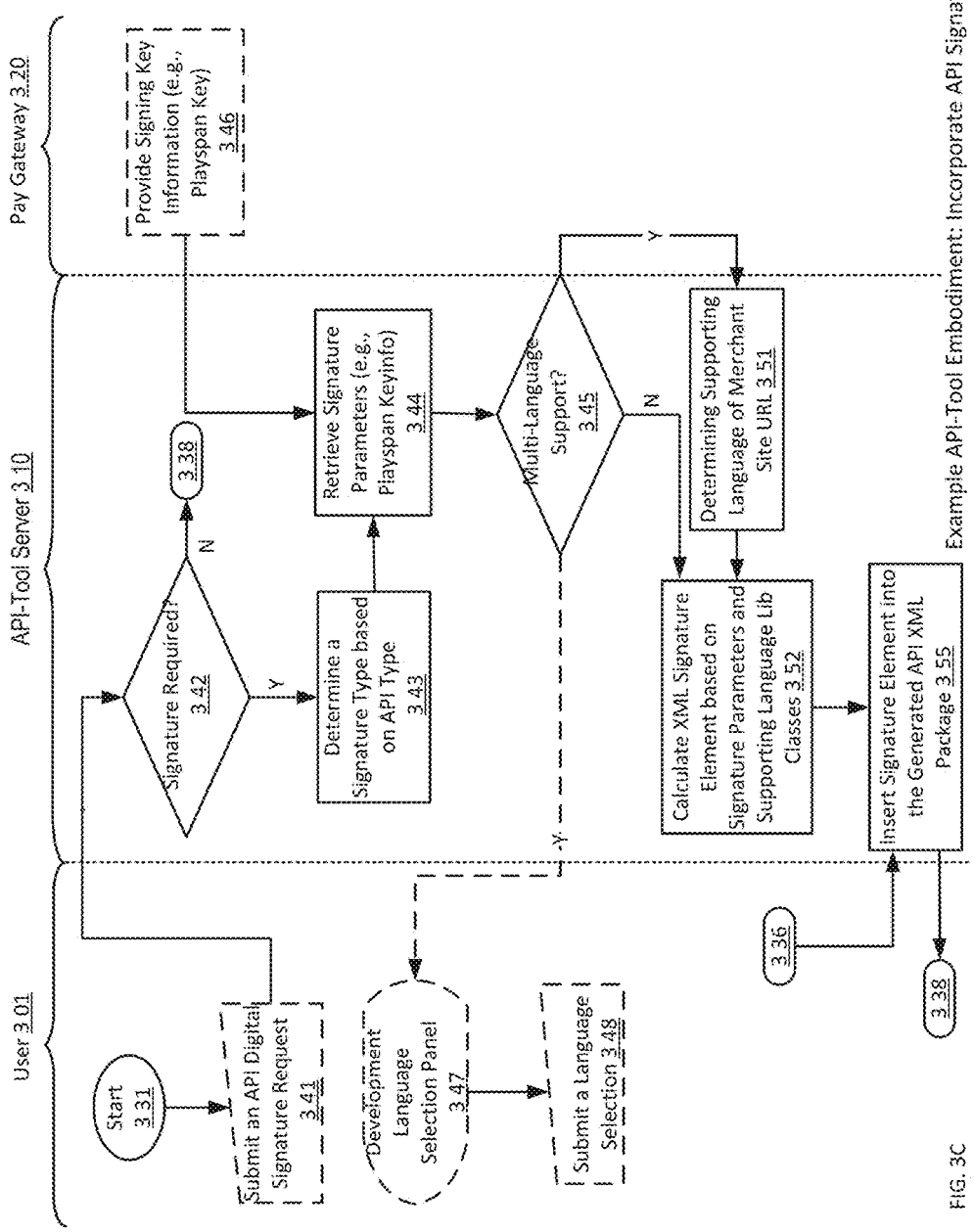
FIGS. 3C-3D provide exemplary logic flow diagrams illustrating API signature widget within embodiments of the API-Tool.
Figure 3D:
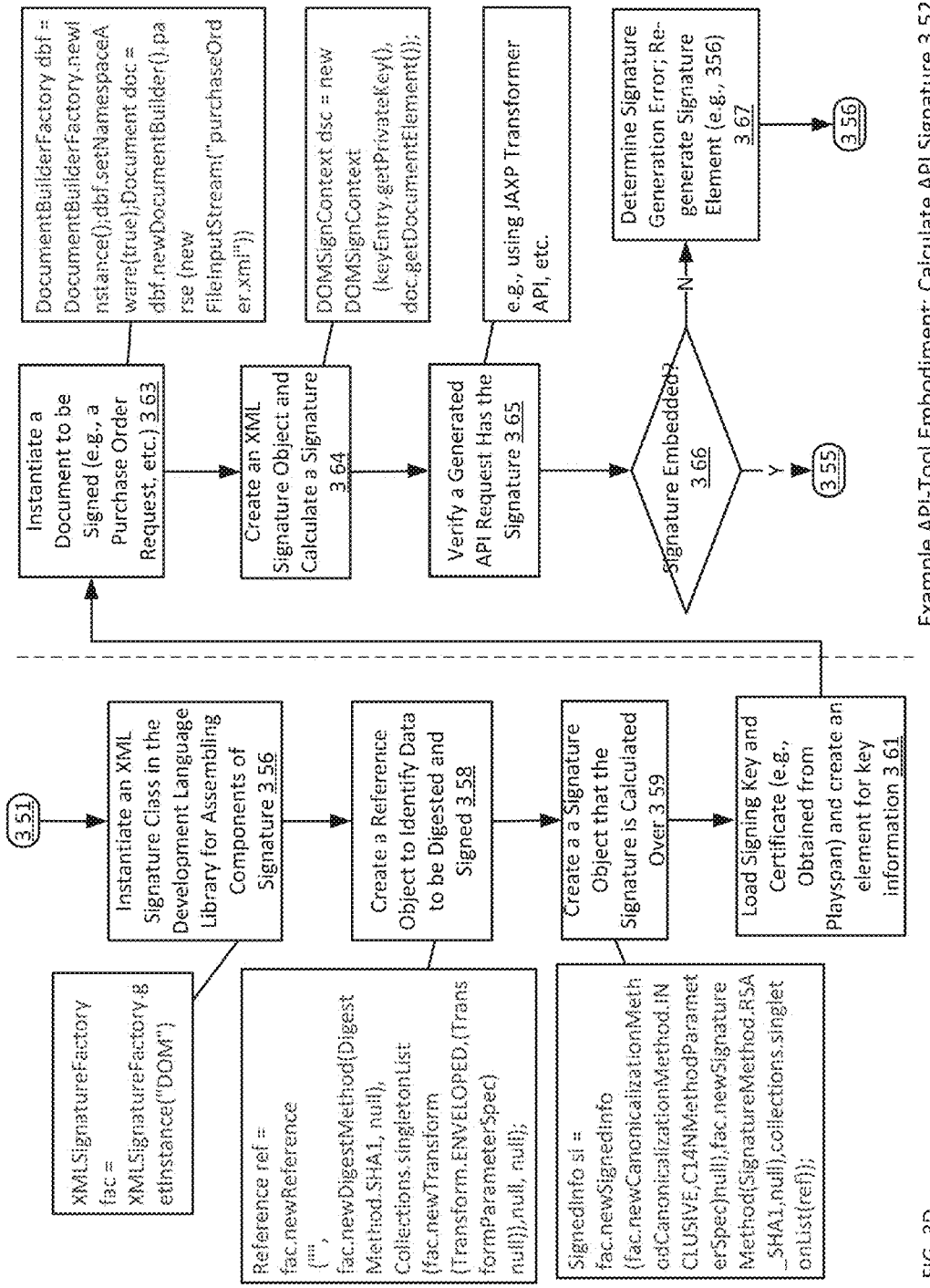

FIGS. 3C-3D provide exemplary logic flow diagrams illustrating aspects of incorporating API signatures into API widget generation within embodiments of the API-Tool. Within embodiments, upon a user 301 (e.g., developer, etc.) selecting an API category via the API-Tool UI at 331, the user 301 may optionally submit an API digital signature request 341 to the API-Tool server 310, indicating the selected API category requires a digital signature (e.g., the pop-up window 842 in FIG. 8C). Alternatively, the API-Tool server 310 may automatically determine whether a signature is required 342 based on the selected API category. For example, a checkout sandbox widget may require a signature for any API request to access the pay gate way 320. As another example, a user profile viewing box may not require a digital signature.

In one implementation, if no signature is required, the API-Tool may proceed with 338 in FIG. 3B to generate the API package. If a signature is required, the API-Tool server 310 may determine a signature type based on the API category 343. For example, based on the data content (e.g., a purchase order, a payment authorization request, a user registration request, etc.) of the selected API category, the digital signature may be a detached signature, an enveloping signature, an enveloped signature, and/or the like. Or alternatively, the signature may include hash/checksum, public/private key-based pair signature, and/or the like. In one implementation, the API-Tool server 310 may retrieve signature parameters, e.g., the key information obtained form the pay gateway 320, etc., 344, to generate a signature element into the API widget package.

In one implementation, the API-Tool server 310 may determine whether multi-language support is available 345, e.g., whether the API-Tool server 310 could generate API widget module for the merchant that is compatible with the source language of the merchant site. In one implementation, the API-Tool server 310 may provide a development language selection panel 347 (e.g., the dropdown menu 143 in FIG. 1D) to the user 301, who may in turn manually submit a preferred development language selection 348. In an alternative implementation, the API-Tool server 310 may automatically determine the source development language of the merchant site, based on the site URL 351. For example, the API-Tool server 310 may employ a HTTP header reader and/or to scan for any file extension used in the URLs to determine the possible source language used to build the site.

In one implementation, the API-Tool server 310 may calculate an XML signature element based on the signature parameters and the determined source language (e.g., the corresponding library classes for digital signatures, etc.) 352, as further discussed in FIG. 3D. The API-Tool server may then insert the signature element into the generated API XML package 355, for delivery to the merchant site server.

FIG. 3D provides an exemplary logic flow illustrating aspects of calculating an API signature element 352 within embodiments of the API-Tool. In one embodiment, upon obtaining signature parameters (e.g., a public/secret key obtained from pay gateway, etc.), the API-Tool may instantiate an XML signature class in the determined development language library for assembling components of a signature 356, e.g., Java XML Digital Signature API library, etc. For example, as shown in the following exemplary Java implementation, the API-Tool may instantiate an XMLSignatureFactory mechanism, and invoke the getInstance method of the XMLSignatureFactory class to look for a service provider that supports DOM and returns an XMLSignatureFactory implementation from the provider with the highest preference. An exemplary Java pseudo-code sample may take a form similar to the following:

```
// Create a DOM XMLSignatureFactory that will be used to
// generate the enveloped signature.
XMLSignatureFactory fac = XMLSignatureFactory.getInstance("DOM");
```

In one implementation, the API-Tool may create a reference object to identify the data that will be digested and signed 358. The reference object may be assembled by creating and passing as parameters each of its components: the URI, the DigestMethod, and a list of Transforms, and/or the like. Exemplary code sample in Java pseudo-code form for creating a reference object may take a form similar to the following:

```
// Create a Reference to the enveloped document (in this case,
// you are signing the whole document, so a URI of "" signifies
// that, and also specify the SHA1 digest algorithm and
// the ENVELOPED Transform.
Reference ref = fac.newReference
  ("", fac.newDigestMethod(DigestMethod.SHA1, null),
    Collections.singletonList
    (fac.newTransform
      (Transform.ENVELOPED, (TransformParameterSpec) null)),
      null, null);
```

In one implementation, the API-Tool may create a signature object that the signature will be calculated over 359. For example, as shown in the following Java implementation, the signature object may include a SignedInfo object assembled by creating and passing as parameters each of its components, such as the CanonicalizationMethod, theSignatureMethod, and a list of References, and/or the like. An example Java pseudo-code form for creating a signature object may take a form similar to the following:

```
// Create the SignedInfo.
SignedInfo si = fac.newSignedInfo
  (fac.newCanonicalizationMethod
    (CanonicalizationMethod.INCLUSIVE,
      (C14NMethodParameterSpec) null),
      fac.newSignatureMethod(SignatureMethod.RSA_SHA1, null),
      Collections.singletonList(ref));
```

In one implementation, the API-Tool may then load a signing key and certificate (e.g., obtained from PlaySpan, Visa V.me, etc.) and create an element for key information

361. Example Java pseudo-code for constructing a key object may take a form similar to the following:

```
// Load the KeyStore and get the signing key and certificate.
KeyStore ks = KeyStore.getInstance("JKS");
ks.load(new FileInputStream("mykeystore.jks"),
    "changeit".toCharArray( ));
KeyStore.PrivateKeyEntry keyEntry =
    (KeyStore.PrivateKeyEntry) ks.getEntry
        ("mykey", new
KeyStore.PasswordProtection("changeit".toCharArray( )));
X509Certificate cert = (X509Certificate)
keyEntry.getCertificate( );
// Create the KeyInfo containing the X509Data.
KeyInfoFactory kif = fac.getKeyInfoFactory( );
List x509Content = new ArrayList( );
x509Content.add(cert.getSubjectX500Principal( ).getName( ));
x509Content.add(cert);
X509Data xd = kif.newX509Data(x509Content);
KeyInfo ki = kif.newKeyInfo(Collections.singletonList(xd));
```

In the above example, the API-Tool may store the signing key and certificate in a "KeyStore" file. The API-Tool may retrieve the signer's X.509 certificate from the keystore, and then create a "KeyInfo" object, by invoking the "KeyInfoFactory" class, which is a factory for assembling 'KeyInfo' objects. In one implementation, the "KeyInfo" object may include an X509Data object containing the certificate and the subject distinguished name.

In one implementation, the signature element inserted in the API widget package may automatically facilitate the merchant to digitally sign an API request. Such digital signing may occur when the merchant generates an API request via the API widget, e.g., when a merchant generates a payment authorization request via a PlaySpan checkout box, etc. For example, in one implementation, the API-Tool widget signing element may instantiate a document to be signed (e.g., a populated payment request, etc.) 363, and create an XML signature object to calculate a signature based on the key value 364. An exemplary Java pseudo-code form of digital signing may take a form similar to the following:

```
// Instantiate the document to be signed.
DocumentBuilderFactory dbf =
DocumentBuilderFactory.newInstance( );
dbf.setNamespaceAware(true);
Document doc = dbf.newDocumentBuilder( ).parse
    (new FileInputStream("paymentrequest.xml"));
// Create a DOMSignContext and specify the RSA PrivateKey and
// location of the resulting XMLSignature's parent element.
DOMSignContext dsc = new DOMSignContext
    (keyEntry.getPrivateKey( ), doc.getDocumentElement( ));
// Create the XMLSignature, but don't sign it yet.
XMLSignature signature = fac.newXMLSignature(si, ki);
// Marshal, generate, and sign the enveloped signature.
signature.sign(dsc);
```

In one implementation, the API-Tool signature element may optionally verify a generated API request has a signature 365, e.g., prior to sending out an API request (e.g., payment request, etc.) to the pay gateway, etc. For example, the API-Tool signature element may use JAXP transformer API to output the contents of the digitally signed XML document to a file, and verify the existence of the signature. An exemplary Java pseudo-code form of digital signing verification may take a form similar to the following:

```
// Output the resulting document.
OutputStream os = new
FileOutputStream("signedPurchaseOrder.xml");
TransformerFactory tf = TransformerFactory.newInstance( );
Transformer trans = tf.newTransformer( );
trans.transform(new DOMSource(doc), new StreamResult(os));
```

If a signature element is properly embedded at the generated widget package, the API-Tool may proceed to incorporate the signature element and deliver the API XML package at 355. Otherwise, the API-Tool may determine a signature generation error, and may re-generate the signature element 367, e.g., restart at 356.

FIG. 3E shows a logic flow illustrating an example widget designer building component, e.g., a BWD Component 300, in some embodiments of the API-Tool. In one embodiment, user device 301 may transmit a widget designer request input, e.g., 374, to an API-Tool server 310. The API-Tool server may receive the widget designer request and extract user authentication information, e.g., 375. Authentication information may be in the form of a clear text username/password, a hashed username/password, a cryptographic key, and/or the like. In one embodiment, the API-Tool server may query a widget designer authentication and permissions table for authorized widget designer users, e.g., 376. If the user is not found, e.g., 377, the API-Tool server may generate an invalid user error response and transmit the error response to the user device 301. The user device may render the error response and request revised user credentials, e.g., 379.

In one embodiment, if the user is found by the API-Tool server, the API-Tool server may determine if the user has widget generation privileges, e.g., 380. For example, users may be permitted by the API-Tool to generate widgets on behalf of any user or merchant, only a subset of users or merchants, or only on behalf of themselves. If the user does not have the appropriate widget generation privileges (or, after proceeding through any of the component logic, no longer has the required permissions), the API-Tool server may generate a widget generation authentication error, e.g., 381, which may cause the user device to prompt the user for updated credentials. In one embodiment, the API-Tool server may determine if the currently active widget generator session is associated with any third party pricing and/or item information services, e.g., 382. A single widget designer session (e.g., a user session) may be associated with one or more item pricing or information services. An item pricing or information service may be a service (e.g., a RESTful web service, a SOAP service, and/or the like) provided by a third party server that enables the API-Tool server to dynamically update its item and pricing database. In other embodiments, the updating may be in the form of a web crawling of a given web site (such as a merchant's ecommerce web site) and not require a separate item pricing or information service for updating. In still other embodiments, when the user or a merchant does not have goods or services to purchase, the API-Tool may provide a template item such that the user may populate the template item with, for example, a request for a donation or tip. In other embodiments, if the a user wishes to list items for sale but does not have a web site or online store, the API-Tool may provide a capability such that the user can upload item image(s) and input item details such as description, inventory, pricing, and/or the like into the API-Tool and the API-Tool may therefore act as a merchant server. In one embodiment, the API-Tool server may generate a merchant content update request, e.g., 383, and transmit the request to merchant server 302. The merchant server may query and parse the request, retrieve updated item information (such as descriptions, inventory stock levels, store locations stocking the item, warehouse locations that can ship the items, backorder status for an item, next expected shipment receive date, and/or the like), e.g., 384. In one embodiment, the merchant server may generate an update response package, e.g., 385, and transmit the package to the API-Tool server. The API-Tool server may extract the updated merchant content and update the a local or remote merchant content database, e.g., 386.

In one embodiment, the API-Tool server may query a widget designer template database for templates that are associated with a given merchant, e.g., 387. In other embodiments, the templates may be associated with a plurality of merchants, with a user, with an item type, and/or the like. If merchant widget designer customization parameters are available, e.g., 388, the template may be populated with a merchant logo file, merchant social application data (e.g., social media credentials, applications running on a social media platform, and/or the like), a description of an item, a description of a merchant or merchant location, dynamically provided user content, and/or the like, e.g., 389. In one embodiment, if merchant item or pricing information is available, e.g., 390, the widget template may be populated with the item pricing or item description data, e.g., 391. In some embodiments, populating the template may include inserting a live-link to the underlying data (e.g., a live API-Tool or merchant database query link) such that the user device may dynamically retrieve all or portions of the information without having to load all of the information at render time. In one embodiment, a widget designer response package may be generated with the populated widget designer, and transmitted to the user device, e.g., 392, which may render the widget designer response for use by the user, e.g., 393.

FIGS. 4A-B show a logic flow illustrating an example social widget assembly and population component, e.g., a PSW Component 400, in some embodiments of the API-Tool. In one embodiment, user device 401 may create a social checkout widget assembly request, e.g., 404, and transmit the request to API-Tool server 402. In one embodiment, the API-Tool server may receive the request and extract user authentication information and widget assembly instructions and/or widget configuration parameters, e.g., 405. In one embodiment, the API-Tool server may query a widget designer authentication and permissions database for a user matching the provided user authentication information, e.g., 406. If the user is not found, e.g., 407, an invalid user error response may be generated, e.g., 408, and forwarded to the user device. The user device may render the error response and request the user to provide updated credentials, e.g., 409. If the user is found, the social checkout widget assembly request may be examined to determine if valid social media credentials (which may be, in some embodiments, credentials to access a user's or third-party's social media feed, to access a user's or third-party's social media application, and/or the like) are present, e.g., 410. If valid credentials are not present, an invalid social media credentials error may be generated, e.g., 411, and transmitted to the user device which may then request updated social media credentials. In some embodiments, the social media credentials may be absent, or may be stored on the API-Tool server or a third-party server and be retrieved in response to receiving a social checkout widget assembly request. In one embodiment, a social application data request may be created using the social media credentials, e.g., 412. A social application data request may be a request to retrieve a list of social media applications associated with or available using a user or third party's social media credentials. In one embodiment, the social application data request is send to a social media server 403, which may receive the request and retrieve available social media application profiles, e.g., 413. For example, in one embodiment a comma delimited list of all applications include an application name, application permission, application widget integration, and/or the like may be returned. The social media server may prepare a social application data response package using the retrieved social media application profiles, e.g., 414, and transmit the response to API-Tool server 402. In one embodiment, API-Tool server 402 may receive the response and extract the available social media application profiles, e.g., 415.

In one embodiment, if the widget assembly instructions include a request to instantiate or create a new social media application, e.g., 416, the API-Tool server may query a social media application template database for a social media application template matching the required widget assembly instruction parameters (e.g., the proper application capabilities, application permissions, target user demographic profile, and/or the like), e.g., 417. An example social media application template, substantially in the form of XML-formatted data, is provided below:

```
<?XML version = "1.0" encoding = "UTF-8"?>
<social_media_application_template>
   <operation type="create_new_application">
      <required_parameters>
         <param name="application_name" />
         <param name="user_to_create_for" />
         <param name="user_credentials" />
      <required_parameters>
      <optional_parameters>
         <param name="application_view_page"
               types_accepted="PHP,HTML+JavaScript,C++" />
         <param name="application_config_options">
            <config val="user_age_range" type="integer" />
            <config val="ecommerce_enabled_store" type="boolean" />
            <config val="third_party_render_server" type="url" />
         </param>
      </optional_parameters>
      <execute>
         <command seq="1" endpoint="https://merchant.com/info"
               to_post="notice_of_new_social_app_being_created" />
         <command seq="2" endpoint="https://socialmedia.com/newapp"
               include="all_parameters" />
         <expect_return from_seq="2" value="string:'app_created'" />
         <expect_return_param from_seq="2"
               name="new_app_id" type="integer" />
      </execute>
   </operation>
   <operation>
      ...
   </operation>
</social_media_application_template>
```

In one embodiment, the API-Tool server may generate a social media application creation request, e.g., 418, using the social media application template and the widget assembly instructions, and transmit the request to social media server 403. The social media server may receive the request and extract the application creation request parameters, e.g., 419, and create a social media application based on the request parameters, e.g., 420. In one embodiment, the social media server may respond with access credentials for the new social media application (e.g., an API access key, username/password, and/or the like). In one embodiment, the API-Tool server may receive the response indicating that the new social media application has been created and extract the new social media application profile including access credentials, e.g., 421. In one embodiment, the new social media application may be added to the available social media applications, e.g., 422.

In one embodiment, the API-Tool server may query a widget template database for a widget template corresponding to the social media application profile, e.g., 423. For example, depending upon the capabilities or renderable types supported by the social media application, a different widget template may be selected. In one embodiment, widget customization parameters may be extracted from the widget assembly instructions, e.g., 424. Widget customization parameters may include but are not limited to: widget behavior when invoked, widget merchant URL to link to, what checkout or application view to render upon widget invocation, and/or the like. The logic flow may continue with respect to FIG. 4B.

In one embodiment, the API-Tool server 402 may extract a first unprocessed widget customization parameter, e.g., 425 for use in customizing the widget template. The customization parameter may be applied to the widget template (e.g., insertion of content, selection of an item for display by the widget, a price of an item, a behavior of the widget, an application view to invoke when the widget is engaged, and/or the like), e.g., 426. In one embodiment, if there are more unprocessed widget customization parameters, e.g., 427, the cycle may repeat. In one embodiment, the API-Tool server may store the customized widget template in a social checkout widget database, e.g., 428, for later use by the API-Tool server or a third-party server in rendering the widget. As a non-limiting example, a customized widget template may be found with respect to FIG. 21D, e.g., sample updated code 2128. In one embodiment, the widget may additionally be injected directly into a social media application hosted by a social media server 403. In one embodiment, the API-Tool server may create a social checkout widget injection package using the customized widget template, e.g., 429, and transmit the package to a social media server 403. In one embodiment, the social media server may receive the package and extract the contents for processing, e.g., 430, and may in turn modify a social media application using the widget injection package contents, e.g., 431. Modifying a social media application may include injecting widget content into a social media application (such as at a given placeholder or DIV element), the creation or removal of a social media application page or view, the rendering of an application view either partially or fully, otherwise configuring the social media application, and/or the like.

In one embodiment, the API-Tool server may query a social media sharing database for a social media sharing template, e.g., 432. A social media sharing template may contain information (e.g., content skeletons, social media parameters to include in a sharing request, and/or the like) that may be used to create a social media sharing request (e.g., a request for a user to share content on a social media site). In one embodiment, the social media sharing template may be customized using the social media application profile (e.g., by injecting or making available a social media application launch button, and/or the like) and/or the customized widget template, e.g., 433. In one embodiment, the API-Tool server may create a social checkout widget assembly response using the customized social media sharing request, e.g., 434, and transmit the request to the user device 401.

In one embodiment, the user device may receive the social checkout response containing the sharing request, e.g., 435, and prompt the user to share the included content, e.g., 436. In one embodiment, the user may accept the request and/or provide a social checkout widget application sharing input, e.g., 437, in order to share the social media application integration information on a social media feed. In one embodiment, the user device may prepare a social checkout widget application sharing request, e.g., 438, and transmit the request to social media 403. The social media server may receive the request and extract the content for sharing, e.g., 439, and render the shared content on a user or third-party's social media feed, e.g., 440.

Figure 5:
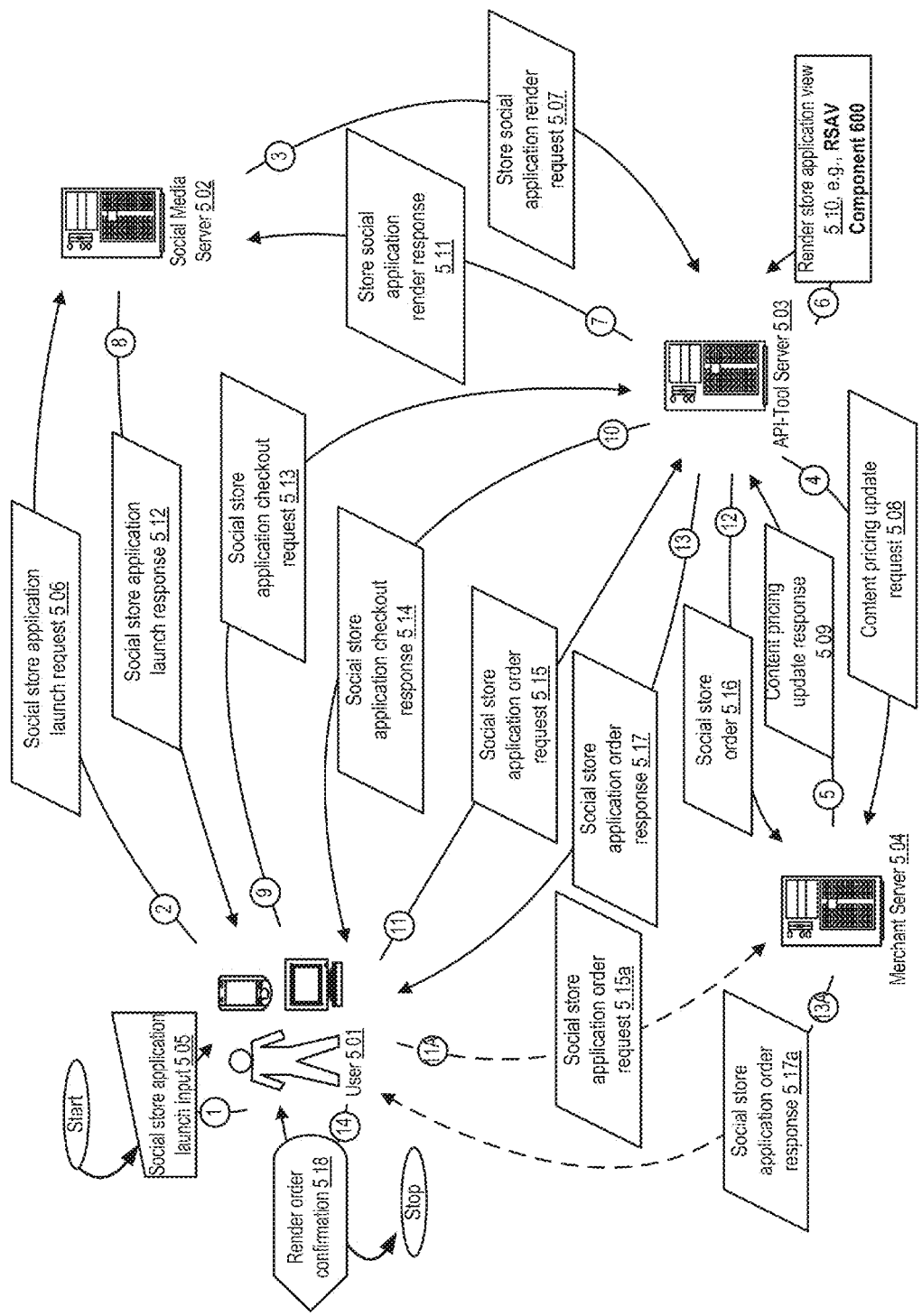
FIG. 5 shows a data flow illustrating an example social wallet widget checkout, in some embodiments of the API-Tool.

FIG. 5 shows a data flow illustrating an example social wallet widget checkout, in some embodiments of the API-Tool. In one embodiment, user 501 may launch a social media application using their client or mobile device, e.g., social store application launch input 505. The user's device may transmit a request to launch the social media application to social media server 502, e.g., a social store application launch request 506. An example social store application launch request 506, substantially in the form of an HTTP(S) POST message including XML-formatted data, is provided below:

```
POST /social_store_application_launch_request.php HTTP/1.1
Host: www.socialmediaserver.com
Content-Type: Application/XML
Content-Length: 667
<?XML version = "1.0" encoding = "UTF-8"?>
<social_store_application_launch_request>
   <auth>
      <user_id>7654353</user_id>
      <password>secretpass</password>
      <device_id type="iPhone">EIN8876565</device_id>
      <key>
         TRDTRBKJHujJHG&^%BKJBJHVTYEXERJHG
         VXDHJVRTDERJUHYLOPOOIUCFGWFDGFTRTD
         )TRDREWQTFRGCDYUG{UYTFTYDFGRERSEW%
      </key>
   </auth>
   <application_to_launch val="merchant_social_app" />
   <application_page_to_view val="new_item_display" />
   <application_page_parameters val="item:E18786" />
</social_store_application_launch_request>
```

In one embodiment, social media server 502 may retrieve a social application record from a social application database stored in communication with the server. The application record may specify an endpoint server that may be used to render the application page(s). For example, the social media server may contact the API-Tool server 503 with a request to render an application page. In other embodiments, the social media server may utilize merchant server 504, a third-party server, and/or the like to render the application view. In still other embodiments, the social media server may itself store the information required to render a social application view on behalf of a third party independently. For example, the third-party may have previously uploaded content to the social media server, the social media server may be in communication with a merchant server 504, the social media server may screenscrape or otherwise parse a merchant's web page (such as, for example, using an integrated parsing function as described herein with respect to FIG. 23. In one embodiment, the social media server may contact the API-Tool server 503 and request that the API-Tool render a social media application containing an integrated ecommerce capability, e.g., a store social application render request 507. An example store social application render request 507, substantially in the form of an HTTP(S) POST message including XML-formatted data, is provided below:

```
POST /store_social_application_render_request.php HTTP/1.1
Host: www.API-Toolserver.com
Content-Type: Application/XML
Content-Length: 667
<?XML version = "1.0" encoding = "UTF-8"?>
<store_social_application_render_request>
    <auth type="requesting_user">
        <key>
            YTGFTYFRYTFYTGFVHUJYTYEXERJHG
            987YHTRFDCTRFGCDYWFDGFTRTD
            YY&>FDTGRFDXTRFRERSEW%
        </key>
    </auth>
    <auth type="social_media_server">
        <key>
            TRDTRBKJHujJHG&^%BKJBJHVTYEXERJHG
            VXDHJVRTDERJUHYLOPOOIUCFGWFDGFTRTD
            )TRDREWQTFRGCDYUG{UYTFTYDFGRERSEW%
        </key>
    </auth>
    <application_to_launch val="merchant_social_app" />
    <application_page_to_view val="new_item_display" />
    <application_page_parameters val="item:E18786" />
</store_social_application_render_request>
```

In one embodiment, the API-Tool server may determine that in order to render the store social application, updated information (e.g., item pricing, inventory levels, descriptions, store locations, and/or the like) is required from merchant server 504. In one embodiment, API-Tool server 503 may initiate a content pricing update request 508 in order to obtain updated item information. The merchant server may retrieve the requested information, such as by querying an item inventory/pricing database, and forward the updated item information as a content pricing update response 509. An example content pricing update request 508 may be substantially in the form of that described with respect to FIG. 2, e.g., a widget merchant content update request 207. An example content pricing update response 509 may be substantially in the form of that described with respect to FIG. 2, e.g., a widget merchant content update response 208.

In one embodiment, the API-Tool server 503 may then render a store application view. For example, the API-Tool server may retrieve a view page template and execute logic to apply the received merchant content to the template. The API-Tool may then generate widget launch code and insert the generated widget launch code into the rendered store application view. In other embodiments, the API-Tool server may query a third-party source (e.g., a stock market index service, a weather service, and/or the like) in order to render the page view. Further detail regarding rendering a store application view may be found herein and particularly with reference to FIG. 6, e.g., an example RSAV Component.

In one embodiment, the API-Tool server 503 may respond with a rendered application view embedded with a widget checkout capability, e.g., a store social application render response 511. In other embodiments, the API-Tool server may only return the widget and the social media server may insert the widget into a larger view rendering. An example store social application render response 511, substantially in the form of an HTTP(S) POST message including XML-formatted data, is provided below:

```
POST /store_social_application_render_response.php HTTP/1.1
Host: www.socialmediaserver.com
Content-Type: Application/XML
Content-Length: 667
<?XML version = "1.0" encoding = "UTF-8"?>
<store_social_application_render_response>
    <auth type="API-Tool_server">
        <key>
            TRDTRBKJHujJHG&^%BKJBJHVTYEXERJHG
            VXDHJVRTDERJUHYLOPOOIUCFGWFDGFTRTD
            )TRDREWQTFRGCDYUG{UYTFTYDFGRERSEW%
        </key>
    </auth>
    <rendered_application_view id="6565">

<page_parameters val="item:E18786" />

<title val="Item Display Page" />
            <content style_sheet="merchant_custom_styles.css">
                <div id="description">
                    This is the item description. You can buy the
                    product now from directly in the social
                    application. Just click the widget button to
                    launch the checkout widget!
                </div>
                <div id="widget">
                    <div id="v-root"></div>
                    <v:init apikey="L3KQEBHEJM4HOKCE2XO5"></v:init>
                    <script type="text/javascript"
                            src="https://sandbox-static.
                            v.me//js/1/v-widgets.js"></script>
                    <v:buy
                        apikey = "L3AWQDLKBHYCE2XO5"
                        token = "4a752d0bb67f241a2a567"
                        custom_widget_skin = "FDSRE"
                        amount = "99.95"
                        currency = "USD"
                        product-id = "Testproduct1"
                        merch-trans = "MERCHORDER1234"
                        collect-shipping = "true"
                        process = "validate">
                    </v:buy>
                </div>

...

</rendered_application_view>
    <rendered_application_view>
        ...
    </rendered_application_view>
</store_social_application_render_response>
```

In one embodiment, the social media server may then manipulate the returned store social application render response, such as by wrapping the response into a larger response, by applying a template to the response, filtering out non-sharable data, inserting social data into the response (e.g., by replacing placeholders inserted by the API-Tool server, by appending social data to the response, and/or the like), and/or the like. The social media server may then transmit the social application embedded with a checkout widget functionality to the user device, e.g., a social store application launch response 512.

In one embodiment, the user may then utilize the rendered application interface to view the requested content. For example the user may be presented with an interface in which to learn about an item that the merchant sells without leaving the social media application. In one embodiment, the user may indicate that they wish to purchase an item from within the social application by clicking the rendered widget checkout button. In so doing, the user device may transmit a checkout request to the API-Tool server 503, e.g., a social store application checkout request 513. In another embodiment, the checkout request may be sent directly to a merchant server, to a social media server, and/or the like. An example social store application checkout request 513, substantially in the form of an HTTP(S) POST message including XML-formatted data, is provided below:

```
POST /social_store_application_checkout_request.php HTTP/1.1
Host: www.API-Toolserver.com
Content-Type: Application/XML
Content-Length: 667
<?XML version = "1.0" encoding = "UTF-8"?>
<social_store_application_checkout_request>
    <timestamp>2020-12-12 15:22:43</timestamp>
    <auth>
        <user_id>7654353</user_id>
        <password>secretpass</password>
        <device_id type="iPhone">EIN8876565</device_id>
        <user_info>
            <name>John Consumer</name>
            <email>john.consumer@foo.com</email>
            <phone>645-123-4567</phone>
        </user_info>
        <key>
          TRDTRBKJHujJHG&^%BKJBJHVTYEXERJHG
          VXDHJVRTDERJUHYLOPOOIUCFGWFDGFTRTD
          )TRDREWQTFRGCDYUG{UYTFTYDFGRERSEW%
        </key>
    </auth>
    <checkout_request>
        <request_type val="render_checkout_lightbox" />
        <request_source val="social_application_widget" />
        <items>
            <item id="Testproduct1"
                 price="99.95" />
            <item id="E765765"
                 Price="18.45" />
        </items>
        <device_lightbox_overlay_capabilities>
            <supports_css4 val="true" />
            <supports_html5 val="true" />
            <supports_flash val="false" />
        </device_lightbox_overlay_capabilities>
    </checkout_request>
</social_store_application_checkout_request>
```

In one embodiment, the API-Tool server may generate a checkout page, such as an HTML page rendered within an IFRAME, a user client specific checkout overlay, and/or the like, e.g., a social store application checkout response 514. The API-Tool server may thereafter transmit the generated response to the user device and the user device may render the response. In one embodiment, the consumer may then connect to their virtual wallet, input payment account information directly into the rendered checkout interface, and/or the like. In one embodiment, the user device may initiate an order by transmitting the entered user payment information as well as information regarding what the consumer is ordering (e.g., item numbers, quantities, and/or the like) to the API-Tool server, e.g., a social store application order request 515. An example social store application order request 515, substantially in the form of an HTTP(S) POST message including XML-formatted data, is provided below:

```
POST /social_store_application_order_request.php HTTP/1.1
Host: www.API-Toolserver.com
Content-Type: Application/XML
Content-Length: 667
<?XML version = "1.0" encoding = "UTF-8"?>
<social_store_application_order_request>
    <timestamp>2020-12-12 17:22:43</timestamp>
    <auth>
        <user_id>7654353</user_id>
        <password>secretpass</password>
        <device_id type="iPhone">EIN8876565</device_id>
```

-continued

```
        <user_info>
            <name>John Consumer</name>
            <email>john.consumer@foo.com</email>
            <phone>645-123-4567</phone>
        </user_info>
        <key>
          TRDTRBKJHujJHG&^%BKJBJHVTYEXERJHG
          VXDHJVRTDERJUHYLOPOOIUCFGWFDGFTRTD
          )TRDREWQTFRGCDYUG{UYTFTYDFGRERSEW%
        </key>
    </auth>
    <order>
        <shipping>
            <name>John Consumer</name>
            <addr>500 Main St.</addr>
            <citystatezip>Anytown, CA 90254</citystatezip>
        </shipping>
        <payment>
            <virtual_wallet id="E7657664" />
            <virtual_wallet_account id="act#2" />
            <backup_payment type="payment_card">
                <card_num val="1234123412341234" />
                <card_exp val="12-2028" />
            </backup_payment>
        </payment>
        <items>
            <item sku="765765" quantity="2" price="10.00">
              DVD Player
            </item>
            <item sku="111111" quantity="1" price="5.00" />
              Donate $5 to charity or friend
            </item>
        </items>
        <total order="15.00" shipping="3.00" final_total="18.00" />
    </order>
</social_store_application_order_request>
```

In one embodiment, the API-Tool server may process the order (e.g., charge the users payment account) and forward the order to the merchant, e.g., a social store order 516. An example social store, substantially in the form of an HTTP(S) POST message including XML-formatted data, is provided below:

```
POST /social_store_order.php HTTP/1.1
Host: www.merchantserver.com
Content-Type: Application/XML
Content-Length: 667
<?XML version = "1.0" encoding = "UTF-8"?>
<social_store_order>
    <timestamp>2020-12-12 17:23:43</timestamp>
    <auth type="server_to_server_preexchangedkey">
        <key>
          TRDTRDTRDHG&^%BKJBJHVTYEXERJHG
          BJHJUYTYFTYGERJUHYLOPOOIUCFGWFDGFTRTD
          IYUTFRDETFGYHCDYUG{UYTFTYDFGRERSEW%
        </key>
    </auth>
    <order type="social_media_widget_order">
        <shipping address="verified_by_social_media_site">
            <name>John Consumer</name>
            <addr>500 Main St.</addr>
            <citystatezip>Anytown, CA 90254</citystatezip>
        </shipping>
        <order_amount>
            <total_order_value val="18.00" />
            <total_items_value val="10.00" />
            <total_non_items_value val="5.00" />
            <total_shipping_value val="3.00" />
            <revenue_share type="social_media_site" val="2.00" />
            <revenue_share type="payment_network" val="1.00" />
            <status val="paid_in_full_account_charged" />
            <merchant_total_revenue_from_order val="15.00" />
        </order_amount>
        <items_to_ship>
            <item sku="765765" quantity="2" price="10.00">
```

```
        DVD Player
      </item>
      <item sku="111111" quantity="1" price="5.00" />
        Donate $5 to charity or friend
      </item>
    </items_to_ship>
  </order>
</social_store_order>
```

In one embodiment the API-Tool server may then respond to the user device with a confirmation that the order has been processed, e.g., a social store application order response 517. In other embodiments of the API-Tool, the user device may directly initiate an order with a merchant server, a social media server, and/or the like, e.g., 515a, 517a.

Figure 6:
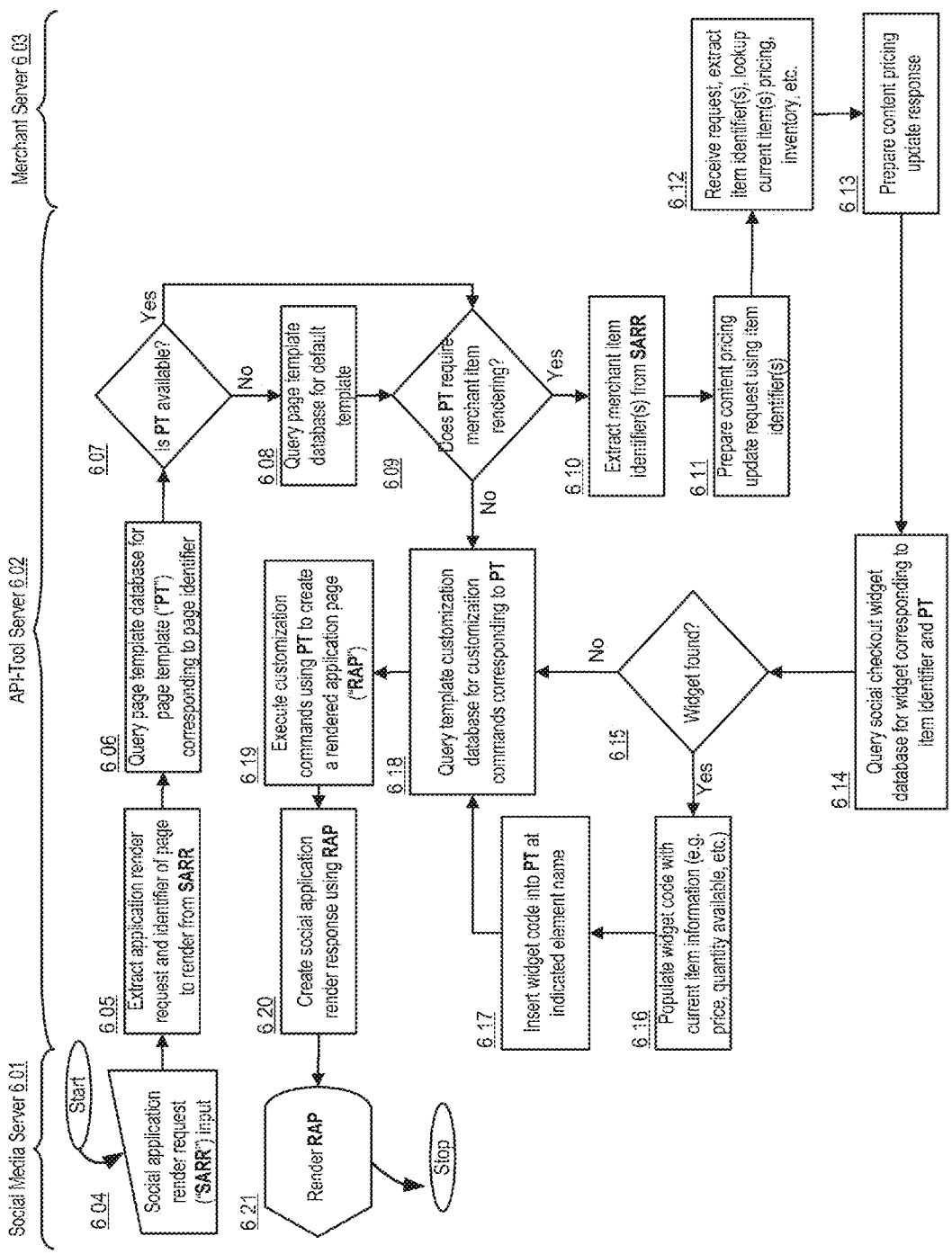
FIG. 6 shows a logic flow illustrating an example store application view rendering component, e.g., a RSAV Component 600, in some embodiments of the API-Tool.

FIG. 6 shows a logic flow illustrating an example store application view rendering component, e.g., a RSAV Component 600, in some embodiments of the API-Tool. In one embodiment, social media server 601 may transmit a social application render request to API-Tool server 602, e.g., 604. A social application render request may be a request from the social network to render a view for an application hosted by the social media server. For example, in some embodiments, the social media server may have application shells that define a subset of all of the application logic for an application available to users of the social media platform. The application shells may indicate that certain portions of an application view should be rendered by contacting a third-party server, such as API-Tool server 602, and requesting that the third-party server render portions of the application view. An application view may be substantially in the form of HTML, may be in the form of a combination of HTML and executable scripting commands (e.g., Javascript, and/or the like), may be in a format native to the social media application, and/or the like. In other embodiments, the social media server may itself contain the full application logic necessary to render a social media application view on behalf of a merchant or on behalf of a API-Tool server. Stated another way, the portion of component execution that is shown as being performed by the API-Tool server 602 or merchant server 603 may in fact be performed by the social media server 601 or a third-party server not shown, either independently or in communication with the API-Tool server and/or the merchant server.

In one embodiment, API-Tool server 602 may extract the application render request and an identifier of a page to render, e.g., 605. A page templates database may be queried for a page corresponding to the page identifier, e.g., 606. In other embodiments, the page template may be associated with the social application, the current user of the application, the social media server, and/or the like. In one embodiment, if a page template is not available, e.g., 607, a default template may be loaded from the page template database or another source, e.g., 608. In one embodiment, if the page template requires merchant item rendering, e.g., 609, one or more merchant item identifiers may be extracted from the social application render request, e.g., 610. For example, if the application page view render template has a placeholder to represent the selected item, the API-Tool may substitute the placeholder element for the item information while rendering the application view. In so doing, social media application render requests may be handled by a minimal number of templates and templates may themselves be multifunctional. In one embodiment, the API-Tool server may determine that the selected item or items for inclusion in the template require updated content such as pricing, inventory, and/or the like. In one embodiment, the API-Tool server may prepare a content pricing update request 611, and transmit the request to a merchant server 603. In one embodiment, the merchant server may receive the request, extract the item identifiers, and retrieve the current item information by querying a database in communication with the merchant server, e.g., 612. In one embodiment, the merchant server 603 may generate a content pricing update response containing the updated item information, e.g., 613, and transmit the response to the API-Tool server 602.

In one embodiment, the API-Tool server may query a social checkout widget database for any generated widgets corresponding to the item or items being included in the application view, e.g., 614. In other embodiments, the widgets may correspond to the social application, the social application request, the user currently engaged with the social application, and/or the like. If a widget for inclusion is found, e.g., 615, the widget code may be populated with information relating to the current item (e.g., price, description, quantity, and/or the like), e.g., 616 and the widget code may be inserted into the page template at a designated point, e.g., 617. In one embodiment, a template customization database may be queried for customization commands corresponding to the page template, the merchant, the user of the social media application, the social media application itself, and/or the like, e.g., 618. The commands may include but are not limited to instructions to insert a merchant's logo, insert images from a third party server, insert links to a merchant's web site, and/or the like. In one embodiment, the customization commands are executed on the page template to create a rendered application page suitable for use by the social media server or direct rendering by a user device, e.g., 619. In one embodiment, the API-Tool server may create a social application render response using or containing the rendered application page, e.g., 620, and may transmit the response to social media server 601 which may render the application page either directly or as part of a larger application view that the social media server is rendering, e.g., 621.

FIGS. 7A-P provide exemplary user interface diagrams illustrating merchant API tools within embodiments of the API-Tool. Within implementations, as shown in FIG. 7A, the API-Tool may provide a web-based user interface for a merchant to access the API-Tool API tool. For example, the merchant may enter a URL of the API-Tool platform 701, which may be associated with an API tool provider (e.g., PlaySpan, etc.). The merchant may enter a merchant key 702, a store ID 703, an access ID 704 obtained from the API-Tool provider to access API-Tool. In one implementation, the merchant may select a type of API, such as, but not limited to user profile APIs 705a, user subscription APIs 705e, subscription APIs 705f, virtual wallet APIs 705g, checkout and order APIs 705h, catalog APIs 705i, coupon APIs 705j, shopping cart APIs 705k, payment profile APIs 705l, and/or the like. In one implementation, if the merchant selects user profile APIs 705a for a widget to register the user to the merchant store, API-Tool may provide at least three sub-categories of API tools 705b-d, e.g., user (merchant) registration 705b, a GET or POST message for partner login 705c-d, and/or the like.

In one implementation, when the merchant selects to generate a user registration API 705a, the merchant may enter a user id at 706a and partner information 706b. The API-Tool may generate API request data 708 based on the merchant input. In one implementation, the merchant may select a format of the API request data, e.g., JavaScript Object Notation (JSON) 707a, XML 707b, and/or the like.

When a merchant has updated the entered request data at 706a-b, the merchant may click "refresh" 707c to update the API-Tool generated API registration request data 708.

In one implementation, the API-Tool may provide a block of XML code 710, in response to the API request 708. In one implementation, the merchant, e.g., a developer of the merchant site, etc., may copy the generated XML code 710 into their web development to incorporate a user profile API widget. In another implementation, API-Tool may automatically send the XML code 710 to the merchant web server for automatic incorporation.

Figure 7B:
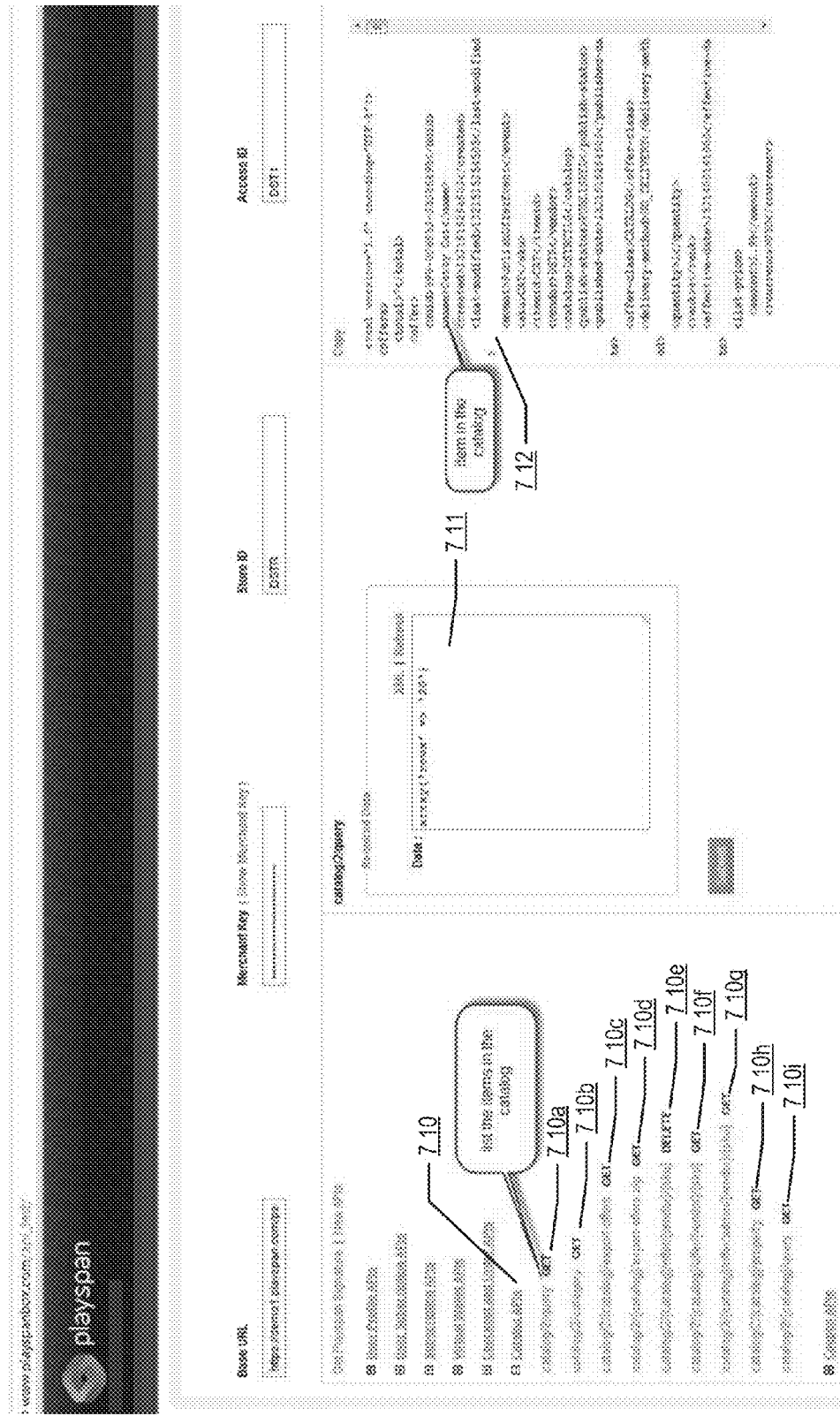
FIG. 7Q shows an example user interface illustrating overloaded social checkout widget creation and integration, in some embodiments of the API-Tool.

With reference to FIG. 7B, a merchant may select "catalog APIs" 710 to generate a widget embedded on the merchant site so that a consumer may view, query at and perform related activities with the merchant's product catalog. In one implementation, the catalog API 710 may include API tools such as, but not limited to a query tool 710a (e.g., to list the items in the merchant catalog, etc.), a category tool 710b, a tool to export offers 710c, a tool to export offers as a compressed package 710d, a tool to show/edit offers per vendor 710e-f, a tool to show offer administration 710g, a tool to show property under a category 710h, a tool to query under a product category 710i, and/or the like.

In one implementation, if the merchant selects to generate a query 710a, API-Tool may automatically generate an API request 711, which may in turn return a block of XML code for listing items in the merchant catalog 712.

Figure 7C:
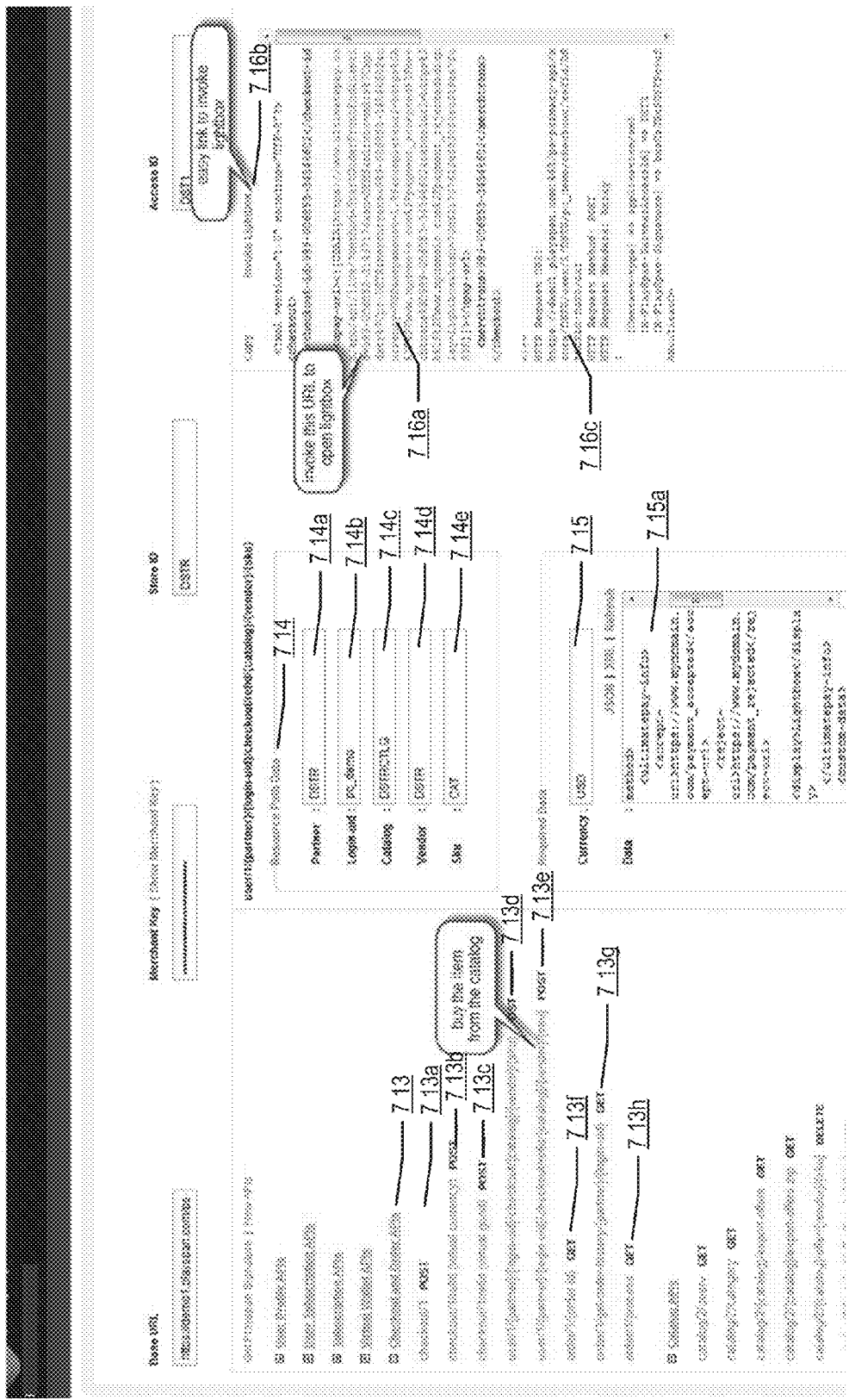

With reference to FIG. 7C, API-Tool may provide checkout and order API tools 713 to a merchant. The checkout and order APIs 713 may include, but not limited to API tools to generate a checkout widget 713a, virtual currency reference id 713b, virtual currency virtual good id 713c, partner login component 713d, partner login checkout with product information 713e, order 713f, get order history component 713g, checkout process component 713h, and/or the like.

In one implementation, when a merchant selects to generate an API for buying a item from a catalog 713e, the merchant may need to enter resource path data, e.g., partner name 714a, login user id 714b, catalog name 714c, vendor name 714d, stocking keeping unit (SKU) 714e, and/or the like. The merchant may further specify a currency type 715, and the API-Tool may in turn generate a formatted API request 715a including the merchant provided data. The API-Tool may then return a block of XML code 716a for incorporation. In one implementation, the returned block of XML code may comprise a lightbox option 716b, e.g., the generated checkout widget may allow a consumer to click on a URL via a user interface to open a lightbox for checkout.

In another implementation, the API-Tool platform may provide an XML formatter API call request, e.g., in the format of a HTTP POST message, such as a checkout request as shown at 716c, the green codes, in FIG. 7C, and/or the like.

FIG. 7D provides an exemplary checkout lightbox as generated at 716a in FIG. 7C. For example, when the generated checkout widget is incorporated into a merchant site, a consumer may see a checkout lightbox 717 when the consumer selects to checkout his/her shopping items at the merchant site.

Figure 7E:
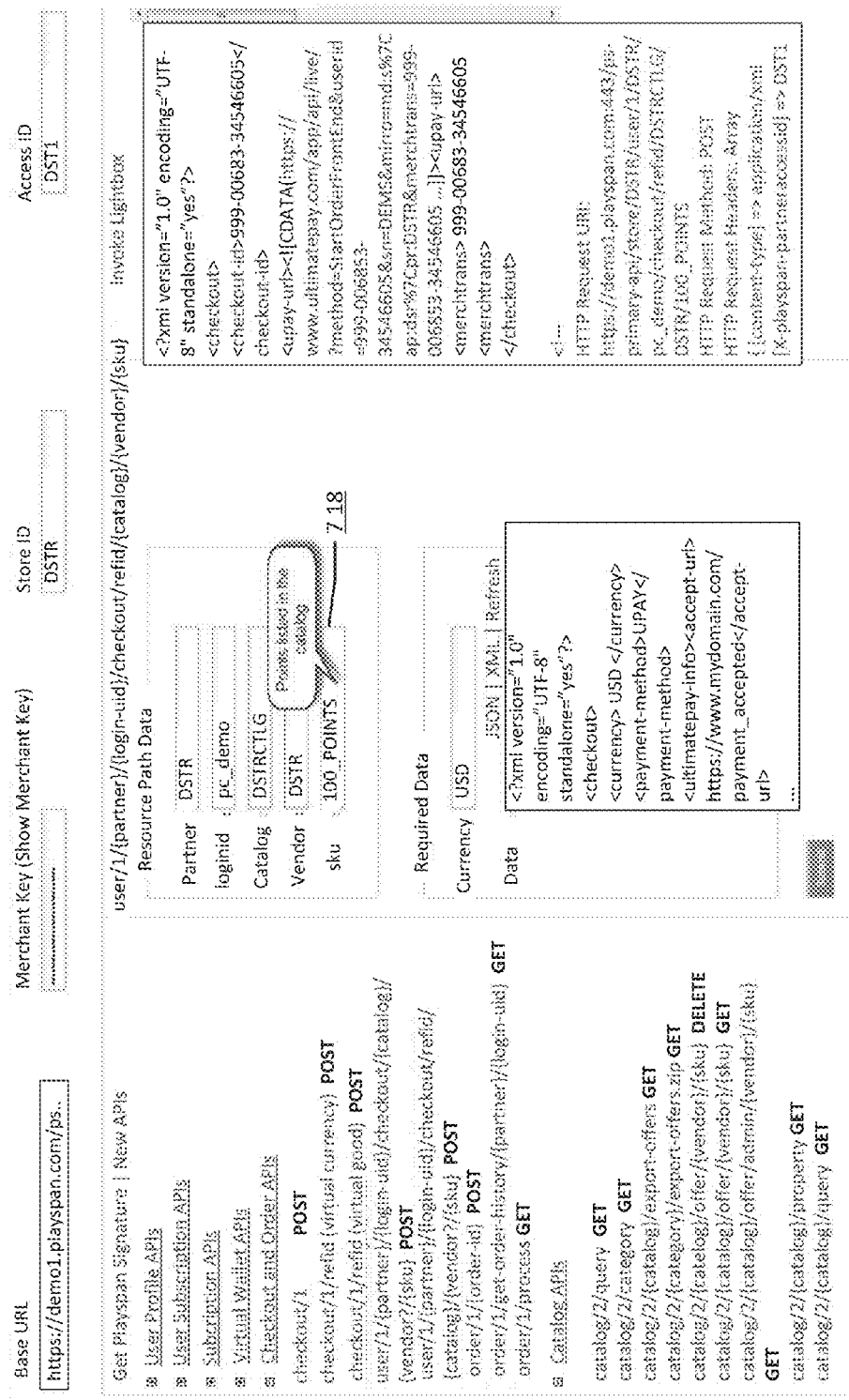
Figure 7F:
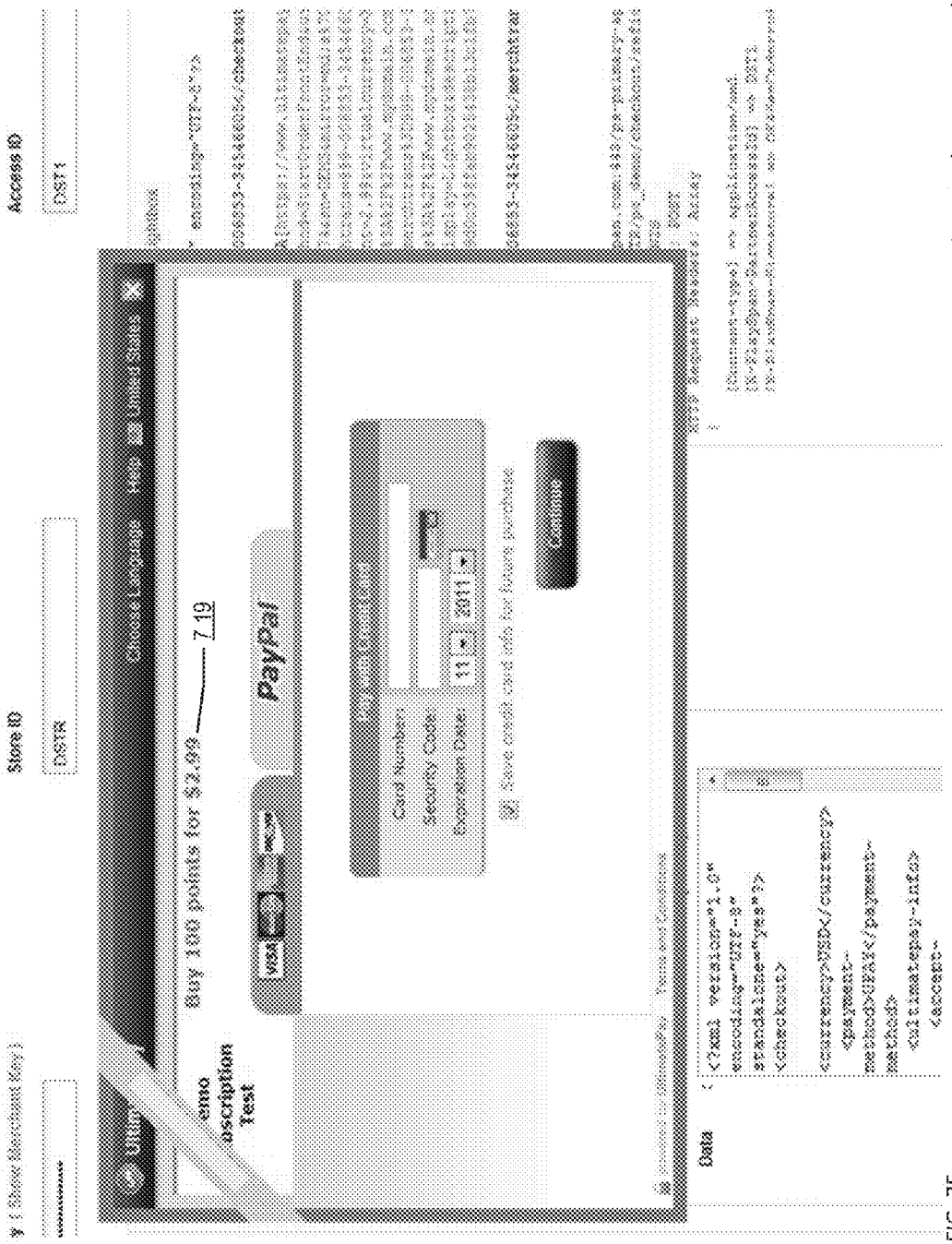

With reference to FIGS. 7E and 7F, alternative checkout widgets are shown to purchase different items, such as but not limited to virtual currency. For example, as shown in FIG. 7E, the SKU of resource path data may specify points listed in the catalog 718, e.g., 100 points, to indicate purchase 100 virtual points from the merchant. The checkout lightbox widget in FIG. 7F may in turn show "Buy 100 Points" 719 texts on the pop-up box.

Figure 7G:
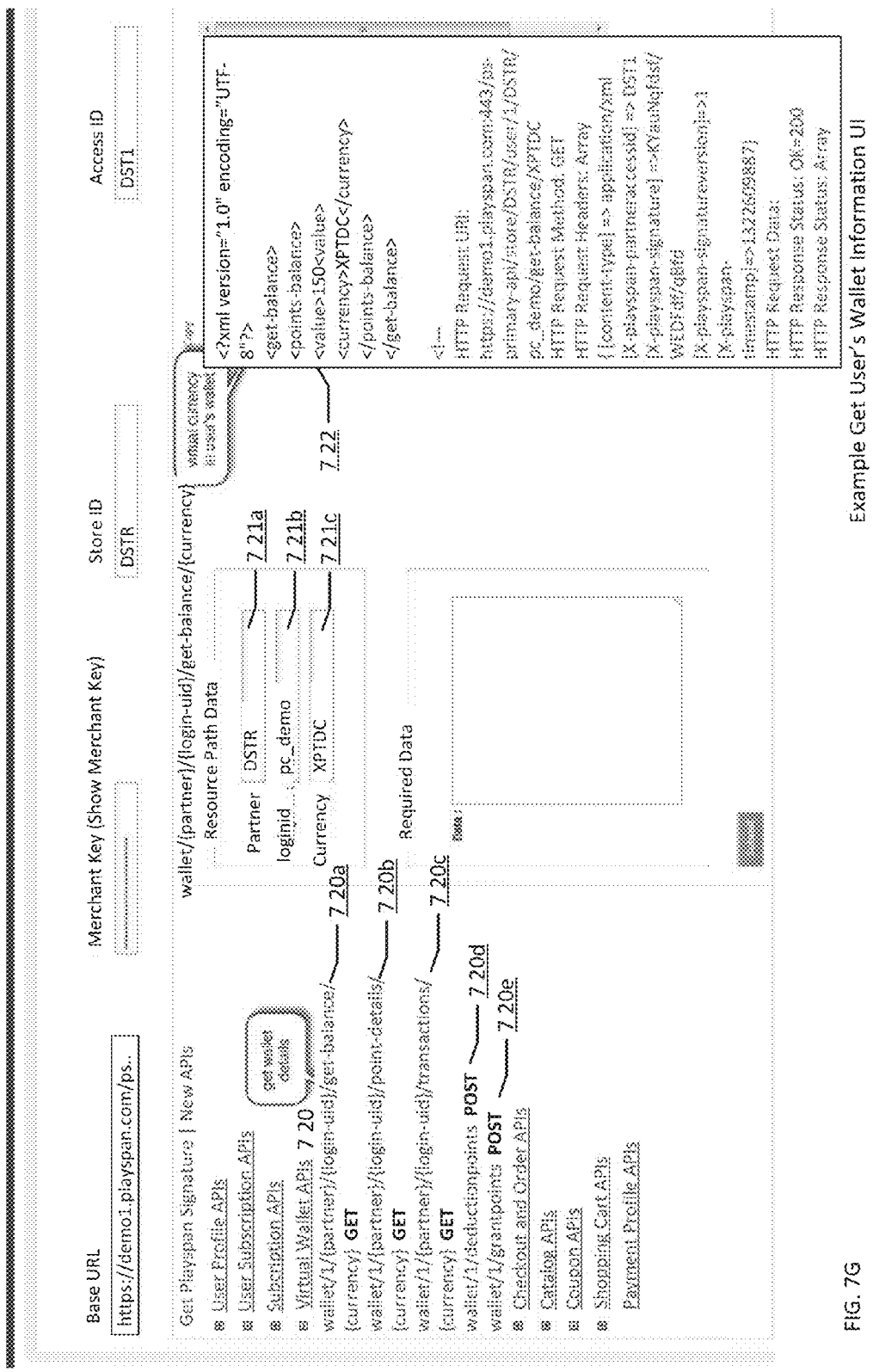

With reference to FIG. 7G, a merchant may select virtual wallet APIs from API-Tool, which may include components to get wallet balance information 720a, get currency point information 720b, get transaction currency information 720c, provide wallet deduction points 720d, grant points 720e, and/or the like. Upon selecting to obtain wallet details 720a, the merchant may need to enter partner name 721a, logic user id 721b, and currency type 721c in order for the API-Tool to generate the XML code which indicates virtual currency in the user's wallet 722.

Figure 7H:
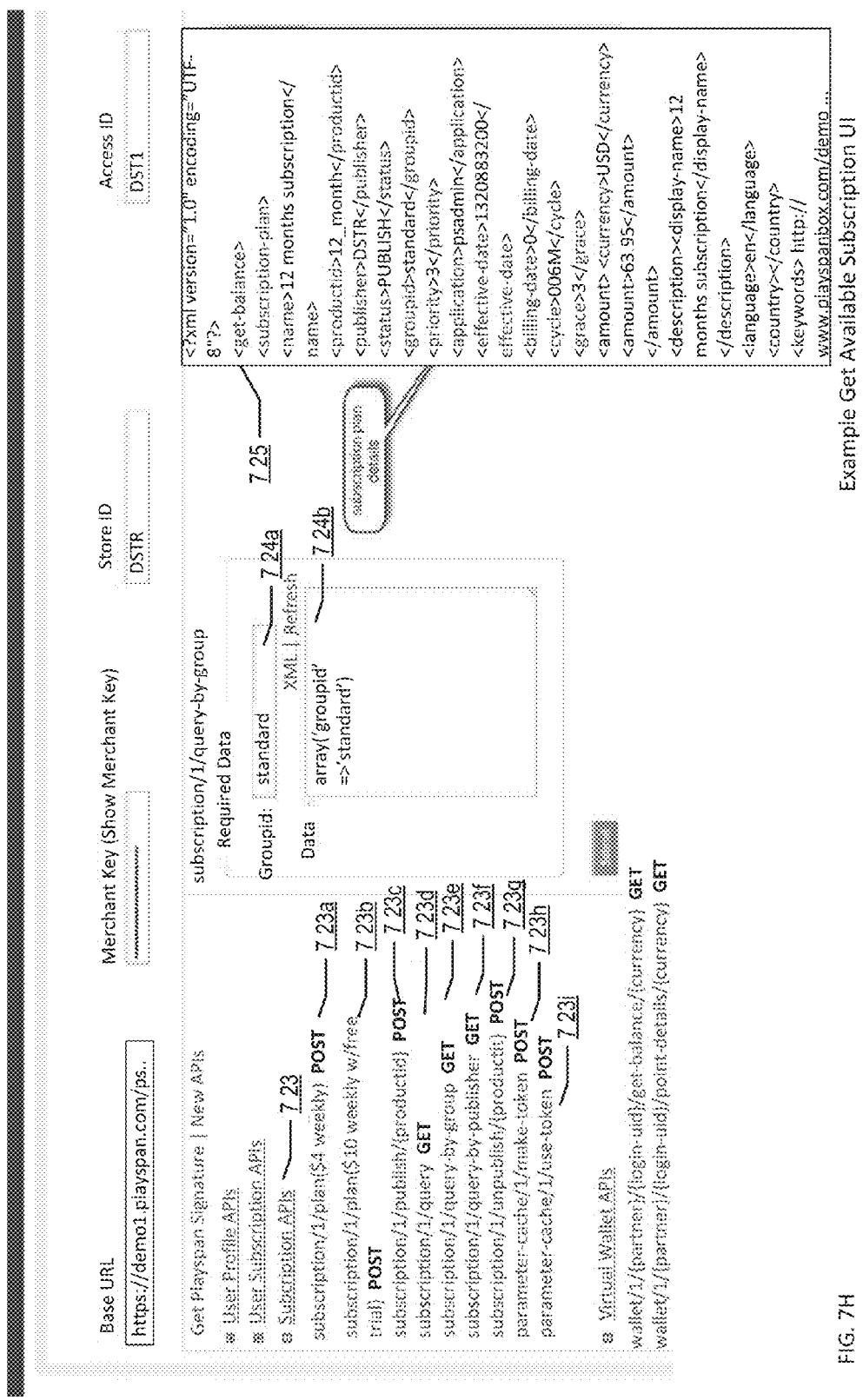

With reference to FIG. 7H, a merchant may select subscription APIs from API-Tool, which may include components to provide merchant subscription plan 723a-b, publish subscription information 723c, query for subscription 723d, query plan by group 723e, query per publisher 723f, unpublished product information 723g, token management 723h, distribute user token 723i, and/or the like. Upon selecting to query subscriptions by group 723e, the merchant may need to enter a group id 724a, in order for the API-Tool to generate required formatted request data 724b, and return the XML code which indicates subscription plan details 725.

Figure 7I:
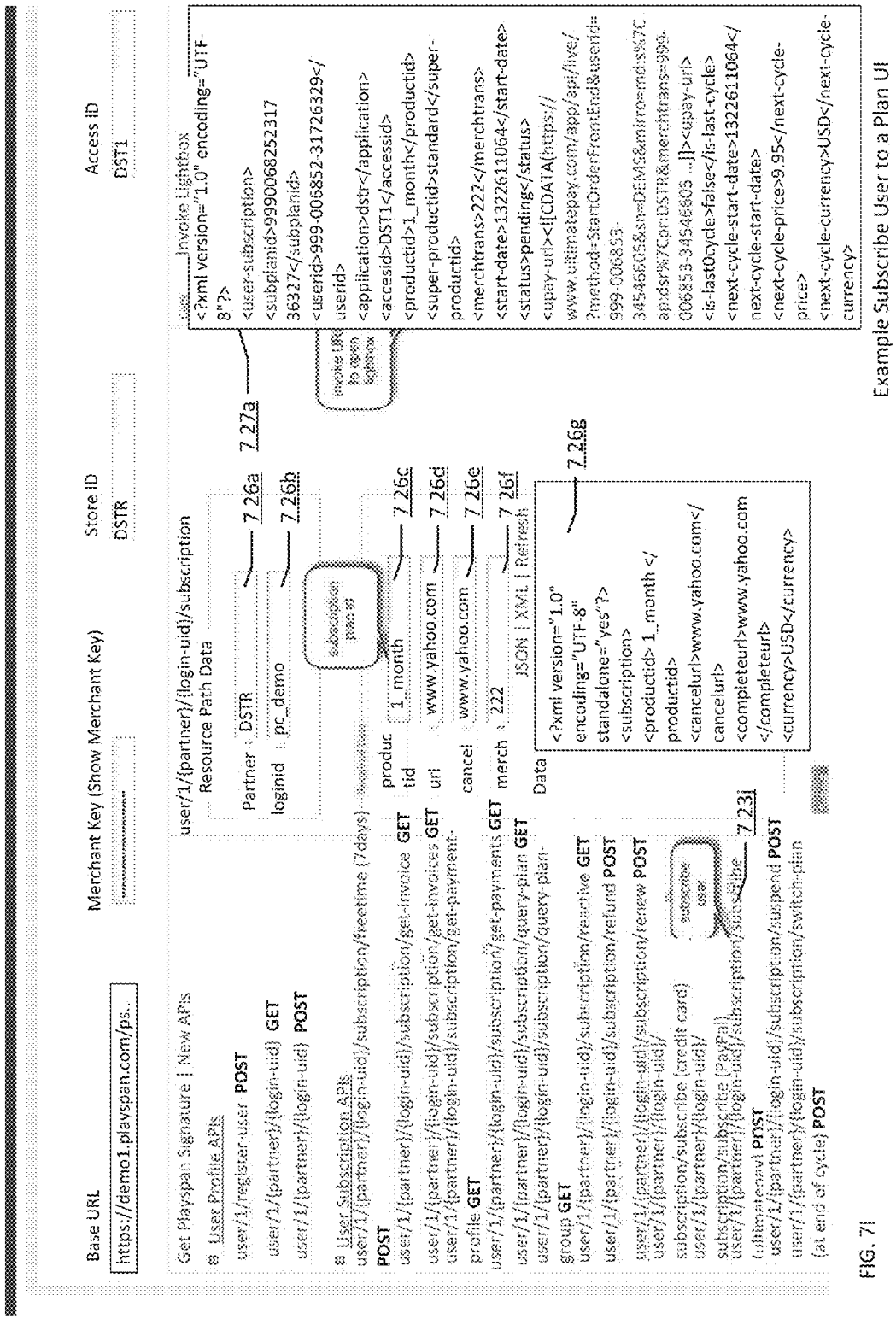
Figure 7J:
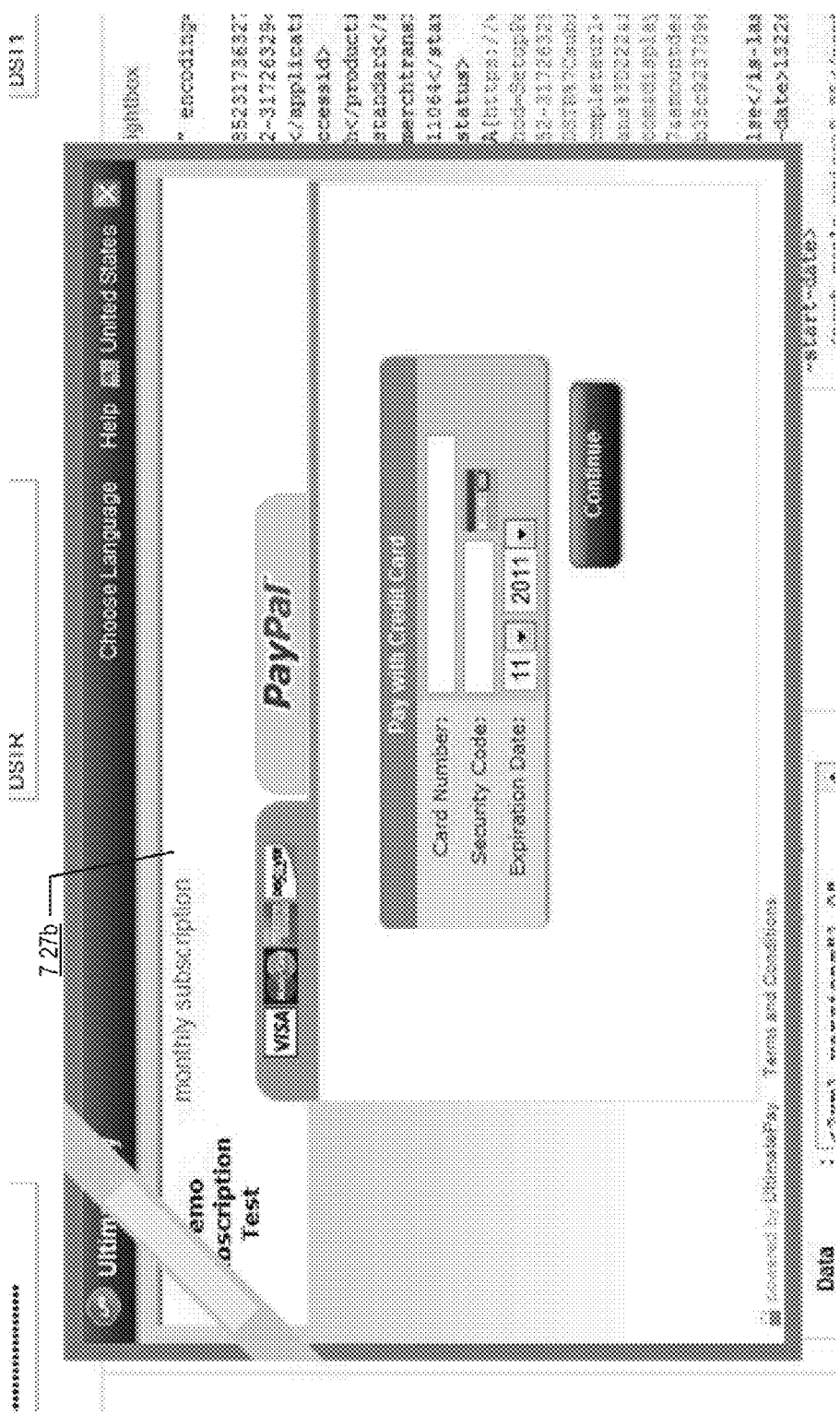

With reference to FIG. 7I, the merchant may select to API tools to subscribe a user 723j. The merchant may submit partner name 726a, login user id 726b, and specify product id 726c (e.g., a subscription plan id, such as a "one month plan", etc.), subscription URL 726d, a cancellation URL 726e, a merchant transaction id 726f, etc. for the API-Tool to generate API tool request data 726g, which may trigger the generation of the XML response 727a. In one implementation, the returned XML may include a section to invoke URL to open a lightbox, e.g., as shown in FIG. 7J, a light box 727b may be prompted for a user to register for monthly subscription to a merchant. In one implementation, the API-Tool may generate a graphic preview of the requested widget, e.g., see light box 727b for user subscription. A user/requester may modify input parameters of the widget, and obtain another preview of the widget on the fly.

Figure 7K:
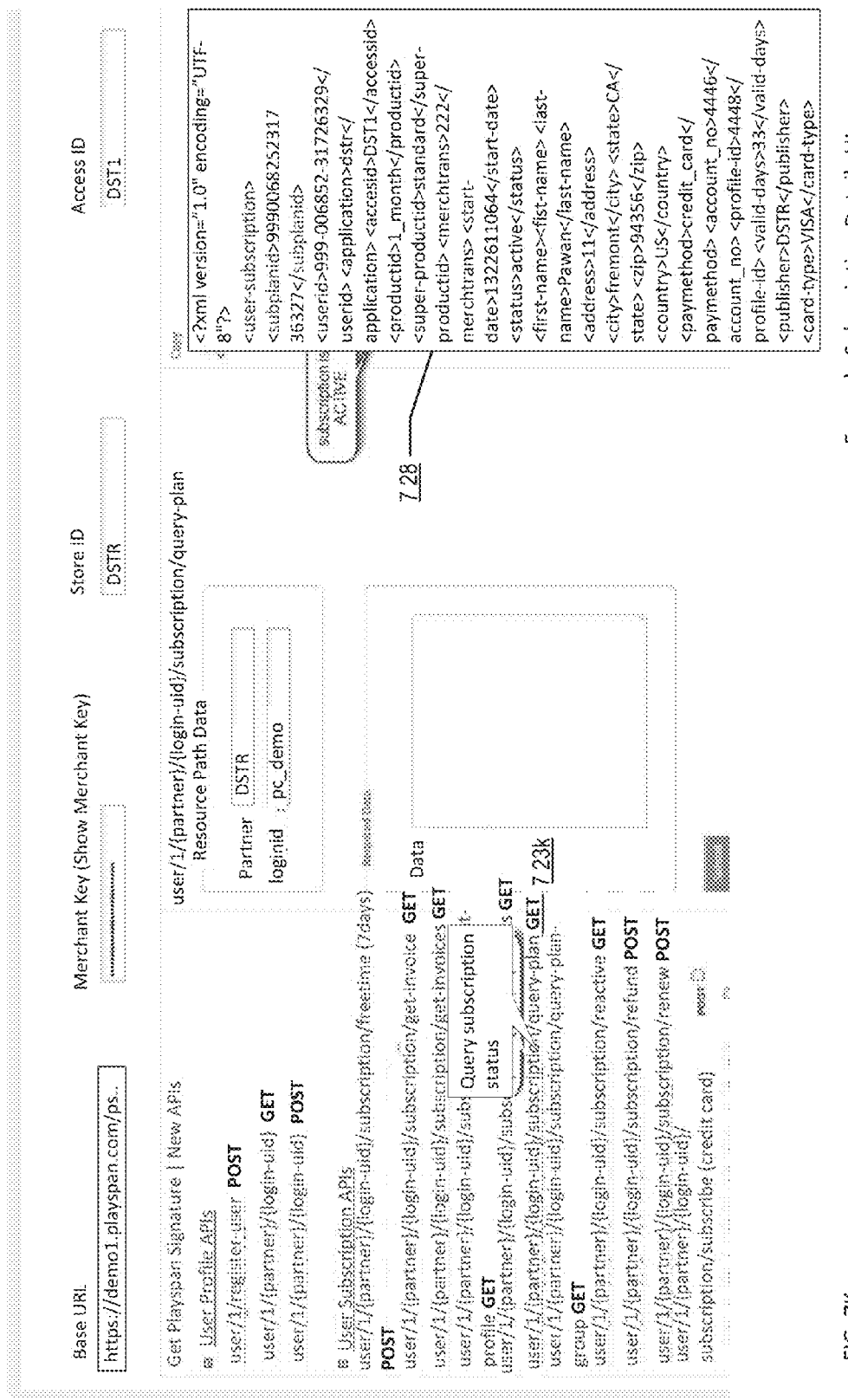
Figure 7L:
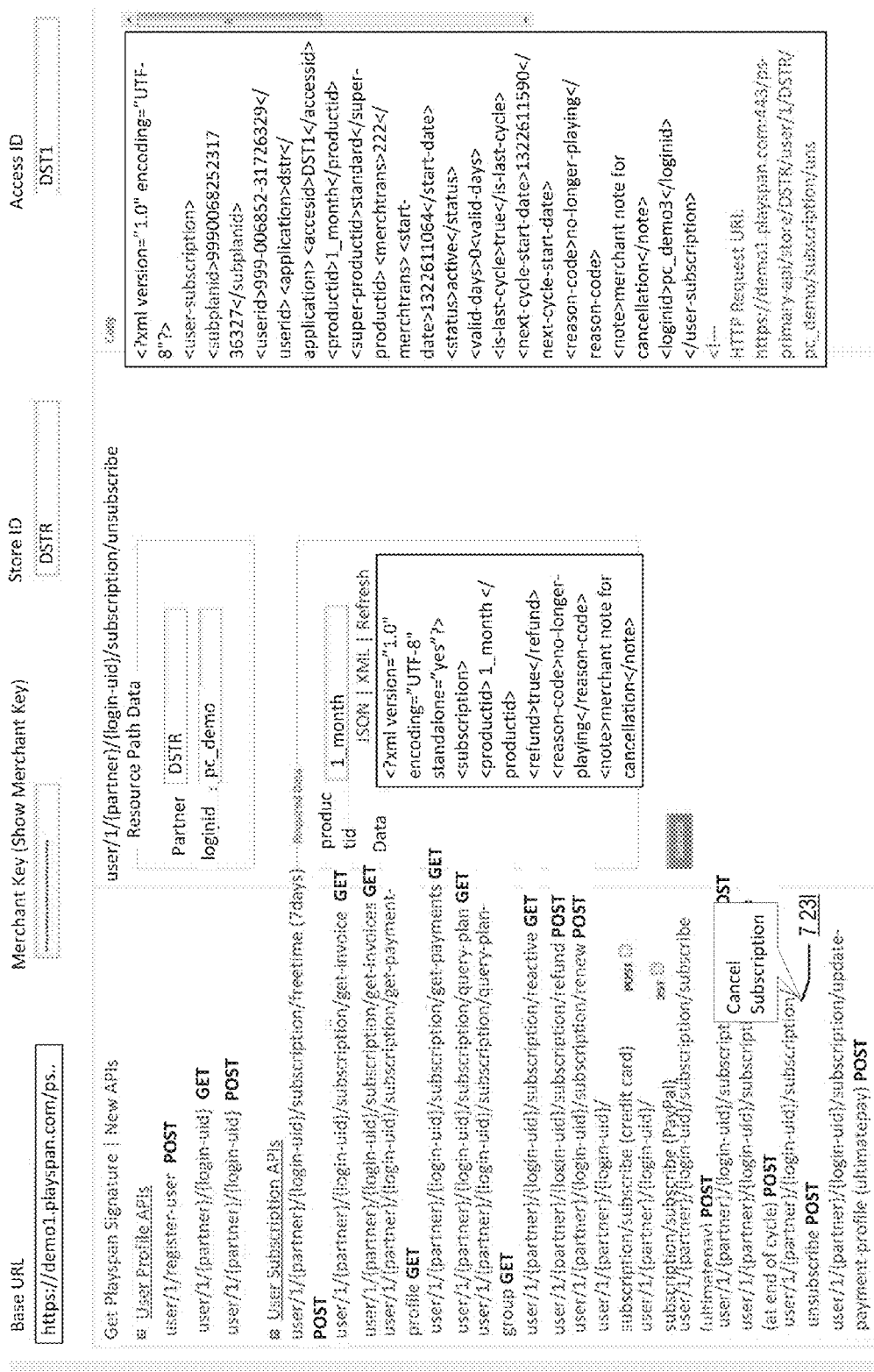

With reference to FIG. 7K, a merchant may select user subscription API tools to generate a widget for a consumer to query subscription status 723k. For example, under the API tool, the API-Tool may generate a XML formatted widget 728 that may query for the status of the consumer's subscription, e.g., whether it is active, etc. In alternative implementations, as shown in FIG. 7L, a merchant may select to generate a widget that a consumer may cancel the subscription 723l.

Figure 7M:
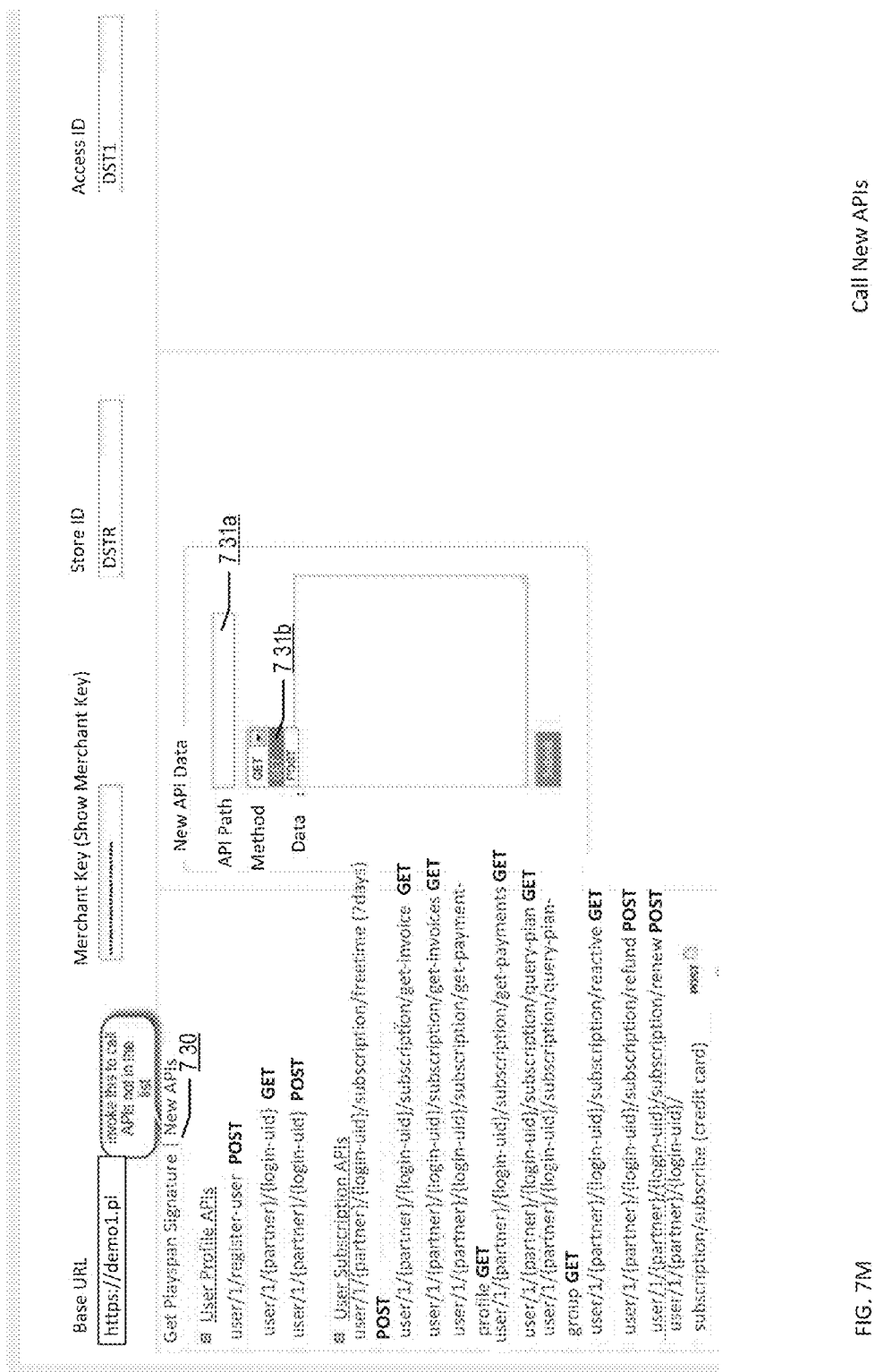

With reference to FIG. 7M, a merchant may create a new API, when the merchant's desired API tools are not listed by API-Tool (e.g., see 705a-l in FIG. 117A). In one implementation, the merchant may specify an API path 731, and select an API method 731b from a drop-down list, e.g., whether it is a GET or POST message type.

Figure 7N:
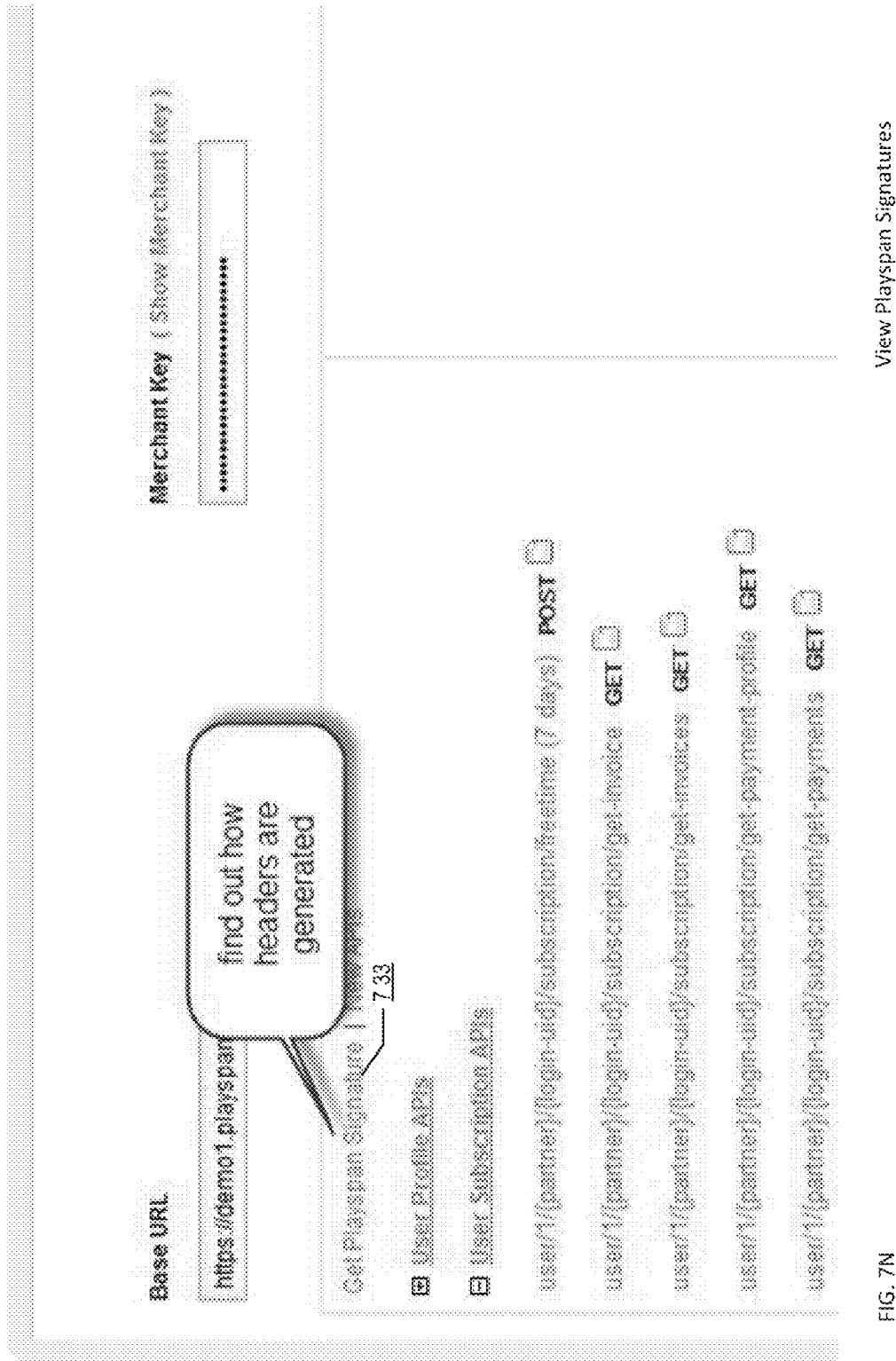

In further implementations, as shown in FIG. 7N, a user may get digital signature from a third party payment platform (e.g., PlaySpan, etc.) and place a logo of the third party payment platform as a header of the generated widget.

Figure 7O:
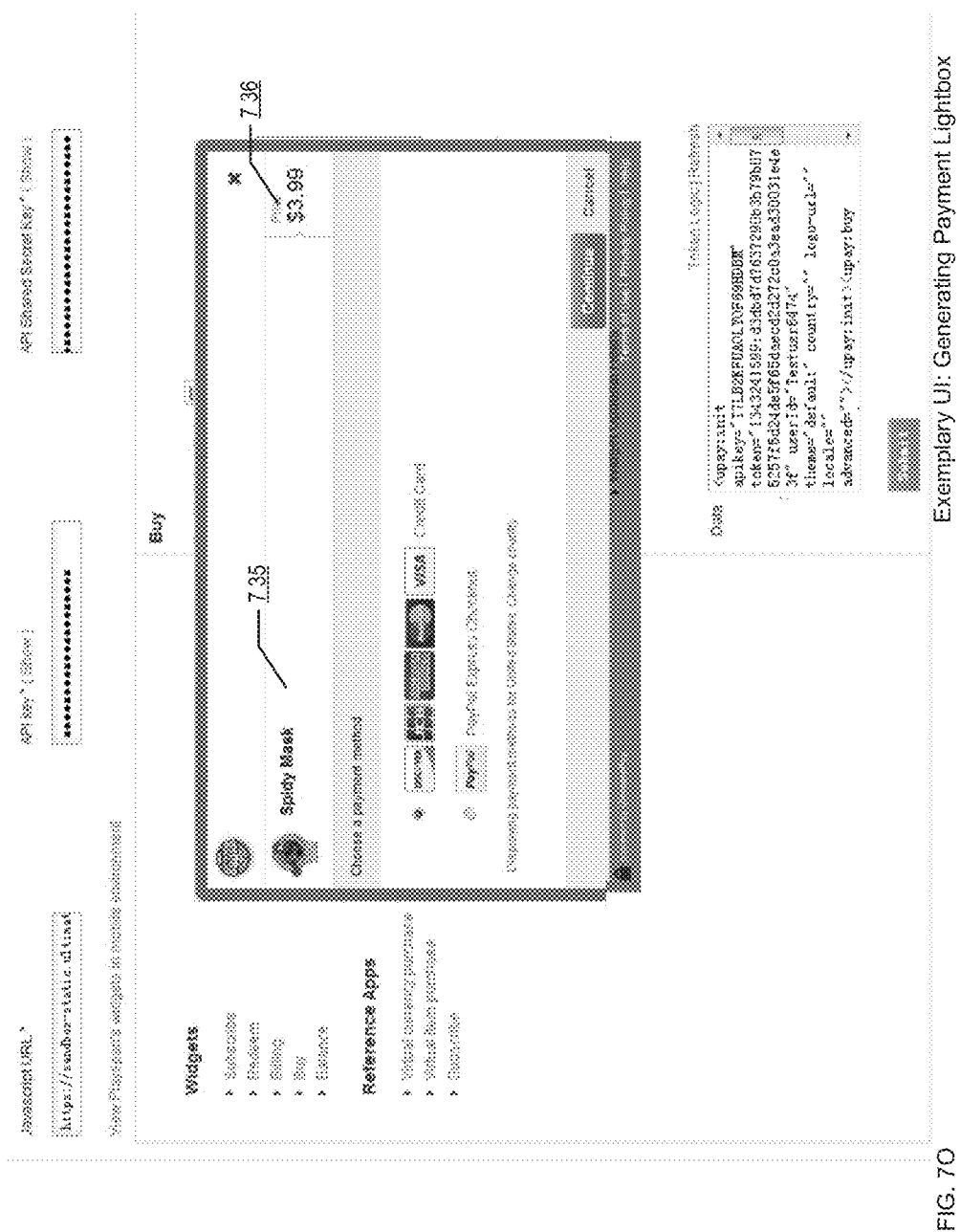

In further implementations, with reference to FIG. 7O, the API-Tool may facilitate the generation of a checkout widget that has built the price of an item into the widget. For example, a merchant (e.g., a developer, etc.) may enter an amount of the item, and the API-Tool may generate a widget that incorporate the pricing information into a checkout lightbox. In one implementation, the checkout lightbox may be placed beneath an item on the merchant's site, and while a consumer clicks the checkout lightbox to proceed to pay, pricing information of the purchased item will be automatically submitted via an API call. For example, the lightbox 735 shows an exemplary checkout lightbox generated by the API-Tool with a price amount 736.

In further implementations, with reference to FIG. 7P, a merchant may enter a product ID 738 to generate a user subscription API call 737.

FIG. 7Q shows an example user interface illustrating overloaded social checkout widget creation and integration, in some embodiments of the API-Tool. In one embodiment, a social media integration interface may be displayed, e.g., 701. A social media integration interface may allow a user to create a payment widget and inject the widget's content into a social media hosted application, a third-party hosted application, or directly into the user's social media feed (e.g., the user's "Facebook Wall", "Twitter Stream," and/or the like). In one embodiment, a user may choose a product or product to feature in the integration, e.g., 702. Multiple products may be loaded from a third party web site via a web services call (e.g., a RESTful call, a SOAP session, and/or the like). In one embodiment, the user may view various items within the interface, e.g., 703, and select one or more items for integration. In one embodiment, the user may select to add only the current item to the social media widget integration, 703a. In other embodiments, the user may select to add the current item and then select another item in addition to the first item (e.g., up to n-items), e.g., 703b. In one embodiment, the social media widget integration interface may pre-populate item information/item details, e.g., 704, in response to the user's selection of an item for integration. In some embodiments, the user may override the default text or selections by entering a specific value or values to be used in the particular integration. The user may also upload an image for a product, e.g., 704a. In some embodiments, the user may build an item entry directly without having any fields pre-filled. In still other embodiments, the item may in fact be a "non-item" such as a cash donation, a tip jar, and/or the like that may solicit money from a user instead of selling a good or service to the user, e.g., 704b. In one embodiment, the user may choose a social application integration target platform, which is the social media platform or platforms that the user wishes to integrate the widget and/or social media application views into, e.g., 705. In one embodiment, the user may choose a social media application connection method, e.g., 706. The connection method is the means by which the widget designer/API-Tool server may gain access to a user's social media applications so that content may be injected. For example, the user may provide social application connection credentials directly into the interface, e.g., 706a. In other embodiments, the user may elect to have a third-party server (such as the API-Tool server, a merchant server, the social media server itself, and/or the like) host the social media application with or without the injected content, e.g., 706b. In one embodiment, the user may indicate that they desire for the API-Tool server to create a new social media application on the user's behalf, e.g., 706c. For example, the API-Tool server may have predefined profiles for creating a social media application with various social media providers. In other embodiments, the API-Tool server may prompt the user for details regarding the requirements to create an application on the social media server (e.g., to provide a WSDL file and/or the like). In still other embodiments, the API-Tool server may autonomously or semi-autonomously scan a social media provider and deduce the requirements for creating an application (e.g., by locating a web services definition file through a web search, by querying standard locations for interface specifications on a social media provider, and/or the like). In one embodiment, the user may configure the social media application configuration, e.g., 707, by choosing a page or view within the social media application on which to integrate a widget, e.g., 707a, an element within which the API-Tool server should insert or make available the rendered widget, e.g., 707b, a preferred location for the widget to be inserted into the page in (e.g., "lower left", "below element x", "above the browser fold", and/or the like), e.g., 707c, and/or the like.

In one embodiment, the user may be presented with an interface that allows them to customize the launch button to launch the social media application and optionally navigate to the injected content page or view, e.g., 708. In one embodiment, the user may click a customize button, e.g., 708a, to be presented with an interface that allows the user to specify an item to feature on the launch button, the text to include, a merchant logo, the page within the social application to navigate to when a user clicks the social media application launch button, and/or the like. In one embodiment, the user may choose to promote the newly available integration on one or more social media feeds, e.g., 709. For example the user may desire to post the integration availability on their social media stream directly, post on the streams of their connections, email their social media connections, message their social media connections through an integrated social media messaging network, and/or the like. In one embodiment, the user may customize the content (e.g., the image, text, and/or the like) to be posted, emailed or messaged to their social network, e.g., 709a. In one embodiment, the user may have an option to specify the social media feed of a third party, such as a corporate social media feed, on which to post the promotion.

FIG. 8A shows a block diagram illustrating example digital marketing value chain in some embodiments of the API-Tool. As shown, the API-Tool digital marketing value chain may include various content providers, distributors and/or other partners, and each layer of the value chain may provide opportunities for wallet integration and/or distribution partnerships. For example, it may include a content site 800 (e.g., wired.com, facebook.com, etc.). Each site may support advertisements via ad network iframe, JAVASCRIPT and/or image ad tags 805. Within the content site and/or the ad network iframe, merchant web applications Bio may be supported. The merchant web applications may be targeted, interactive mini stores that are embedded within the site or ad network iframe. Further within the content site, ad network iframe or merchant web application, a payment widget may be embedded to facilitate wallet lightbox instant checkout 820.

Publishers of print, TV, radio, online media brands, etc., either build and manage their own websites, mobile and tablet applications or rely on third party publishing platform vendors to distribute their digital content. In either case, and particularly in mobile or tablet environments, content is usually monetized through freemium, subscription, or ad-supported models with no integration with direct merchandizing or commerce. Various embodiments of the API-Tool may assist publishing platforms in building a complete commerce solution to publishers and merchants. FIG. 8B shows a block diagram illustrating an example content monetization structure in some embodiments of the API-Tool. As shown, such a structure may connect merchants (830a, 830b), publishers (825a, 825b) and content publishing platforms 835 to checkout widget 840 and wallet commerce service layer 845, and thereby allow integration of several components needed to facilitate commerce in content publishing channels.

The API-Tool provides a safe, common, low-friction checkout experience for consumers from a trusted brand, using payment and authentication credentials they already have on file (e.g., if they are v.me wallet subscribers). It allows publishers or their platform vendor to resell wallet merchant acceptance services to merchants and track sales, allows publishing platforms to participate and/or resell wallet value-added services including offers (clipping offers or redeeming offers), integration with wallet wish list for tracking and affiliate revenue schemes for goods added to a wish list from a content site but purchased later through wallet in another channel. For example, in some implementations, the API-Tool may facilitate aggregation of merchants within a targeted marketplace 835*b* (e.g. beauty products and apparel merchants) within a content site (e.g., a fashion magazine iPad application), and provide widget checkout solution to the targeted marketplace, thereby providing a convenient commerce solution to the content publishers and/or merchants. In one implementation, content publishers may leverage the API-Tool facilities to select partnerships with sponsor brands or advertisers to sell a specific promoted good or service. In another implementation, the API-Tool may allow advertisers to monetize their marketing by enabling complete checkout within advertisements. The API-Tool checkout facilities may also be leveraged by classified-like business or person-to-person (P2P) posting for goods and services, publishers acting as merchant themselves, selling their own premium services or subscriptions to their audience at better economics than offered by an application store, selling their own merchandise (e.g., branded t-shirts mugs etc.), and/or the like.

FIGS. 8C-8F provide exemplary UI diagram illustrating aspects of API widget signature generation within embodiments of the API-Tool. With reference to FIG. 8C, the API-Tool may provide a web-based UI for a user (e.g., a developer, etc.) to obtain XML code for API widget generation. For example, as shown in FIG. 8C, the user may be interested in generating a user registration widget to connect to a third party payment service platform (e.g., PlaySpan, etc.). The user may enter the user id 841*a*, a partner id 841*b*, which the API-Tool may translate into XML or JSON formatted data input 843*a*. The API-Tool may then provide the output API XML code 843*b* for the user to incorporate into the destination webpage. In one implementation, the API-Tool may provide an option for the user to add a signature (e.g., PlaySpan signature, etc.) to the generated XML package, e.g., 842, wherein the API-Tool may automatically calculate a signature over the data input 843*a* and add the signature element into the generated XML API package 843*b*.

Figure 8D:
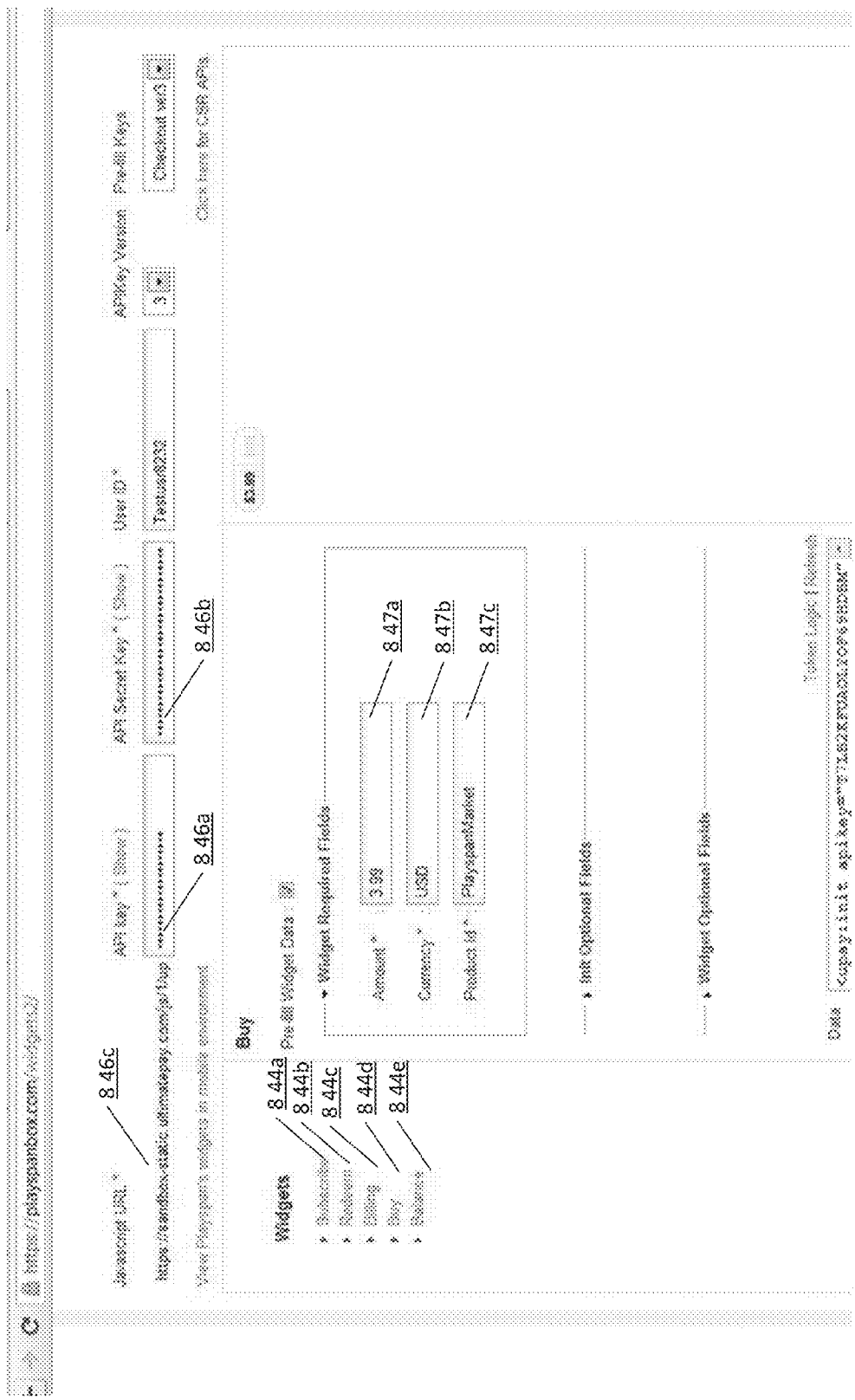

FIG. 8D shows another example of generating API widget via the API-Tool platform, e.g., a checkout widget having the purchase amount embedded in it, etc. In one implementation, the user (e.g., developer, etc.) may be directed to a Javascript URL 846*c* for the widget generation, which may be replaced by alternative links supported by different environment languages, as shown in FIG. 1D. The user may provide the API key 846*a*, and/or the API secret key 846*b* (e.g., provided by PlaySpan, Visa V.me, etc.). The user may select various categories, types of widgets, such as subscription 844*a*, offer redeem 844*b*, billing 844*c*, buy 844*d*, balance check 844*e*, and/or the like. As shown in FIG. 8D, when the user has selected the "Buy" widget, the user may need to enter basic information such as the amount of an item 847*a*, currency type 847*b*, product identification 847*c*, and/or the like. The API-Tool may then generate XML or JSON formatted input data and convert the input data to API XML packages, e.g., in a similar manner as shown at 843*a*-843*b* in FIG. 8C. For example, the "buy" widget may include data such as shown in the following exemplary XML-formatted data block:

In another implementation, the API-Tool checkout widget may generate an API buy request to connect to a pay gateway server, e.g., PlaySpan, Visa V.me, and/or the like. For example, the buy request 254 may take a form similar to the following:

```
<upay:init apikey="WZQMVOLN5B66Y4Q17VK1"
token="1375701946:0f9e94a72e064a0eed0e1cc134ff371632e998f072e6dbe
005ef8c66a3d810de" userId="Testusr8232" theme="default"
country="US" logo-url="https://d13m2pbs70v5xe.cloudfront.net/wp-
content/themes/heroup/images/global/shsMainLogo.png" pay-
profile="" applicationid="" merchantid="" locale="en_US"
advanced=""></upay:init>
<upay:buy callback="handleUPayEvents"
apikey="WZQMVOLN5B66Y4Q17VK1"
token="d7de1b2b4f2cbd2857c342db94ab70f3f8046ec39e7f79ae92e6e1b911
8bc22a" amount="3.99" product-id="PlayspanMarket" currency="USD"
merch-trans="" product-desc="Spidy Mask" product-
image="https://d13m2pbs70v5xe.cloudfront.net/wp-
content/themes/heroup/images/games/characters/scarlet_spider.png"
dom-id="" auto-payment="true" method="" custom.email="" email=""
process="" delete-pay-profile=""></upay:buy>
```

Figure 8E:
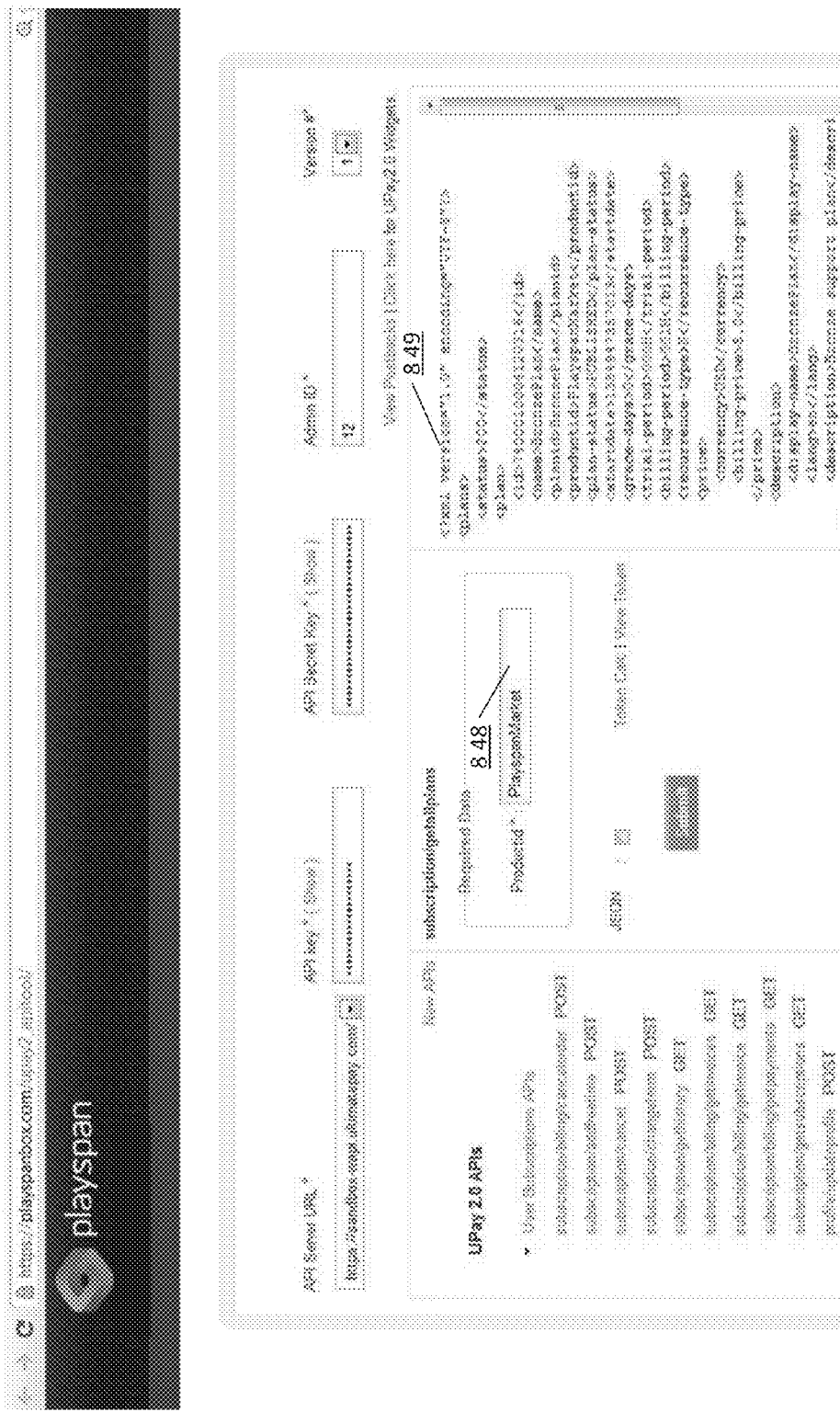

FIG. 8E provides an exemplary UI for generating an API subscription widget for a user to obtain all plans from a third party service provider (e.g., PlaySpan, Visa V.me, etc.), such as offer plans, redemption plans, payment schedule plans, and/or the like. In one implementation, the user may enter a product id at 848, e.g., indicating the subscription is for the PlaySpan product for market information, etc., and the API-Tool may generate the XML formatted API package for subscription to PlaySpan market plans 849.

Figure 8F:
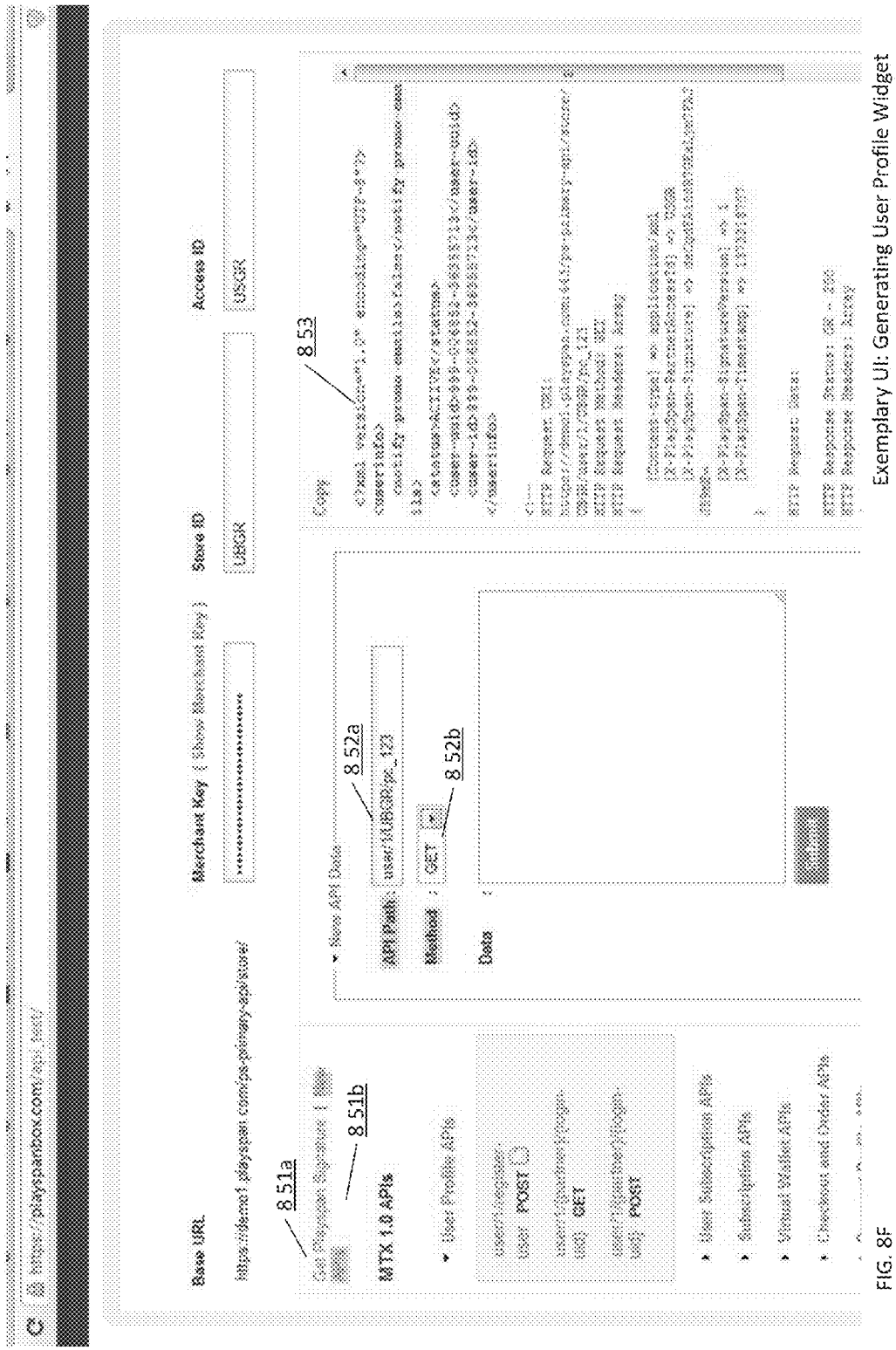

FIG. 8F provides an exemplary UI for generating an API user profile registration for a user to register a new account, login to an existing account, and/or the like with a pay gateway server, e.g., PlaySpan, Visa V.me, etc. For example, the user may select to encrypt an API request the API widget generates, e.g., by selecting "PlaySpan signature" 851*a*, and start to create a new API 851*b*. For example, the user may enter required widget information, including an API path 852*a* (e.g., via which the API-Tool may automatically retrieve an API widget template, etc.), a method (e.g., GET or POST message, etc.) 852*b*. The API-Tool may then generate XML or JSON formatted input data and convert the input data to API XML packages, e.g., see 853.

Figure 9A:
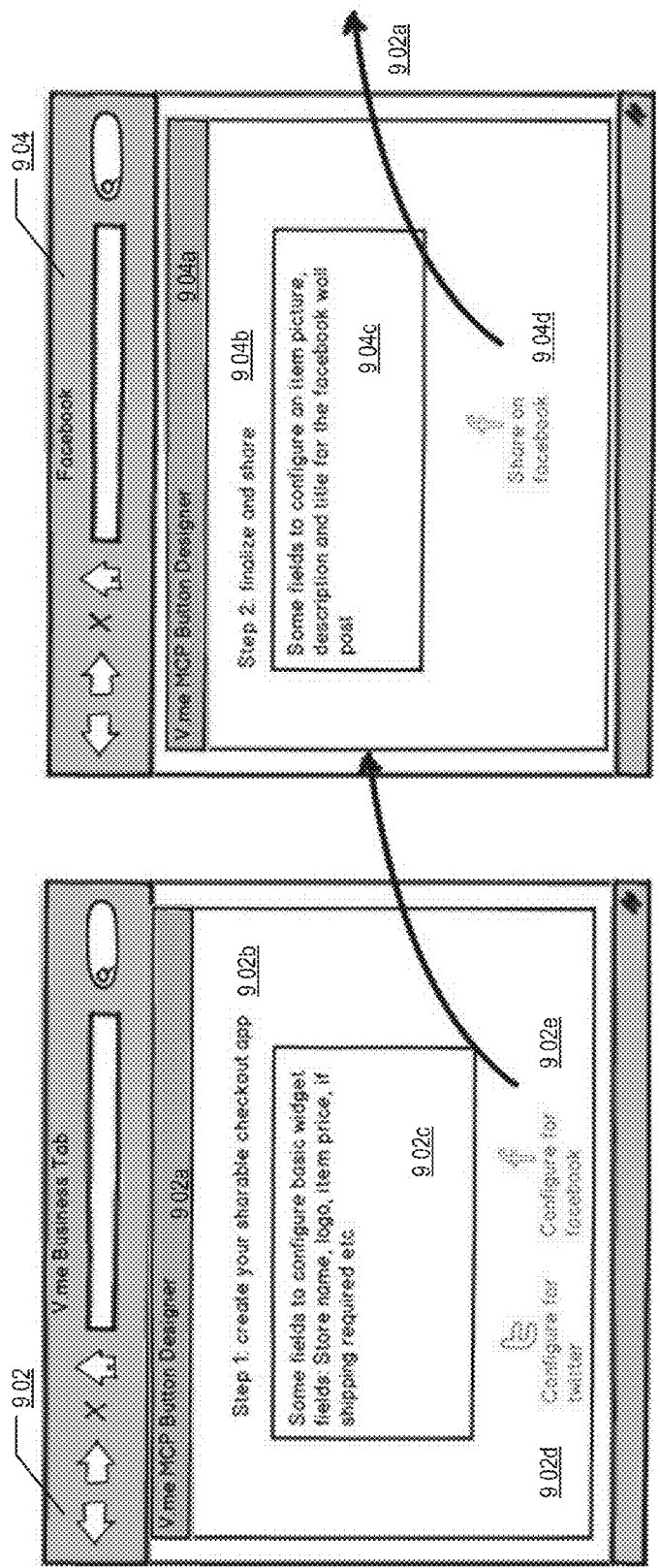
FIG. 9A shows user interfaces illustrating example integration of checkout widget in social media (e.g., FACEBOOK), in some embodiments of the API-Tool.

FIG. 9A shows user interfaces illustrating example integration of checkout widget in social media (e.g., FACEBOOK) in some embodiments of the API-Tool. In one implementation, the API-Tool may provide a user such as a publisher, merchant, or any party desiring to engage in commerce tools to create, customize and share checkout widget in channels outside of their traditional e-commerce site. In one implementation, a user interface 902 (e.g., V.me Business Tab) may be provided for configuring and integrating a checkout widget in various social media and other channels. The user interface 902 may include an option to launch a wallet merchant control panel (MCP) button designer user interface component 902a ("button designer wizard") that allows the user to pre-configure a checkout widget for a particular Stock Keeping Unit (SKU) item (e.g., a deal of the day, pre-order a product, a donation to a cause, etc.). The component 902a may request the user to enter information for basic checkout widget fields such as store name, logo, item price, item description, SKU, shipping information, and/or the like in one or more fields 902c provided to create and configure the checkout widget. Social media options (e.g., 902d, 902e) where the checkout widget may be distributed or shared may also be provided for selection by the user. In one implementation, when the user selects "configure for FACEBOOK" option 902e, the user may be redirected to their FACEBOOK page 904, from where the user may continue with the button design. For example, the button designer wizard may request the user to finalize and share (e.g., 904b) the checkout widget. The user may input item picture, description, title and other information in the fields 904c provided.

When the user selects the "Share on FACEBOOK" option 904d, the button designer wizard may provide the merchant a unique URL for that checkout which they can share by the selected social media channel.

Figure 9B:
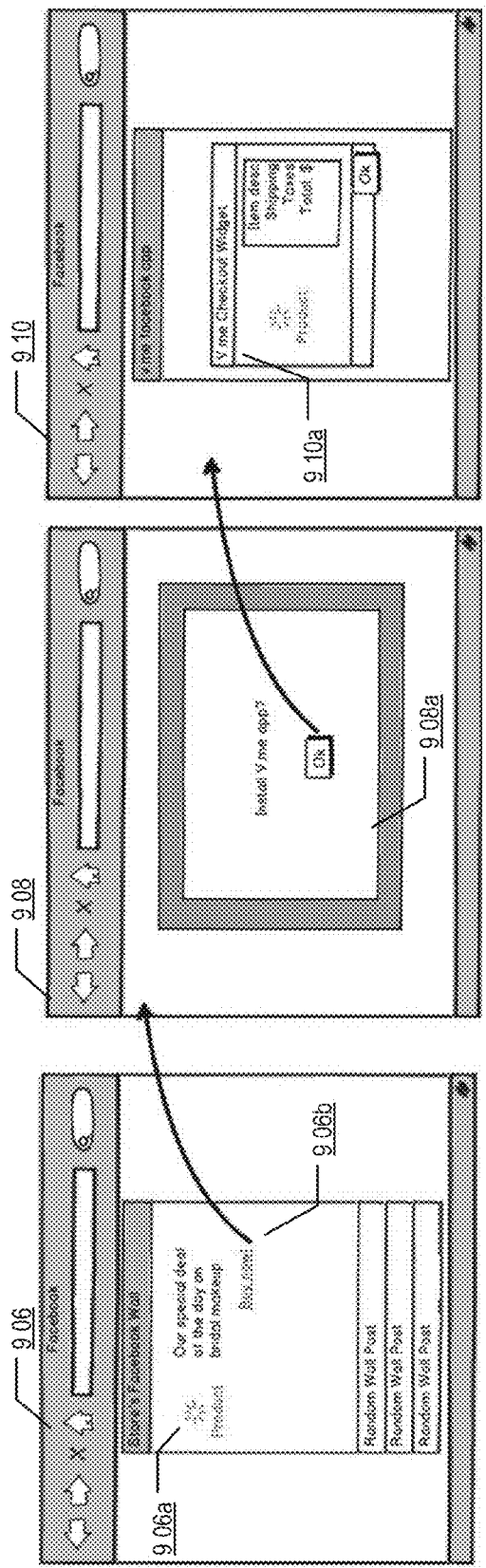
FIGS. 9B-C shows user interfaces illustrating example widget checkout in social media (e.g., FACEBOOK), in some embodiments of the API-Tool.

FIG. 9B shows user interfaces illustrating example widget checkout in social media (e.g., FACEBOOK) in some embodiments of the API-Tool. For example, as shown, a wall post 906a including a link 906b to the product for sale may be published in the user's FACEBOOK page 906. Once the link to the product is posted, it may be clicked by any consumer to initiate instant checkout. For example, as shown, when a consumer clicks on the checkout link 906b, a pop up message 908a may be displayed in the FACEBOOK site 908 to request the consumer to install a wallet (e.g., V.me) application. When the consumer agrees, a native FACEBOOK application 910a may be installed in the consumer's FACEBOOK page 910. A wallet landing page that takes the unique link 906b and spawns an appropriate checkout widget 910b for the user and the item 910c may be embedded into the wallet native FACEBOOK application. The consumer may provide wallet credentials or other payment information to the checkout widget and complete a purchase without leaving their FACEBOOK page. Further, consumer may only have to install one wallet FACEBOOK application to checkout from any user or merchant on FACEBOOK.

Figure 9C:
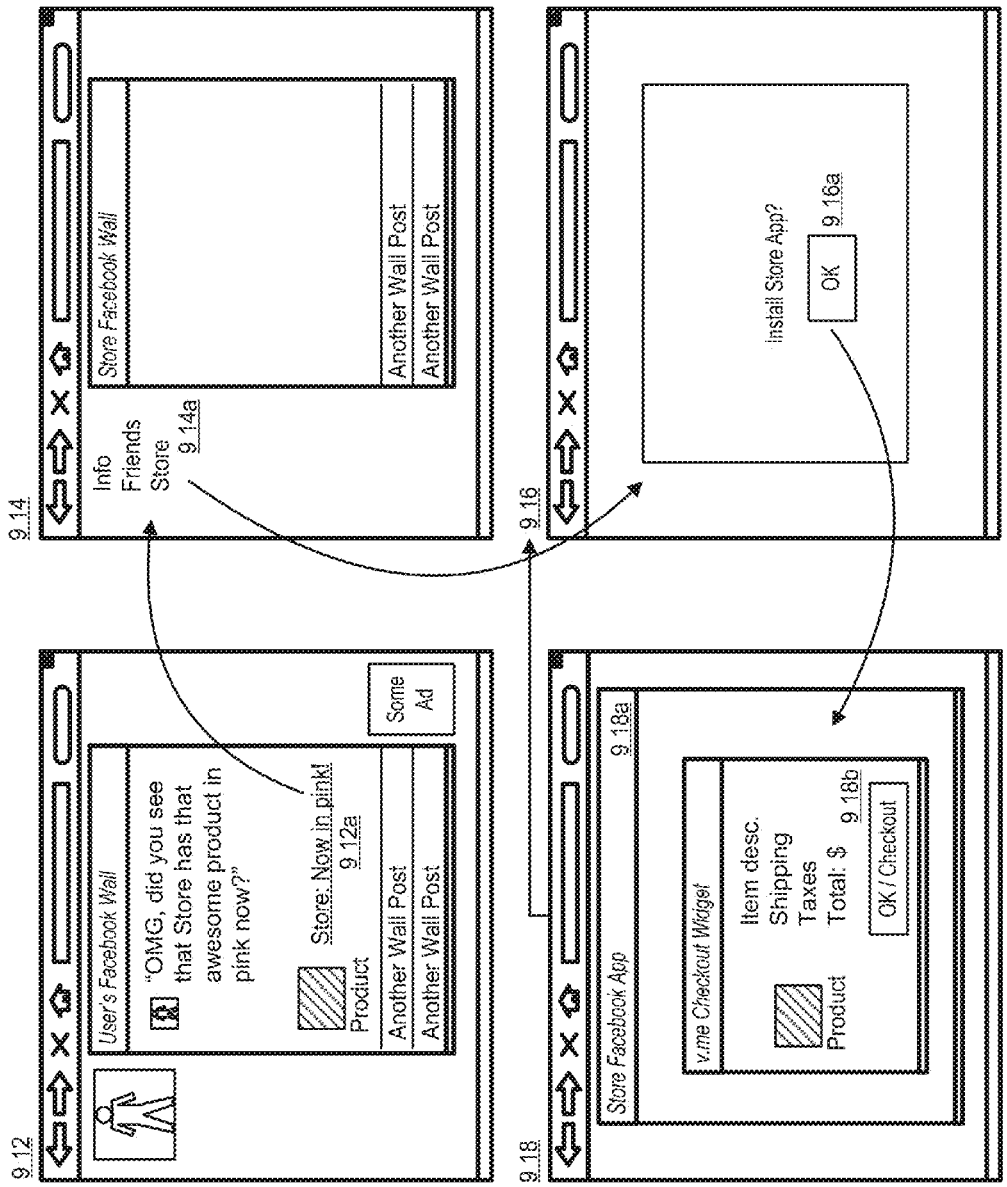

FIG. 9C shows user interfaces illustrating example widget checkout in social media (e.g., FACEBOOK) in some embodiments of the API-Tool. As shown, a link 912a to a product or store may be generated by the wizard and may be posted in a message on a consumer's social network page 912. The link, when clicked, may redirect to a merchant store landing page 914 on a social network (e.g., FACEBOOK). From the merchant's social network landing page, a consumer may launch a merchant store application using a link 914a. In other embodiments, clicking the link 912a may immediately launch the merchant's social store application (e.g., 918a). Upon clicking the link 914a, a message window 916a may pop up in the browser, e.g., 916, requesting the consumer's permission to install a merchant store application. Upon installation, the merchant store application 918a may be rendered as an iframe within the merchant store social network landing page 918. In a further implementation, the initially selected item 912a may be displayed to the consumer in the store application 918a, from where the consumer may add the item to a shopping cart (e.g., V.me shopping cart) and checkout. The consumer may also browse through other items in the store application and add one or more items in the shopping cart. When the consumer is ready to check out the items in the shopping cart, the consumer may click on a checkout widget 918b (e.g., V.me checkout widget) integrated within the store application 918a. The consumer may simply enter his wallet credentials (e.g., V.me wallet), or information corresponding to other forms of payment such as credit card, debit card, prepaid card, gift card, online account such as PAYPAL account, and/or the like. In some implementations, the consumer may also provide shipping and any other details necessary to conclude the transaction. In this way, by facilitating consumer purchase of products and/or services within a social network framework, the API-Tool opens up a new sales channel for merchants and provides consumers the convenience of anytime and anywhere checkout.

FIG. 9D shows a screenshot diagram illustrating example integration of checkout widget in social media (e.g., TWITTER) in some embodiments of the API-Tool. In one implementation, a merchant (or other users) may use TWITTER to tweet/retweet 920 a unique link 922 (e.g., https://v.me/238ax4) to a product or service. In one implementation, the link 922 may be a shortened Universal Resource Locator (URL) generated by the merchant using the button designer wizard.

FIG. 9E shows a screenshot diagram illustrating example widget checkout in social media (e.g., TWITTER) in some embodiments of the API-Tool. As shown, a consumer may click on the link 922 (shown in FIG. 9D), which may direct the consumer to a landing page 924 (e.g., V.me checkout page), where the merchant's website 908 may be displayed as an iframe. The consumer may then go back the previous page by selecting the link 928 (e.g., return to twitter.com) or may select a checkout widget (not shown). When the checkout widget is clicked or selected, an overlay similar to overlay 930 may be displayed where the consumer may enter their wallet login credentials. The consumer provided login credentials may be authenticated by the wallet server, and upon successful authentication, an overlay 930 may be displayed. As shown, the overlay 930 may display the consumer's shipping address 930a on file, shipping type preference 930b on file, payment information on file 930c, purchase summary 930d, total amount 930e, and/or the like. In one implementation, the overlay may include an option to change any of the information displayed prior to placing the order. In a further implementation, any change of information provided on the overlay may be linked to the information on file at the wallet server, thereby allowing the consumer to update information on the fly. The overlay may also include a pay button 93 of to place order. Upon placing the order, a confirmation message may be displayed in the same overlay. The consumer may then return to their TWITTER page by clicking on the link 928.

Figure 10A:
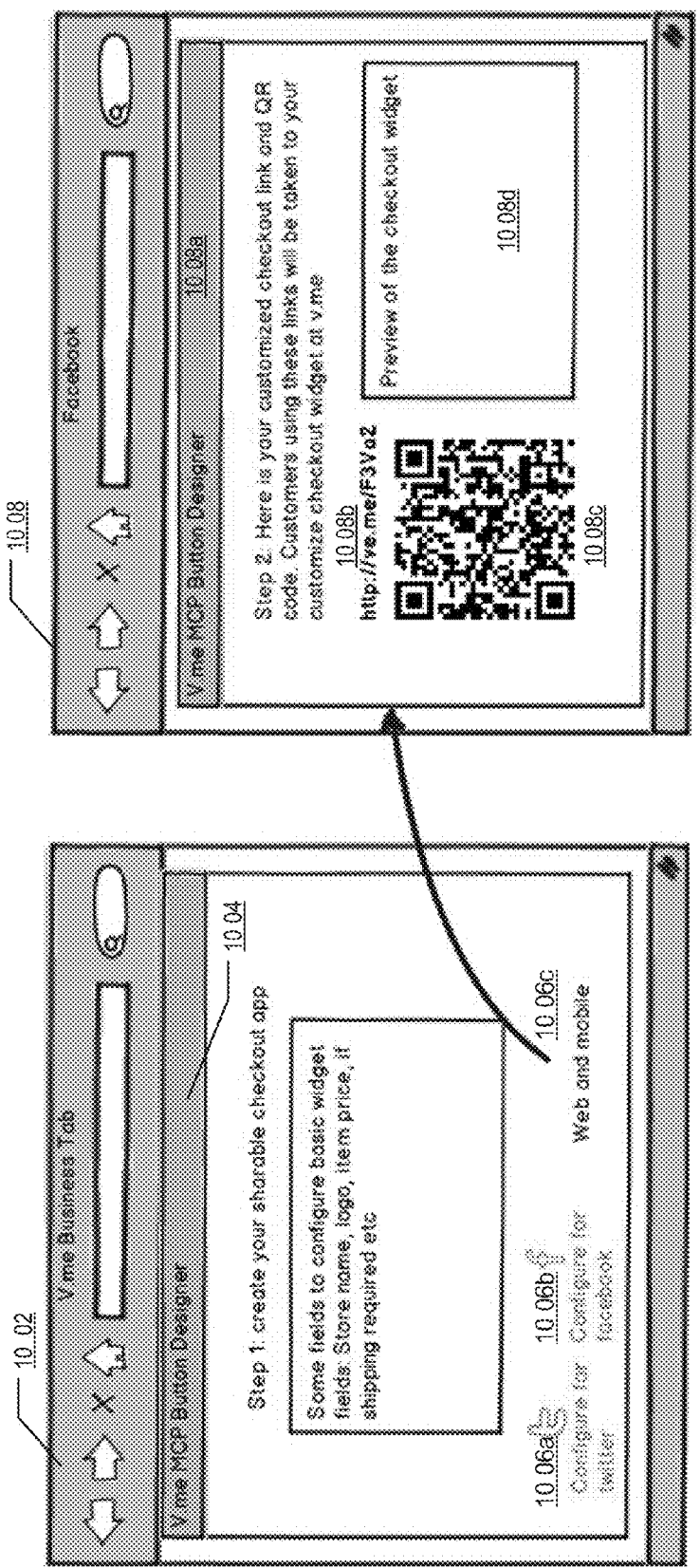
FIG. 10A shows user interfaces illustrating example integration of checkout widget in web/mobile channels, in some embodiments of the API-Tool.

FIG. 10A shows user interfaces illustrating example integration of checkout widget in web/mobile channels in some embodiments of the API-Tool. In one implementation, a merchant control panel 1002, similar to those shown in FIGS. 9A and 9C may be provided to a merchant. The merchant control panel may include, among other things, a merchant control panel button designer component wizard 1004 that allows the merchant to create a shareable checkout application. In one implementation, the merchant may be requested to provide button parameters such as store name, logo, item price, if shipping required, shipping methods, product ID, and/or the like necessary to create and customize a checkout widget. In some implementations, an API key and token may also be required to create the checkout widget. The API key may identify the general API access configuration settings, and the token may be an encrypted token for the merchant account. The merchant may have the option to configure the checkout application for various channels including social network (1006a, 1006b) and web and mobile 1006c. In one implementation, when web/mobile configuration is selected, the wizard may generate and provide to the merchant a customized checkout link and/or code such as a bar code, a quick response (QR) code, and/or the like. For example, as shown, the wizard iframe 1008a may display a shortened URL link 1008b and/or a QR code 1008c. In some implementations, a preview 1008d of the checkout widget customized according to the button parameters provided by the merchant may be displayed. In one implementation, the link 1008b may be shared using communication channels including social media channels, email, SMS, MMS, content site and/or the like.

Figure 10B:
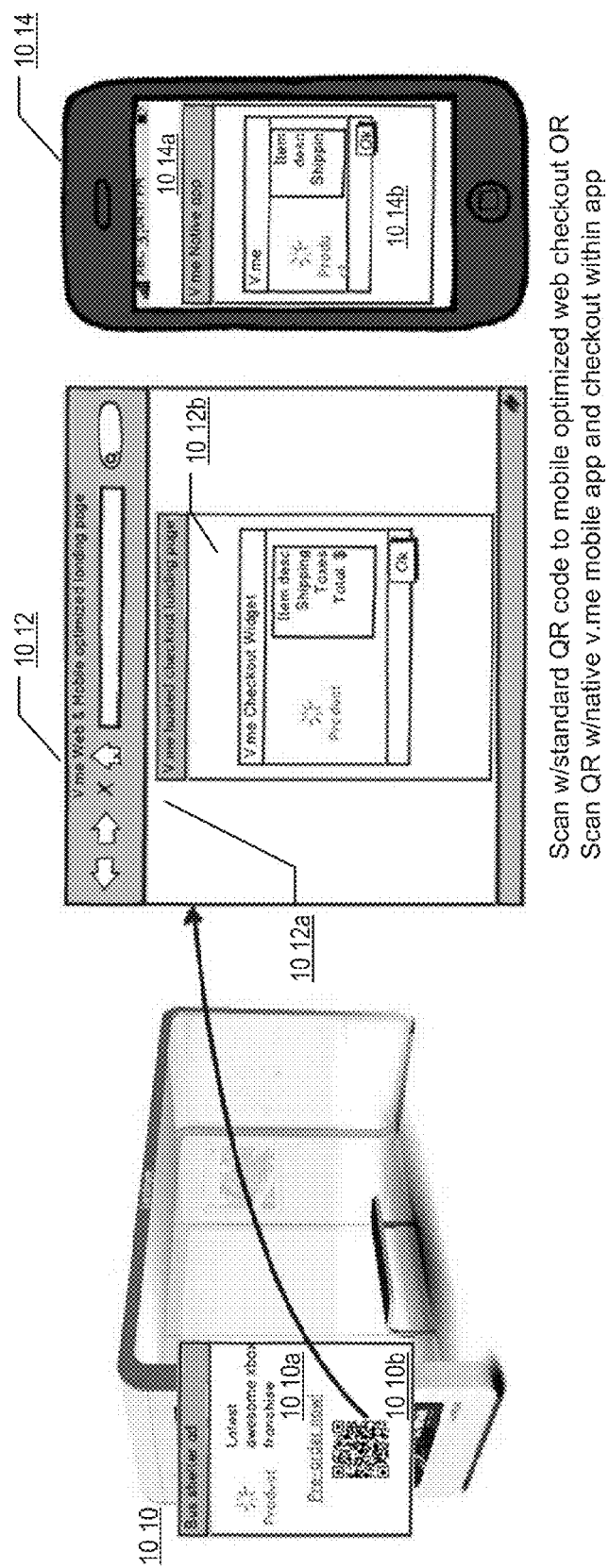
FIG. 10B shows user interfaces illustrating example widget checkout in web/mobile channels, in some embodiments of the API-Tool.

FIG. 10B shows user interfaces illustrating example widget checkout in web/mobile channels in some embodiments of the API-Tool. In some implementations, the QR code generated by the wizard may be used for advertisements in print or online. For example, as shown, the QR code 1010b along with product or service information 1010a may be used in a bus shelter advertisement 1010. In one implementation, a consumer may scan the QR code using their mobile device which directs the consumer to a wallet web and mobile optimized landing page 1012. The landing page may display a wallet hosted checkout landing page 1012a. The landing page 1012a may display product/service and/or merchant information, and a checkout widget (not shown). When the checkout widget is selected, a wallet checkout window or iframe 1012b may be displayed where the user may enter wallet credentials, payment and/or shipping information, view purchase details and place order. In an alternate implementation, the landing page may be embedded within a wallet native mobile application 1014a, thereby allowing the consumer to install one wallet mobile application to enable checkout from any merchant accepting mobile checkout. In some implementations, the checkout experience may be optimized for speed, for embedded security, and for a standardized user experience across all merchants on the platform.

Figure 11A:
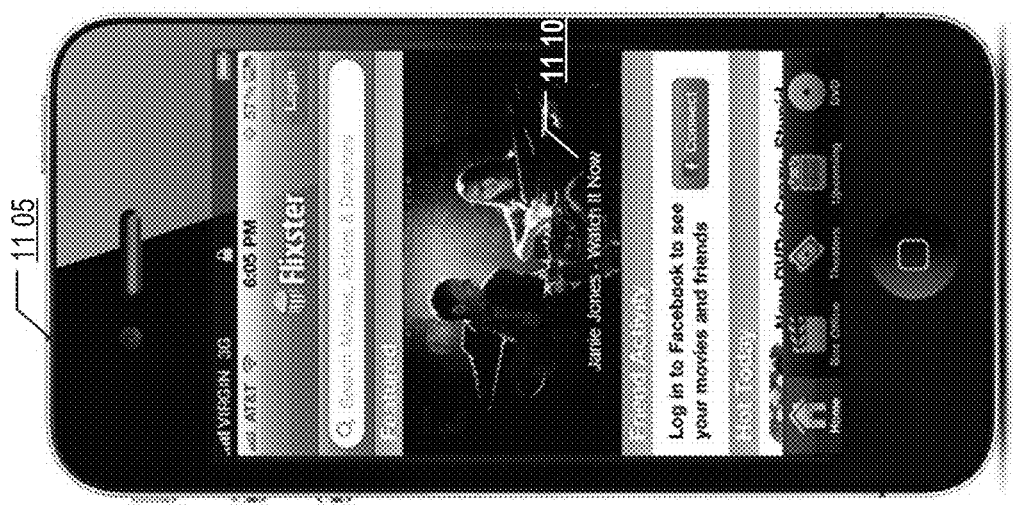
FIG. 11A shows user interfaces illustrating example integration of checkout widget in a mobile application, in some embodiments of the API-Tool.

FIG. 11A shows user interfaces illustrating example integration of checkout widget in a mobile application in some embodiments of the API-Tool. In one implementation, a mobile application 1105 may be integrated with wallet checkout via a link 1110 on a content on the mobile application.

Figure 11B:
FIG. 11B shows user interfaces illustrating example widget checkout in a mobile application, in some embodiments of the API-Tool.

FIG. 11B shows user interfaces illustrating example widget checkout in a mobile application in some embodiments of the API-Tool. When a consumer clicks on the link 1110 (shown in FIG. 11A), a user interface 1115 including a checkout button 1115a may be displayed. The consumer may initiate purchase of the content by clicking on the checkout button 1115a. In one implementation, selection of the checkout button may launch an iframe 1120 that displays the consumer's preferred payment information. The consumer may also change payment information directly from the checkout user interface 1120. The checkout user interface may additionally include product information 1120b and a pay button 1120c to place the purchase order. In an alternate implementation, instead of launching the checkout user interface 1120 when the checkout button 1115a is selected, a native mobile wallet application may be launched. The purchase may then be completed using the wallet application.

Figure 12A:
FIG. 12A shows user interfaces illustrating example integration of checkout widget in a digital catalog, in some embodiments of the API-Tool.

FIG. 12A shows user interfaces illustrating example integration of checkout widget in a digital catalog in some embodiments of the API-Tool. The user interface 1200 shows a number of products 1205a-h aggregated from one or more merchants and saved under favorites 1215 or wish list. A checkout widget 1210 may be integrated with such a multi-merchant catalog to allow checkout directly from the catalog, favorites or wish list, without having to visit each of the merchants' stores or application individually.

FIG. 12B shows user interfaces illustrating example widget checkout in a digital catalog in some embodiments of the API-Tool. In one implementation, when the checkout widget is clicked, a lightbox 1220 may be launched. Such lightbox may be branded using logo and other information provided by the catalog publisher. The lightbox may include information such as shipping address 1220a, shipping type 1220b, payment information 1220c, purchase summary 1220d, and/or the like retrieved from the consumer's wallet. Such information may also be changed from the same interface, in accordance with permissions and controls for bi-directional federation set up in the wallet. The consumer may then complete the purchase by selecting the pay button 1220d.

Once the purchase transaction has been authorized, and one or more wallet commerce service components communicate with the merchants to provide information regarding purchase, and in some implementations, obtain information regarding products (e.g., inventory information, fulfillment, etc.). In some implementations, the API-Tool may provide facilities for crediting the aggregated seller such as the catalog publisher for initial lead that results in an interest and/or purchase.

Figure 12C:
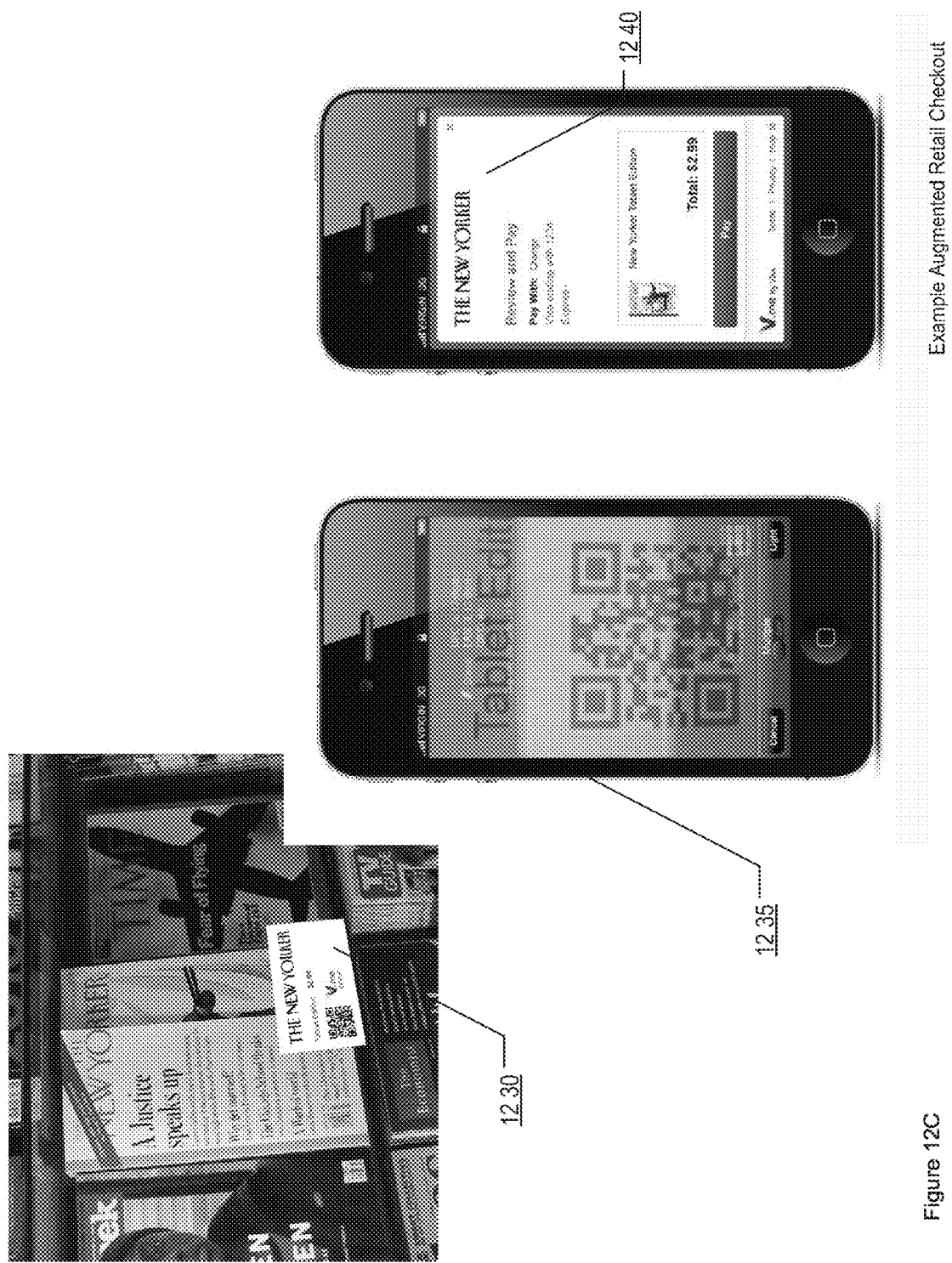
FIG. 12C shows user interfaces illustrating example augmented retail checkout, in some embodiments of the API-Tool.

FIG. 12C shows user interfaces illustrating example augmented retail checkout in some embodiments of the API-Tool. In some implementations, retail stores selling retail or digital version of the same product may be credited for the initial lead resulting in interest and/or purchase of the digital version of the product. For example, a bookstore that sells "The New Yorker" magazine, may also place a QR code 1230 for purchasing a digital version of the magazine, the retail store effectively becoming a show room for online products. A consumer who wishes to purchase the digital copy of the magazine, instead of the print copy, may scan the QR code using their tablet or mobile devices 1235. The QR code may launch a landing page, a lightbox, or wallet application 1240 where the consumer may enter payment information or wallet credentials to complete the purchase and download a digital copy to their tablets or other mobile devices. At the backend, the wallet services component may identify the merchant associated with the code that was used for the purchase, and may provide a cut or commission for the sale of the digital magazine. In one implementation, any cut or commission may be determined based on agreements between various parties such as the retailer, the publisher, the wallet service provider, and/or the like.

FIG. 13A shows a screenshot diagram illustrating example integration of checkout widget in a content site in some embodiments of the API-Tool. As shown, a content site 1300 may publish an article 1305 reviewing a product ("USB charger"). The content site may integrate the product review with a checkout widget 1310 to facilitate purchase of the product directly from the review page.

Figure 13B:
FIG. 13B shows a screenshot diagram illustrating example widget checkout in a content site, in some embodiments of the API-Tool.

FIG. 13B shows a screenshot diagram illustrating example widget checkout in a content site in some embodiments of the API-Tool. When the checkout widget 1310 is clicked, a lightbox 1315 may be displayed overlaying on top of the site. The lightbox may include shipping information 1315*a*, shipping type 1315*b*, payment information 1315*c*, purchase summary and details 1315*d*, and/or the like. In some implementations, the lightbox may request wallet credentials from the consumer to retrieve consumer information relating shipping and payment information on file with the wallet. The consumer, upon agreement with the information on the lightbox, may place an order by clicking on the pay button 1315*e*. Once the purchase transaction is authorized, the wallet services component may, in some implementations, provide the content publisher credit for monetizing the product via product review on the content site.

Figure 13C:
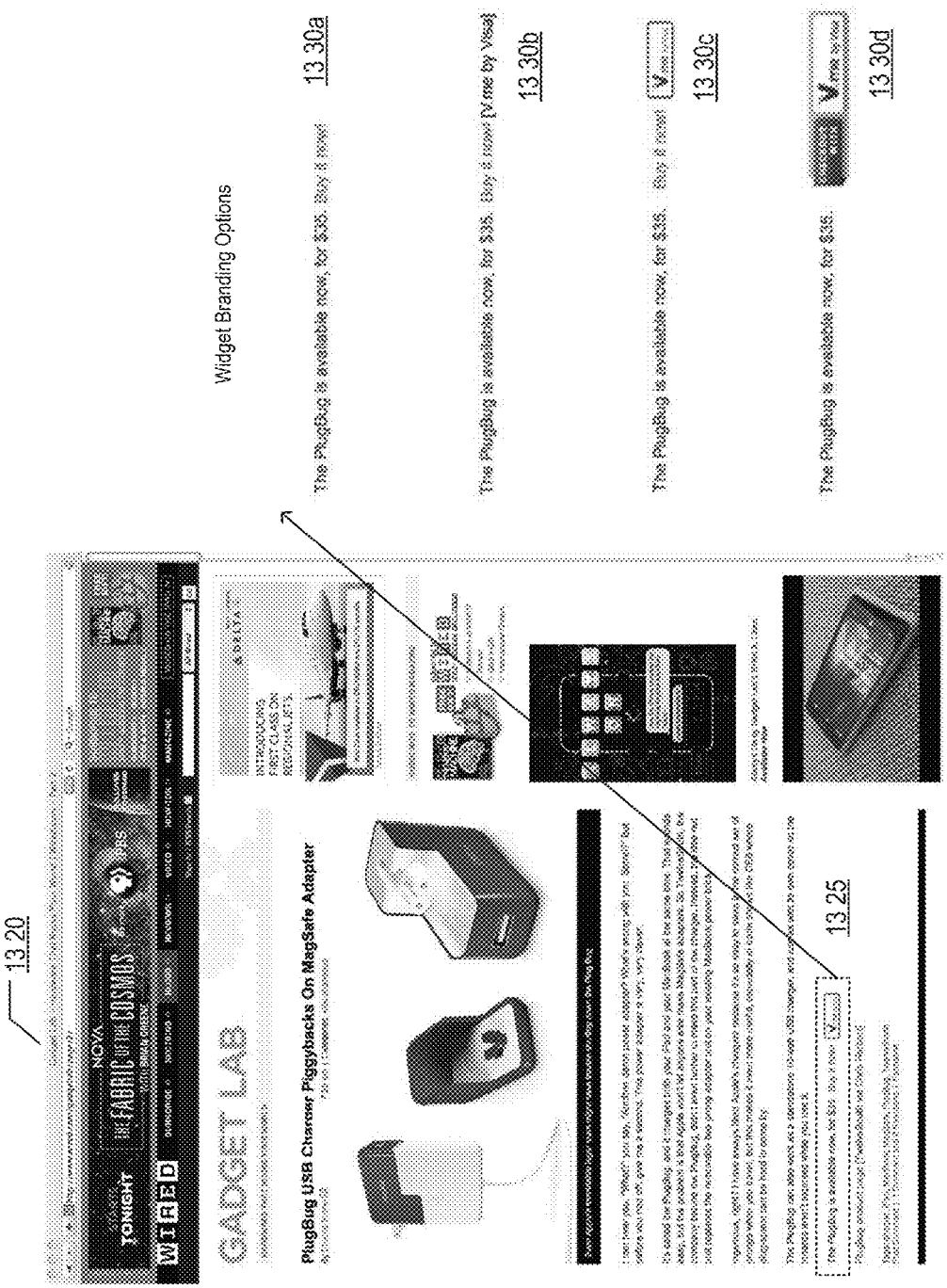
FIG. 13C shows diagrams illustrating example checkout widget branding options, in some embodiments of the API-Tool.

FIG. 13C shows diagrams illustrating example checkout widget branding options in some embodiments of the API-Tool. As shown, a content site 1320 may link content with product and facilitate checkout of the product directly from the content site. In one implementation, the checkout widget 1325 on the content site may be branded in multiple ways. In one implementation, the product may be advertised for checkout simply as a link 1330*a* with no branding. In some other implementations, the checkout may be implemented as a link with additional description 1330*b*, a link with a wallet branding 1330*c*, a checkout widget with wallet branding 1330*d*, a checkout widget with merchant, issuer, or site publisher branding, and/or the like.

FIG. 14 shows a logic flow diagram illustrating example widget integration and checkout in some embodiments of the API-Tool. In one implementation, the API-Tool may obtain widget customization parameters from a merchant at 1405. The widget customization parameters in some implementations may include parameters for creating a checkout widget, a checkout link, a checkout post or tweet, a URL, a QR code, and/or the like. The customization parameters may be embedded or associated with the widget. At 1410, the API-Tool may obtain widget configuration parameters. The widget configuration parameters in some implementations include identification of a channel where the widget is to be embedded. For example, a social media channel, a web channel, a mobile channel, a content site channel, a retail channel, and/or the like. At 1415, the API-Tool may generate a checkout widget using the customization and configuration parameters. At 1420, the API-Tool may embed the widget in a content site. In some implementations, code snippets of the widget may be provided via APIs to a developer of the site for embedding. In other implementations, the user may copy and paste the widget. At 1425, the API-Tool may detect engagement of the widget by a consumer who may wish to checkout a product corresponding to the widget. In one implementation, at 1430, the API-Tool may request the consumer's permission to install a checkout application (e.g., a wallet application). If the installation is not approved at 1435, the consumer may need to use alternate ways to checkout (e.g., FIG. 9B) or the process may end at 1440. If the installation is approved at 1435, the API-Tool may install the application at 1446. At 1450, a payment lightbox 1450 may be instantiated to process the purchase transaction. In some implementations, a buy button on the installed application may need to be engaged to launch the payment lightbox. In one implementation, the payment light box may request the consumer's wallet credentials if the consumer has an existing wallet account and wishes to use information in the wallet to conduct the purchase transaction. Additionally, the consumer may input payment and other details necessary for the purchase in various fields in the lightbox. At 1455, the API-Tool may obtain the payment information and other details necessary for the checkout to be completed. At 1460, the API-Tool may obtain a purchase order for the consumer confirming the checkout.

FIG. 15 is block diagram illustrating an example checkouts in some embodiments of the API-Tool. As shown in the figure, a web page 1505*a* has a checkout option using PayPal. Customers 1520*a*, 1525*a* may click on the "Check out with PayPal" button 1510*a* to initiate the transaction. The clicking of the button 1510*a* may take the customers 1520*a*, 1525*a* to another page 1515*a* where the user may need to register for a new account or sign in. For customers 1520*a* and 1525*a*, such a checkout option may be inconvenient and thus may lead to the customers abandoning their shopping carts before completing the purchase.

On the other hand, an example web page 1505*b*, also shown in FIG. 15, may have an integrated payment acceptance that allows easy checkout. For example, customers 1520*b* and 1525*b* visiting web site or in an application 1505*b* may want to buy an item. In this case, he or she may click a buy button 1510*b* (e.g., V.me buy button) that is dynamically generated and coded into the web page. A payment application 1515*b* (e.g., a lightbox) may be invoked and may be overlayed on top of the web page 1505*b*. The customers may select a payment method and enter payment information on the payment window 1515*b* to complete the purchase. The checkout process is thus made simpler for the customer, with no registration or signing in required. In instances where there is a card on file, a wallet functionality may be invoked by the buy button, and the purchase may be completed in one click or action via the wallet. The customer may then receive the item, and the transaction may be settled through the merchant's account.

In addition to the ease of checkout for customers, the seller and/or developer may have obtain the advantages of easy integration of payment acceptance as the seller needs to insert a few API-Tool platform tags and a few code snippets to generate a buy button that accepts various forms of payments including customer's wallet and gets the seller paid. In some implementations, sellers and/or merchants may obtain and analyze buying trends and other analytics through data collected from the buy widget based purchases.

Figure 16:
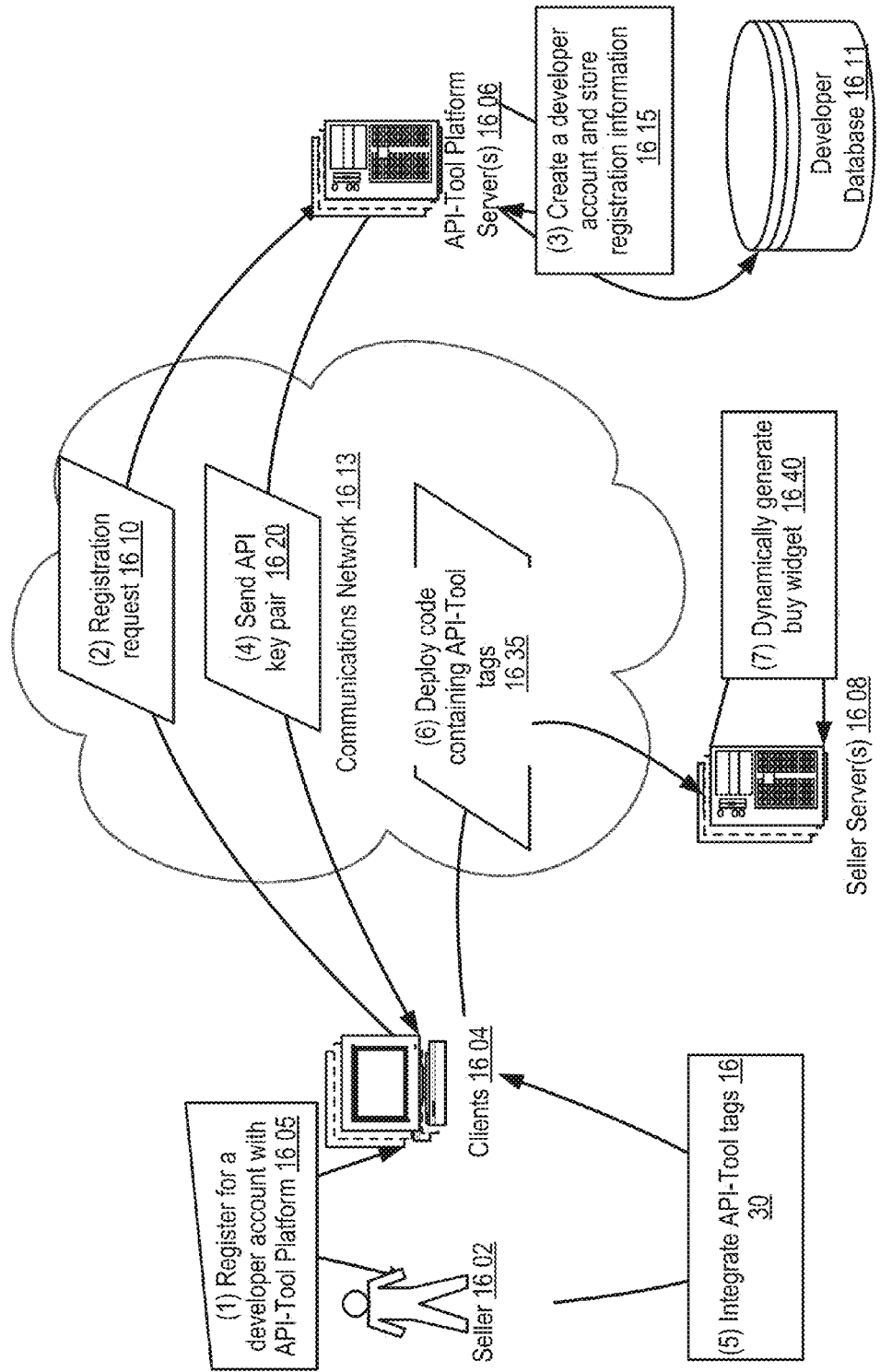
FIG. 16 shows a data flow diagram illustrating dynamic widget generation, in some embodiments of the API-Tool.

FIG. 16 shows a data flow diagram illustrating dynamic widget generation in some embodiments of the API-Tool. In one embodiment, a seller 1602 (or a developer) may use a client 1604 to register as a developer in the API-Tool Platform at 1605. During registration, the seller may provide login and/or other identifying information such as a name, country, currency, email address, password, userid, postback URL, and/or the like. The client 1604 may then generate a registration request 1610 using the information supplied by the user during registration. An example registration request 1610, substantially in the form of an HTTP(S) POST message including XML-formatted data, is provided below:

POST /registration_request.php HTTP/1.1
Host: www.v.me
Content-Type: Application/XML

```
Content-Length: 667
<?XML version = "1.0" encoding = "UTF-8"?>
<registration_request>
        <request_ID>4NFU4RG94</request_ID>
        <timestamp>2011-12-12 15:22:43</timestamp>
    <user_details>
        <user_ID>JDoe</user_ID>
        <password>JDeloves2sing</password>
        <firstname>Joe</firstname>
        <lastname>Doe</lastname>
        <email>JDoe@gmail.com</email>
        <country>Canada</country>
        <currency>Canadian dollars</currency>
        <postback_URL>http://billsjewellery.com/response</postback_URL>
        <client_detail>
            <client_IP>192.168.23.126</client_IP>
            <client_type>smartphone</client_type>
            <client_model>HTC Hero</client_model>
            <OS>Android 2.2</OS>
            <app_installed_flag>true</app_installed_flag>
        </client_detail>
    </user_details>
</registration_request>
```

Upon receiving the registration request from the seller, the API-Tool platform server may, at 1615, create a developer account and store the details of the account in a developer database 1611. The API-Tool platform server may further generate and/or provide an API key pair to the client 1604 at 1620. In one implementation, the API key pair may include a public key and a shared secret key. The public key may be used as an apikey parameter value in an initialization tag and buy button tag discussed in further detail below. The shared secret key may be used to generate encrypted tokens necessary for authenticating the seller with the API-Tool platform server. Example tags which use the shared secret key as one of the parameters are shown below:

| Tag/Widget | Parameters | Description |
| --- | --- | --- |
| v:init | sharedsecretkey, userid | |
| v:buy | sharedsecretkey, amount, currency, product-id | This token may be generated with these required parameters for each product with a buy button in an app, as the parameters will vary. |

At 1630, upon receiving the API key pair from the API-Tool platform server(s) 1606, the developer may begin coding. Coding may involve inserting a root tag (v-root) just below the <body> tag of the application or website code. In one implementation, the root tag may be placed elsewhere in the page. In another implementation, the root tag may need to be placed just below the body tag to facilitate proper loading of the lightbox. The placement of the root tag may be relative to the root element in the Document Object Model (DOM) document. An example root tag, substantially in JavaScript, is provided below:

```
<body>
    <div id="v-root"></div>
```

The developer may then add an initialize tag (v:init) below the root tag (v-root) and before any buy button tags. The initialize tag may identify the user and page attributes for handling events using various parameters. For example, the initialize tag may set the API key and token to authenticate the seller with the API-Tool. Exemplary parameters for the initialize tag include, without limitation, apikey, token, userid, logo-url, country and callback. The apikey may be a string value that identifies the general API access configuration and developer settings for the site or application.

The token may be the encrypted token for the user account. It may be a string that is created by the MD5 Message Digest Algorithm hash of API secret shared key and userid. In one implementation, the parameters to the hash may not include any spaces, quotes or delimiters. These tokens may also be used as values for tokenid in API-Tool's buy button parameters. A API-Tool MD5 hash may be generated by running an appropriate function on a concatenated string of particular parameter values such as the shared secret key and userid in a proper sequence. In one implementation, the sequence may not have any spaces or delimiters. Example API-Tool MD5 hash syntax for languages such as JAVA, PHP, RUBY and PYTHON is provided below:

| Language | Standard Syntax for Generating MD5 Hash |
| --- | --- |
| Java | import org.apache.commons.codec.digest.*;<br>hash = DigestUtils.md5Hex(string1+string2+string3 . . .); |
| PHP | $hash = md5($string1.$string2.$string3 . . .); |
| Ruby | require 'digest/md5'<br>hash = Digest::MD5.hexdigest(string1+string2+string3 . . .) |
| Python | import md5<br>hash = md5.new(string1+string2+string3 . . .) |

The userid parameter is an application or game user registered and/or developer authenticated parameter. The userid may be a string representing a unique non-changing user in the developer's system. The logo-url is a string that indicates the absolute path to an image to be displayed in the payment widget. The logo-url in some implementations may be optional. The country parameter may be a string that sets the country where the application is running and may be auto-detected. The default value may be set to, for example, the United States. The callback parameter may be a string function that listens for events triggered by API-Tool platform widgets. The callback parameter may, in one implementation, be a globally accessible static JavaScript function. An example initialize tag, substantially in JavaScript, including one or more of the above described parameters is provided below:

```
<v:init apikey = "bbb8aae57c104cda40c9"
    token = "ed0f2847b36f27e19e5613e9e73aeda1"
    userid = "JDoe1970"
    callback="handleVmeEvents">
</v:init>
```

The initialize tag may also include the userid of the developer and a callback function discussed in further detail below. The developer may continue coding by inserting a script tag just above the </body> tag. The script tag may link to the API-Tool platform JavaScript Software Development Kit (SDK) for loading the API-Tool platform JavaScript SDK library into the application or web page. In one implementation, the library may scan a web page for buy button tags and replace them with buy buttons customized for the product items in an application or site. An example script tag, substantially in JavaScript, is provided below:

```
<script type="text/javascript"
    src="http://api8.ultimatepay.com/js/1/v-widgets.js"></script>
</body>
```

The developer may also add a API-Tool platform buy button tag (v:buy) to dynamically generate a buy button or widget that allows a customer to buy selected products. A number of parameters may be included in the buy button tag. Example parameters include apikey, token, amount, currency, product-id, product-desc, merch-trans, dom-id, callback, and/or the like. These parameters may be of string type. In some implementations, parameters such as product-desc, merchant-trans, dom-id and callback may be optional. An apikey key may identify API access configuration and developer settings for an application and may be the key that is provided during the on-boarding process. A token is an encrypted purchase token for a purchase. It may be created by the md5 hash of API secret shared key, amount, currency, product-id, and/or the like. An amount is the price of an item being purchased. In one implementation, the value of the amount may be displayed on the widget and is the payment that is requested from the customer's account on behalf of the seller. A currency is a parameter that sets the currency for display. A product-id is a unique non-changing identifier for an item or product in the seller's catalog or store. A product-desc is an end user friendly description of goods or services corresponding to a product-id. A merch-trans may be a transaction id for tracking purchase activity. This id may pass through the system and may be available to developers in all status replies. A dom-id may be a DOM element id that is used as a trigger for a purchase action. For example, if a valid dom-id is specified, the default or themed API-Tool platform buy widget may not be displayed. A callback is a globally accessible static JavaScript function that listens for events triggered by API-Tool platform widgets. An example buy button or widget tag, substantially in JavaScript, and including some of the parameters discussed above, are provided below:

```
<v:buy apikey = "aK2Leiv89j2A1__lOn4s1"
    token = "12f049788f4b67dc9cc58529769fb9d2"
    amount = "100"
    currency = "USD"
    product-id = "sku856781"
    callback = "handleVmeEvents">
</v:buy>
```

At 1630, the developer may inset these tags (v:root, v:init, script and v:buy) to the existing code. The completed code may then be deployed to the seller server(s) 1608 at 1635. At 1640, the inserted code snippets may dynamically generate a API-Tool platform buy button or widget. In some embodiments, the buy button tag may be dynamically generated server-side in the code. For basic product offerings with no changes to any of the values, the buy button may be generated once and used many times. Using a test tool (e.g., such as is described herein and with respect to FIG. 20), the developer may generate static buy button tags for a site. In some other embodiments, the test tool may be used to check the hashing algorithm in the code, or simply to become better accustomed to the API-Tool platform buy button fields. In yet other embodiments, the buy button widget may be customized with a logo-url (e.g., in the initialize tag), product description, and/or the like.

FIG. 17 shows a logic flow diagram illustrating dynamic widget generation component in some embodiments of the API-Tool. In one embodiment, starting at 1705, the seller using his or her client device 1701 registers for a developer account with the API-Tool server 1703 at 1710. The registration includes the seller supplying registration information such as name, email, userid, password, country, currency, postback URL, and/or the like. The registration information is received at 1715 by the API-Tool server 1703. The API-Tool server 1703 may then parse the received information and use the parsed information to create a developer account at 1720. At 1725, an API key pair including a public key and a shared secret key may be generated and stored in association with the seller account in one or more databases and/or tables. The API key pair may then be transmitted to the seller at 1730. The seller may, upon receiving the API key pair at 1735, input the shared secret key and other parameters to a hash function (e.g., MD5 hash) at 1740. The seller may, at 1750, insert tags (v:root, v:init, script and v:buy) in his or her app or site code. The completed code may then be deployed at 1755 to the seller server(s) 1702.

The seller server(s) 1702 may load the code and JavaScript libraries at 1760. At 1745, the seller account token may be generated for each product item listed in the application or site. At 1765, an authentication request may be sent to the API-Tool server(s) 1703 to authenticate the seller. The authentication request may include parameters such as apikey, token, userid, and/or the like. The API-Tool server(s) 1703 may receive the request and may authenticate the seller using the received parameters at 1770. If the authentication is successful at 1775, the API-Tool server(s) may transmit a successful authentication message and the seller server(s) 1702 may dynamically generate a buy widget at 1780, ending the process at 1785. If, however, the authentication is unsuccessful, the API-Tool server(s) 1703 may report authentication failure to the seller server(s) 1702 at 1790. The seller server(s) 1702 receiving authentication failure message may invoke processes for handling error, such as notifying the seller by email, or logging the error.

FIG. 18 shows a data flow diagram illustrating dynamically generated widget based purchase in some embodiments of the API-Tool. A customer 1802 may wish to check out a product from a seller's web site. The customer may click the buy widget on the seller's web site at 1805 to initiate purchase. The customer's client device 1804 may then generate and send a payment widget (e.g., lightbox) request at 1810 to the seller's server 1806. An example payment widget request 1810, substantially in the form of an HTTP(S) POST message including XML-formatted data, is provided below:

```
POST /paymentwidget_request.php HTTP/1.1
Host: www.bobsjewelleries.com
Content-Type: Application/XML
Content-Length: 667
<?XML version = "1.0" encoding = "UTF-8"?>
<paymentwidget_request>
        <timestamp>2011-12-12 15:22:43</timestamp>
        <amount>100</amount>
        <currency> USD</currency>
        <product-id> sku856781</product-id>
    <client_detail>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
        </client_detail>
    </client_detail>
</paymentwidget_request>
```

The seller's server 1806 may respond with a payment widget (e.g., lightbox) at 1815. The payment widget (e.g., lightbox) may then be displayed at the client 1804 at 1820. The customer may then enter payment information into the displayed payment widget at 1825. At 1830, the client 1804 may take the entered payment information, and generate a purchase request message for transmission to the seller server(s) 1806 at 1830. An example purchase request 1830, substantially in the form of an HTTP(S) POST message including XML-formatted data, is provided below:

```
POST /purchase_request.php HTTP/1.1
Host: www.bobsjewelleries.com
Content-Type: Application/XML
Content-Length: 667
<?XML version = "1.0" encoding = "UTF-8"?>
<purchase_request>
        <timestamp>2011-12-12 15:22:43</timestamp>
        <nameoncard>John Doe</nameoncard>
        <creditcard_number>4444444444444448</creditcard_number>
        <expiration_month>05</expiration_month>
        <expiration_year>2014</expiration_year>
        <cvv>2345</cvv>
        <street_address>22 Pleasantville</street_address>
        <city>Beverley Hills</city>
        <zipcode>90210</zipcode>
    <client_detail>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
        </client_detail>
    </client_detail>
</purchase_request>
```

The seller server(s) may generate a payment authorization message using the purchase request at 1835. Further, at 1840, the seller server(s) may invoke purchase transaction authorization component which facilitates payment processing via payment gateway and settlement of funds between associated acquirers and issuers.

Figure 19A:
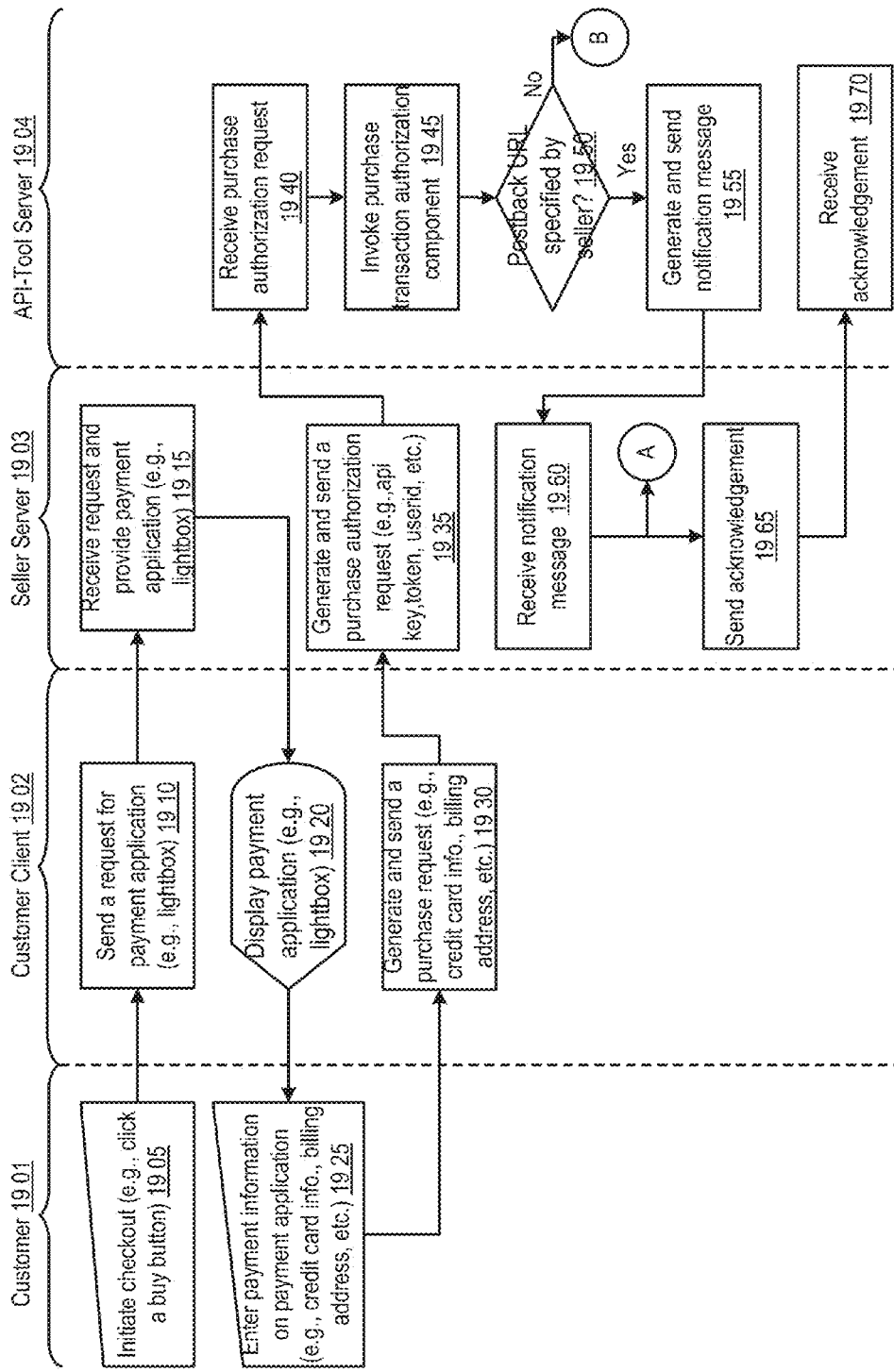
FIGS. 19A-C show logic flow diagrams illustrating dynamically generated widget purchase, in some embodiments of the API-Tool.
Figure 19B:
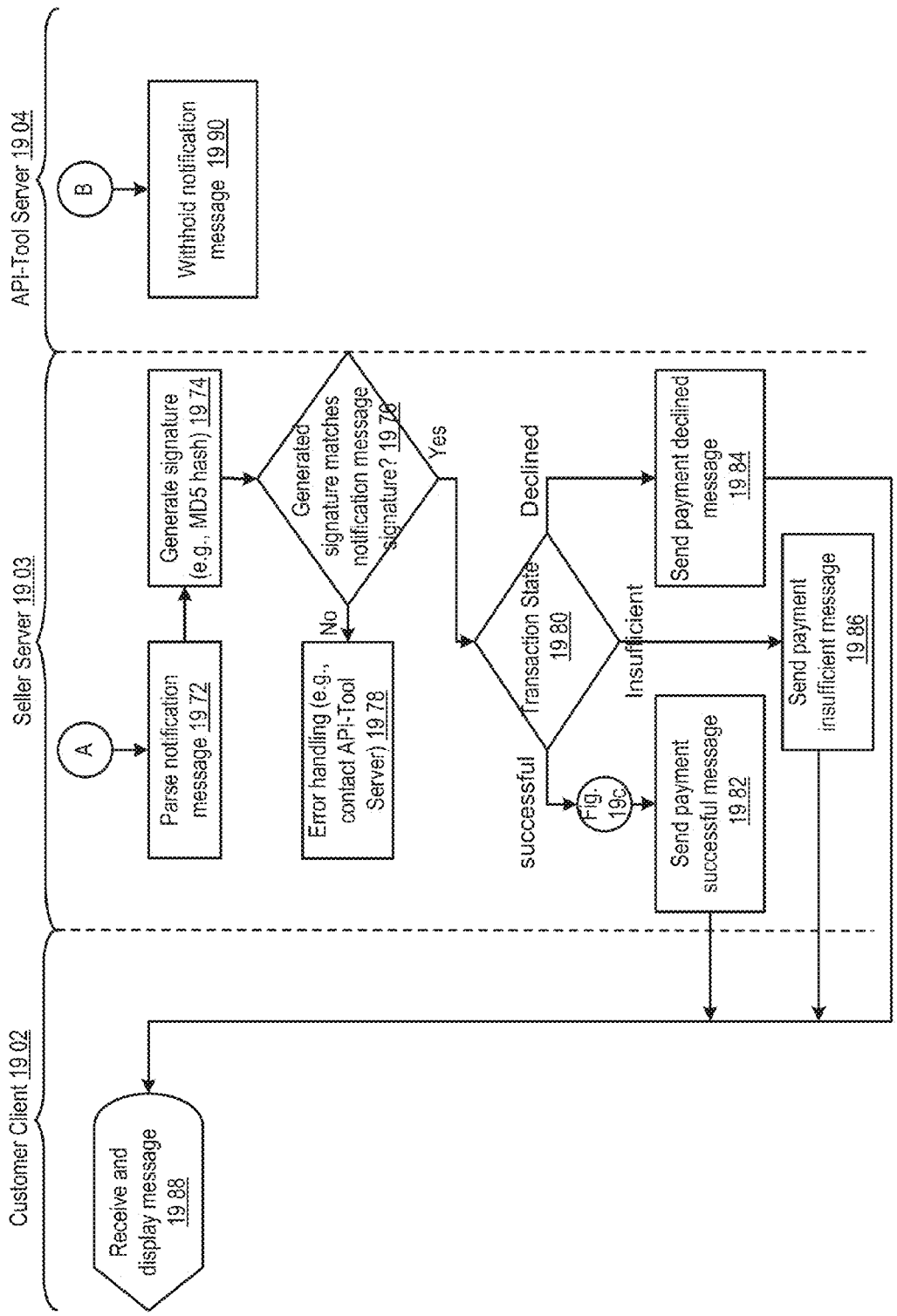

FIGS. 19*a-b* show logic flow diagrams illustrating dynamically generated widget purchase in some embodiments of the API-Tool. In one embodiment, a customer 1901 may initiate checkout of an item from a seller site at 1905. The checkout may be initiated by clicking or tapping on a buy widget using a customer client 1902. The click on the buy widget may generate a request for a payment application (e.g., a lightbox) at 1910 from seller server(s) 1903. At 1915, the seller server(s) 1903 may receive the request and may provide the requested payment application to the customer client 1902 at 1915. The customer client 1902 may display the payment application at 1920. When the payment application is displayed on the customer client 1902, the customer 1901 may enter payment information in one or more fields of the payment application at 1925. Credit card information, billing address, and/or the like may be provided by the customer to complete purchase. The customer client may then take the customer payment information and generate a purchase request at 1930. The purchase request may then be sent to the seller server(s), which may generate a purchase authorization request and send the request to the API-Tool server(s) 1904 at 1935. The API-Tool server(s) may receive the purchase authorization request at 1940, and may invoke a purchase transaction authorization component at 1945.

Some embodiments of the API-Tool platform may handle notifications and callbacks. The notifications and callbacks may facilitate customization of payment experience, data collection and a better user experience. Notifications may be available from the API-Tool platform for each transaction. There are multiple options for receiving a notification. One of these options are callback functions. Some of the callback methods are discussed in further detail below.

At 1950 the API-Tool server(s) may determine whether a postback URL has been specified by the seller. If a postback URL has been specified, the API-Tool server(s) may generate and send a notification message at 1955. The notification message may be received at 1960 by the seller server(s). Upon receiving the notification message, the seller server(s) may send an acknowledgement back to the API-Tool server(s) at 1965 to confirm receipt of the message. In some implementations, the API-Tool server(s) may resend the notification message a finite number of times until an acknowledgement is received. If the seller has not set up a postback URL, the API-Tool server may not be able to communicate any notifications to the seller, and the notification may be withheld at 1990.

After receiving the notification message at 1960, the example logic flow of FIG. 19*a* continues at FIG. 19*b*, where the seller server(s) parses the notification message at 1972 to extract fields of information including a signature in the notification message. At 1974, the seller server(s) may generate a signature key in the same way the API-Tool generated the signature key in the notification message. At 1976, the two signatures are compared to determine if they match. If there is no match, error handling processes may be invoked at 1978. For example, the seller may need to contact the API-Tool server(s) to resolve the issue. On the other hand, if the two signature keys match, the notification message is authenticated. At 1980, the seller server(s) may determine the state of the transaction by examining the parsed notification message. When the transaction state is insufficient or declined, messages 1986 and 1984 respectively may be sent to the client device for display. If the transaction state in the message is successful, the logic flow may continue with respect to FIG. 19*c*.

Figure 19C:
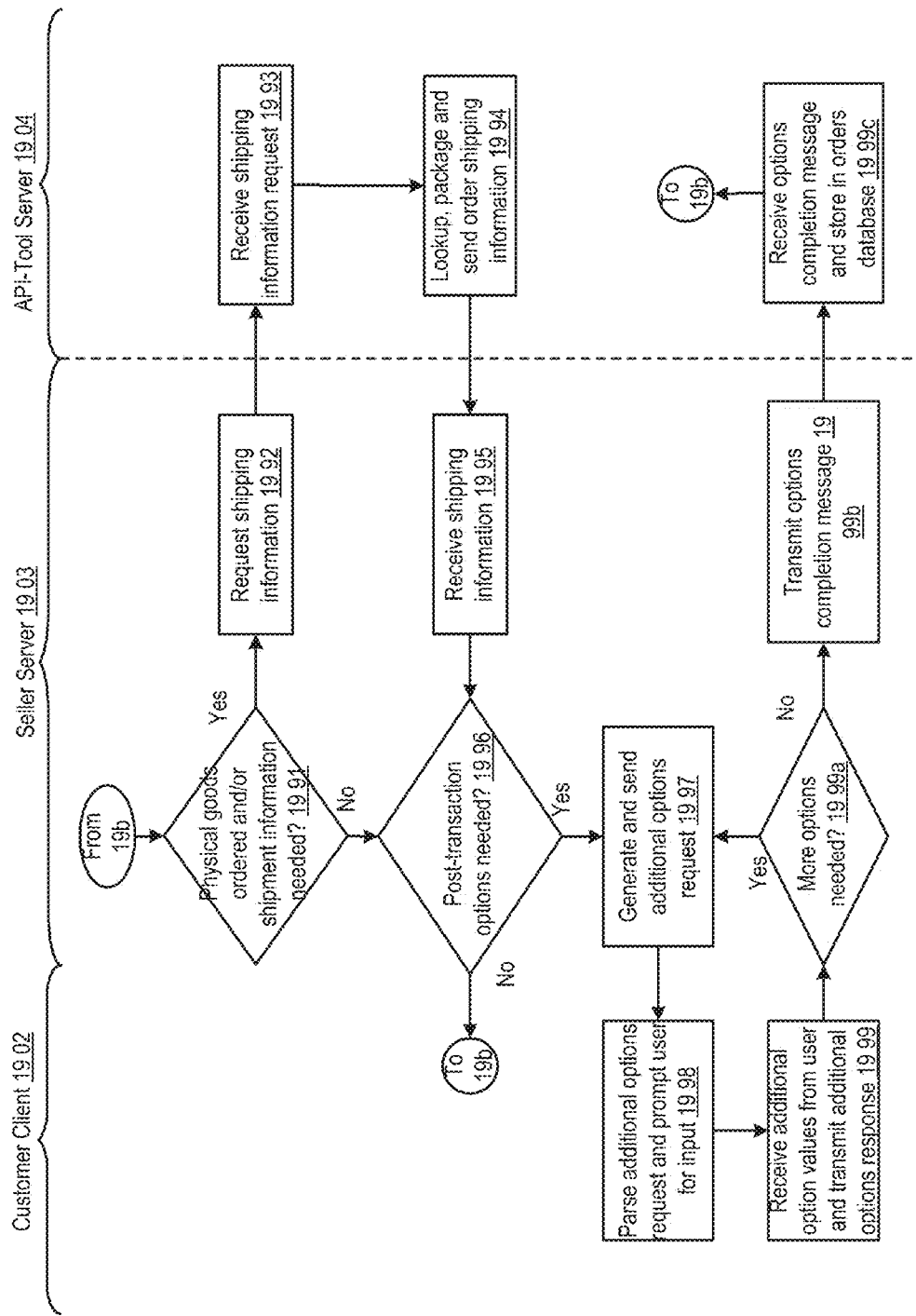

With respect to FIG. 19C, the seller server may determine if the goods that have been ordered are physical goods or goods that may require the seller to retrieve a shipping address. An example of physical goods may be a DVD player, a product delivered by a commercial carrier such as UPS or FedEx, a hand delivered product such as a gift basket, and/or the like. If physical goods are being ordered, the seller server 1903 may poll the API-Tool server 1904 for shipping information. For example, the seller server 1903 may issue a request for shipping information, e.g., 1992. In one embodiment, the shipping information request 1992 may be in the form of a web services call, such as SOAP, XML-RPC, or REST. An example shipping information request 1992, substantially in the form of an HTTP(S) POST message including XML-formatted data, is provided below:

```
POST /shipping_info_request.php HTTP/1.1
Host: www.server.com
Content-Type: Application/XML
Content-Length: 667
<?XML version = "1.0" encoding = "UTF-8"?>
<transaction_detail_request>
    <paytxnid>6565E324756</paytxnid>
    <adminid>7643</adminid>
</transaction_detail_request>
```

In one embodiment, the API-Tool server will then receive the shipping information request, e.g., 1993. The API-Tool server 1904 may send the shipping information request to a third-party server for processing or may process the request locally. For example, the API-Tool server may extract the identifier specifying the order for which shipping information is requested, e.g., paytxnid and/or the like, or may lookup the order in an orders database using session information and/or the like. The API-Tool server may then reply to the seller server with shipping information for the order, and/or other information available about the order. In one embodiment, shipping information is not requested and instead other information about an order processed at the API-Tool server or elsewhere is requested. For example, user information, session information, product information, and/or the like may be requested. In one embodiment, the response from the API-Tool server may be sent to the seller server 1903. An example shipping information response, e.g., 1994, 1995, substantially in the form of an HTTP(S) POST message including XML-formatted data, is provided below:

```
POST /response.php HTTP/1.1
Host: www.server.com
Content-Type: Application/XML
Content-Length: 667
<?XML version = "1.0" encoding = "UTF-8"?>
<transaction_detail_response>
    <status>CAPTURED</status>
    <call-id>114564353</call-id>
    <paytxnid>101440637</paytxnid>
    <amount>49.95</amount>
    <currency>USD</currency>
    <products>
        <product>
            <product-id>1234</product-id>
            <product-descrp>Sony DVD Player</product-descrp>
        </product>
        <product>
            <product-id>5478</product-id>
            <product-descrp>14-inch Tablet PC</product-descrp>
        </product>
        <product>
            ...
        </product>
    </products>
    <state-of-transaction>NY</state-of-transaction>
    <reconciliation-id>54874</reconciliation-id>
    <amount_detail>
        <amount>49.95</amount>
        <shipping>5.95</shipping>
        <handling>2.00</handling>
        <shippingHandling>7.95</shippingHandling>
        <tax>8.52</tax>
    </amount_detail>
    <shipping_detail>
        <shipment>
            <products_to_ship_here qty=2>
                <product>
                    <product-id>1234</product-id>
                    <product-descrp>Sony DVD
                        Player</product-descrp>
                </product>
                <product>
                    <product-id>5478</product-id>
                    <product-descrip>14-inch Tablet
                        PC</product-descrip>
                </product>
            </products_to_ship_here>
            <addressLine1>500 Main St.</addressLine1>
            <addressLine2>Apt 2A</addressLine2>
            <addressLine3></addressLine3>
            <city>Anytown</city>
            <state>FL</state>
            <postalCode>45784</postalCode>
            <stateProvinceCode>12</stateProvinceCode>
        </shippment>
        <shippment>
            ...
        </shippment>
    </shipping_detail>
    <payment_detail>
        <type>credit_card</type>
        <brand>VISA</brand>
        <pan4>7645</pan4>
        <bin6>547645</bin6>
        <expiration_month>05</expiration_month>
        <expiration_year>2020</expiration_year>
        <avs_response_code>300 - Approved</avs_response_code>
        <psp_ref_id>54874</psp_ref_id>
    </payment_detail>
    <risk_detail>
        <risk_level>Medium</risk_level>
        <risk_advice>
            <advice>Verify signature</advice>
            <advice>Collect drivers license number</advice>
        </risk_advice>
    </risk_detail>
    <partial_billing_details>
        <cardholder_name>John Consumer</cardholder_name>
        <billing_city>Anytown</billing_city>
        <billing_state>FL</billing_state>
        <billing_phone>7184587452</billing_phone>
    </partial_billing_details>
    <full_billing_details>
        <cardholder_name>John Consumer</cardholder_name>
        <billing_addr1>500 Main St.</billing_addr1>
        <billing_addr2>Apt 2A</billing_addr2>
        <billing_city>Anytown</billing_city>
        <billing_state>FL</billing_state>
        <billing_phone>7184587452</billing_phone>
    </full_billing_details>
</transaction_detail_response>
```

In one embodiment, the seller server 1903 may then determine that additional transaction options are needed, e.g., 1996. Additional transaction options may be additional shipping options such as express shipping or bulk-rate, the use of a pre-paid card for a partial or full payment, additional shipping detail such as an apartment number, and/or the like. If no additional transaction options are needed, the logic flow may continue with respect to FIG. 19*b*.

If additional transaction options are needed, e.g., 1996, then a request from the seller server may be sent to the customer client 1902 to request the additional options. An example additional options request 1997, substantially in the form of an HTTP(S) POST message including XML-formatted data, is provided below:

```
POST /request.php HTTP/1.1
Host: www.server.com
Content-Type: Application/XML
Content-Length: 667
<?XML version = "1.0" encoding = "UTF-8"?>
<additional_options_request>
    <timestamp>2020-12-12 15:22:43</timestamp>
    <session_id>1e987543578643356</session_id>
    <options_requested>
        <option required=true>
            <id>shipping_options</id>
            <type>shipping</type>
            <values>
                <option>Express Shipping</option>
                <option>Flat Rate Shipping</option>
                <option>Ground</option>
            </values>
            <validation_code>
                <!--inline code returned, e.g., js, for validation -->
                <script>
                    var shipping = null;
                    if (document.popup.shipping == null)
                        alert("Please input shipping");
                    else shipping = document.popup.shipping;
                </script>
```

```
            </validation_code>
        </option>
        <option required=false>
            <id>gift_wrapping</id>
            <type>up_sell</type>
            <values>
                <option>Yes</option>
                <option>No</option>
            </values>
        </option>
        <option>
            ...
        </option>
    </options_requested>
</additional_options_request>
```

The customer client 1902 may then receive the additional options request 1997 and present the options to the user for input, e.g., 1998. For example, the customer client 1902 may display a "pop up" to the user indicating that additional options are required or optional for their order and request the appropriate input. In one embodiment, the additional options request 1997 may contain inline logic such as JavaScript or the like that will be executed by the customer client. In doing so, the seller server may collect very complex input from the user without a page reload. If additional options are needed, e.g., 1999a, the process outlined above may repeat. If no additional options are required, the seller server 1903 may transmit an options completion message to API-Tool server 1904, e.g., 1999b, indicating that all additional options have been collected. In one embodiment, no message is sent to the API-Tool server. The API-Tool server may then, in one embodiment, note that the additional options have been received. In one example, the API-Tool server 1904 may receive the options for storage or later retrieval, e.g., 1999c. The logic flow may then continue with respect to FIG. 19b.

Continuing the logic flow with respect to FIG. 19b, the seller server(s) may send a payment successful message at 1982 for display at the client device at 1988.

As discussed before, the API-Tool platform supports notifications and callbacks. One way of receiving notifications is via JavaScript implemented callback functions. In some implementations, callback functions are optional for setting up and running the API-Tool. Callback functions facilitate customization of the payment experience by collecting relevant data and/or make the experience more powerful using a JavaScript event handler function. Using the data returned from the API-Tool platform, a developer may code the JavaScript event handler in a page to read any data returned by the callback and display it, log it, or take an action based on it. Additionally, developers may present a customized action such as, for example, an offer to a user if the user buy a product now. This type of callback uses a front end push mechanism. Example returned event types that may be handled with the callback functions are provided below:

| Debit Event Type | Description |
| --- | --- |
| debit.init | Always fires. For example, every time a call is made, there is a debit API in the background. The JSON object returns the call id, a transaction id, user token, and/or user id. |
| debit.success | Fires when the amount was successfully debited from the user's account. In other words, the payment was made. |
| debit.cancel | Fires when the Cancel button is clicked in the lightbox. |
| debit.fail | Fires when the payment fails. |

An example code portion including a developer created callback function called handleVmeEvents is shown below. The callback function is triggered in the buy button tag using the callback parameter. The function name is created by the developer, with the only requirement being that it match the value of the callback parameter in the V.me buy button tag.

```
<html>
<head>
<script type="text/javascript">
handleVmeEvents = function(eventType,data){
    var MerchantTrans = data.merchTrans;
    if (eventType == "debit.success"){
        alert ( msg );
        mywindow = window.open
("./checkyourorder.php?merchTrans=" + MerchantTrans,"Check your
Order ID","width=400,height=300");
        mywindow.moveTo(300,300);
    }
}
</script>
</head>
<body>
<div id="v-root"></div>
<v:buy apikey = "CG6KBNNKJ5ZSSJC5XTEX"
    token = "eeeeb512b710d0fde173eff8b411ec01"
    amount = "100"
    currency = "USD"
    product-id = "sku29995"
    product-desc = "10 Items, sku: 29995"
    callback = "handleVmeEvents">
</v:buy>
```

The API-Tool platform may also support back end push notifications in some embodiments. This may be a mandatory server-to-server communication that sends notifications regarding payment events. The Postback URL for this exchange may be configured during the seller on-boarding process. Back-end notifications are automatically sent from API-Tool back-end servers to the seller's back-end servers when the seller's customer makes a payment using the v:buy button tag. To confirm the communication, the API-Tool server(s) expects an acknowledgement back from the seller's server. If the notification is not received, there is an exponentially increasing time between a decreasing number of retries, and eventually it is abandoned. The seller may use the developer console to specify the following configuration parameters that the API-Tool servers may use to send back-end notifications to the seller's servers:

| Parameter | Description |
| --- | --- |
| Postback URL | Back-end notifications are sent to the URL specified by the seller. V.me may not send back-end notifications if the seller has not specified a back-end URL. |
| Postback Method | POST or GET |
| Postback Contenttype | (Only if Postback Method is POST) JSON or XML |

An example back-end notification message sent from the API-Tool back-end server to a seller's back-end server using the POST method in JSON format is provided below.

```
{   "apikey" : "JZ5K6DNHY2JEUSBUE3Y8",
    "token" : "aDsL5kJfh8kyWei8UrYk0cmNbatQldy",
    "userid" : "testuser",
    "callId" : "101830367",
    "type" : "DEBIT",
    "status" : "200",
    "state" : "PROCESSED",
    "product-id" : "sku28756",
    "productDesc" : "Item",
    "amount" : "1000",
    "currency" : "USD"
    "merchTrans" : "129446-832362-389",
    "signature" : "acTf73f590425Bc8913P6a7b9dIb4c26",
}
```

As discussed with respect to FIG. 19b, example values of the "state" field may include "processed," "declined," or "insufficient" based on the type of activity. In some implementations, the value of the signature key in the notification message above may be the MD5 hash of the ordered concatenated string of the shared secret key and values of certain keys in the message as illustrated by the following pseudocode:

```
signature = md5(shared secret key + userid + amount + currency +
    callId + merchTrans + product-id)
```

In some implementations, the responsibility to recreate the notification message's signature and compare it to the signature in the notification message that was sent from the API-Tool server(s) may reside with the seller. If the signatures are not an exact match, the seller may need to contact API-Tool server(s)/contact immediately to determine the reason for the mismatch.

An example back-end notification message sent from the API-Tool back-end servers to a seller's back-end servers using the POST method in XML format is shown below.

```
<notification-payload>
    <apikey>JZ5K6DNHY2JEUSBUE3Y8</apikey>
    <token>aDsL5kJfh8kyWei8UrYk0cmNbatQldy</token>
    <userid>testuser</userid>
    <call-id>101830367</call-id>
    <type>DEBIT</type>
    <status>200</status>
    <state>PROCESSED</state>
    <product-id>sku28756</product-id>
    <product-desc>Item</product-desc>
    <amount>1000</amount>
    <currency>USD</currency>
    <merch-trans>129446-832362-389</merch-trans>
    <signature>acTf73f590425Bc8913P6a7b9dIb4c26</signature>
</notification-payload>
```

An example back-end notification message sent from the API-Tool back-end servers to a seller's back-end servers using a non-browser based GET method is shown below.

```
apikey=JZ5K6DNHY2JEUSBUE3Y8&token=
aDsL5kJfh8kyWei8UrYk0cmNbatQldy&userid=testuser&callid=
101830367&type=DEBIT&status=200&state=PROCESSED
&product-id=sku28756&productdesc=Item&amount=
1000¤cy=USD&merchtrans=129446-832362-389&signature=
acTf73f590425Bc8913P6a7b9dIb4c26
```

In some implementations, the notifications that are pushed from API-Tool server(s) to the seller can be pulled at will by the seller from the same API used by API-Tool server(s). The pull at will facility may allow the developer the freedom to choose when to view information on a transaction. The API-Tool server(s) may automatically call the getStatus API for debit events when users purchase something using the buy button. In some implementations, a GET request method for making the call may follow the following syntax:

```
<UltimatePayServerURL>wallet/api/getStatus?callid=
{callid}&callno={callno}&apikey={apikey}&token>=
{user token}&userid={User id}
```

An example request using the syntax above is shown below.

```
http://server1.sitename.com/wallet/api/getStatus?callid=100006&callno=
1&apikey=1&token=u:c6a5941420cf4cc12486abe8e09a8299&userid=
JohnDoe
```

The API-Tool server(s) may then send this data to sellers via a POST message in XML format. An exemplary POST message substantially in XML format is shown below.

```
<?xml version="1.0" encoding="UTF-8"?>
<activity>
    <apikey>ksdlkjdf7asdkk3dADT9I8jj5</apikey>
    <token>al3kjdfdkf844WNlkjadfl7kjf939038aUkljd</token>
    <userid>JohnDoe</userid>
    <call-id>3</call-id>
    <type>DEBIT</type>
    <status>200</status>
    <state>PROCESSED</state>
    <product-id>sku744932</product-id>
    <product-desc>Item</product-desc>
    <merch-trans>567456-456456-544</merch-trans>
    <signature>1dec14a5c5c417f69cbd3d30a474519c</signature>
    <transaction>
        <amount>50</amount>
        <currency>USD</currency>
    </transaction>
</activity>
```

Sellers may then parse these messages and handle message data. In some other implementations, sellers may proactively call the getStatus API in case the purchase data does not reach them for some reason.

An example code illustrating various tags, including root tag, initialize tag, buy button tag, JavaScript SDK tag and callback function implemented in JavaScript is shown below.

```
<html>
<head>
<script type="text/javascript">
handleVmeEvents = function(eventType,data) {
    var MerchantTrans = data.merchTrans;
    var ProductID = data.product-id;
    if (eventType == "payment.success") {
        var msg = "Payment Succeeded " + ProductID + "Order id "
+ MerchantTrans; alert (msg); }
}
</script>
</head>
<body>
<div id="v-root"></div>
<v:init
    apikey = "RGDJIXJW3U63WTCX3PS0"
    token = "98fef8ac38289318a7a4cb661f9fa0d1"
    userId = "JohnDoe"
    callback = "handleVmeEvents">
```

-continued

```
</v:init>
<h3> Welcome to Bill's Jewelries Site! Purchase content here!</h3>
<table width="415" border="1" width="50" height="50">
<tr><td>Order ID: 1234 , 10 Items, SKU: 29995</td>
<td style=text-align:right>
<b style=font-size:2em>10 Items</b>
<v:buy
    apikey = "CG6KBNNKJ5ZSSJC5XTEX"
    token = "eeeeb512b710d0fde173eff8b411ec01"
    amount = "100"
    currency = "USD"
    product-id = "sku29995"
    product-desc = "Item, sku: 29995"
    callback = "handleVmeEvents">
</v:buy>
</td></tr>
<br><br>
<script type="text/javascript" src="http://sandbox-static.v.me/js/1/v-widgets.js">
</script>
</body>
</html>
```

Figure 20C:
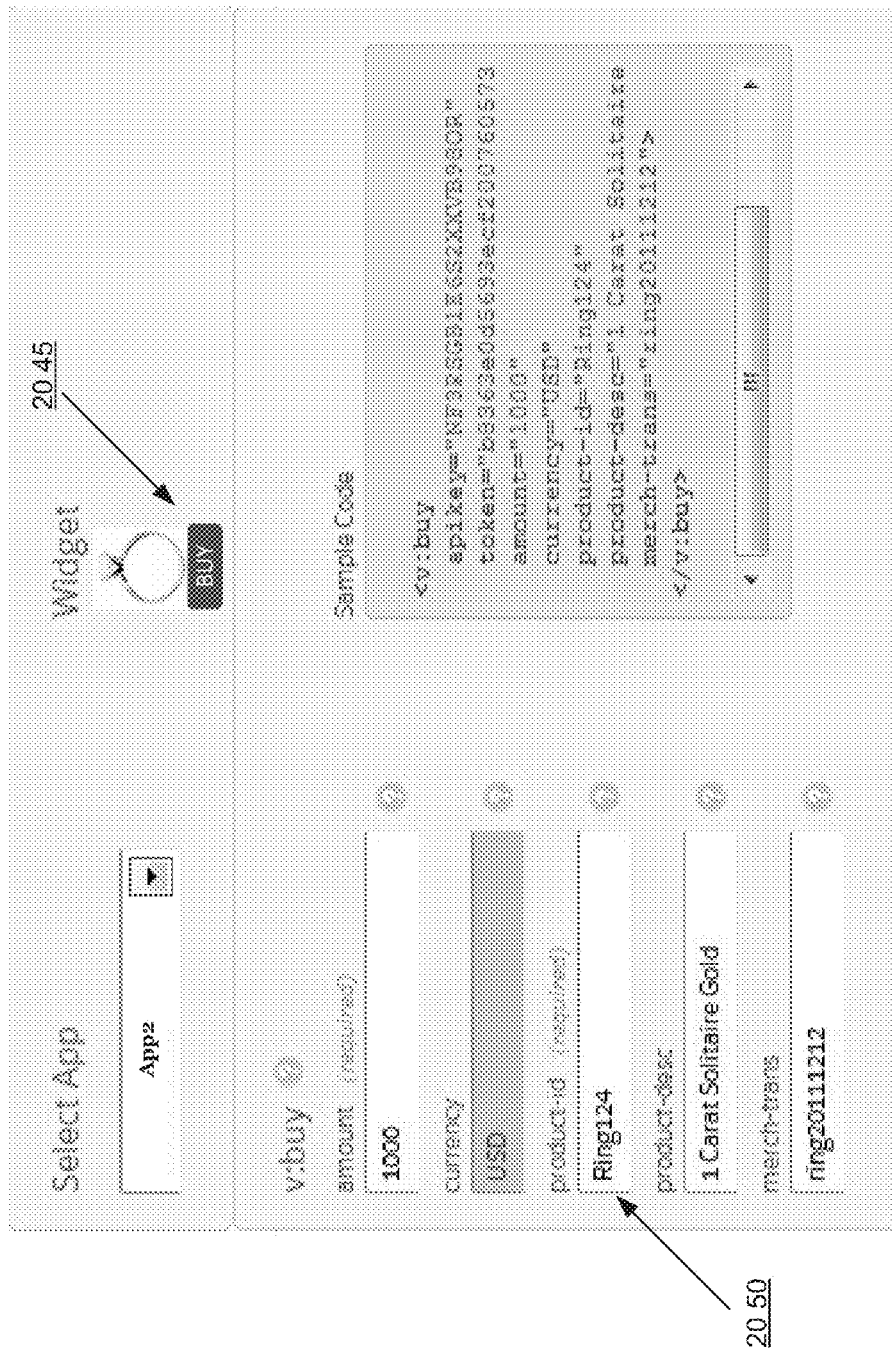

FIGS. 20a-c show screen shots illustrating example widgets generated via a test tool in some embodiments of the API-Tool. An example test tool web page 2005 is shown in FIG. 20a. The test tool web page includes a series of fields for selecting an application and entering values for v:init tag 2015 and v:buy tag 2020. Next to the fields for each tag are corresponding sample code snippets generated on the fly based on the user provided inputs in the fields. The buy widget 2010, in this example, may be a default widget that is not customized. When a user clicks on the buy widget, a lightbox 2030 is displayed. The lightbox 2030 is customized based on user inputs. For example, the image 2025 on the lightbox corresponds to the image in the logo-url specified in the v:init tag 2015. Similarly, the product description "easter egg" corresponds to the product description in the product-desc field of the v:buy tag 2020.

In some embodiments, the seller may have the option to customize the widget. For example, FIG. 20b shows an example App1 where, a widget logo-url 2040 is specified. The corresponding code then dynamically generates a widget 2035 having the image specified by the widget logo-url 2040. As another example, the widget 2045 shown in FIG. 20C is dynamically generated and customized based on the product-id code in the v:buy tag, e.g., 2050. Information such as text (e.g., "buy" or "Get it"), shape and/or color may also be specified in the various tags to dynamically generate customized or personalized buy widgets.

FIGS. 21a-d show example user interfaces of a widget code generator in one embodiment of the API-Tool. An example user interface showing a widget code generator with integrated testing is show in FIG. 21a. In one embodiment, code is provided by the widget generator for copy/paste into a seller's web page code (e.g., HTML, PHP, and/or the like). Some of the code, e.g., 2101, is provided for pasting near the "body" tags within the seller's site code and may not vary with respect to the other options of the widget code generator. In one embodiment, the options selected in the widget code generator will cause the v:init code, e.g., 2101, and/or the sample code to automatically change when you update widget parameters using the widget controls, e.g., 2102-2107 and/or the like.

In one embodiment, a seller may enter an amount to be charged for an item, e.g., 2102, a currency, e.g., 2103, and/or a product identifier, e.g., 2104. In some embodiments, a merchant transaction code (e.g., an order number, customer code, transaction identifier, seller identifier, and/or the like) may be entered, e.g., 2105. Options for whether the widget should collect shipping, e.g., 2106, and/or when a transaction should be processed, e.g., 2107, may also be collected. In one embodiment, some of the fields may be pre-populated based on a seller's profile, previous use of the code generator, selling history, and/or the like.

In one embodiment, the options entered into the widget may be saved for later use, e.g., 2110. In doing so, a seller may quickly generate new widget code for rapid integration into their web site code. In some embodiments, the skin of the widget that the provided code will generate may be customized through the code generator, e.g., 2108. For example, a seller may click button 2108 to input options. As a result, in one embodiment, a custom widget skin may be made available to the seller and the widget code may be updated to note the widget skin to display, e.g., 2109. In another embodiment, the widget skin customizations may be stored on the API-Tool server and therefore not affect the displayed code, e.g., 2109. Further detail with respect to widget skin customization can be found herein and particularly with respect to FIG. 21b. In one embodiment, the user may be given an option within the widget generator to generate numerous widgets in bulk, e.g., 2111. Further detail with respect to bulk widget generation can be found herein and particularly with respect to FIG. 21C.

Figure 21B:
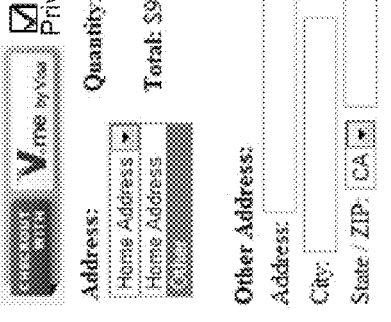

FIG. 21b is an example user interface depicting widget skin customization in one embodiment of the API-Tool. In one embodiment, a pop-up may be presented to the seller after the seller indicates that they wish to customize the widget skin. For example, a seller may click a button, e.g., 2108, and be presented with a pop-up widget skin customization interface, e.g., 2112. In one embodiment, the seller may customize the background color of the widget to, for example, better match the background of the seller's site, e.g., 2113. The seller may also, in one embodiment, add a logo file to the widget by providing a URL to a logo file, e.g., 2114. In another embodiment, the user may upload the logo directly to the API-Tool server from the interface 2112 by way of a file upload control (e.g., HTML inline file upload, Flash file upload, and/or the like).

In one embodiment, the seller may check options to add badges to the widget, e.g., 2116. A badge is a textual or visual enhancement that is added near, on top of, overlapping the main widget body, and/or the like. A badge may be used to indicate that a seller has additional capabilities, accepts certain payment types, allows the consumer to split a bill with a friend, is privacy enhanced, offers credit, and/or the like. In one embodiment, the preview of the widget may be updated in real-time to show the badge(s) that a seller has selected. Additionally, in one embodiment, other options may influence the rendering of the badge with the widget. For example, a widget background color, e.g., 2113, may also be applied to a widget badge, e.g., 2116.

In one embodiment, the seller may specify additional run-time widget options. These options will cause the code generator to inject additional code into the generated widget code that will enable additional widget features. For example, in one embodiment, the widget code may be modified to allow the calculation of shipping/handling and/or tax, e.g., 2116a. In another embodiment, the seller may select an option to have the widget prompt the user for a quantity amount, e.g., 2116b. Optionally, the user may also specify a minimum and maximum amount, which will be validated by the widget prior to or after launching the lightbox. Other fields may also be dynamically loaded into the widget. In one embodiment, shipping information may be already stored in a consumer's v.me account and the seller may desire to have the dynamically generated widget display an address drop down, e.g., 2116*c*. In still another embodiment, address information may be stored on a third-party server, such as a seller's server. A seller may provide access to their or another server for the purpose of retrieving a consumer's address or other information at the time of widget rendering. In one embodiment, the preview widget, e.g., 2116*d*, may additionally display a quantity field when a seller indicates that a quantity should be displayed. Additionally, a total transaction cost may be calculated automatically based on the quantity selected, e.g., 2116*e*. In some embodiments, the widget's calculation of total cost may be modified by the address information selected within the widget, such address information being optionally automatically loaded from a virtual wallet (e.g., v.me and/or the like) or third party server via a dynamic link, e.g., 2116*c*, the quantity of item selected, tax costs, shipping costs, VAT costs, price changes, real-time commodity prices, and/or the like.

In one embodiment, as the seller selects options within the widget skin customization screen, e.g., 2112, a preview of the widget as it would appear on the seller's commerce site may appear within the interface, e.g., 2116*d*. In doing so, the seller may see in real-time the effect of their widget customization options and may make both design and content decisions that would provide an optimal user experience. Additionally, in one embodiment, the preview widget may be live and capable of performing a transaction.

FIG. 21C is an example user interface depicting bulk widget generation in one embodiment of the API-Tool. In one embodiment, a pop-up may be presented to the seller after the seller indicates that they wish to bulk generate widgets. For example, a seller may click a button, e.g., 2111, and be presented with a pop-up bulk widget generation interface, e.g., 2117. In one embodiment, a seller may upload a file, e.g., 2118, that contains data records to be used in bulk widget generation. Example file formats suitable for this purpose are Excel (.xls, and/or the like), Access (.dbf, and/or the like), or a flat file (e.g., comma-separated, tab-separated, and/or the like). Once uploaded, e.g., 2119, fields may be extracted from the file (such as by using COM integration within or in conjunction with MS Excel, flat-file reading, and/or the like), e.g., 2120. Fields required for widget generation, e.g., 2120, may be displayed to the seller along with an option to choose a field from the uploaded file that matches the field. The names of the required fields and the selected fields need not match. In one embodiment, a default override value option, e.g., 2121, may be provided to the seller. By inputting a value in the default override, the value of the field in widget generation will be dictated by the default field and not by a value in the uploaded file. In one embodiment, the user may specify a null value as a default override, e.g., 2122. In another embodiment, only valid values for a field may be presented to the user as a default override, e.g., 2124. Upon filling out all of the required information, the user may then indicate that they wish to bulk generate a widget code snippet for all of the entries in the uploaded data file, e.g., 2125.

In one embodiment, the API-Tool server will receive the bulk widget generation options and will proceed to create the widget code as described herein. Each widget code may be stored in an Excel, database, or other suitable file. In one embodiment, the bulk generated widget code may be automatically uploaded to a seller's web site server. For example, the seller may designate a template file on their server which has a placeholder suitable for replacement by the bulk widget generator. For example, the template may contain code such as:

```
<!-- BULK WIDGET TEMPLATE SNIP START -->
BULK_WIDGET_REPLACEMENT($PRODUCT_ID)
<!-- BULK WIDGET TEMPLATE SNAP END -->
```

In one embodiment, the bulk widget generation, e.g., 2125, may then copy the template file to another location on the seller's server and replace the appropriate section of the template file with the generated widget code. In order to facilitate this operation, the seller may provide the API-Tool access to their server, such as by providing SFTP credentials, a shared key, and/or the like.

FIG. 21*d* is an example user interface depicting a widget code generator with dynamic content retrieval, in one embodiment of the API-Tool. In some embodiments of the API-Tool, sellers may desire to integrate widget code into their web sites that allows one or more of the widget option values to vary and/or be changed at the time of widget generation. In one embodiment, the option may vary within a range. For example, a seller may desire to generate a widget that automatically updates the price for an item by polling a pricing database. Additionally, instead of being required to re-generate widget code (including a shs256 hashed token) every time an item's price changes, it may be more advantageous for the seller to specify a range of sale prices within which the widget should still accept the transaction. In one embodiment, a maximum amount, e.g., 2126, and a minimum amount, e.g., 2127) may be specified. A dynamic link, e.g., 2128, may also be specified by the seller. When polled, the link may return the current price of an item, such price optionally being within the range specified above. In so doing, the widget generator may generate a token that is not tied to a single price of an item, but rather is suitable for use with items of varying prices. Further detail regarding the generation of a token using a range of item cost amounts is provided with respect to FIG. 22.

FIG. 22*a* is an example logic flow depicting a widget code generator with dynamic content retrieval, e.g., DCR component 22000, in one embodiment of the API-Tool. In one embodiment, seller 2201 inputs the widget code generator parameters (e.g., currency, product id, merchant transaction value, collect shipping option, and/or the like). In one example, the widget code generator parameters contain a minimum amount and a maximum amount within which the item's cost may vary, e.g., 2204. In other embodiments, the variable portion of the widget code parameters may instead be the product identifier, merchant transaction value, and/or the like.

In one embodiment, the seller client 2202 may then send a request for widget code generation to the API-Tool server 2203, e.g., 2205. An example widget code generation request 2205, substantially in the form of an HTTP(S) POST message including XML-formatted data, is provided below:

```
POST /widget_code_request.php HTTP/1.1
Host: www.server.com
Content-Type: Application/XML
Content-Length: 667
<?XML version = "1.0" encoding = "UTF-8"?>
<widget_code_generation_request>
    <timestamp>2020-12-12 15:22:43</timestamp>
    <api_key>LAWQDLK</api_key>
    <max_amount>110.99</max_amount>
```

```
    <min_amount>95.99</min_amount>
    <product_id>CU8765</product_id>
    <merch_trans>987545</merch_trans>
    <collect_shipping value=true />
    <process_on>capture</process_on>
    <dynamic_data field="amount">
        <dyn_link>https://merc-serve/prod/?[productid]</dyn_link>
        <substitute value="product_id">[productid]</substitute>
        <request_method>GET</request_method>
        <return_type>JSON</return_type>
        <return_variable>price</return_variable>
    </dynamic_data>
</widget_code_generation_request>
```

The server may then extract the widget generator parameters, e.g., 2206, and determine if a dynamic cost amount has been provided, e.g., 2207. In one embodiment, the API-Tool server 2203 can determine if a dynamic cost amount has been specified by the presence of a minimum amount and maximum amount in the request for widget code generation, e.g., 2205 and/or the extracted values, e.g., 2206. In one embodiment, the API-Tool server then calculates a difference or range between the minimum amount and maximum amount, e.g., 2208. Then a floor value may be looked up in a dynamic cost database, e.g., 2209. An example listing, substantially in the form of PHP/SQL commands, for querying a dynamic database for a floor value is provided below:

```
<?PHP
header('Content-Type: text/plain');
mysql_connect("locaohost",$DBserver,$password); // access database server
mysql_select_db("dynamic_cost.sql"); // select database table to search
//create query for token arbitrators
$query = "SELECT floor_value FROM dynamic_cost WHERE minimum_amount > $min_amount AND maximum_amount − minimum_amount
< $range AND permissions LIKE '%' $user_permissions";
$result = mysql_query($query); // perform the search query
mysql_close("dynamic_cost.sql"); // close database access
?>
```

In one embodiment, the floor value is a value that is based on the minimum amount and the range between the minimum amount and maximum amount. In another embodiment, the floor value is based on only the range, only the maximum value, only the minimum value, and/or the like. In still other embodiments, the floor value is specified by a API-Tool server administrator based on business risk tollerance (e.g., the tollerance of the issuer for risk, the tolerance of the seller for risk, the size of the transaction, the history of the buyer, and/or the like). In one example, the determined floor value is then set equal to the amount, e.g., 2210.

In one embodiment, a token is generated that represents a unique combination of widget parameters. As described herein, one or more of the unique widget parameters (e.g., amount, and/or the like) may be representative of a range of acceptable values, one value, and/or the like. In one embodiment, a token is generated using an SHA256 hashing algorithm that hashes the string combination of a shared secret key, the amount calculated above or provided by the seller, the currency, a merchant transaction identifier and a product identifier, e.g., 2211. In other embodiments, the hash is generated using MD5, Whirlpool, Gost, Haval, and/or the like. An example hash command suitable for token generation, e.g., 2211, substantially in the form of PHP is provided below:

```
$token = "";
$token = hash('sha256', $shared_secret_key . $amount . $currency
. $merch_trans . $product_id);
```

In one embodiment, the generated token will then be placed in a widget code template, and other values in the template will be populated based on user inputs, values looked up, and/or the like, e.g., 2212. A widget code template is a widget code shell that may contain placeholders for the insertion of specific widget customization parameters. The widget code and/or the widget code template may then be further customized with respect to FIG. 22b.

FIG. 22b is an example logic flow of a widget code generator with dynamic content retrieval, in one embodiment of the API-Tool. In one embodiment, the API-Tool will determine if the seller has selected that the widget should load shipping information for a consumer from the v.me virtual wallet (see, e.g., FIG. 21b, 2116c), e.g., 2250. If the seller has chosen to have the widget load v.me shipping information dynamically, then additional code to dynamically load the shipping information into the widget at the time of rendering may be appended and/or inserted into the generated widget code, e.g., 2251. Example code, substantially in the form of JavaScript/jQuery, suitable for injection into the widget code for dynamic address retrieval is:

```
//wait until DOM has loaded to trigger dynamic address loading
//then load up the address information from remote
//server (v.me, etc.)
//and build a SELECT with content
<script language="JavaScript">
jQuery(document).ready(function($) {
    $.get(
        'https://www.v.me/',
        {doing: "get_shipping_addresses", seller_id: "1254874",
version: 5.1},
        function(response){
            //injection code begin
            inj_code = "<select name=shipping>";
            //for each returned address, create a dropdown menu item
            for(i=0; i<response.length; i++) {
                inj_code = inj_code + "<option>" + response[i] + "</option>";
            }
            //injection code end
            inj_code = inj_code + "</select>";
        },
        "json"
    );
});
</script>
```

In one embodiment, shipping information may be loaded from an external server, such as a third-party server, e.g., 2252. In some embodiments, the widget code generator may then require credential information (such as a username/password, shared key, fingerprint authentication, and/or the like) for the third-party server the seller has access to and may request that the seller client 2202 solicit this information from the seller, e.g., 2253.

In one embodiment, the seller client 2202 may parse the credential request and display a prompt to the seller 2201 for the credential information for the third-party shipping information server, e.g., 2254. The seller may then input the information directly into the widget code generator, e.g., 2255, or otherwise upload or store the information in a location accessible by the API-Tool server 2203. The seller client 2202 may then transmit the credentials to the API-Tool server, e.g., 2256. In one embodiment, the API-Tool server will then store the credentials in a credentials database in a secure format, such as by one-way cryptographically hashing the credential password, e.g., 2257. The API-Tool server may then append third-party server shipping lookup code to the generated widget code, e.g., 2258. Example code, substantially in the form of JavaScript/jQuery, suitable for injection into the widget code for third-party address retrieval is:

```
//wait until DOM has loaded to trigger dynamic address loading
//then load up the address information
//from remote server (v.me, etc.)
//and build a SELECT with content
<script language="JavaScript">
jQuery(document).ready(function($) {
    $.get(
        'https://www.third-party.com/?credential=87HASH654',
        {doing: "get_shipping_addresses",
            user_name: "shippingAccessUserName",
            password: "timeLimitedPassword"},
        function(response){
            //injection code begin
            inj_code = "<select name=shipping>";
            //for each returned address, create a dropdown menu item
            for(i=0; i<response.length; i++) {
                inj_code = inj_code + "<option>" + response[i] + "</option>";
            }
            //injection code end
            inj_code = inj_code + "</select>";
        },
        "json"
    );
});
</script>
```

In one embodiment, additional dynamic data may be loaded into the widget generator generated code, e.g. 2259 using code substantially similar to the appended code described herein. For example, default quantity information may be solicited from a costing server based on a consumer's past buying behavior and dynamic retrieval of same incorporated into the dynamically generated widget code. In one embodiment, the additional injected widget generation code may load items from a user's "wish list" at a merchant, facilitating low friction commerce opportunities via a seller based widget, e.g. 2260.

Returning to FIG. 22a, the widget code may then be set by the API-Tool server 2203 to the seller client 2202, e.g., 2213. An example widget code generation response, e.g. 2213, substantially in the form of an HTTP(S) POST message including XML-formatted data, is provided below:

```
POST /widget_code_response.php HTTP/1.1
Host: www.server.com
Content-Type: Application/XML
Content-Length: 667
<?XML version = "1.0" encoding = "UTF-8"?>
<widget_code_response>
    <timestamp>2020-12-12 15:22:43</timestamp>
    <api_key>LAWQDLK</api_key>
    <code content_type="Javascript / HTML 5.0">
        <v:buy
            apikey = "L3AWQDLKBHYCE2XO5"
            token = "7643245f59a654654"
            dynamic_amount = "https://merch-serve/prod/?[product_id]"
            dynamic_method="POST"
            product-id = "Testproduct1"
            merch-trans = ""
```

-continued

```
            collect-shipping = "true"
            process = "validate">
        </v:buy>
        <script language="JavaScript">
            jQuery(document).ready(function($) {
                //dynamic shipping code, e.g., 2258
            }
        </script>
    </code>
</widget_code_response>
```

The seller client 2202 may receive and display the widget code, e.g., 2214. In one embodiment, the seller may then copy and paste the generated widget code from the widget generator into their web site code (e.g., HTML, PHP code, and/or the like), e.g., 2215. The seller's web site code containing the generated widget code may then be deployed to the sellers server (e.g., by SFTP upload, using shared keys, using a live WYSIWYG code editor, and/or the like). In one embodiment the widget code generator generation step is performed by the seller's server, seller client 2202 (such as dynamically generating the widget code directly using JavaScript, and/or the like), the seller 2201 (such as by manually inserting the appropriate widget code and calculating the token), and/or the like.

API-Tool Controller

Figure 23:
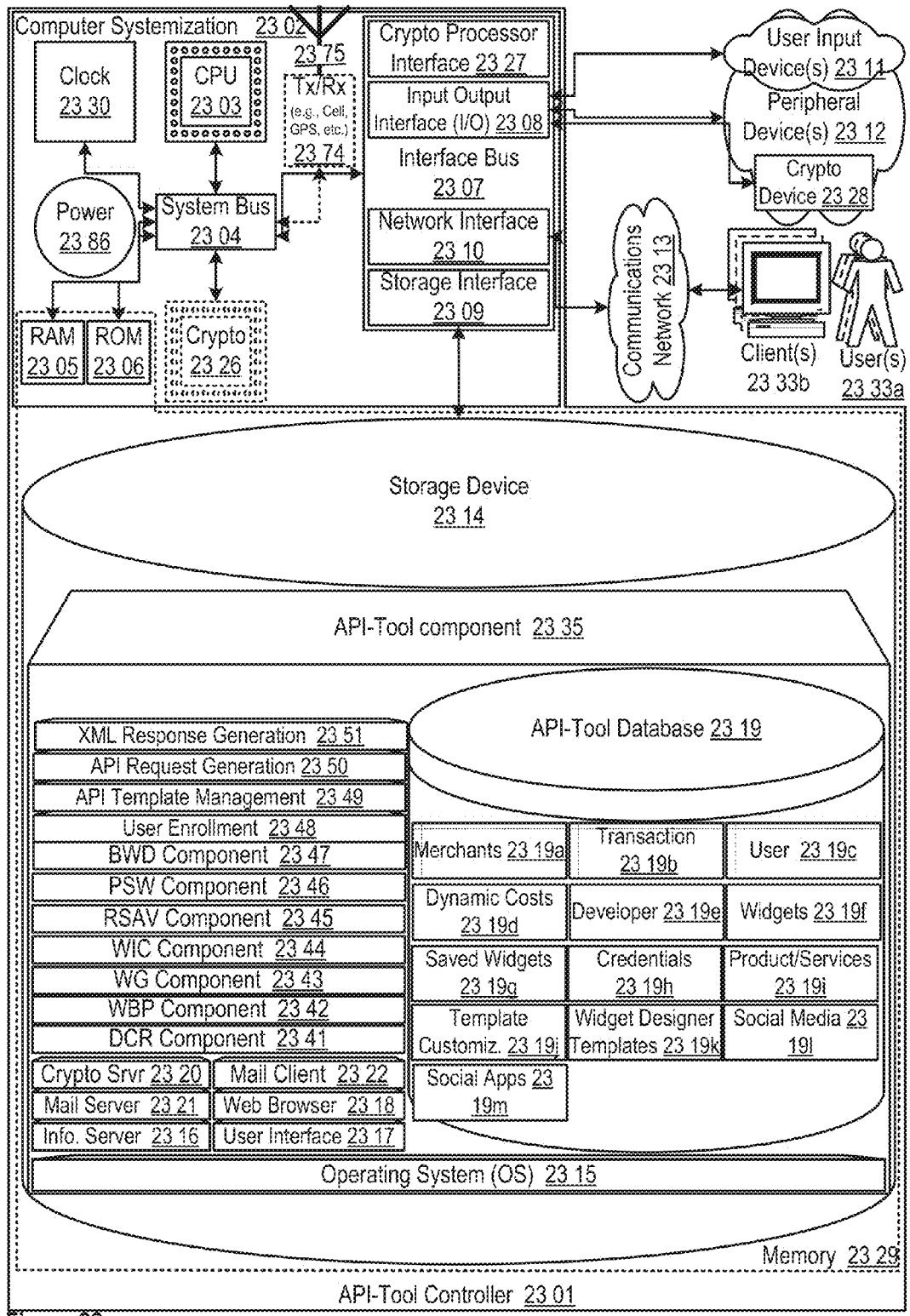
FIG. 23 shows a block diagram illustrating aspects of an exemplary embodiment of a API-Tool user interface controller, in one implementation of the API-Tool operation.

FIG. 23 shows a block diagram illustrating embodiments of a API-Tool controller. In this embodiment, the API-Tool controller 2301 may serve to aggregate, process, store, search, serve, identify, instruct, generate, match, and/or facilitate interactions with a computer through various technologies, and/or other related data.

Typically, users, which may be people and/or other systems, may engage information technology systems (e.g., computers) to facilitate information processing. In turn, computers employ processors to process information; such processors 2303 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 2329 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program.

These information technology systems provide interfaces that allow users to access and operate various system components.

In one embodiment, the API-Tool controller 2301 may be connected to and/or communicate with entities such as, but not limited to: one or more users from user input devices 2311; peripheral devices 2312; an optional cryptographic processor device 2328; and/or a communications network 2313.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The API-Tool controller 2301 may be based on computer systems that may comprise, but are not limited to, components such as: a computer systemization 2302 connected to memory 2329.

Computer Systemization

A computer systemization 2302 may comprise a clock 233o, central processing unit ("CPU(s)" and/or "processor(s)" (these terms are used interchangeable throughout the disclosure unless noted to the contrary)) 2303, a memory 2329 (e.g., a read only memory (ROM) 2306, a random access memory (RAM) 2305, etc.), and/or an interface bus 2307, and most frequently, although not necessarily, are all interconnected and/or communicating through a system bus 2304 on one or more (mother)board(s) 2302 having conductive and/or otherwise transportive circuit pathways through which instructions (e.g., binary encoded signals) may travel to effectuate communications, operations, storage, etc. The computer systemization may be connected to a power source 2386; e.g., optionally the power source may be internal. Optionally, a cryptographic processor 2326 and/or transceivers (e.g., ICs) 2374 may be connected to the system bus. In another embodiment, the cryptographic processor and/or transceivers may be connected as either internal and/or external peripheral devices 2312 via the interface bus I/O. In turn, the transceivers may be connected to antenna(s) 2375, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing API-Tool controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 2329 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the API-Tool controller and beyond through various interfaces. Should processing requirements dictate a greater amount speed and/or capacity, distributed processors (e.g., Distributed API-Tool), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the API-Tool may be achieved by implementing a microcontroller such as CAST's R8051XC2 microcontroller; Intel's MCS 51 (i.e., 8051 microcontroller); and/or the like. Also, to implement certain features of the API-Tool, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the API-Tool component collection (distributed or otherwise) and/or features may be implemented via the microprocessor and/or via embedded components; e.g., via ASIC, coprocessor, DSP, FPGA, and/or the like. Alternately, some implementations of the API-Tool may be implemented with embedded components that are configured and used to achieve a variety of features or signal processing.

Depending on the particular implementation, the embedded components may include software solutions, hardware solutions, and/or some combination of both hardware/software solutions. For example, API-Tool features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the API-Tool features. A hierarchy of programmable interconnects allow logic blocks to be interconnected as needed by the API-Tool system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the API-Tool may be developed on regular FPGAs and then migrated into a fixed version that more resembles ASIC implementations. Alternate or coordinating implementations may migrate API-Tool controller features to a final ASIC instead of or in addition to FPGAs. Depending on the implementation all of the aforementioned embedded components and microprocessors may be considered the "CPU" and/or "processor" for the API-Tool.

Power Source

The power source 2386 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2386 is connected to at least one of the interconnected subsequent components of the API-Tool thereby providing an electric current to all subsequent components. In one example, the power source 2386 is connected to the system bus component 2304. In an alternative embodiment, an outside power source 2386 is provided through a connection across the I/O 2308 interface. For example, a USB and/or IEEE 1394 connection carries both data and power across the connection and is therefore a suitable source of power.

Interface Adapters

Interface bus(ses) 2307 may accept, connect, and/or communicate to a number of interface adapters, conventionally although not necessarily in the form of adapter cards, such as but not limited to: input output interfaces (I/O) 2308, storage interfaces 2309, network interfaces 2310, and/or the like. Optionally, cryptographic processor interfaces 2327 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 2309 may accept, communicate, and/or connect to a number of storage devices such as, but not limited to: storage devices 2314, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 2310 may accept, communicate, and/or connect to a communications network 2313. Through a communications network 2313, the API-Tool controller is accessible through remote clients 2333b (e.g., computers with web browsers) by users 2333a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed API-Tool), architectures may similarly be employed to pool, load balance, and/or otherwise increase the communicative bandwidth required by the API-Tool controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 2310 may be used to engage with various communications network types 2313. For example, multiple network interfaces may be employed to allow for the communication over broadcast, multicast, and/or unicast networks.

Input Output interfaces (I/O) 2308 may accept, communicate, and/or connect to user input devices 2311, peripheral devices 2312, cryptographic processor devices 2328, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x, Bluetooth, cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 2311 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 2312 may be connected and/or communicate to I/O and/or other facilities of the like such as network interfaces, storage interfaces, directly to the interface bus, system bus, the CPU, and/or the like. Peripheral devices may be external, internal and/or part of the API-Tool controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the API-Tool controller may be embodied as an embedded, dedicated, and/or monitor-less (i.e., headless) device, wherein access would be provided over a network interface connection.

Cryptographic units such as, but not limited to, microcontrollers, processors 2326, interfaces 2327, and/or devices 2328 may be attached, and/or communicate with the API-Tool controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 2329. However, memory is a fungible technology and resource, thus, any number of memory embodiments may be employed in lieu of or in concert with one another. It is to be understood that the API-Tool controller and/or a computer systemization may employ various forms of memory 2329. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 2329 will include ROM 2306, RAM 2305, and a storage device 2314. A storage device 2314 may be any conventional computer system storage. Storage devices may include a drum; a (fixed and/or removable) magnetic disk drive; a magneto-optical drive; an optical drive (i.e., Blueray, CD ROM/ RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 2329 may contain a collection of program and/or database components and/or data such as, but not limited to: operating system component(s) 2315 (operating system); information server component(s) 2316 (information server); user interface component(s) 2317 (user interface); Web browser component(s) 2318 (Web browser); database(s) 2319; mail server component(s) 2321; mail client component(s) 2322; cryptographic server component(s) 2320 (cryptographic server); the API-Tool component(s) 2335; DCR Component 2341, WBP Component 2342, WG Component 2343, WIC Component 2344, RSAV Component 2345, PSW Component 2346, BWD Component 2347; and/or the like (i.e., collectively a component collection). These components may be stored and accessed from the storage devices and/or from storage devices accessible through an interface bus. Although non-conventional program components such as those in the component collection, typically, are stored in a local storage device 2314, they may also be loaded and/or stored in memory such as: peripheral devices, RAM, remote storage facilities through a communications network, ROM, various forms of memory, and/or the like.

Operating System

The operating system component 2315 is an executable program component facilitating the operation of the API-Tool controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP/Win7 (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the API-Tool controller to communicate with other entities through a communications network 2313. Various communication protocols may be used by the API-Tool controller as a subcarrier transport mechanism for interaction, such as, but not limited to: multicast, TCP/IP, UDP, unicast, and/or the like.

Information Server

An information server component 2316 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the API-Tool controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the API-Tool database 2319, operating systems, other program components, user interfaces, Web browsers, and/or the like.

Access to the API-Tool database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the API-Tool. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the API-Tool as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery UI, MooTools, Prototype, script.aculo.us, SWFObject, Yahoo! User Interface, any of which may be used and provide a baseline and means of accessing and displaying information graphically to users.

A user interface component 2317 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2318 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Firefox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the API-Tool enabled nodes. The combined application may be nugatory on systems employing standard Web browsers.

Mail Server

A mail server component 2321 is a stored program component that is executed by a CPU 2303. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the API-Tool.

Access to the API-Tool mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2322 is a stored program component that is executed by a CPU 2303. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2320 is a stored program component that is executed by a CPU 2303, cryptographic processor 2326, cryptographic processor interface 2327, cryptographic processor device 2328, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the API-Tool may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the API-Tool component to engage in secure transactions if so desired. The cryptographic component facilitates the secure accessing of resources on the API-Tool and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The API-Tool Database

The API-Tool database component 2319 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the API-Tool database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the API-Tool database is implemented as a data-structure, the use of the API-Tool database 2319 may be integrated into another component such as the API-Tool component 2335. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 2319 includes several tables 2319a-m. A merchants table 2319a includes fields such as, but not limited to: merchant_id, merchant_name, country, currency, email_address, password, userid, api_key, secret_key, postback_URL, and/or the like. The merchants table may support and/or track multiple entity accounts on a API-Tool. A transaction table 2319b includes fields such as, but not limited to: transaction_id, product_id, merchant_id, user_id, product_desc, merchant_trans, customer_id, amount, currency, dom_id, state, and/or the like. A user table 2319c user table includes fields such as, but not limited to: user_id, user_name, customer_id, credit_card_number, expiration_date, CVV, address, email, and/or the like. A dynamic costs table 2319d includes fields such as, but not limited to: dynamic_cost_id, credentials_id, transaction_id, product_id, cost, minimum_cost, maximum_cost, floor_value, ceiling_value, and/or the like. A developer table 2319e includes fields such as, but not limited to: developer_id, secret_key, api_key, developer_name, seller_id, last_deployed_code_date, saved_widgets. A widgets table 2319f includes fields such as, but not limited to: widget_id, seller_id, product_id, developer_id, widget_code, last_used_widget, is_saved, and/or the like. A saved widgets table 2319g includes fields such as, but not limited to: saved_widget_id, widget_id, seller_id, developer_id, widget_last_updated_date, and/or the like. A credentials table 2319h includes fields such as, but not limited to: credential_id, seller_id, developer_id, user_name, password, crypto_key, web_site_url, request_method, request_response_variable, and/or the like. A product/services table 2319i includes fields such as, but not limited to: product_id, seller_id, developer_id, product_name, product_description, inventory_quantity, next_inventory_order_date, next_inventory_order_amount, model_number, manufacturer, and/or the like. A template customization table 2319j includes fields such as, but not limited to: template_customization_id, template_id, developer_id, user_id, merchant_id, template_rule, is_active, rule_parser, parent_template_customization_id, and/or the like. A widget designer templates table 2319k includes fields such as, but not limited to: widget_designer_templates_id, widget_id, template_format, template, template_parser, and/or the like. A social media table 2319l includes fields such as, but not limited to: social_media_id, social_media_name, application_generation_template, access_credentials, developer_api_key, last_accessed, and/or the like. A social media applications table 2319m includes fields such as, but not limited to: social_media_application_id, social_media_id, app_name, developer_id, associated_widgets_id, application_pages, application_views, and/or the like.

In one embodiment, the API-Tool database may interact with other database systems. For example, employing a distributed database system, queries and data access by search API-Tool component may treat the combination of the API-Tool database, an integrated data security layer database as a single database entity.

In one embodiment, user programs may contain various user interface primitives, which may serve to update the API-Tool. Also, various accounts may require custom database tables depending upon the environments and the types of clients the API-Tool may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 2319*a-m*. The API-Tool may be configured to keep track of various settings, inputs, and parameters via database controllers.

The API-Tool database may communicate to and/or with other components in a component collection, including itself, and/or facilities of the like. Most frequently, the API-Tool database communicates with the API-Tool component, other program components, and/or the like. The database may contain, retain, and provide information regarding other nodes and data.

The API-Tools

The API-Tool component 2335 is a stored program component that is executed by a CPU. In one embodiment, the API-Tool component incorporates any and/or all combinations of the aspects of the API-Tool that was discussed in the previous figures. As such, the API-Tool affects accessing, obtaining and the provision of information, services, transactions, and/or the like across various communications networks. The features and embodiments of the API-Tool discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the API-Tool's features and facilities, and in many cases reduce the costs, energy consumption/requirements, and extend the life of API-Tool's underlying infrastructure; this has the added benefit of making the API-Tool more reliable. Similarly, many of the features and mechanisms are designed to be easier for users to use and access, thereby broadening the audience that may enjoy/employ and exploit the feature sets of the API-Tool; such ease of use also helps to increase the reliability of the API-Tool. In addition, the feature sets include heightened security as noted via the Cryptographic components 2320, 2326, 2328 and throughout, making access to the features and data more reliable and secure.

The API-Tool component may transform social application widget checkout requests, and/or the like and use the API-Tool. In one embodiment, the API-Tool component 2335 takes inputs (e.g., widget designer request 206, widget merchant content update request 207, social application data request 213, social checkout widget assembly request 212, registration information 1605, API-Tool tags and parameters 1630, buy widget click 1805, payment information 1825, and/or the like), and transforms the inputs via various components (e.g., DCR Component 2341, WBP Component 2342, WG Component 2343, WIC Component 2344, RSAV Component 2345, PSW Component 2346, BWD Component 2347, user enrollment 2348, API template management 2349, API request generation 2350, XML response generation 2351, and/or the like) into outputs (e.g., widget designer response 210, social checkout widget assembly response 277, social checkout widget application injection 276, widget designer response 210, registration request 1610, deploy code request 1635, lightbox request 1810, purchase request 1830, and/or the like).

The API-Tool component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools, Prototype; script.aculo.us, Simple Object Access Protocol (SOAP); SWFObject; Yahoo! User Interface; and/or the like), WebObjects, and/or the like. In one embodiment, the API-Tool server employs a cryptographic server to encrypt and decrypt communications. The API-Tool component may communicate to and/or with other components in a component collection, including itself, and/or facilities of the like. Most frequently, the API-Tool component communicates with the API-Tool database, operating systems, other program components, and/or the like. The API-Tool may contain, communicate, generate, obtain, and/or provide program component, system, user, and/or data communications, requests, and/or responses.

Distributed API-Tools

The structure and/or operation of any of the API-Tool node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the API-Tool controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c –post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the API-Tool controller may be executing a PHP script implementing a Secure Sockets Layer ("SSL") socket server via the information sherver, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
//set ip address and port to listen to for incoming data
$address = '192.168.0.100';
$port = 255;
//create a server-side SSL socket, listen
//for/accept incoming communication
$sock = socket_create(AF_INET, SOCK_STREAM, 0);
socket_bind($sock, $address, $port)
     or die('Could not bind to address');
socket_listen($sock);
$client = socket_accept($sock);
//read input data from client device in 1024 byte
//blocks until end of message
do {
       $input = "";
       $input = socket_read($client, 1024);
       $data .= $input;
} while($input != "");
// parse data to extract variables
$obj = json_decode($data, true);
// store input data in a database
mysql_connect("10.1.1.1",$srvr,$pass); // access database server
mysql_select("CLIENT_DB.SQL"); // select database to append
mysql_query("INSERT INTO UserTable (transmission) VALUES
($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

Additional embodiments of the API-Tool may include:

1. A processor implemented method of social application widget integration, comprising:

receiving a request to instantiate a social media application view;

retrieving a social media template corresponding to the social media application view;

generating, via a computer, social checkout widget launch code;

rendering a widget enhanced social media application view using the social checkout widget launch code and the social media template; and providing the widget enhanced social media application view.

2. The method of embodiment 1, additionally comprising:

receiving a social application widget checkout render request including a social application identifier;

querying a widget checkout template database for a checkout template corresponding to the social application identifier;

generating a rendered social application checkout widget using the widget checkout template;

providing the rendered social application checkout widget.

3. The method of embodiment 1, wherein receiving a request to instantiate a social media application view includes receiving an item designator of an item for purchase.

4. The method of embodiment 3, wherein the social widget launch code is generated using the item designator of an item for purchase.

5. The method of embodiment 4, wherein the social widget launch code is configured to render a widget launch button.

6. The method of embodiment 5, wherein the widget launch button includes an indication of an item for purchase.

7. The method of embodiment 6, wherein the indication is a photo of the item for purchase.

8. The method of embodiment 3, additionally comprising:
querying a merchant server for updated pricing and inventory data corresponding to the item designator of an item for purchase; and
receiving updated pricing and inventory data corresponding to the item designator of an item for purchase.

9. The method of embodiment 8, wherein receiving updated pricing and inventory data includes receiving data corresponding to a substitute item that can be substituted for the item for purchase.

Additional embodiments of social widgets of the API-Tool may include:

1. A processor-implemented purchase social widget integration code generation method, comprising:
obtaining a plurality of social widget customization parameters from a user;
retrieving a social widget code template;
generating, using the social widget customization parameters and the social widget code template, engageable social widget launch code, wherein the social widget launch code is configured to launch an integrated checkout interface from a social media site; and
providing the social widget launch code.

2. The method of embodiment 1, additionally comprising:
receiving a request to inject the generated social widget launch code into a social media application and access credentials for the social media application; and
injecting the generated social widget launch code into the social media application.

3. The method of embodiment 2, wherein injecting the social widget launch code comprises integrating the social widget launch code into a social media application view page.

4. The method of embodiment 3, wherein the social media application view page includes a placeholder token representing the widget injection point.

5. The method of embodiment 1, additionally comprising:
receiving a request to create a new social media application and inject the generated social widget launch code into the new social media application, wherein the request includes social media application configuration parameters;
retrieving a social media application creation template containing a social media application creation procedure;
applying the social media application configuration parameters to the social media application creation template;
executing the social media application creation procedure; and
injecting the generated social widget launch code into the social media application.

6. The method of embodiment 1 wherein the social widget customization parameters include an indication of an item to feature in the social widget.

7. The method of embodiment 6, additionally comprising an image representing the item.

8. The method of embodiment 1, wherein the social widget customization parameters include an indication of a revenue split to be used for purchases made using the social widget.

9. The method of embodiment 8, wherein the revenue split includes a social media site hosting the social media application.

10. The method of embodiment 2, additionally comprising retrieving a social media application profile, wherein the social media application profile contains indications of the social media application capabilities.

11. The method of embodiment 10, wherein the social media application capabilities include the ability to limit usage of the social widget launch code to users that are above an age threshold.

12. A processor-implemented purchase social widget integration code generation system, comprising:
means to obtain a plurality of social widget customization parameters from a user;
means to retrieve a social widget code template;
means to generate, using the social widget customization parameters and the social widget code template, engageable social widget launch code, wherein the social widget launch code is configured to launch an integrated checkout interface from a social media site; and
means to provide the social widget launch code.

13. The system of embodiment 12, additionally comprising:
receiving a request to inject the generated social widget launch code into a social media application and access credentials for the social media application; and
injecting the generated social widget launch code into the social media application.

14. The system of embodiment 13, wherein injecting the social widget launch code comprises integrating the social widget launch code into a social media application view page.

15. The system of embodiment 14, wherein the social media application view page includes a placeholder token representing the widget injection point.

16. The system of embodiment 12, additionally comprising:
receiving a request to create a new social media application and inject the generated social widget launch code into the new social media application, wherein the request includes social media application configuration parameters;
retrieving a social media application creation template containing a social media application creation procedure;
applying the social media application configuration parameters to the social media application creation template;
executing the social media application creation procedure; and
injecting the generated social widget launch code into the social media application.

17. The system of embodiment 12 wherein the social widget customization parameters include an indication of an item to feature in the social widget.

18. The system of embodiment 17, additionally comprising an image representing the item.

19. A purchase social widget integration code generation apparatus, comprising:
a memory;
a processor disposed in communication with said memory, and configured to issue a plurality of processing instructions stored in the memory, wherein the processor issues instructions to:

obtain a plurality of social widget customization parameters from a user;
retrieve a social widget code template;
generate, using the social widget customization parameters and the social widget code template, engageable social widget launch code, wherein the social widget launch code is configured to launch an integrated checkout interface from a social media site; and
provide the social widget launch code.

20. A non-transitory medium storing purchase social widget integration code generation instructions to:
obtain a plurality of social widget customization parameters from a user;
retrieve a social widget code template;
generate, using the social widget customization parameters and the social widget code template, engageable social widget launch code, wherein the social widget launch code is configured to launch an integrated checkout interface from a social media site; and
provide the social widget launch code.

Additional embodiments of the API-Tool may further include:

1. A cross-merchant applicable user interface widget generation and integration apparatus, comprising:
a memory;
a processor disposed in communication with said memory, and configured to issue a plurality of processing instructions stored in the memory, wherein the processor issues instructions to:
receive a user interface widget generation request for a cross-merchant applicable user interface widget;
provide a widget generation user interface including a list of cross-merchant applicable widget categories and a cross-merchant applicable widget parameter input element;
receive a cross-merchant applicable widget category selection via the widget generation user interface;
retrieve required widget parameters associated with the cross-merchant applicable widget category selection;
provide data input fields for the required widget parameters via the cross-merchant applicable widget parameter input element;
receive widget parameter values via the data input fields;
query for a structured interface widget template based on the widget parameters;
populate the received widget parameter values into the structured interface widget template;
generate a segment of cross-merchant applicable widget interface launch code; and
provide the segment of cross-merchant applicable widget interface launch code to a requester for incorporation into a web page.

2. The apparatus of embodiment 1, wherein the cross-merchant applicable user interface widget includes an actionable web page item.

3. The apparatus of embodiment 1, wherein the cross-merchant applicable user interface widget includes any of a light box, a button, a drop-down menu, and pop-up dialogue box.

4. The apparatus of embodiment 1, wherein the user interface widget generation request is received upon a user providing an access ID.

5. The apparatus of embodiment 1, wherein the cross-merchant applicable user interface widget provides an application programming interface (API).

6. The apparatus of embodiment 1, wherein the list of cross-merchant applicable widget categories comprises any of user profile APIs, user subscription APIs, subscription APIs, virtual wallet APIs, checkout and order APIs, catalog APIs, coupon APIs, shopping cart APIs, and payment profile APIs.

7. The apparatus of embodiment 1, wherein the widget parameter input element converts the widget parameter values into a structured language format.

8. The apparatus of embodiment 7, wherein the structured language format includes any of JSON and eXtensible Markup Language (XML).

9. The apparatus of embodiment 1, wherein the required widget parameters associated with a checkout and order API includes any of a login ID, a catalog ID, a vendor ID, a SKU number, and a currency type.

10. The apparatus of embodiment 1, wherein the required widget parameters associated with a user profile API includes any of a user ID and a partner ID.

11. The apparatus of embodiment 1, wherein the required widget parameters associated with a virtual wallet API includes any of a login user ID, a partner ID, and a currency type.

12. The apparatus of embodiment 1, wherein the required widget parameters associated with a user subscription API includes a login ID, a product ID, a complete URL, a cancel URL, a merchant ID.

13. The apparatus of embodiment 1, wherein the widget parameter input element includes a drop down selectable menu of API method.

14. The apparatus of embodiment 1, wherein the API method includes any of a GET and a POST message.

15. The apparatus of embodiment 1, wherein the structured interface widget template has a XML format.

16. The apparatus of embodiment 1, wherein the structured interface widget template is supported by any of PHP, .Net Framework, Javascript and Python.

17. The apparatus of embodiment 1, wherein the generated segment of cross-merchant applicable widget interface launch code is compatible with any of PHP, .Net Framework, Javascript and Python.

18. The apparatus of embodiment 1, wherein the structured interface widget template and the generated segment of widget interface launch code are supported by any of PHP, .Net Framework, Javascript and Python upon user selection.

19. The apparatus of embodiment 1, wherein the processor further issues instructions to:
obtain a URL of the web page;
determine a source code type of the web page; and
retrieve a structured interface widget template compatible with the source code type.

20. The apparatus of embodiment 1, wherein the widget generation user interface is merchant-site agnostic, and is applicable for widget generation for different merchant sites.

21. The apparatus of embodiment 1, wherein the cross-merchant applicable widget parameter input element includes a digital signature input element.

22. The apparatus of embodiment 21, wherein the processor further issues instructions to:
obtain digital signature parameters via the digital signature input element;
generate a signature element based on the digital signature parameters;
and incorporate the signature element into the cross-merchant applicable widget interface launch code.

23. The apparatus of embodiment 22, wherein the signature element facilitates a merchant to digitally sign an API request.

24. The apparatus of embodiment 22, wherein the processor further issues instructions to:
receive an API request from a merchant site; and
determine the API request is digitally signed.

25. The apparatus of embodiment 24, wherein the processor further issues instructions to:
determine a type of the API request; and
forward the API request to a destination entity for processing.

26. The apparatus of embodiment 25, wherein the destination entity includes any of a payment gateway, a payment processing network and a merchant server.

27. The apparatus of embodiment 1, wherein the processor further issues instructions to:
provide a graphic preview of the cross-merchant applicable user interface widget via the widget generation user interface;
receive a modification of widget parameters via the cross-merchant applicable widget parameter input element; and
generate a modified graphic preview of the cross-merchant applicable user interface widget based on the modification of widget parameters.

28. The apparatus of embodiment 1, wherein the cross-merchant applicable user interface widget provides a cost of a transaction, including any of a price of an item, shipping cost, handling cost, and additional charges.

29. A cross-merchant applicable user interface widget generation and integration system, comprising:
means to receive a user interface widget generation request for a cross-merchant applicable user interface widget;
means to provide a cross-merchant applicable widget generation user interface including a list of cross-merchant applicable widget categories and a cross-merchant applicable widget parameter input element;
means to receive a cross-merchant applicable widget category selection via the cross-merchant applicable widget generation user interface;
means to retrieve required widget parameters associated with the cross-merchant applicable widget category selection;
means to provide data input fields for the required widget parameters via the cross-merchant applicable widget parameter input element;
means to receive widget parameter values via the data input fields;
means to query for a structured interface widget template based on the widget parameters;
means to populate the received widget parameter values into the structured interface widget template;
means to generate a segment of cross-merchant applicable widget interface launch code; and
means to provide the segment of cross-merchant applicable widget interface launch code to a requester for incorporation into a web page.

30. A cross-merchant applicable user interface widget generation and integration storage non-transitory medium storing processor-executable instructions executable by a processor to:
receive a user interface widget generation request for a cross-merchant applicable user interface widget;
provide a cross-merchant applicable widget generation user interface including a list of cross-merchant applicable widget categories and a cross-merchant applicable widget parameter input element;
receive a cross-merchant applicable widget category selection via the cross-merchant applicable widget generation user interface;
retrieve required widget parameters associated with the cross-merchant applicable widget category selection;
provide data input fields for the required widget parameters via the widget parameter input element;
receive widget parameter values via the data input fields;
query for a structured interface widget template based on the widget parameters;
populate the received widget parameter values into the structured interface widget template;
generate a segment of cross-merchant applicable widget interface launch code; and
provide the segment of cross-merchant applicable widget interface launch code to a requester for incorporation into a web page.

31. A cross-merchant applicable user interface widget generation and integration processor-implemented method, comprising:
receiving a user interface widget generation request for a cross-merchant applicable user interface widget;
providing a cross-merchant applicable widget generation user interface including a list of cross-merchant applicable widget categories and a cross-merchant applicable widget parameter input element;
receiving a cross-merchant applicable widget category selection via the cross-merchant applicable widget generation user interface;
retrieving required widget parameters associated with the cross-merchant applicable widget category selection;
providing data input fields for the required widget parameters via the cross-merchant applicable widget parameter input element;
receiving widget parameter values via the data input fields;
querying for a structured interface widget template based on the widget parameters;
populating the received widget parameter values into the structured interface widget template;
generating a segment of cross-merchant applicable widget interface launch code; and
providing the segment of cross-merchant applicable widget interface launch code to a requester for incorporation into a web page.

In order to address various issues and advance the art, the entirety of this application for API-Tool (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a API-Tool individual and/or enterprise user, database configuration and/or relational model, data type, data transmission and/or network framework, syntax structure, and/or the like, various embodiments of the API-Tool, may be implemented that enable a great deal of flexibility and customization. For example, aspects of the API-Tool may be adapted for restaurant dining, online shopping, brick-and-mortar shopping, secured information processing, and/or the like. While various embodiments and discussions of the API-Tool have been directed to electronic purchase transactions, however, it is to be understood that the embodiments described herein may be readily configured and/or customized for a wide variety of other applications and/or implementations.

What is claimed is:

1. A cross-merchant applicable user interface widget generation and integration apparatus, comprising:
a memory;
a processor disposed in communication with said memory, and configured to issue a plurality of processing instructions stored in the memory, wherein the processor issues instructions to:
receive a user interface widget generation request for a cross-merchant applicable user interface widget;
in response to receiving the user interface widget generation request, provide a widget generation user interface including a list of cross-merchant applicable widget categories and a cross-merchant applicable widget parameter input element;
wherein the cross-merchant applicable widget parameter input element includes a digital signature input element;
receive a cross-merchant applicable widget category selection via the widget generation user interface;
retrieve required widget parameters associated with the cross-merchant applicable widget category selection;
provide data input fields for the required widget parameters via the cross-merchant applicable widget parameter input element;
receive widget parameter values via the data input fields;
query for a structured interface widget template based on the widget parameters;
populate the received widget parameter values into the structured interface widget template;
generate a segment of cross-merchant applicable widget interface launch code;
obtain digital signature parameters via the digital signature input element;
generate a signature element based on the digital signature parameters and incorporate the signature element into the cross-merchant applicable widget interface launch code, wherein the signature element facilitates a merchant to digitally sign an API request;
provide the segment of cross-merchant applicable widget interface launch code to a requester for incorporation into a web page;
provide the segment of cross-merchant applicable widget interface launch code for incorporation into a memory of a device from which the user interface widget generation request was received;
execute the segment of cross-merchant applicable widget interface launch code to present a new user interface function associated with an interaction of the device and the merchant, wherein the new user interface function supports interaction with the merchant without leaving a current page on the device from which the request was received, the current page being a social media page.

2. The apparatus of claim 1, wherein the cross-merchant applicable user interface widget includes an actionable web page item.

3. The apparatus of claim 1, wherein the cross-merchant applicable user interface widget includes any of a light box, a button, a drop-down menu, and pop-up dialogue box.

4. The apparatus of claim 1, wherein the user interface widget generation request is received upon a user providing an access ID.

5. The apparatus of claim 1, wherein the cross-merchant applicable user interface widget provides an application programming interface (API).

6. The apparatus of claim 1, wherein the list of cross-merchant applicable widget categories comprises any of user profile APIs, user subscription APIs, subscription APIs, virtual wallet APIs, checkout and order APIs, catalog APIs, coupon APIs, shopping cart APIs, and payment profile APIs.

7. The apparatus of claim 1, wherein the widget parameter input element converts the widget parameter values into a structured language format.

8. The apparatus of claim 7, wherein the structured language format includes any of JSON and eXtensible Markup Language (XML).

9. The apparatus of claim 1, wherein the required widget parameters associated with a checkout and order API includes any of a login ID, a catalog ID, a vendor ID, a SKU number, and a currency type.

10. The apparatus of claim 1, wherein the required widget parameters associated with a user profile API includes any of a user ID and a partner ID.

11. The apparatus of claim 1, wherein the processor further issues instructions to:
  receive the API request from a merchant site; and
  determine the API request is digitally signed.

12. The apparatus of claim 1, wherein the processor further issues instructions to:
  provide a graphic preview of the cross-merchant applicable user interface widget via the widget generation user interface;
  receive a modification of widget parameters via the cross-merchant applicable widget parameter input element; and
  generate a modified graphic preview of the cross-merchant applicable user interface widget based on the modification of widget parameters.

13. The apparatus of claim 1, wherein the cross-merchant applicable user interface widget provides a cost of a transaction, including any of a price of an item, shipping cost, handling cost, and additional charges.

14. A cross-merchant applicable user interface widget generation and integration storage non-transitory medium storing processor-executable instructions executable by a processor to:
  receive a user interface widget generation request for a cross-merchant applicable user interface widget;
  in response to receiving the user interface widget generation request, provide a cross-merchant applicable widget generation user interface including a list of cross-merchant applicable widget categories and a cross-merchant applicable widget parameter input element;
  wherein the cross-merchant applicable widget parameter input element includes a digital signature input element;
  receive a cross-merchant applicable widget category selection via the cross-merchant applicable widget generation user interface;
  retrieve required widget parameters associated with the cross-merchant applicable widget category selection;
  provide data input fields for the required widget parameters via the widget parameter input element wherein the required widget parameters associated with a checkout and order API includes any of a login ID, a catalog ID, a vendor ID, a SKU number, and a currency type and further wherein the required widget parameters associated with a checkout and order API includes any of a login ID, a catalog ID, a vendor ID, a SKU number, and a currency type;
  receive widget parameter values via the data input fields;
  query for a structured interface widget template based on the widget parameters;
  populate the received widget parameter values into the structured interface widget template;
  generate a segment of cross-merchant applicable widget interface launch code;
  obtain digital signature parameters via the digital signature input element;
  generate a signature element based on the digital signature parameters and incorporate the signature element into the cross-merchant applicable widget interface launch code, wherein the signature element facilitates a merchant to digitally sign an API request; and
  provide the segment of cross-merchant applicable widget interface launch code to a requester for incorporation into a web page, wherein the web page is a social media page and the segment of cross-merchant applicable widget interface launch code supports interaction with the merchant.

15. A cross-merchant applicable user interface widget generation and integration processor-implemented method, comprising:
  receiving a user interface widget generation request for a cross-merchant applicable user interface widget;
  in response to receiving the user interface widget generation request, providing a cross-merchant applicable widget generation user interface including a list of cross-merchant applicable widget categories and a cross-merchant applicable widget parameter input element;
  wherein the cross-merchant applicable widget parameter input element includes a digital signature input element;
  receiving a cross-merchant applicable widget category selection via the cross-merchant applicable widget generation user interface;
  retrieving required widget parameters associated with the cross-merchant applicable widget category selection;
  providing data input fields for the required widget parameters via the cross-merchant applicable widget parameter input element;
  receiving widget parameter values via the data input fields;
  querying for a structured interface widget template based on the widget parameters;
  populating the received widget parameter values into the structured interface widget template;
  generating a segment of cross-merchant applicable widget interface launch code;
  obtain digital signature parameters via the digital signature input element;
  generate a signature element based on the digital signature parameters and incorporate the signature element into the cross-merchant applicable widget interface launch code, wherein the signature element facilitates a merchant to digitally sign an API request; and
  providing the segment of cross-merchant applicable widget interface launch code to a requester for incorporation into a web page, wherein the web page is a social media page and the segment of cross-merchant applicable widget interface launch code supports interaction with the merchant.

* * * * *